(12) United States Patent  
Shanley et al.

(10) Patent No.: US 7,369,316 B2
(45) Date of Patent: May 6, 2008

(54) OPTICAL SYSTEM FOR A DIGITAL LIGHT PROJECTION SYSTEM INCLUDING OPTICAL CONCENTRATOR ELEMENTS HAVING REFLECTIVE APERTURE ELEMENTS

(75) Inventors: James F. Shanley, Westborough, MA (US); Rong Liu, Miami, FL (US)

(73) Assignee: Scram Technologies, Inc., Dunkirk, MD (US)

(*) Notice: Subject to any disclaimer, the term of this patent is extended or adjusted under 35 U.S.C. 154(b) by 109 days.

(21) Appl. No.: 11/445,660

(22) Filed: Jun. 2, 2006

(65) Prior Publication Data

US 2007/0132959 A1 Jun. 14, 2007

Related U.S. Application Data

(63) Continuation-in-part of application No. 11/375,356, filed on Mar. 13, 2006, which is a continuation-in-part of application No. 11/299,281, filed on Dec. 9, 2005.

(51) Int. Cl.
*G02B 27/10* (2006.01)
(52) U.S. Cl. ..................................... 359/629
(58) Field of Classification Search ................ 359/629
See application file for complete search history.

(56) References Cited

U.S. PATENT DOCUMENTS

| | | | |
|---|---|---|---|
| 2,215,900 A | 9/1940 | Bitner | |
| 2,254,961 A | 9/1941 | Harris | |
| 5,700,076 A | 12/1997 | Minich et al. | |
| 5,757,557 A | 5/1998 | Medvedev et al. | |
| 6,227,682 B1 | 5/2001 | Li | |
| 6,547,423 B2 | 4/2003 | Marshall et al. | |
| 6,580,469 B1 | 6/2003 | Rieche et al. | |
| 6,595,673 B1 | 7/2003 | Ferrante et al. | |
| 6,619,820 B2 | 9/2003 | Li | |
| 6,724,543 B1 | 4/2004 | Chinniah et al. | |
| 6,739,726 B2 | 5/2004 | Li | |
| 6,819,505 B1 | 11/2004 | Cassarly et al. | |
| 6,819,506 B1 | 11/2004 | Taylor et al. | |
| 6,836,576 B2 | 12/2004 | Li | |
| 6,856,436 B2 | 2/2005 | Brukilacchio et al. | |
| 6,856,727 B2 | 2/2005 | Li | |

(Continued)

OTHER PUBLICATIONS

Automated optimization advances software for illumination design. Laser Focus World, Nov. 2004. Author: William Cassarly, 3 pages.

*Primary Examiner*—Jordan Schwartz
*Assistant Examiner*—James C Jones
(74) *Attorney, Agent, or Firm*—Matthew J. Esserman

(57) ABSTRACT

An optical system for a digital light projection system is provided. The optical system comprises a plurality of LED arrays, wherein each LED array comprises a plurality of LEDs. The optical system also comprises an optical concentrator element positioned substantially adjacent to each of the LED arrays, wherein each concentrator element reflects light emitted from the plurality of LEDs within the corresponding LED array. The optical system preferably further comprises a reflective aperture element positioned substantially adjacent to the output surface of each concentrator element. The aperture element includes a reflective surface and an aperture defined by the reflective surface. The reflective surface faces the output surface of each corresponding concentrator element to thereby ultimately provide substantially uniform light which is projected through the aperture.

45 Claims, 33 Drawing Sheets

U.S. PATENT DOCUMENTS

| | | |
|---|---|---|
| 6,857,772 B2 | 2/2005 | Brukilacchio |
| 6,871,982 B2 | 3/2005 | Holman et al. |
| 6,926,435 B2 | 8/2005 | Li |
| 6,942,365 B2 | 9/2005 | Galli |
| 6,969,177 B2 | 11/2005 | Li et al. |
| 6,974,234 B2 | 12/2005 | Galli |
| 7,002,745 B2 | 2/2006 | Li |
| 7,006,288 B2 | 2/2006 | Li |
| 7,020,368 B2 | 3/2006 | Li |
| 7,072,096 B2 | 7/2006 | Holman et al. |
| 7,106,936 B2 | 9/2006 | Saccomanno |
| 7,151,874 B2 | 12/2006 | Li |
| 7,153,015 B2 | 12/2006 | Brukilacchio |
| 7,172,290 B2 | 2/2007 | Li |
| 2005/0052873 A1* | 3/2005 | Sokolov .................... 362/341 |
| 2005/0201100 A1 | 9/2005 | Cassarly et al. |
| 2006/0126178 A1* | 6/2006 | Li ............................. 359/485 |
| 2006/0164857 A1* | 7/2006 | Morejon et al. ............ 362/555 |
| 2006/0268417 A1* | 11/2006 | Penn et al. ................. 359/618 |

\* cited by examiner

| ITEM NO. | QTY. | PART NO. |
|---|---|---|
| 1 | 1 | OSA Armature 2-25-05 |
| 2 | 1 | Projection Housing 2-25-05 |
| 9 | 1 | Lens 6-8300-01-006 |
| 22 | 1 | DMD PC Board 2-09-05 |
| 32 | 1 | Lens Strap 1 |
| 33 | 1 | Lens Strap 2 |
| 52 | 1 | Turning Mirror 2 3-09-05 |
| 53 | 1 | Turning Mirror 1 |
| 55 | 1 | TIR Prism Cover-top |
| 57 | 1 | TIR Prism Cover-front |
| 58 | 1 | Beam Dump |
| 66 | 1 | Illuminator Housing 3-8-05 |
| 71 | 1 | LED Housing |
| 87 | 3 | LED Heat Sink |

Left View

Right View

Plan View

| ITEM NO. | QTY. | PART NO. |
|---|---|---|
| 1 | 2 | M2 PIN |
| 2 | 1 | alignment disk |
| 3 | 1 | 1pc housing |
| 4 | 4 | Prism 1, 8300-01-301 |
| 5 | 3 | aperture |
| 8 | 1 | prism retainer |
| 11 | 1 | Prism oring |
| 13 | 3 | S_1064 spring |
| 14 | 3 | OCE bd-3n |
| 15 | 96 | LL-CREE XB290 Die |
| 16 | 3 | OCE for X-cube 1_finished |
| 17 | 3 | small heat spreader |
| 18 | 3 | OCE lock |
| 19 | 3 | Custom heat sink |
| 20 | 3 | OCE Holder2 |

US 7,369,316 B2

OPTICAL SYSTEM FOR A DIGITAL LIGHT PROJECTION SYSTEM INCLUDING OPTICAL CONCENTRATOR ELEMENTS HAVING REFLECTIVE APERTURE ELEMENTS

This application is a continuation-in-part of U.S. patent application Ser. No. 11/375,356, filed Mar. 13, 2006, which is a continuation-in-part of U.S. patent application Ser. No. 11/299,281, filed Dec. 9, 2005.

FIELD OF THE INVENTION

The present invention relates generally to the field of digital light projection systems, and, more specifically, to optical systems for digital light projection systems including optical concentrator elements having reflective aperture elements.

BACKGROUND OF THE INVENTION

For digital light projection (DLP) systems, a need exists for an optical system capable of producing a substantially uniform and substantially white light in the illumination path. Traditional optical systems for DLP systems typically include light sources such as, for example, high intensity mercury lamps or xenon lamps. However, these traditional optical systems and corresponding light sources suffer from drawbacks such as, for example, non-uniformity of light, non-white light, and insufficient brightness. Moreover, the excess heat generation and high design complexity of these traditional optical systems require complicated and expensive procedures and techniques to manufacture the optical systems.

Thus, it is desirable to provide an optical system which is able to overcome the above disadvantages and which can be manufactured in an inexpensive and efficient fashion.

It is therefore desirable to provide an optical system including LED arrays and corresponding optical concentrator elements that can be utilized in DLP systems, and that does not suffer from the above drawbacks experienced by traditional optical systems. Additionally, while addressing these problems, the optical system including LED arrays and corresponding optical concentrator elements of the present invention will simultaneously provide superior uniformity of light, white light, and brightness desired in DLP systems.

These and other advantages of the present invention will become more fully apparent from the detailed description of the invention hereinbelow.

SUMMARY OF THE INVENTION

The present invention is directed to an optical system for a digital light projection system, the optical system comprising a plurality of LED arrays, wherein each LED array comprises a plurality of LEDs. The optical system also comprises an optical concentrator element positioned substantially adjacent to each of the LED arrays, wherein each concentrator element totally internally or specularly reflects light emitted from the plurality of LEDs within the corresponding LED array so as to provide substantially uniform light at an output surface of each concentrator element. The optical system may further comprise an optical combiner element, wherein the output surface of each concentrator element is optically aligned with a corresponding side of the combiner element, and wherein the combiner element spatially or chromatically combines the substantially uniform light provided at the output surface of each concentrator element so as to form substantially white light or color-combined light at an output surface of the combiner element. The optical system may further comprise a reflective aperture element positioned substantially adjacent to the output surface of each concentrator element, wherein the aperture element includes a reflective surface and an aperture defined by the reflective surface. The reflective surface faces the output surface of each concentrator element such that a first portion of the reflected light is intended for projection through the aperture without reflection by the reflective surface, while a second portion of the reflected light is reflected by the reflective surface back into the concentrator element to thereby provide light which is additionally reflected within the concentrator element. The first portion of the reflected light and the additionally reflected light is spatially combined at the output surface of each concentrator element at the aperture to thereby provide substantially uniform light which is projected through the aperture.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
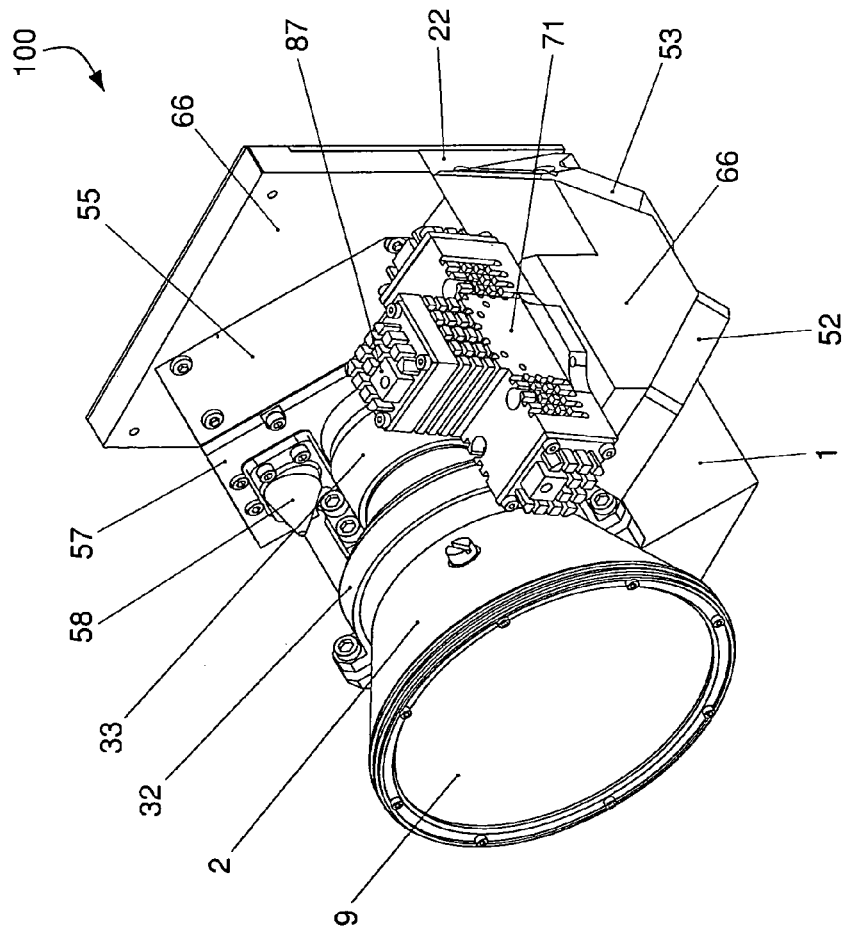
FIG. 1 is an isometric view illustrating a digital light projection system including a 3-channel LED array configuration, in accordance with a preferred embodiment of the present invention.

It is to be understood that the figures and descriptions of the present invention may have been simplified to illustrate elements that are relevant for a clear understanding of the present invention, while eliminating, for purposes of clarity, other elements found in a typical digital light projection system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Illustrated in FIG. 1 is a digital light projection (DLP) system 100 in accordance with an preferred exemplary embodiment of the present invention. The DLP system is an assembly and orientation of components including an armature 1, projection housing 2, lens 9, digital micromirror device (DMD) board 22, lens straps 32,33, turning (folding) mirrors 52,53, total internal reflection (TIR) prism top cover 55, TIR prism front cover 57, beam dump 58, illuminator housing 66, light emitting diode (LED) housing 71, and LED heat sink 87. Although a DMD is utilized in this configuration as the digital imaging device 75 (see FIGS. 10-12), alternative digital imaging devices may be contemplated.

Figure 2:
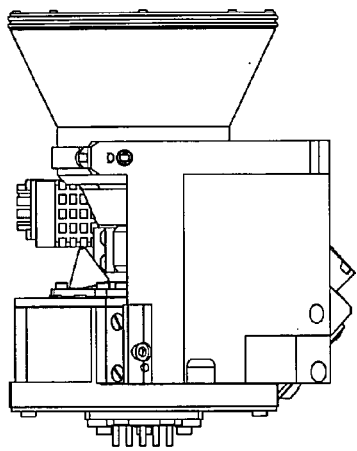
FIG. 2 is a left side view of the digital light projection system shown in FIG. 1.
Figure 3:
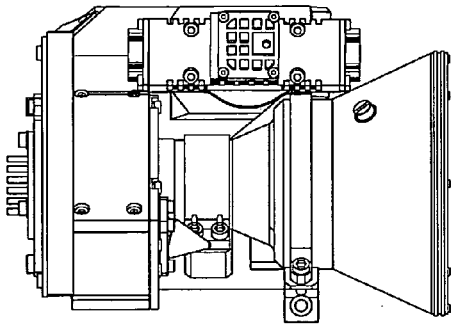
FIG. 3 is a right side view of the digital light projection system shown in FIG. 1.
Figure 4:
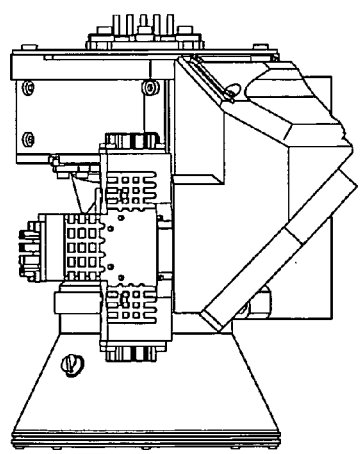
FIG. 4 is a plan view of the digital light projection system shown in FIG. 1.
Figure 5:
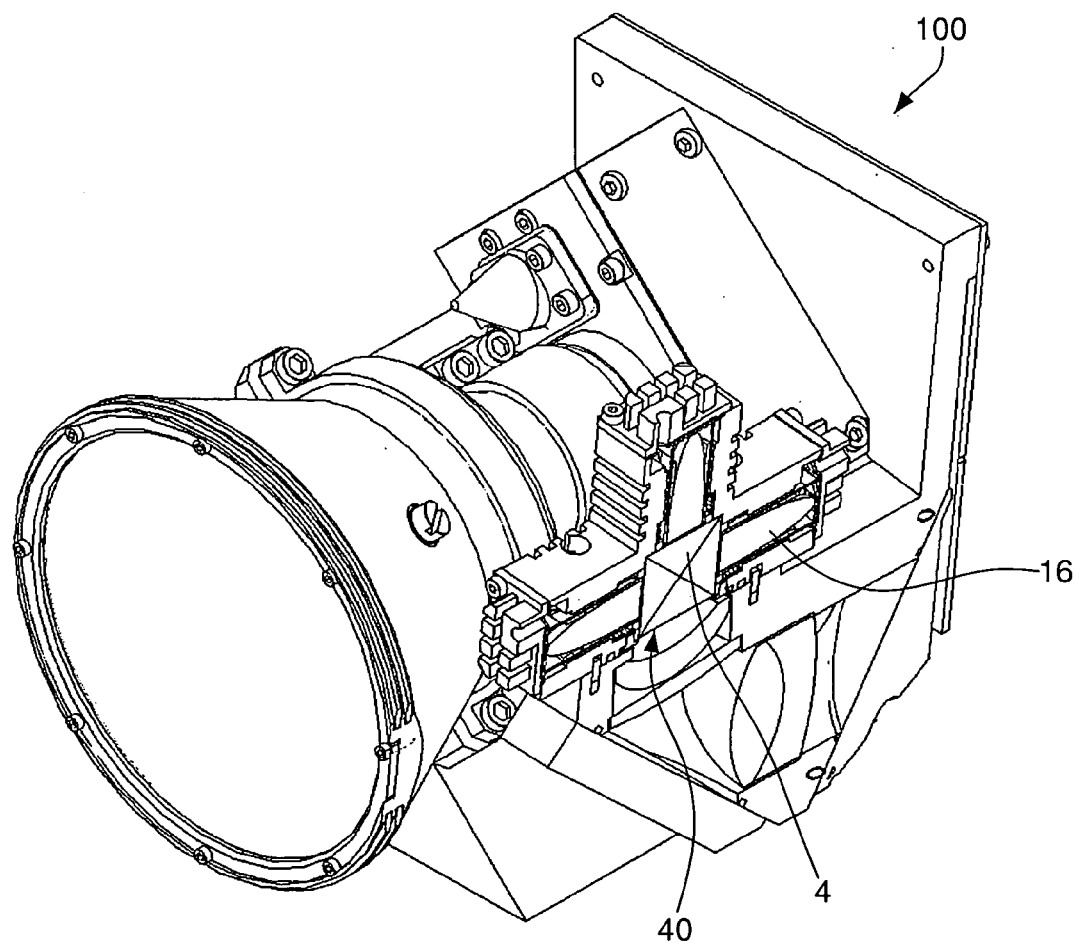
FIG. 5 is a cross-sectional view of the digital light projection system shown in FIG. 1.

FIG. 2 is a left side view of the DLP system 100 shown in FIG. 1. FIG. 3 is a right side view of the DLP system 100 shown in FIG. 1. FIG. 4 is a plan view of the DLP system 100 shown in FIG. 1. FIG. 5 is a cross-sectional view of the DLP system 100 shown in FIG. 1.

Figure 6:
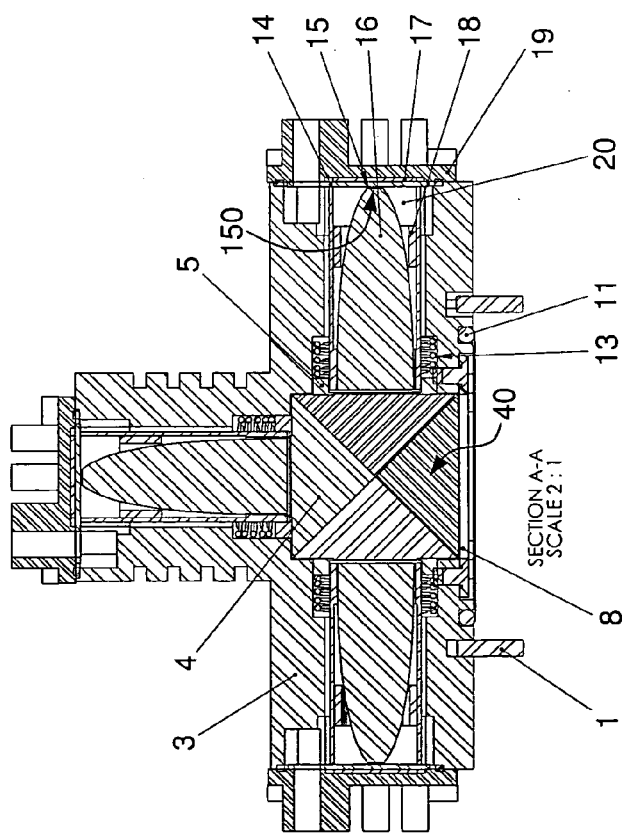
FIG. 6 is an enlarged, cross-sectional left side view of a portion of the digital light projection system shown in FIG. 1, including the 3 optical concentrator elements, the optical combiner element, and the 3 LED arrays.

FIG. 6 (with reference to the cross-sectional portion of FIG. 5) is an enlarged, cross-sectional left side view of a portion of the DLP system 100 shown in FIG. 1, including 3 optical concentrator elements 16, an optical combiner element 40, and 3 LED arrays 150. FIG. 6 also illustrates a pin 1, alignment disk 2, housing 3 (preferably aluminum which is cast or machined), prism 4, aperture 5, prism retainer 8, prism o-ring 11, spring 13, optical concentrator element board (or LED array mounting board) 14, LED (die) 15, small heat spreader 17, optical concentrator element lock 18, custom heat sink 19, and optical concentrator element holder 20. Although it is shown that, in this preferred example, one particular type of LED is utilized (i.e. LL-CREE XB290—for one of the 3 channels), other LEDs from other manufacturers may of course be contemplated. The number of LEDs per each LED array is preferably 32 but this number may vary. Also, the number of LEDs in one LED array may differ from that in another LED array.

Figure 7:
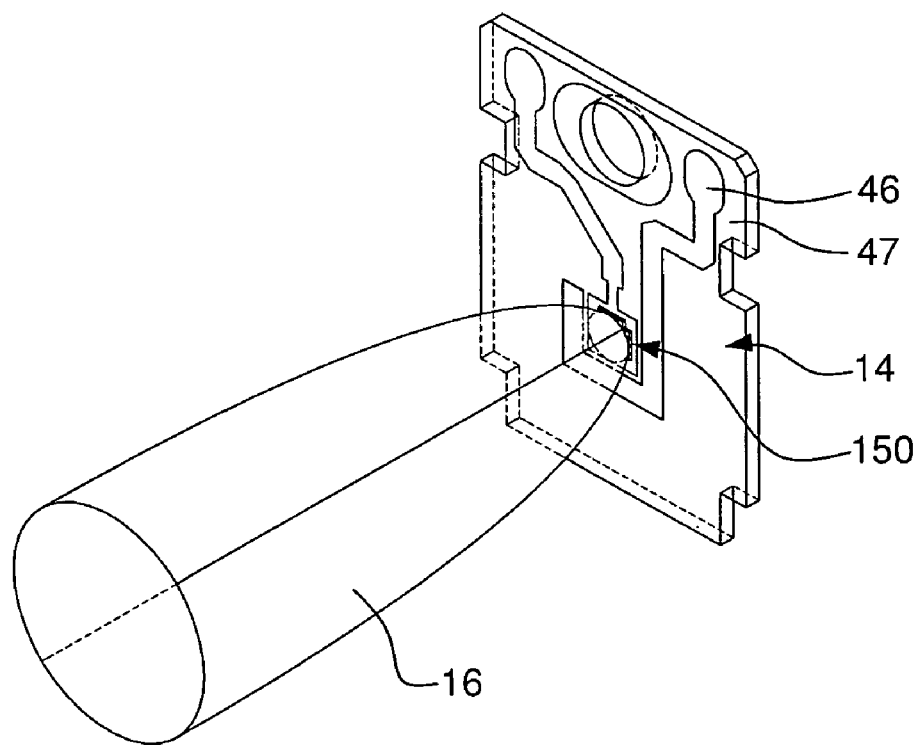
FIG. 7 is an enlarged, isometric view of a portion of the digital light projection system shown in FIG. 1, including the optical concentrator element, the LED array and corresponding LED array mounting board.

FIG. 7 is an enlarged, isometric view of a portion of the DLP system 100 shown in FIG. 1, including an optical concentrator element 16, an LED array 150 and corresponding LED array mounting board 14. FIG. 7 also illustrates a preferred LED circuit trace 46 comprising, for example, gold. The LED array mounting board 14 comprises an LED sub-mount/board 47 comprising, for example, beryllium oxide. The LEDs 15 may be directly mounted on LED array mounting board 14 or via a supplemental board therebetween.

Figure 8:
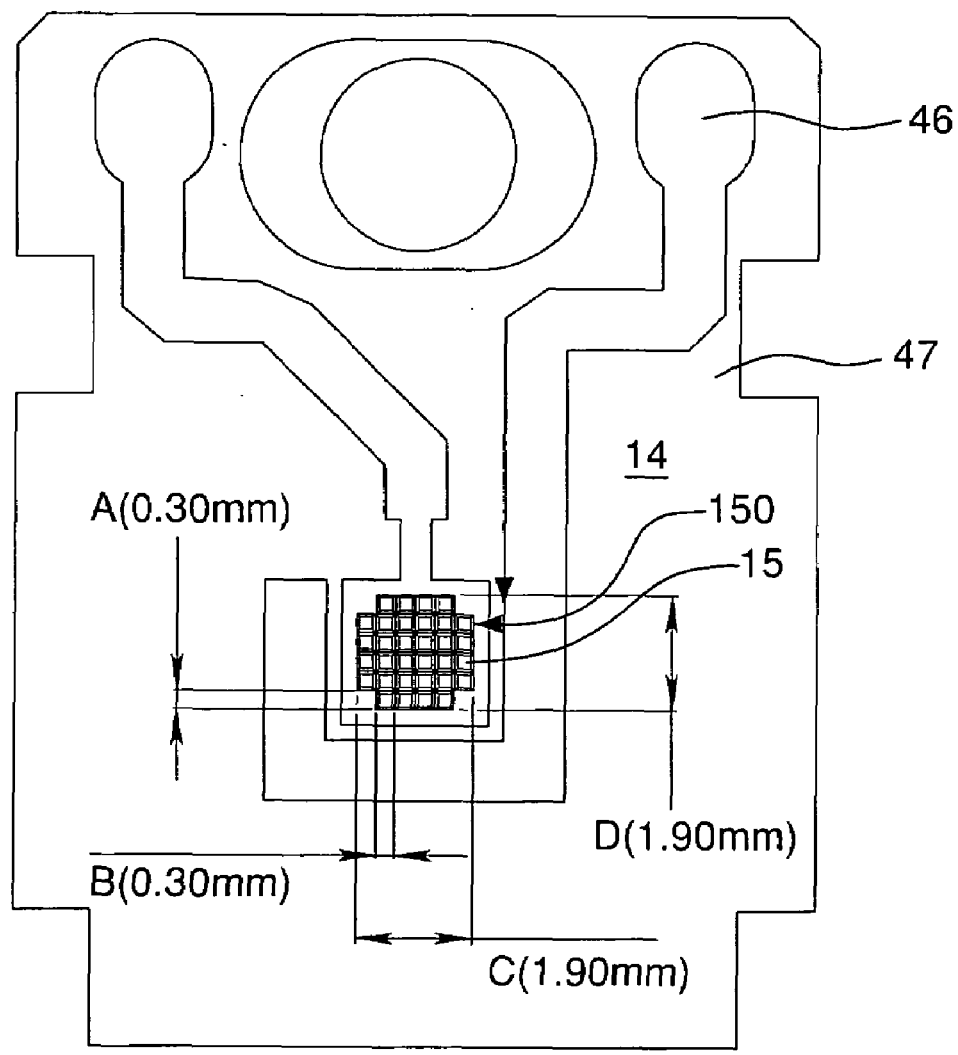
FIG. 8 is an enlarged, plan view of a portion of the digital light projection system shown in FIG. 1, including the LED array and corresponding LED array mounting board.
Figure 9:
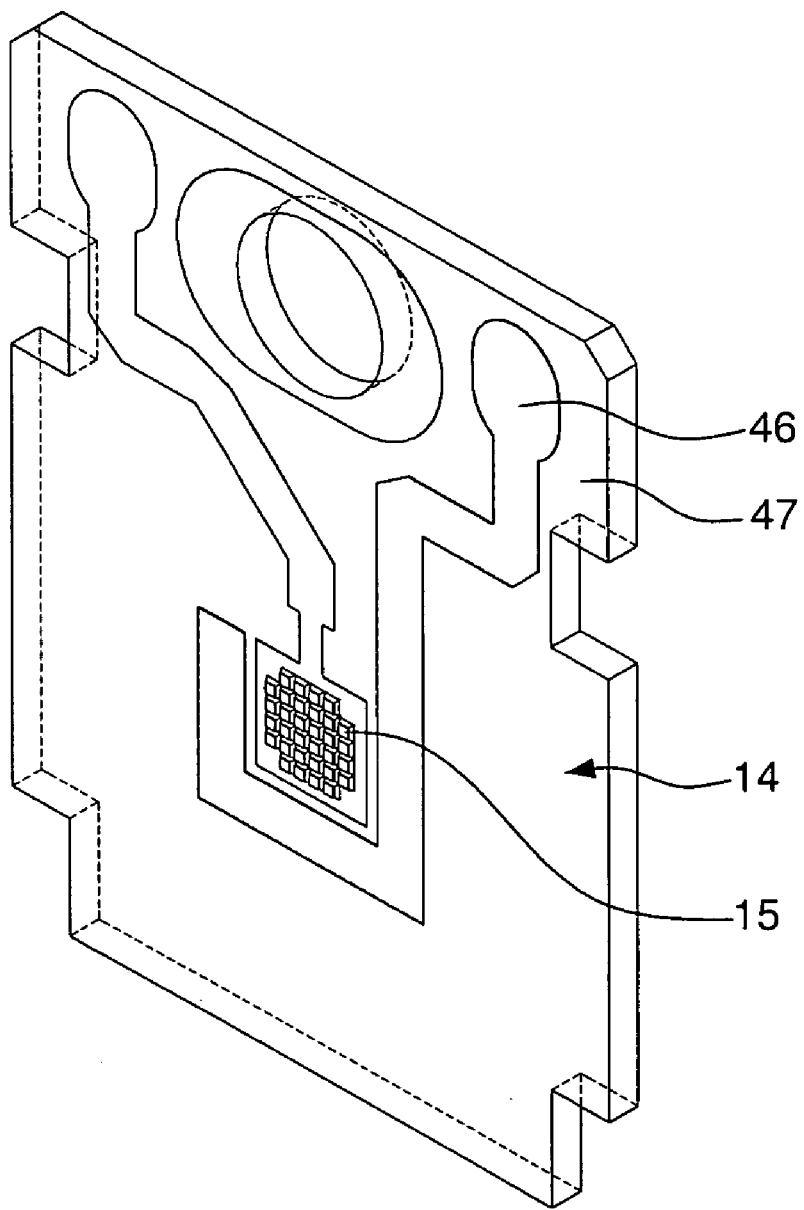
FIG. 9 is an isometric view of a portion of the digital light projection system shown in FIG. 1, including the LED array and corresponding LED array mounting board.

FIG. 8 is an enlarged, plan view of a portion of the DLP system 100 shown in FIG. 1, including an LED array 150 and corresponding LED array mounting board 14. The preferred dimensions and spacings of the LEDs 15 in the corresponding LED array 150 are as illustrated in FIG. 8 (i.e. A=0.30 mm, B=0.30 mm, C=1.90 mm, and D=1.90 mm). It is noted that other dimensions and spacings may be contemplated. FIG. 9 is an isometric view of a portion of the DLP system 100 shown in FIG. 1.

The optical concentrator element 16 is positioned substantially adjacent to each LED array 150, wherein each concentrator element 16 totally internally reflects light emitted from the plurality of LEDs 15 within the corresponding LED array 150 so as to provide substantially uniform light at an output surface of each concentrator element 16. The concentrator element 16 is formed by diamond-turning or mold processes. The concentrator element 16 preferably comprises a plastic, glass, or polymer material, or combinations thereof, that can withstand high heat such as, for example, Zeonex®. The concentrator element 16 is positioned directly in contact with each LED array. In the exemplary embodiment illustrated in the drawings, the concentrator element 16 is solid and TIR is employed therein. However, a reflective layer may be formed on portions (or the entire) outer surface of the concentrator element 16 to effect specular reflection instead of TIR. Alternative, the concentrator element 16 may be hollow and have reflective surfaces to achieve specular reflection. A concentrator element 16 having a combination of TIR and specular reflective portions may alternatively be contemplated.

The DLP system 100 may additionally include an optical coupling material positioned between the concentrator element and each LED array, wherein the optical coupling material is in contact with the concentrator element and each LED array. The optical coupling material preferably comprises a gel having an index of refraction which substantially matches that of the concentrator element.

Each LED array comprises LEDs which are preferably less than 0.35 mm in width, with 0.30 mm more preferably being the optimum width. Each LED array comprises LEDs which are spaced from adjacent LEDs within the same array by an amount preferably less than 0.025 mm, with 0.02 mm more preferably being the optimum spacing.

The concentrator element 16 preferably has a conic shape, and more preferably has a complex conic shape. The concentrator element 16 may either have a substantially parabolic cross section, a cross section which is a portion of a substantially hyperbolic shape, a cross section which is a portion of a substantially elliptical shape, or combinations thereof.

The DLP system 100 preferably further comprises an optical combiner element 40, wherein the output surface of each concentrator element 16 is positioned substantially adjacent to a corresponding side of the combiner element 40, and wherein the combiner element 40 spatially combines the substantially uniform light provided at the output surface of each concentrator element 16 so as to form substantially white light at an output surface of the combiner element 40.

The combiner element 40 preferably is a combiner cube which preferably comprises 4 prisms which are preferably composed of plastic, glass, polymer, or combinations thereof, with BK7 glass being the more preferred material. Dichroic coatings are preferably positioned between the prisms. The combiner element 40 preferably has an antireflective coating on the outside surfaces thereof. The combiner cube may be the type which is known in the art as an "X-Cube". Although other types of combiner elements may be contemplated.

In the configuration shown in FIG. 6, the combiner element allows red light from the left concentrator element 16 to be reflected downward, while being transmissive to green and blue from the other concentrator elements 16. Similarly, the same combiner element allows blue light from the right concentrator element 16 to be reflected downward, while being transmissive to green and red from the other concentrator elements 16. However, the same combiner element is transmissive for allowing the green light from the top concentrator element 16 to be transmitted downward. Of course, the locations of these colors may be varied or switched.

The plurality of LED arrays preferably consists of 3 LED arrays, wherein the 3 LED arrays preferably consist of 3 single-color LED arrays, and wherein each of the 3 single-color LED arrays is preferably of a different color from one another. More preferably, the 3-single-color LED arrays consist of an LED array consisting of only red LEDs, an LED array consisting of only green LEDs, and an LED array consisting of only blue LEDs. However, multi-color LED arrays (i.e. an LED array having multi-colored LEDs within the same LED array) may alternatively be contemplated.

Figure 10:
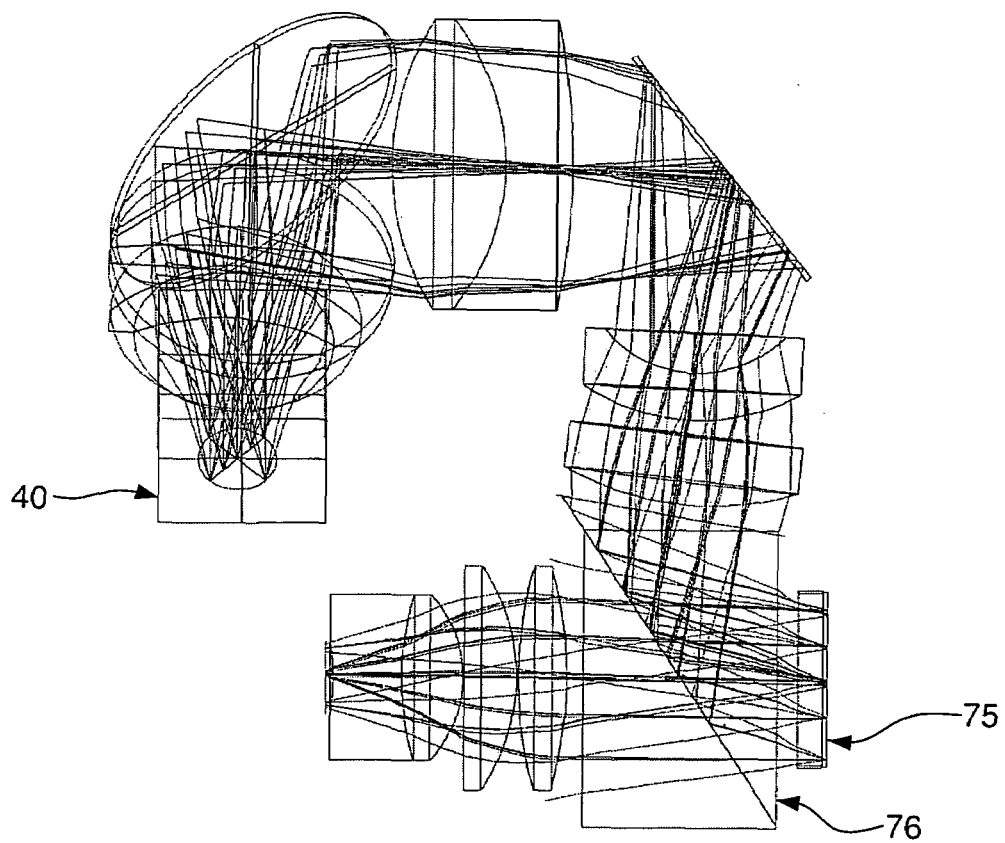
FIG. 10 is a plan view of a portion of the digital light projection system shown in FIG. 1, including the optical combiner element, illumination optics, total internal reflection (TIR) prism, digital imaging device, and projection optics.
Figure 11:
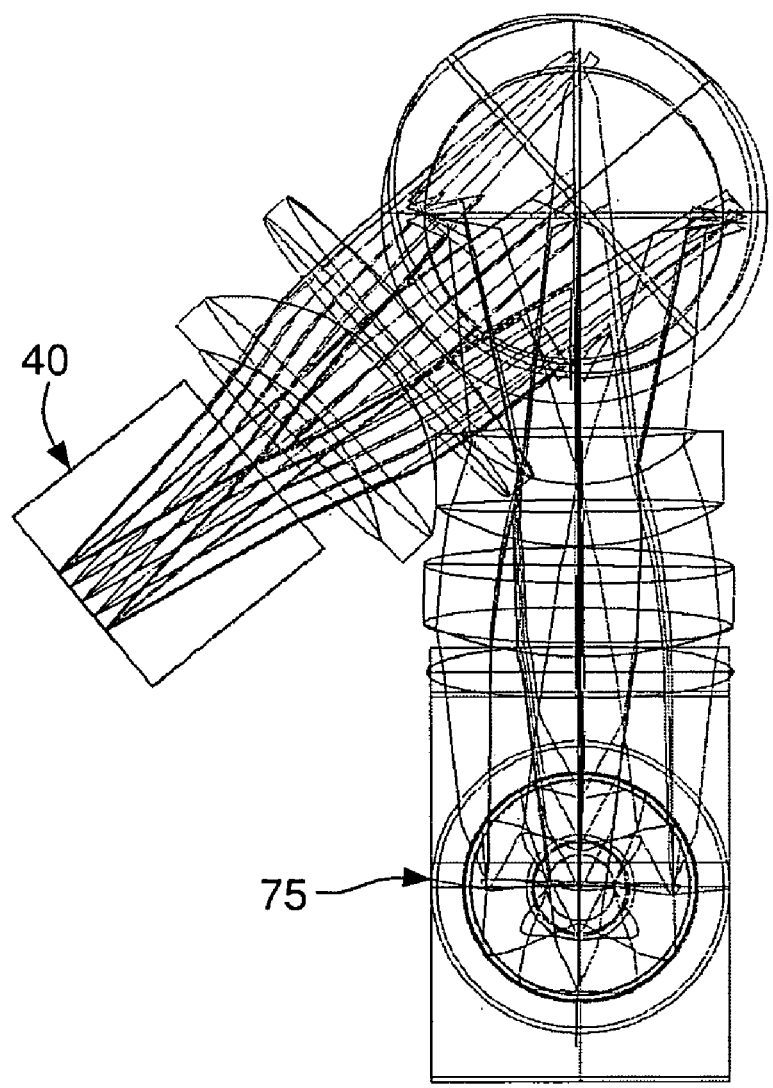
FIG. 11 is a left side view of the configuration shown in FIG. 10.
Figure 12:
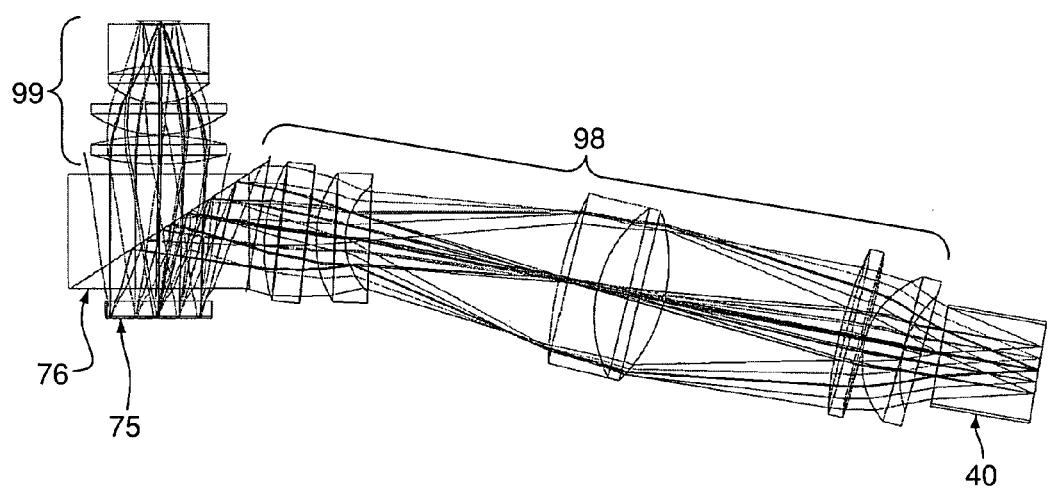
FIG. 12 is an unfolded plan view of the configuration shown in FIG. 10.

FIG. 10 is a plan view of a portion of the DLP system 100 shown in FIG. 1, including the optical combiner element 40, TIR cube 76 (e.g. preferably comprising 2 prisms with preferably an air interface (gap) therebetween), and digital imaging device 75. Sample ray traces are also illustrated in FIGS. 10-12. FIG. 11 is a left side view of the configuration shown in FIG. 10. FIG. 12 is an unfolded plan view of the configuration shown in FIG. 10. FIG. 12 also identifies the optical system which comprises illumination optics 98 and projection optics 99 portions of the DLP system 100.

Commonly available optical design software such as, for example, ZEMAX (Focus Software, Inc.) may be used to assist in describing the various characteristics (e.g. radius, thickness, glass type, diameter, and whether the surface is conic) corresponding to each surface region of each individual elements/groups within the optical system. In the preferred exemplary configuration shown in FIGS. 10 and 11, the ZEMAX software outputs surface data describing these surface characteristics as illustrated in Tables 1 and 2. Table 1 specifically illustrates data corresponding to the illumination optics 98 portion of the DLP system 100 while Table 2 specifically illustrates data corresponding to the projection optics 99 portion of the DLP system 100.

Of course, other surface data values for each individual element/group will become apparent to those of ordinary skill in the art in light of the present disclosure and may therefore be determined through routine experimentation dependent, inter alia, on the overall configuration and positioning of the individual elements/groups within the optical system, and the quality of the image desired.

TABLE 1

ZEMAX Software Output Describing Surface Data Summary and Detail for Each Individual Element within the Illumination Optical System 98

GENERAL LENS DATA:

| | |
|---|---|
| Surfaces: | 58 |
| Stop: | 18 |
| System Aperture: | Object Space NA = 0.342 |
| Telecentric Mode: | On |
| Glass Catalogs: | OHARA SCHOTT |
| Ray Aiming: | Off |
| Apodization: | Uniform, factor = 0.00000E+000 |
| Effective Focal Length: | 8.441475 (in air at system temperature and pressure) |
| Effective Focal Length: | 8.441475 (in image space) |
| Back Focal Length: | −1.62518 |
| Total Track: | 103.0885 |
| Image Space F/#: | 1.159715e−009 |
| Paraxial Working F/#: | 3.000081 |
| Working F/#: | 3.786189 |
| Image Space NA: | 0.1643947 |
| Object Space NA: | 0.342 |
| Stop Radius: | −14.12827 |
| Paraxial Image Height: | 10.26355 |
| Paraxial Magnification: | −2.183735 |
| Entrance Pupil Diameter: | 7.278919e+009 |
| Entrance Pupil Position: | 1e+010 |
| Exit Pupil Diameter: | 6.144481 |
| Exit Pupil Position: | −0.7151799 |
| Field Type: | Object height in Millimeters |
| Maximum Field: | 4.7 |
| Primary Wave: | 0.525 |
| Lens Units: | Millimeters |
| Angular Magnification: | 1.184627e+009 |

Fields: 8
Field Type: Object height in Millimeters

| # | X-Value | Y-Value | Weight |
|---|---|---|---|
| 1 | 0.000000 | −4.700000 | 1.000000 |
| 2 | −4.700000 | 0.000000 | 1.000000 |
| 3 | 0.000000 | 0.000000 | 1.000000 |
| 4 | 0.000000 | 4.700000 | 1.000000 |
| 5 | −4.700000 | 0.000000 | 1.000000 |
| 6 | 0.000000 | 2.350000 | 1.000000 |
| 7 | 0.000000 | −2.350000 | 1.000000 |
| 8 | 4.680000 | 0.000000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths: 3
Units: μm

| # | Value | Weight |
|---|---|---|
| 1 | 0.460000 | 0.100000 |
| 2 | 0.525000 | 0.100000 |
| 3 | 0.638000 | 0.100000 |

SURFACE DATA SUMMARY:

| Surf | Type | Comment | Radius | Thickness | Glass | Diameter | Conic |
|---|---|---|---|---|---|---|---|
| OBJ | TILTSURF | | — | −0.1 | | 9.4 | — |
| 1 | COORDBRK | | — | 0 | | — | — |
| 2 | COORDBRK | | — | 0 | | — | — |
| 3 | STANDARD | | Infinity | −20 | BK7 | 9.946429 | 0 |
| 4 | STANDARD | | Infinity | 0 | | 19.67943 | 0 |

TABLE 1-continued

ZEMAX Software Output Describing Surface Data Summary and Detail for Each
Individual Element within the Illumination Optical System 98

| | | | | | | |
|---|---|---|---|---|---|---|
| 5 | COORDBRK | — | −8.5 | | — | — |
| 6 | COORDBRK | — | 0 | | — | — |
| 7 | STANDARD | 21.71 | −7.891024 | S-TIM5 | 24 | 0 |
| 8 | STANDARD | 18.25 | −0.5 | | 30 | 0 |
| 9 | COORDBRK | — | 0 | | — | — |
| 10 | STANDARD | Infinity | −4.557022 | S-LAH66 | 34 | 0 |
| 11 | STANDARD | 88.4428 | −20 | | 34 | 0 |
| 12 | COORDBRK | — | 0 | | — | — |
| 13 | STANDARD | Infinity | 0 | MIRROR | 48.54833 | 0 |
| 14 | COORDBRK | — | 15 | | — | — |
| 15 | COORDBRK | — | 0 | | — | — |
| 16 | STANDARD | 33.39 | 13.54779 | S-PHM52 | 35 | 0 |
| 17 | STANDARD | −27.48 | 8 | S-TIH6 | 35 | 0 |
| STO | STANDARD | −86.487 | 18 | | 30.58858 | 0 |
| 19 | COORDBRK | — | 0 | | — | — |
| 20 | STANDARD | Infinity | 0 | MIRROR | 32.50427 | 0 |
| 21 | COORDBRK | — | −25 | | — | — |
| 22 | COORDBRK | — | 0 | | — | — |
| 23 | STANDARD | 14.454 | −5.741131 | S-LAH66 | 21.5 | 0 |
| 24 | STANDARD | 24.38 | −1.792458 | | 26 | 0 |
| 25 | COORDBRK | — | 0 | | — | — |
| 26 | STANDARD | Infinity | −8.394174 | S-LAH66 | 26.89927 | 0 |
| 27 | STANDARD | 35.2 | −1.5 | | 27.97676 | 0 |
| 28 | COORDBRK | — | 0 | | — | — |
| 29 | STANDARD | Infinity | 0 | | 27.73099 | 0 |
| 30 | STANDARD | Infinity | 0 | BK7 | 27.73099 | 0 |
| 31 | COORDBRK | — | 0 | | — | — |
| 32 | COORDBRK | — | 0 | | — | — |
| 33 | STANDARD | Infinity | 0 | MIRROR | 46.07963 | 0 |
| 34 | COORDBRK | — | 0 | | — | — |
| 35 | COORDBRK | — | 0 | | — | — |
| 36 | STANDARD | Infinity | 2.5 | | 23.09484 | 0 |
| 37 | STANDARD | Infinity | 3 | FK5 | 19.75174 | 0 |
| 38 | STANDARD | Infinity | 0.5 | | 20.79397 | 0 |
| 39 | STANDARD | Infinity | 0 | | 21.06476 | 0 |
| 40 | COORDBRK | — | 0 | | — | — |
| 41 | PARAXIAL | — | 0 | | 9369.208 | — |
| 42 | COORDBRK | — | 0 | | — | — |
| 43 | PARAXIAL | — | 0 | | 21.06476 | — |
| 44 | STANDARD | Infinity | −0.5 | MIRROR | 21.06476 | 0 |
| 45 | STANDARD | Infinity | −3 | FK5 | 20.86724 | 0 |
| 46 | STANDARD | Infinity | −2.5 | | 21.35858 | 0 |
| 47 | STANDARD | Infinity | −23 | BK7 | 22.46585 | 0 |
| 48 | STANDARD | Infinity | −2 | | 29.18505 | 0 |
| 49 | STANDARD | −49.071 | −5.7785 | S-PHM53 | 27 | 0 |
| 50 | STANDARD | 49.071 | −0.2 | | 27 | 0 |
| 51 | STANDARD | −23.88 | −6.194 | S-BSM81 | 27 | 0 |
| 52 | STANDARD | Infinity | −0.2 | | 27 | 0 |
| 53 | STANDARD | −14.732 | −7.297 | S-FSL5 | 20 | 0 |
| 54 | STANDARD | 35.2 | −8.181 | S-TIH6 | 20 | 0 |
| 55 | STANDARD | −32 | −0.91 | | 9.749377 | 0 |
| 56 | STANDARD | Infinity | 0 | | 8.773558 | 0 |
| 57 | STANDARD | Infinity | 0 | | 8.773558 | 0 |
| IMA | STANDARD | Infinity | | | 8.35577 | 0 |

SURFACE DATA DETAIL:

Surface OBJ: TILTSURF
X Tangent: 0
Y Tangent: 0
Surface 1: COORDBRK
Decenter X: 0
Decenter Y: 0
Tilt About X: 0
Tilt About Y: 0
Tilt About Z: −131
Order: Decenter then tilt
Surface 2: COORDBRK
Decenter X: 0
Decenter Y: 0
Tilt About X: 0
Tilt About Y: 0
Tilt About Z: −2.9
Order: Decenter then tilt
Surface 3: STANDARD
Aperture: Rectangular Aperture TABLE 1-continued ZEMAX Software Output Describing Surface Data Summary and Detail for Each Individual Element within the Illumination Optical System 98

| | |
|---|---|
| X Half Width: | 10 |
| Y Half Width: | 10 |
| X-Decenter: | 0 |
| Y-Decenter: | −0.5 |
| Surface 4: | STANDARD |
| Aperture: | Rectangular Aperture |
| X Half Width: | 10 |
| Y Half Width: | 10 |
| X-Decenter: | 0 |
| Y-Decenter: | −0.5 |
| Surface 5: | COORDBRK |
| Decenter X: | −5.2218237 |
| Decenter Y: | 0.54365794 |
| Tilt About X: | 1.9041816 |
| Tilt About Y: | −15.502077 |
| Tilt About Z: | 2.9 |
| Order: | Decenter then tilt |
| Surface 6: | COORDBRK |
| Decenter X: | 3.3921034 |
| Decenter Y: | −0.66705067 |
| Tilt About X: | −5.3573672 |
| Tilt About Y: | 19.739401 |
| Tilt About Z: | 0 |
| Order: | Decenter then tilt |
| Surface 7: | STANDARD |
| Aperture: | Circular Aperture |
| Minimum Radius: | 0 |
| Maximum Radius: | 12 |
| Surface 8: | STANDARD |
| Aperture: | Circular Aperture |
| Minimum Radius: | 0 |
| Maximum Radius: | 15 |
| Surface 9: | COORDBRK |
| Decenter X: | 0.14501681 |
| Decenter Y: | −1.0712542 |
| Tilt About X: | −0.066043177 |
| Tilt About Y: | −2.1064114 |
| Tilt About Z: | 0 |
| Order: | Decenter then tilt |
| Surface 10: | STANDARD |
| Aperture: | Circular Aperture |
| Minimum Radius: | 0 |
| Maximum Radius: | 17 |
| Surface 11: | STANDARD |
| Aperture: | Circular Aperture |
| Minimum Radius: | 0 |
| Maximum Radius: | 17 |
| Surface 12: | COORDBRK |
| Decenter X: | 0 |
| Decenter Y: | 0 |
| Tilt About X: | 47.8 |
| Tilt About Y: | 0 |
| Tilt About Z: | 0 |
| Order: | Decenter then tilt |
| Surface 13: | STANDARD |
| Aperture: | Elliptical Aperture |
| X Half Width: | 17 |
| Y Half Width: | 23 |
| X-Decenter: | 0 |
| Y-Decenter: | 2.5 |
| Surface 14: | COORDBRK |
| Decenter X: | 0 |
| Decenter Y: | 0 |
| Tilt About X: | 47.8 |
| Tilt About Y: | 0 |
| Tilt About Z: | 0 |
| Order: | Decenter then tilt |
| Surface 15: | COORDBRK |
| Decenter X: | 0.99137317 |
| Decenter Y: | 3.376614 |
| Tilt About X: | −1.475471 |
| Tilt About Y: | −0.81685172 |
| Tilt About Z: | 131 |
| Order: | Decenter then tilt |
| Surface 16: | STANDARD |
| Aperture: | Circular Aperture |

TABLE 1-continued

ZEMAX Software Output Describing Surface Data Summary and Detail for Each
Individual Element within the Illumination Optical System 98

| | |
|---|---|
| Minimum Radius: | 0 |
| Maximum Radius: | 17.5 |
| Surface 17: | STANDARD |
| Aperture: | Circular Aperture |
| Minimum Radius: | 0 |
| Maximum Radius: | 17.5 |
| Surface STO: | STANDARD |
| Aperture: | Circular Aperture |
| Minimum Radius: | 0 |
| Maximum Radius: | 17.5 |
| Surface 19: | COORDBRK |
| Decenter X: | 0 |
| Decenter Y: | 0 |
| Tilt About X: | −38.08 |
| Tilt About Y: | 0 |
| Tilt About Z: | 0 |
| Order: | Decenter then tilt |
| Surface 20: | STANDARD |
| Aperture: | Elliptical Aperture |
| X Half Width: | 13.5 |
| Y Half Width: | 17 |
| Surface 21: | COORDBRK |
| Decenter X: | 0 |
| Decenter Y: | 0 |
| Tilt About X: | −38.08 |
| Tilt About Y: | 0 |
| Tilt About Z: | 0 |
| Order: | Decenter then tilt |
| Surface 22: | COORDBRK |
| Decenter X: | −0.47489395 |
| Decenter Y: | −2.5440208 |
| Tilt About X: | −11.395468 |
| Tilt About Y: | 0.41607589 |
| Tilt About Z: | 0 |
| Order: | Decenter then tilt |
| Surface 23: | STANDARD |
| Aperture: | Circular Aperture |
| Minimum Radius: | 0 |
| Maximum Radius: | 10.75 |
| Surface 24: | STANDARD |
| Aperture: | Circular Aperture |
| Minimum Radius: | 0 |
| Maximum Radius: | 13 |
| Surface 25: | COORDBRK |
| Decenter X: | 0.14410789 |
| Decenter Y: | 0.37194946 |
| Tilt About X: | 4.0907234 |
| Tilt About Y: | −1.1395971 |
| Tilt About Z: | 0 |
| Order: | Decenter then tilt |
| Surface 26: | STANDARD |
| Aperture: | Circular Aperture |
| Minimum Radius: | 0 |
| Maximum Radius: | 14 |
| Surface 27: | STANDARD |
| Aperture: | Circular Aperture |
| Minimum Radius: | 0 |
| Maximum Radius: | 14 |
| Surface 28: | COORDBRK |
| Decenter X: | −0.19341404 |
| Decenter Y: | 0.80152634 |
| Tilt About X: | 3.4489226 |
| Tilt About Y: | 0.68325579 |
| Tilt About Z: | 0 |
| Order: | Decenter then tilt |
| Surface 29: | STANDARD |
| Surface 30: | STANDARD |
| Aperture: | Rectangular Aperture |
| X Half Width: | 13.5 |
| Y Half Width: | 13.03 |
| Surface 31: | COORDBRK |
| Decenter X: | 0 |
| Decenter Y: | 13.03 |
| Tilt About X: | 47 |
| Tilt About Y: | 0 |
| Tilt About Z: | 0 |

TABLE 1-continued

ZEMAX Software Output Describing Surface Data Summary and Detail for Each Individual Element within the Illumination Optical System 98

| | |
|---|---|
| Order: | Decenter then tilt |
| Surface 32: | COORDBRK |
| Decenter X: | 0 |
| Decenter Y: | −23.565 |
| Tilt About X: | 0 |
| Tilt About Y: | 0 |
| Tilt About Z: | 0 |
| Order: | Decenter then tilt |
| Surface 33: | STANDARD |
| Aperture: | Rectangular Aperture |
| X Half Width: | 13.5 |
| Y Half Width: | 23.57 |
| Surface 34: | COORDBRK |
| Decenter X: | 0 |
| Decenter Y: | −23.565 |
| Tilt About X: | 33 |
| Tilt About Y: | 0 |
| Tilt About Z: | 0 |
| Order: | Decenter then tilt |
| Surface 35: | COORDBRK |
| Decenter X: | 0 |
| Decenter Y: | 17.5 |
| Tilt About X: | 0 |
| Tilt About Y: | 0 |
| Tilt About Z: | 0 |
| Order: | Decenter then tilt |
| Surface 36: | STANDARD |
| Aperture: | Rectangular Aperture |
| X Half Width: | 13.5 |
| Y Half Width: | 17.5 |
| Surface 37: | STANDARD |
| Surface 38: | STANDARD |
| Surface 39: | STANDARD |
| Surface 40: | COORDBRK |
| Decenter X: | 0 |
| Decenter Y: | 4451.5 |
| Tilt About X: | 0 |
| Tilt About Y: | 0 |
| Tilt About Z: | 0 |
| Order: | Decenter then tilt |
| Surface 41: | PARAXIAL |
| Focal length: | −10000 |
| OPD Mode: | 0 |
| Surface 42: | COORDBRK |
| Decenter X: | 0 |
| Decenter Y: | −4451.5 |
| Tilt About X: | 0 |
| Tilt About Y: | 0 |
| Tilt About Z: | 0 |
| Order: | Decenter then tilt |
| Surface 43: | PARAXIAL |
| Focal length: | 0 |
| OPD Mode: | 0 |
| Surface 44: | STANDARD |
| Surface 45: | STANDARD |
| Surface 46: | STANDARD |
| Surface 47: | STANDARD |
| Aperture: | Rectangular Aperture |
| X Half Width: | 13.5 |
| Y Half Width: | 18 |
| Surface 48: | STANDARD |
| Aperture: | Rectangular Aperture |
| X Half Width: | 13.5 |
| Y Half Width: | 18 |
| Surface 49: | STANDARD |
| Aperture: | Circular Aperture |
| Minimum Radius: | 0 |
| Maximum Radius: | 13 |
| Surface 50: | STANDARD |
| Aperture: | Floating Aperture |
| Maximum Radius: | 13.5 |
| Surface 51: | STANDARD |
| Aperture: | Floating Aperture |
| Maximum Radius: | 13.5 |
| Surface 52: | STANDARD |
| Aperture: | Floating Aperture |

TABLE 1-continued

ZEMAX Software Output Describing Surface Data Summary and Detail for Each
Individual Element within the Illumination Optical System 98

| | |
|---|---|
| Maximum Radius: | 13.5 |
| Surface 53: | STANDARD |
| Aperture: | Floating Aperture |
| Maximum Radius: | 10 |
| Surface 54: | STANDARD |
| Aperture: | Floating Aperture |
| Maximum Radius: | 10 |
| Surface 55: | STANDARD |
| Surface 56: | STANDARD |
| Surface 57: | STANDARD |
| Aperture: | Circular Aperture |
| Minimum Radius: | 0 |
| Maximum Radius: | 3.06 |
| Surface IMA: | STANDARD |

COATING DEFINITIONS:
PHYSICAL OPTICS PROPAGATION SETTINGS SUMMARY:

| | |
|---|---|
| OBJ TILTSURF | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 1 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 2 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 3 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 4 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 5 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 6 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 7 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 8 STANDARD | |
| Use Rays To Propagate To Next Surface: | Off |

TABLE 1-continued

ZEMAX Software Output Describing Surface Data Summary and Detail for Each
Individual Element within the Illumination Optical System 98

| | |
|---|---|
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 9 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 10 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 11 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 12 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 13 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 14 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 15 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 16 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 17 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| STO STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 19 COORDBRK | |

TABLE 1-continued

ZEMAX Software Output Describing Surface Data Summary and Detail for Each
Individual Element within the Illumination Optical System 98

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

20 STANDARD

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

21 COORDBRK

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

22 COORDBRK

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

23 STANDARD

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

24 STANDARD

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

25 COORDBRK

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

26 STANDARD

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

27 STANDARD

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

28 COORDBRK

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

29 STANDARD

| | |
|---|---|
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

TABLE 1-continued

ZEMAX Software Output Describing Surface Data Summary and Detail for Each Individual Element within the Illumination Optical System 98

30 STANDARD
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
31 COORDBRK
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
32 COORDBRK
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
33 STANDARD
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
34 COORDBRK
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
35 COORDBRK
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
36 STANDARD
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
37 STANDARD
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
38 STANDARD
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
39 STANDARD
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off
Reference Radius: Best Fit
40 COORDBRK
Use Rays To Propagate To Next Surface: Off
Recompute Pilot Beam: Off
Do Not Rescale Beam Size Using Ray Data: Off
Use Angular Spectrum Propagator: Off
Use Parallel Probing Rays: Off TABLE 1-continued ZEMAX Software Output Describing Surface Data Summary and Detail for Each
Individual Element within the Illumination Optical System 98

| | |
|---|---|
| Reference Radius: | Best Fit |
| 41 PARAXIAL | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 42 COORDBRK | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 43 PARAXIAL | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 44 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 45 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 46 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 47 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 48 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 49 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 50 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 51 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |

TABLE 1-continued

ZEMAX Software Output Describing Surface Data Summary and Detail for Each
Individual Element within the Illumination Optical System 98

| | |
|---|---|
| Use Parallel Probing Rays: | Off |
| Reference Radius: | Best Fit |
| 52 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 53 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 54 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 55 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 56 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 57 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| IMA STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

EDGE THICKNESS DATA:

| Surf | X-Edge | Y-Edge |
|---|---|---|
| OBJ | −0.100000 | −0.100000 |
| 1 | 0.000000 | 0.000000 |
| 2 | 0.000000 | 0.000000 |
| 3 | −20.000000 | −20.000000 |
| 4 | 0.000000 | 0.000000 |
| 5 | −8.500000 | −8.500000 |
| 6 | 3.617900 | 3.617900 |
| 7 | −3.654235 | −3.654235 |
| 8 | −8.354689 | −8.354689 |
| 9 | 0.000000 | 0.000000 |
| 10 | −2.907821 | −2.907821 |
| 11 | −21.649201 | −21.649201 |
| 12 | 0.000000 | 0.000000 |
| 13 | 0.000000 | 0.000000 |
| 14 | 15.000000 | 15.000000 |
| 15 | 4.953367 | 4.953367 |
| 16 | 2.301690 | 2.301690 |
| 17 | 12.929674 | 12.929674 |
| STO | 19.363056 | 19.363056 |
| 19 | 0.000000 | 0.000000 |

TABLE 1-continued

ZEMAX Software Output Describing Surface Data Summary and Detail for Each Individual Element within the Illumination Optical System 98

| | | |
|---|---|---|
| 20 | 0.000000 | 0.000000 |
| 21 | −25.000000 | −25.000000 |
| 22 | 4.791929 | 4.791929 |
| 23 | −6.777909 | −6.777909 |
| 24 | −5.547609 | −5.547609 |
| 25 | 0.000000 | 0.000000 |
| 26 | −5.495339 | −5.495339 |
| 27 | −4.398835 | −4.398835 |
| 28 | 0.000000 | 0.000000 |
| 29 | 0.000000 | 0.000000 |
| 30 | 0.000000 | 0.000000 |
| 31 | 0.000000 | 0.000000 |
| 32 | 0.000000 | 0.000000 |
| 33 | 0.000000 | 0.000000 |
| 34 | 0.000000 | 0.000000 |
| 35 | 0.000000 | 0.000000 |
| 36 | 2.500000 | 2.500000 |
| 37 | 3.000000 | 3.000000 |
| 38 | 0.500000 | 0.500000 |
| 39 | 0.000000 | 0.000000 |
| 40 | 0.000000 | 0.000000 |
| 41 | 0.000000 | 0.000000 |
| 42 | 0.000000 | 0.000000 |
| 43 | 0.000000 | 0.000000 |
| 44 | −0.500000 | −0.500000 |
| 45 | −3.000000 | −3.000000 |
| 46 | −2.500000 | −2.500000 |
| 47 | −23.000000 | −23.000000 |
| 48 | −3.893537 | −3.893537 |
| 49 | −1.991427 | −1.991427 |
| 50 | −6.275709 | −6.275709 |
| 51 | −2.011827 | −2.011827 |
| 52 | −4.113875 | −4.113875 |
| 53 | −1.932791 | −1.932791 |
| 54 | −10.004803 | −10.004803 |
| 55 | −0.536530 | −0.536530 |
| 56 | 0.000000 | 0.000000 |
| 57 | 0.000000 | 0.000000 |
| IMA | 0.000000 | 0.000000 |

MULTI-CONFIGURATION DATA:
Configuration 1:

| | | |
|---|---|---|
| 1 Y-field 1: | −4.7 | |
| 2 X-field 2: | −4.7 | Pick up from configuration 1, operand 1, scale 1, offset 0 |
| 3 Y-field 4: | 4.7 | Pick up from configuration 1, operand 1, scale −1, offset 0 |
| 4 X-field 5: | −4.7 | Pick up from configuration 1, operand 1, scale 1, offset 0 |
| 5 Y-field 6: | 2.35 | Pick up from configuration 1, operand 1, scale −0.5, offset 0 |
| 6 Y-field 7: | −2.35 | Pick up from configuration 1, operand 1, scale 0.5, offset 0 |
| 7 Aperture: | 0.342 | |

SOLVE AND VARIABLE DATA:

| | |
|---|---|
| Parameter 1 Surf 5: | Variable |
| Parameter 2 Surf 5: | Variable |
| Parameter 3 Surf 5: | Variable |
| Parameter 4 Surf 5: | Variable |
| Parameter 5 Surf 5: | Pickup from 2 times −1.000000, plus 0.000000 |
| Parameter 1 Surf 6: | Variable |
| Parameter 2 Surf 6: | Variable |
| Parameter 3 Surf 6: | Variable |
| Parameter 4 Surf 6: | Variable |
| Thickness of 7: | Variable |
| Semi Diameter 7: | Fixed |
| Semi Diameter 8: | Fixed |
| Parameter 1 Surf 9: | Variable |
| Parameter 2 Surf 9: | Variable |
| Parameter 3 Surf 9: | Variable |
| Parameter 4 Surf 9: | Variable |
| Thickness of 10: | Variable |
| Semi Diameter 10: | Fixed |
| Semi Diameter 11: | Fixed |
| Parameter 3 Surf 14: | Pickup from 12 times 1.000000, plus 0.000000 |
| Parameter 1 Surf 15: | Variable |
| Parameter 2 Surf 15: | Variable |
| Parameter 3 Surf 15: | Variable |

TABLE 1-continued

ZEMAX Software Output Describing Surface Data Summary and Detail for Each
Individual Element within the Illumination Optical System 98

| | |
|---|---|
| Parameter 4 Surf 15: | Variable |
| Parameter 5 Surf 15: | Pickup from 1 times −1.000000, plus 0.000000 |
| Thickness of 16: | Variable |
| Semi Diameter 16: | Fixed |
| Semi Diameter 17: | Fixed |
| Parameter 3 Surf 21: | Pickup from 19 times 1.000000, plus 0.000000 |
| Parameter 1 Surf 22: | Variable |
| Parameter 2 Surf 22: | Variable |
| Parameter 3 Surf 22: | Variable |
| Parameter 4 Surf 22: | Variable |
| Thickness of 23: | Variable |
| Semi Diameter 23: | Fixed |
| Thickness of 24: | Variable |
| Semi Diameter 24: | Fixed |
| Parameter 1 Surf 25: | Variable |
| Parameter 2 Surf 25: | Variable |
| Parameter 3 Surf 25: | Variable |
| Parameter 4 Surf 25: | Variable |
| Thickness of 26: | Variable |
| Parameter 1 Surf 28: | Variable |
| Parameter 2 Surf 28: | Variable |
| Parameter 3 Surf 28: | Variable |
| Parameter 4 Surf 28: | Variable |
| Parameter 2 Surf 34: | Pickup from 32 times 1.000000, plus 0.000000 |
| Parameter 1 Surf 42: | Pickup from 40 times −1.000000, plus 0.000000 |
| Parameter 2 Surf 42: | Pickup from 40 times −1.000000, plus 0.000000 |
| Thickness of 44: | Solve, pick up value from 38, scaled by −1.00000, plus 0.00000 |
| Semi Diameter 49: | Fixed |
| Curvature of 50: | Solve, pick up value from 49, scaled by −1.00000 |
| Semi Diameter 50: | Pickup from 49 |
| Semi Diameter 51: | Fixed |
| Semi Diameter 52: | Fixed |
| Semi Diameter 53: | Fixed |
| Semi Diameter 54: | Fixed |
| Config 1, Oper 2 X-field 2: | −4.7 Pick up from configuration 1, operand 1, scale 1, offset 0 |
| Config 1, Oper 3 Y-field 4: | 4.7 Pick up from configuration 1, operand 1, scale −1, offset 0 |
| Config 1, Oper 4 X-field 5: | −4.7 Pick up from configuration 1, operand 1, scale 1, offset 0 |
| Config 1, Oper 5 Y-field 6: | 2.35 Pick up from configuration 1, operand 1, scale −0.5, offset 0 |
| Config 1, Oper 6 Y-field 7: | −2.35 Pickup from configuration 1, operand 1, scale 0.5, offset 0 |

INDEX OF REFRACTION DATA:

| Surf | Glass | Temp | Pres | 0.460000 | 0.525000 | 0.638000 |
|---|---|---|---|---|---|---|
| 0 | | 20.00 | 1.00 | 1.00000000 | 1.00000000 | 1.00000000 |
| 1 | <CRD BRK> | | | 1.00000000 | 1.00000000 | 1.00000000 |
| 2 | <CRD BRK> | | | 1.00000000 | 1.00000000 | 1.00000000 |
| 3 | BK7 | 20.00 | 1.00 | 1.52443350 | 1.51986781 | 1.51491301 |
| 4 | | 20.00 | 1.00 | 1.00000000 | 1.00000000 | 1.00000000 |
| 5 | <CRD BRK> | | | 1.00000000 | 1.00000000 | 1.00000000 |
| 6 | <CRD BRK> | | | 1.00000000 | 1.00000000 | 1.00000000 |
| 7 | S-TIM5 | 25.00 | 1.00 | 1.61896887 | 1.60946991 | 1.59984226 |
| 8 | | 20.00 | 1.00 | 1.00000000 | 1.00000000 | 1.00000000 |
| 9 | <CRD BRK> | | | 1.00000000 | 1.00000000 | 1.00000000 |
| 10 | S-LAH66 | 25.00 | 1.00 | 1.78746088 | 1.77844022 | 1.76890908 |
| 11 | | 20.00 | 1.00 | 1.00000000 | 1.00000000 | 1.00000000 |
| 12 | <CRD BRK> | | | 1.00000000 | 1.00000000 | 1.00000000 |
| 13 | MIRROR | 20.00 | 1.00 | 1.00000000 | 1.00000000 | 1.00000000 |
| 14 | <CRD BRK> | | | 1.00000000 | 1.00000000 | 1.00000000 |
| 15 | <CRD BRK> | | | 1.00000000 | 1.00000000 | 1.00000000 |
| 16 | S-PHM52 | 25.00 | 1.00 | 1.62732483 | 1.62172274 | 1.61573794 |
| 17 | S-TIH6 | 25.00 | 1.00 | 1.83685381 | 1.81725141 | 1.79821004 |
| 18 | | 20.00 | 1.00 | 1.00000000 | 1.00000000 | 1.00000000 |
| 19 | <CRD BRK> | | | 1.00000000 | 1.00000000 | 1.00000000 |
| 20 | MIRROR | 20.00 | 1.00 | 1.00000000 | 1.00000000 | 1.00000000 |
| 21 | <CRD BRK> | | | 1.00000000 | 1.00000000 | 1.00000000 |
| 22 | <CRD BRK> | | | 1.00000000 | 1.00000000 | 1.00000000 |
| 23 | S-LAH66 | 25.00 | 1.00 | 1.78746088 | 1.77844022 | 1.76890908 |
| 24 | | 20.00 | 1.00 | 1.00000000 | 1.00000000 | 1.00000000 |
| 25 | <CRD BRK> | | | 1.00000000 | 1.00000000 | 1.00000000 |
| 26 | S-LAH66 | 25.00 | 1.00 | 1.78746088 | 1.77844022 | 1.76890908 |
| 27 | | 20.00 | 1.00 | 1.00000000 | 1.00000000 | 1.00000000 |
| 28 | <CRD BRK> | | | 1.00000000 | 1.00000000 | 1.00000000 |
| 29 | | 20.00 | 1.00 | 1.00000000 | 1.00000000 | 1.00000000 |
| 30 | BK7 | 20.00 | 1.00 | 1.52443350 | 1.51986781 | 1.51491301 |
| 31 | <CRD BRK> | | | 1.52443350 | 1.51986781 | 1.51491301 |

TABLE 1-continued

ZEMAX Software Output Describing Surface Data Summary and Detail for Each
Individual Element within the Illumination Optical System 98

| | | | | | | |
|---|---|---|---|---|---|---|
| 32 | <CRD BRK> | | | 1.52443350 | 1.51986781 | 1.51491301 |
| 33 | MIRROR | 20.00 | 1.00 | 1.52443350 | 1.51986781 | 1.51491301 |
| 34 | <CRD BRK> | | | 1.52443350 | 1.51986781 | 1.51491301 |
| 35 | <CRD BRK> | | | 1.52443350 | 1.51986781 | 1.51491301 |
| 36 | | 20.00 | 1.00 | 1.00000000 | 1.00000000 | 1.00000000 |
| 37 | FK5 | 20.00 | 1.00 | 1.49402111 | 1.49012584 | 1.48585830 |
| 38 | | 20.00 | 1.00 | 1.00000000 | 1.00000000 | 1.00000000 |
| 39 | | 20.00 | 1.00 | 1.00000000 | 1.00000000 | 1.00000000 |
| 40 | <CRD BRK> | | | 1.00000000 | 1.00000000 | 1.00000000 |
| 41 | | 20.00 | 1.00 | 1.00000000 | 1.00000000 | 1.00000000 |
| 42 | <CRD BRK> | | | 1.00000000 | 1.00000000 | 1.00000000 |
| 43 | | 20.00 | 1.00 | 1.00000000 | 1.00000000 | 1.00000000 |
| 44 | MIRROR | 20.00 | 1.00 | 1.00000000 | 1.00000000 | 1.00000000 |
| 45 | FK5 | 20.00 | 1.00 | 1.49402111 | 1.49012584 | 1.48585830 |
| 46 | | 20.00 | 1.00 | 1.00000000 | 1.00000000 | 1.00000000 |
| 47 | BK7 | 20.00 | 1.00 | 1.52443350 | 1.51986781 | 1.51491301 |
| 48 | | 20.00 | 1.00 | 1.00000000 | 1.00000000 | 1.00000000 |
| 49 | S-PHM53 | 25.00 | 1.00 | 1.61177822 | 1.60651481 | 1.60085657 |
| 50 | | 20.00 | 1.00 | 1.00000000 | 1.00000000 | 1.00000000 |
| 51 | S-BSM81 | 25.00 | 1.00 | 1.65011121 | 1.64405670 | 1.63750734 |
| 52 | | 20.00 | 1.00 | 1.00000000 | 1.00000000 | 1.00000000 |
| 53 | S-FSL5 | 25.00 | 1.00 | 1.49404408 | 1.49013274 | 1.48585674 |
| 54 | S-TIH6 | 25.00 | 1.00 | 1.83685381 | 1.81725141 | 1.79821004 |
| 55 | | 20.00 | 1.00 | 1.00000000 | 1.00000000 | 1.00000000 |
| 56 | | 20.00 | 1.00 | 1.00000000 | 1.00000000 | 1.00000000 |
| 57 | | 20.00 | 1.00 | 1.00000000 | 1.00000000 | 1.00000000 |
| 58 | | 20.00 | 1.00 | 1.00000000 | 1.00000000 | 1.00000000 |

THERMAL COEFFICIENT OF EXPANSION DATA:

| Surf | Glass | TCE *10E−6 |
|---|---|---|
| 0 | | 0.00000000 |
| 1 | <CRD BRK> | 0.00000000 |
| 2 | <CRD BRK> | 0.00000000 |
| 3 | BK7 | 7.10000000 |
| 4 | | 0.00000000 |
| 5 | <CRD BRK> | 0.00000000 |
| 6 | <CRD BRK> | 0.00000000 |
| 7 | S-TIM5 | 8.30000000 |
| 8 | | 0.00000000 |
| 9 | <CRD BRK> | 0.00000000 |
| 10 | S-LAH66 | 6.20000000 |
| 11 | | 0.00000000 |
| 12 | <CRD BRK> | 0.00000000 |
| 13 | MIRROR | 0.00000000 |
| 14 | <CRD BRK> | 0.00000000 |
| 15 | <CRD BRK> | 0.00000000 |
| 16 | S-PHM52 | 10.10000000 |
| 17 | S-TIH6 | 8.90000000 |
| 18 | | 0.00000000 |
| 19 | <CRD BRK> | 0.00000000 |
| 20 | MIRROR | 0.00000000 |
| 21 | <CRD BRK> | 0.00000000 |
| 22 | <CRD BRK> | 0.00000000 |
| 23 | S-LAH66 | 6.20000000 |
| 24 | | 0.00000000 |
| 25 | <CRD BRK> | 0.00000000 |
| 26 | S-LAH66 | 6.20000000 |
| 27 | | 0.00000000 |
| 28 | <CRD BRK> | 0.00000000 |
| 29 | | 0.00000000 |
| 30 | BK7 | 7.10000000 |
| 31 | <CRD BRK> | 7.10000000 |
| 32 | <CRD BRK> | 7.10000000 |
| 33 | MIRROR | 0.00000000 |
| 34 | <CRD BRK> | 0.00000000 |
| 35 | <CRD BRK> | 0.00000000 |
| 36 | | 0.00000000 |
| 37 | FK5 | 9.20000000 |
| 38 | | 0.00000000 |
| 39 | | 0.00000000 |
| 40 | <CRD BRK> | 0.00000000 |
| 41 | | 0.00000000 |
| 42 | <CRD BRK> | 0.00000000 |
| 43 | | 0.00000000 |

TABLE 1-continued

ZEMAX Software Output Describing Surface Data Summary and Detail for Each Individual Element within the Illumination Optical System 98

| | | |
|---|---|---|
| 44 | MIRROR | 0.00000000 |
| 45 | FK5 | 9.20000000 |
| 46 | | 0.00000000 |
| 47 | BK7 | 7.10000000 |
| 48 | | 0.00000000 |
| 49 | S-PHM53 | 9.30000000 |
| 50 | | 0.00000000 |
| 51 | S-BSM81 | 5.80000000 |
| 52 | | 0.00000000 |
| 53 | S-FSL5 | 9.00000000 |
| 54 | S-TIH6 | 8.90000000 |
| 55 | | 0.00000000 |
| 56 | | 0.00000000 |
| 57 | | 0.00000000 |
| 58 | | 0.00000000 |

F/# DATA:
F/# calculations consider vignetting factors and ignore surface apertures.

| | | Wavelength: | | | | | |
|---|---|---|---|---|---|---|---|
| | | 0.460000 | | 0.525000 | | 0.638000 | |
| # | Field | Tan | Sag | Tan | Sag | Tan | Sag |
| 1 | 0.0000, −4.7000 mm: | 4.8398 | 4.3748 | 4.4425 | 4.0018 | 4.2373 | 3.7817 |
| 2 | −4.7000, 0.0000 mm: | 3.8570 | 6.8070 | 3.5637 | 6.0899 | 3.3948 | 5.7508 |
| 3 | 0.0000, 0.0000 mm: | 3.8427 | 4.6147 | 3.5095 | 4.1546 | 3.3157 | 3.8884 |
| 4 | 0.0000, 4.7000 mm: | 9.9516 | 4.6933 | 8.4478 | 4.2863 | 7.9387 | 4.0561 |
| 5 | −4.7000, 0.0000 mm: | 3.8570 | 6.8070 | 3.5637 | 6.0899 | 3.3948 | 5.7508 |
| 6 | 0.0000, 2.3500 mm: | 4.6871 | 4.6396 | 4.2321 | 4.1943 | 3.9876 | 3.9387 |
| 7 | 0.0000, −2.3500 mm: | 3.9215 | 4.5231 | 3.5916 | 4.0869 | 3.3990 | 3.8313 |
| 8 | 4.6800, 0.0000 mm: | 3.7304 | 6.3593 | 3.4531 | 5.6840 | 3.2929 | 5.3537 |

GLOBAL VERTEX COORDINATES, ORIENTATIONS, AND ROTATION/OFFSET MATRICES:
Reference Surface: 35

| Surf | R11<br>R21<br>R31 | R12<br>R22<br>R32 | R13<br>R23<br>R33 | X<br>Y<br>Z |
|---|---|---|---|---|
| 0 | 0.4336132998<br>0.5349194913<br>−0.7251487047 | 0.4566178415<br>0.5633300907<br>0.6885923001 | 0.7768395285<br>−0.6296986158<br>0.0000136360 | 4.517843432E+001<br>4.369443138E+001<br>−6.445732627E+001 |
| 1 | −0.6290897799<br>−0.7760893783<br>−0.0439468507 | 0.0276838538<br>0.0341310725<br>−0.9990338704 | 0.7768395285<br>−0.6296986158<br>0.0000136360 | 4.510075037E+001<br>4.375740124E+001<br>−6.445732764E+001 |
| 2 | −0.6296847481<br>−0.7768222763<br>0.0066534903 | −0.0041791009<br>−0.0051772806<br>−0.9999778652 | 0.7768395285<br>−0.6296986158<br>0.0000136360 | 4.510075037E+001<br>4.375740124E+001<br>−6.445732764E+001 |
| 3 | −0.6296847481<br>−0.7768222763<br>0.0066534903 | −0.0041791009<br>−0.0051772806<br>−0.9999778652 | 0.7768395285<br>−0.6296986158<br>0.0000136360 | 4.510075037E+001<br>4.375740124E+001<br>−6.445732764E+001 |
| 4 | −0.6296847481<br>−0.7768222763<br>0.0066534903 | −0.0041791009<br>−0.0051772806<br>−0.9999778652 | 0.7768395285<br>−0.6296986158<br>0.0000136360 | 2.956395980E+001<br>5.635137355E+001<br>−6.445760036E+001 |
| 5 | −0.3976204718<br>−0.9168711729<br>−0.0352875716 | 0.0418064530<br>0.0203151008<br>−0.9989191745 | 0.9165970657<br>−0.3986659617<br>0.0302534317 | 3.284979056E+001<br>6.040498788E+001<br>−6.503598962E+001 |
| 6 | −0.6837956136<br>−0.7295767638<br>−0.0118871570 | −0.0439565517<br>0.0574488052<br>−0.9973802968 | 0.7283483921<br>−0.6814817536<br>−0.0713529197 | 2.368205873E+001<br>6.066997554E+001<br>−6.474651317E+001 |
| 7 | −0.6837956136<br>−0.7295767638<br>−0.0118871570 | −0.0439565517<br>0.0574488052<br>−0.9973802968 | 0.7283483921<br>−0.6814817536<br>−0.0713529197 | 2.368205873E+001<br>6.066997554E+001<br>−6.474651317E+001 |
| 8 | −0.6837956136<br>−0.7295767638<br>−0.0118871570 | −0.0439565517<br>0.0574488052<br>−0.9973802968 | 0.7283483921<br>−0.6814817536<br>−0.0713529197 | 1.793464400E+001<br>6.604756449E+001<br>−6.418346556E+001 |
| 9 | −0.6565646105<br>−0.7541295542<br>−0.0145439936 | −0.0447960683<br>0.0582342911<br>−0.9972973877 | 0.7529383935<br>−0.6541386572<br>−0.0720166136 | 1.751839659E+001<br>6.622096220E+001<br>−6.308106508E+001 |
| 10 | −0.6565646105<br>−0.7541295542<br>−0.0145439936 | −0.0447960683<br>0.0582342911<br>−0.9972973877 | 0.7529383935<br>−0.6541386572<br>−0.0720166136 | 1.751839659E+001<br>6.622096220E+001<br>−6.308106508E+001 |

TABLE 1-continued

ZEMAX Software Output Describing Surface Data Summary and Detail for Each
Individual Element within the Illumination Optical System 98

| | | | | |
|---|---|---|---|---|
| 11 | −0.6565646105 | −0.0447960683 | 0.7529383935 | 1.408723977E+001 |
| | −0.7541295542 | 0.0582342911 | −0.6541386572 | 6.920188645E+001 |
| | −0.0145439936 | −0.9972973877 | −0.0720166136 | −6.275288379E+001 |
| 12 | −0.6565646105 | 0.5276897813 | 0.5389493547 | −9.715280989E−001 |
| | −0.7541295542 | −0.4454717516 | −0.4825386348 | 8.228465959E+001 |
| | −0.0145439936 | −0.7232554274 | 0.6904274466 | −6.131255152E+001 |
| 13 | −0.6565646105 | 0.5276897813 | 0.5389493547 | −9.715280989E−001 |
| | −0.7541295542 | −0.4454717516 | −0.4825386348 | 8.228465959E+001 |
| | −0.0145439936 | −0.7232554274 | 0.6904274466 | −6.131255152E+001 |
| 14 | −0.6565646105 | 0.7537162500 | −0.0288916372 | −9.715280989E−001 |
| | −0.7541295542 | −0.6566993861 | 0.0058763849 | 8.228465959E+001 |
| | −0.0145439936 | 0.0256462639 | 0.9995652762 | −6.131255152E+001 |
| 15 | 0.9999997042 | 0.0007607226 | −0.0001135077 | 4.892056127E−001 |
| | −0.0007607547 | 0.9999996707 | −0.0002827083 | 7.940776125E+001 |
| | 0.0001132926 | 0.0002827946 | 0.9999999536 | −4.624689337E+001 |
| 16 | 0.9999997042 | 0.0007607226 | −0.0001135077 | 4.892056127E−001 |
| | −0.0007607547 | 0.9999996707 | −0.0002827083 | 7.940776125E+001 |
| | 0.0001132926 | 0.0002827946 | 0.9999999536 | −4.624689337E+001 |
| 17 | 0.9999997042 | 0.0007607226 | −0.0001135077 | 4.876678347E−001 |
| | −0.0007607547 | 0.9999996707 | −0.0002827083 | 7.940393118E+001 |
| | 0.0001132926 | 0.0002827946 | 0.9999999536 | −3.269910661E+001 |
| 18 | 0.9999997042 | 0.0007607226 | −0.0001135077 | 4.867597732E−001 |
| | −0.0007607547 | 0.9999996707 | −0.0002827083 | 7.940016951E+001 |
| | 0.0001132926 | 0.0002827946 | 0.9999999536 | −2.469910698E+001 |
| 19 | 0.9999997042 | 0.0006688102 | 0.0003798365 | 4.847166348E−001 |
| | −0.0007607547 | 0.7873244644 | 0.6165384083 | 7.939658076E+001 |
| | 0.0001132926 | −0.6165385149 | 0.7873247404 | −6.699107813E+000 |
| 20 | 0.9999997042 | 0.0006688102 | 0.0003798365 | 4.847166348E−001 |
| | −0.0007607547 | 0.7873244644 | 0.6165384083 | 7.939658076E+001 |
| | 0.0001132926 | −0.6165385149 | 0.7873247404 | −6.699107813E+000 |
| 21 | 0.9999997042 | 0.0002921858 | 0.0007114846 | 4.847166348E−001 |
| | −0.0007607547 | 0.2394858009 | 0.9708995687 | 7.939658076E+001 |
| | 0.0001132926 | −0.9708998228 | 0.2394859523 | −6.699107813E+000 |
| 22 | 0.9999678527 | 0.0001458509 | 0.0080169972 | −8.707615719E−003 |
| | −0.0080158666 | 0.0429346250 | 0.9990457266 | 5.451519596E+001 |
| | −0.0001984951 | −0.9990778732 | 0.0429344139 | −1.021632109E+001 |
| 23 | 0.9999678527 | 0.0001458509 | 0.0080169972 | −8.707615719E−003 |
| | −0.0080158666 | 0.0429346250 | 0.9990457266 | 5.451519596E+001 |
| | −0.0001984951 | −0.9990778732 | 0.0429344139 | −1.021632109E+001 |
| 24 | 0.9999678527 | 0.0001458509 | 0.0080169972 | −5.473424960E−002 |
| | −0.0080158666 | 0.0429346250 | 0.9990457266 | 4.877954327E+001 |
| | −0.0001984951 | −0.9990778732 | 0.0429344139 | −1.046281320E+001 |
| 25 | 0.9999288973 | 0.0007173794 | −0.0119031827 | 7.505312732E−002 |
| | 0.0117436164 | 0.1140931188 | 0.9934006481 | 4.700360971E+001 |
| | 0.0020707164 | −0.9934698011 | 0.1140765819 | −1.091140643E+001 |
| 26 | 0.9999288973 | 0.0007173794 | −0.0119031827 | 7.505312732E−002 |
| | 0.0117436164 | 0.1140931188 | 0.9934006481 | 4.700360971E+001 |
| | 0.0020707164 | −0.9934698011 | 0.1140765819 | −1.091140643E+001 |
| 27 | 0.9999288973 | 0.0007173794 | −0.0119031827 | 1.749705142E−001 |
| | 0.0117436164 | 0.1140931188 | 0.9934006481 | 3.866483183E+001 |
| | 0.0020707164 | −0.9934698011 | 0.1140765819 | −1.186898511E+001 |
| 28 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 29 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 30 | 1.0000000000 | 0.0000000000 | 0.0000000000 | 0.000000000E+000 |
| | 0.0000000000 | 0.1736481777 | 0.9848077530 | 3.726390811E+001 |
| | 0.0000000000 | −0.9848077530 | 0.1736481777 | −1.283679270E+001 |
| 31 | 1.0000000000 | 0.0000000000 | 0.0000000000 | 0.000000000E+000 |
| | 0.0000000000 | 0.8386705679 | 0.5446390350 | 3.952654387E+001 |
| | 0.0000000000 | −0.5446390350 | 0.8386705679 | −2.566883772E+001 |
| 32 | 1.0000000000 | 0.0000000000 | 0.0000000000 | 0.000000000E+000 |
| | 0.0000000000 | 0.8386705679 | 0.5446390350 | 1.976327193E+001 |
| | 0.0000000000 | −0.5446390350 | 0.8386705679 | −1.283441886E+001 |
| 33 | 1.0000000000 | 0.0000000000 | 0.0000000000 | 0.000000000E+000 |
| | 0.0000000000 | 0.8386705679 | 0.5446390350 | 1.976327193E+001 |
| | 0.0000000000 | −0.5446390350 | 0.8386705679 | −1.283441886E+001 |
| 34 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |
| 35 | 1.0000000000 | 0.0000000000 | 0.0000000000 | 0.000000000E+000 |
| | 0.0000000000 | 1.0000000000 | 0.0000000000 | 0.000000000E+000 |
| | 0.0000000000 | 0.0000000000 | 1.0000000000 | 0.000000000E+000 |

TABLE 1-continued

ZEMAX Software Output Describing Surface Data Summary and Detail for Each Individual Element within the Illumination Optical System 98

| | | | | |
|---|---|---|---|---|
| 36 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 0.000000000E+000 |
| 37 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 2.500000000E+000 |
| 38 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 5.500000000E+000 |
| 39 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 40 | 1.0000000000 | 0.0000000000 | 0.0000000000 | 0.000000000E+000 |
| | 0.0000000000 | 1.0000000000 | 0.0000000000 | 4.469000000E+003 |
| | 0.0000000000 | 0.0000000000 | 1.0000000000 | 6.000000000E+000 |
| 41 | 1.0000000000 | 0.0000000000 | 0.0000000000 | 0.000000000E+000 |
| | 0.0000000000 | 1.0000000000 | 0.0000000000 | 4.469000000E+003 |
| | 0.0000000000 | 0.0000000000 | 1.0000000000 | 6.000000000E+000 |
| 42 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 43 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 44 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 6.000000000E+000 |
| 45 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 5.500000000E+000 |
| 46 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 2.500000000E+000 |
| 47 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | 0.000000000E+000 |
| 48 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −2.300000000E+001 |
| 49 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −2.500000000E+001 |
| 50 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.077850000E+001 |
| 51 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.097850000E+001 |
| 52 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.717250000E+001 |
| 53 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −3.737250000E+001 |
| 54 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −4.466950000E+001 |
| 55 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.285050000E+001 |
| 56 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |
| 57 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |
| 58 | 1.0000000000 | 0.0000000000 | 0.0000000000 | 0.000000000E+000 |
| | 0.0000000000 | 1.0000000000 | 0.0000000000 | 1.750000000E+001 |
| | 0.0000000000 | 0.0000000000 | 1.0000000000 | −5.376050000E+001 |

ELEMENT VOLUME DATA:

For centered elements with plane or spherical circular faces, exact volumes are computed by assuming edges are squared up to the larger of the front and back radial aperture.
For all other elements, approximate volumes are numerically integrated to 0.1% accuracy.
Zero volume means the volume cannot be accurately computed.

TABLE 1-continued

ZEMAX Software Output Describing Surface Data Summary and Detail for Each Individual Element within the Illumination Optical System 98

Single elements that are duplicated in the Lens Data Editor for ray tracing purposes may be listed more than once yielding incorrect total mass estimates.

|  | Volume cc | Density g/cc | Mass g |
|---|---|---|---|
| Element surf 3 to 4 | 8.025020 | 2.510000 | 20.142799 |
| Element surf 7 to 8 | 4.769696 | 2.630000 | 12.544300 |
| Element surf 10 to 11 | 3.391090 | 4.230000 | 14.344310 |
| Element surf 16 to 17 | 7.818599 | 3.670000 | 28.694260 |
| Element surf 17 to 18 | 9.784333 | 3.370000 | 32.973202 |
| Element surf 23 to 24 | 3.695705 | 4.230000 | 15.632832 |
| Element surf 26 to 27 | 4.281907 | 4.230000 | 18.112466 |
| Element surf 30 to 31 | 0.000000 | 2.510000 | 0.000000 |
| Element surf 31 to 32 | 0.000000 | 0.000000 | 0.000000 |
| Element surf 32 to 33 | 0.000000 | 0.000000 | 0.000000 |
| Element surf 34 to 35 | 0.000000 | 0.000000 | 0.000000 |
| Element surf 35 to 36 | 0.000000 | 0.000000 | 0.000000 |
| Element surf 37 to 38 | 1.018793 | 2.450000 | 2.496042 |
| Element surf 45 to 46 | 1.074870 | 2.450000 | 2.633431 |
| Element surf 47 to 48 | 22.437579 | 2.510000 | 56.318323 |
| Element surf 49 to 50 | 2.231466 | 3.510000 | 7.832445 |
| Element surf 51 to 52 | 2.387445 | 3.060000 | 7.305583 |
| Element surf 53 to 54 | 1.482802 | 2.460000 | 3.647692 |
| Element surf 54 to 55 | 2.899719 | 3.370000 | 9.772053 |
| Total Mass: |  |  | 232.449738 |

CARDINAL POINTS:

Object space positions are measured with respect to surface 1.
Image space positions are measured with respect to the image surface.
The index in both the object space and image space is considered.

|  | Object Space | Image Space |
|---|---|---|
| W = 0.460000 |  |  |
| Focal Length: | −8.312566 | 8.312566 |
| Focal Planes: | 3.847888 | −0.619539 |
| Principal Planes: | 12.160454 | −8.932105 |
| Anti-Principal Planes: | −4.464678 | 7.693027 |
| Nodal Planes: | 12.160454 | −8.932105 |
| Anti-Nodal Planes: | −4.464678 | 7.693027 |
| W = 0.525000 (Primary) |  |  |
| Focal Length: | −8.441475 | 8.441475 |
| Focal Planes: | 3.965614 | −0.715180 |
| Principal Planes: | 12.407089 | −9.156655 |
| Anti-Principal Planes: | −4.475861 | 7.726295 |
| Nodal Planes: | 12.407089 | −9.156655 |
| Anti-Nodal Planes: | −4.475861 | 7.726295 |
| W = 0.638000 |  |  |
| Focal Length: | −8.588137 | 8.588137 |
| Focal Planes: | 4.163721 | −0.827454 |
| Principal Planes: | 12.751857 | −9.415591 |
| Anti-Principal Planes: | −4.424416 | 7.760682 |
| Nodal Planes: | 12.751857 | −9.415591 |
| Anti-Nodal Planes: | −4.424416 | 7.760682 |

TABLE 2

ZEMAX Software Output Describing Surface Data Summary and Detail for Each Individual Element within the Projection Optical System 99

GENERAL LENS DATA:

| Surfaces: | 22 |
|---|---|
| Stop: | 13 |
| System Aperture: | Object Space NA = 0.2 |
| Telecentric Mode: | On |
| Glass Catalogs: | MISC SCHOTT OHARA |
| Ray Aiming: | Off |

TABLE 2-continued

ZEMAX Software Output Describing Surface Data Summary and Detail for Each Individual Element within the Projection Optical System 99

| | |
|---|---|
| Apodization: | Uniform, factor = 5.00000E−001 |
| Effective Focal Length: | 53.39083 (in air at system temperature and pressure) |
| Effective Focal Length: | 53.39083 (in image space) |
| Back Focal Length: | −622.2273 |
| Total Track: | 330.1757 |
| Image Space F/#: | 1.307803e−008 |
| Paraxial Working F/#: | 29.07414 |
| Working F/#: | 29.00313 |
| Image Space NA: | 0.01719487 |
| Object Space NA: | 0.2 |
| Stop Radius: | 2.913214 |
| Paraxial Image Height: | 88.17827 |
| Paraxial Magnification: | −11.86947 |
| Entrance Pupil Diameter: | 4.082483e+009 |
| Entrance Pupil Position: | 1e+010 |
| Exit Pupil Diameter: | 21.79671 |
| Exit Pupil Position: | −622.2273 |
| Field Type: | Object height in Millimeters |
| Maximum Field: | 7.429 |
| Primary Wave: | 0.46 |
| Lens Units: | Millimeters |
| Angular Magnification: | 1.872981e+008 |

Fields: 5
Field Type: Object height in Millimeters

| # | X-Value | Y-Value | Weight |
|---|---|---|---|
| 1 | 0.000000 | 0.000000 | 1.000000 |
| 2 | 0.000000 | 2.500000 | 3.000000 |
| 3 | 0.000000 | 5.000000 | 12.000000 |
| 4 | 0.000000 | 7.000000 | 15.000000 |
| 5 | 0.000000 | 7.429000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |

Wavelengths: 3
Units: µm

| # | Value | Weight |
|---|---|---|
| 1 | 0.460000 | 1.000000 |
| 2 | 0.525000 | 1.000000 |
| 3 | 0.635000 | 1.000000 |

SURFACE DATA SUMMARY:

| Surf | Type | Comment | Radius | Thickness | Glass | Diameter | Conic |
|---|---|---|---|---|---|---|---|
| OBJ | STANDARD | | Infinity | 0 | | 14.858 | 0 |
| 1 | STANDARD | | Infinity | 0.5 | | 16.3438 | 0 |
| 2 | STANDARD | | Infinity | 3 | N-FK5 | 16.56834 | 0 |
| 3 | STANDARD | | Infinity | 2.5 | | 17.46482 | 0 |
| 4 | STANDARD | | Infinity | 23 | N-BK7 | 18.5875 | 0 |
| 5 | STANDARD | | Infinity | 2 | | 25.32628 | 0 |
| 6 | STANDARD | | 49.071 | 5.778508 | S-PHM53 | 27 | 0 |
| 7 | STANDARD | | −49.071 | 0.2 | | 27 | 0 |
| 8 | STANDARD | | 23.88 | 6.19367 | S-BSM81 | 27 | 0 |
| 9 | STANDARD | | Infinity | 0.2 | | 23.87212 | 0 |
| 10 | STANDARD | | 14.732 | 7.297311 | S-FSL5 | 20 | 0 |
| 11 | STANDARD | | −35.2 | 8.181407 | S-TIH6 | 20 | 0 |
| 12 | STANDARD | | 32 | 0.9104899 | | 9 | 0 |
| STO | STANDARD | | Infinity | 6.399912 | | 6.116962 | 0 |
| 14 | STANDARD | | −6.67 | 11.23256 | S-TIH3 | 11 | 0 |
| 15 | STANDARD | | −18 | 0.2 | | 25.6 | 0 |
| 16 | STANDARD | | −96.016 | 4.960048 | S-TIH6 | 30 | 0 |
| 17 | STANDARD | | −52.68 | 49.35403 | | 34 | 0 |
| 18 | STANDARD | | 182.45 | 11.9887 | S-BSM81 | 92 | 0 |

TABLE 2-continued

ZEMAX Software Output Describing Surface Data Summary and Detail for Each
Individual Element within the Projection Optical System 99

| 19 | STANDARD | Infinity | 161.2791 | | 92 | 0 |
| 20 | STANDARD | Infinity | 0 | | 183.3892 | 0 |
| 21 | EVENASPH | 295.1198 | 25 | POLYCARB | 190.8502 | 0 |
| IMA | STANDARD | Infinity | | | 174.5479 | 0 |

SURFACE DATA DETAIL:

| Surface OBJ: | STANDARD |
| Surface 1: | STANDARD |
| Surface 2: | STANDARD |
| Surface 3: | STANDARD |
| Surface 4: | STANDARD |
| Surface 5: | STANDARD |
| Surface 6: | STANDARD |
| Aperture: | Floating Aperture |
| Maximum Radius: | 13.5 |
| Surface 7: | STANDARD |
| Aperture: | Floating Aperture |
| Maximum Radius: | 13.5 |
| Surface 8: | STANDARD |
| Aperture: | Floating Aperture |
| Maximum Radius: | 13.5 |
| Surface 9: | STANDARD |
| Surface 10: | STANDARD |
| Aperture: | Floating Aperture |
| Maximum Radius: | 10 |
| Surface 11: | STANDARD |
| Aperture: | Floating Aperture |
| Maximum Radius: | 10 |
| Surface 12: | STANDARD |
| Aperture: | Floating Aperture |
| Maximum Radius: | 4.5 |
| Surface STO: | STANDARD |
| Surface 14: | STANDARD |
| Aperture: | Floating Aperture |
| Maximum Radius: | 5.5 |
| Surface 15: | STANDARD |
| Aperture: | Floating Aperture |
| Maximum Radius: | 12.8 |
| Surface 16: | STANDARD |
| Aperture: | Floating Aperture |
| Maximum Radius: | 15 |
| Surface 17: | STANDARD |
| Aperture: | Floating Aperture |
| Maximum Radius: | 17 |
| Surface 18: | STANDARD |
| Aperture: | Floating Aperture |
| Maximum Radius: | 46 |
| Surface 19: | STANDARD |
| Aperture: | Floating Aperture |
| Maximum Radius: | 46 |
| Surface 20: | STANDARD |
| Surface 21: | EVENASPH |
| Coeff on r 2: | 0 |
| Coeff on r 4: | 0 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Surface IMA: | STANDARD |

COATING DEFINITIONS:
PHYSICAL OPTICS PROPAGATION SETTINGS SUMMARY:

OBJ STANDARD
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

1 STANDARD
| Use Rays To Propagate To Next Surface: | Off |
| Recompute Pilot Beam: | Off |

TABLE 2-continued

ZEMAX Software Output Describing Surface Data Summary and Detail for Each
Individual Element within the Projection Optical System 99

| | |
|---|---|
| Do Not Rescale Beam Size Using Ray Data: | Off |
| Use Angular Spectrum Propagator: | Off |
| Use Parallel Probing Rays: | Off |
| Reference Radius: | Best Fit |
| 2 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 3 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 4 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 5 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 6 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 7 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 8 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 9 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 10 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 11 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 12 STANDARD | |
| Use Rays To Propagate To Next Surface: | Off |

TABLE 2-continued

ZEMAX Software Output Describing Surface Data Summary and Detail for Each Individual Element within the Projection Optical System 99

| | |
|---|---|
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| STO STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 14 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 15 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 16 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 17 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 18 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 19 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 20 STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| 21 EVENASPH | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |
| IMA STANDARD | |
| Use Rays To Propagate To Next Surface: | Off |
| Recompute Pilot Beam: | Off |
| Do Not Rescale Beam Size Using Ray Data: | Off |
| Use Angular Spectrum Propagator: | Off |
| Use Parallel Probing Rays: | Off |
| Reference Radius: | Best Fit |

TABLE 2-continued

ZEMAX Software Output Describing Surface Data Summary and Detail for Each Individual Element within the Projection Optical System 99

EDGE THICKNESS DATA:

| Surf | Edge |
|---|---|
| OBJ | 0.000000 |
| 1 | 0.500000 |
| 2 | 3.000000 |
| 3 | 2.500000 |
| 4 | 23.000000 |
| 5 | 3.893537 |
| 6 | 1.991435 |
| 7 | 6.275709 |
| 8 | 2.011497 |
| 9 | 4.113875 |
| 10 | 1.933102 |
| 11 | 9.949726 |
| 12 | 0.592504 |
| STO | 3.503359 |
| 14 | 8.784551 |
| 15 | 4.365649 |
| 16 | 3.320598 |
| 17 | 58.066448 |
| 18 | 6.094651 |
| 19 | 161.279099 |
| 20 | 15.853350 |
| 21 | 9.146650 |
| IMA | 0.000000 |

MULTI-CONFIGURATION DATA:

Configuration 1:
1 Thickness 20:    0
Configuration 2:
1 Thickness 20:    −5
Configuration 3:
1 Thickness 20:    5

SOLVE AND VARIABLE DATA:

| | |
|---|---|
| Thickness of 6: | Variable |
| Semi Diameter 6: | Fixed |
| Curvature of 7: | Solve, pick up value from 6, scaled by −1.00000 |
| Semi Diameter 7: | Pickup from 6 |
| Thickness of 8: | Variable |
| Semi Diameter 8: | Pickup from 6 |
| Thickness of 10: | Variable |
| Semi Diameter 10: | Fixed |
| Thickness of 11: | Variable |
| Semi Diameter 11: | Pickup from 10 |
| Thickness of 12: | Variable |
| Semi Diameter 12: | Fixed |
| Thickness of 13: | Variable |
| Thickness of 14: | Variable |
| Semi Diameter 14: | Fixed |
| Semi Diameter 15: | Fixed |
| Thickness of 16: | Variable |
| Semi Diameter 16: | Fixed |
| Thickness of 17: | Variable |
| Semi Diameter 17: | Fixed |
| Thickness of 18: | Variable |
| Semi Diameter 18: | Fixed |
| Thickness of 19: | Variable |
| Semi Diameter 19: | Fixed |
| Curvature of 21: | Variable |

INDEX OF REFRACTION DATA:

| Surf | Glass | Temp | Pres | 0.460000 | 0.525000 | 0.635000 |
|---|---|---|---|---|---|---|
| 0 | | 20.00 | 1.00 | 1.00000000 | 1.00000000 | 1.00000000 |
| 1 | | 20.00 | 1.00 | 1.00000000 | 1.00000000 | 1.00000000 |
| 2 | N-FK5 | 20.00 | 1.00 | 1.49402111 | 1.49012584 | 1.48594605 |
| 3 | | 20.00 | 1.00 | 1.00000000 | 1.00000000 | 1.00000000 |
| 4 | N-BK7 | 20.00 | 1.00 | 1.52443350 | 1.51986781 | 1.51501420 |
| 5 | | 20.00 | 1.00 | 1.00000000 | 1.00000000 | 1.00000000 |
| 6 | S-PHM53 | 25.00 | 1.00 | 1.61177822 | 1.60651481 | 1.60097110 |

TABLE 2-continued

ZEMAX Software Output Describing Surface Data Summary and Detail for Each Individual Element within the Projection Optical System 99

| | | | | | | |
|---|---|---|---|---|---|---|
| 7 | | 20.00 | 1.00 | 1.00000000 | 1.00000000 | 1.00000000 |
| 8 | S-BSM81 | 25.00 | 1.00 | 1.65011121 | 1.64405670 | 1.63764082 |
| 9 | | 20.00 | 1.00 | 1.00000000 | 1.00000000 | 1.00000000 |
| 10 | S-FSL5 | 25.00 | 1.00 | 1.49404408 | 1.49013274 | 1.48594450 |
| 11 | S-TIH6 | 25.00 | 1.00 | 1.83685381 | 1.81725141 | 1.79857441 |
| 12 | | 20.00 | 1.00 | 1.00000000 | 1.00000000 | 1.00000000 |
| 13 | | 20.00 | 1.00 | 1.00000000 | 1.00000000 | 1.00000000 |
| 14 | S-TIH3 | 25.00 | 1.00 | 1.76602131 | 1.74996726 | 1.73451038 |
| 15 | | 20.00 | 1.00 | 1.00000000 | 1.00000000 | 1.00000000 |
| 16 | S-TIH6 | 25.00 | 1.00 | 1.83685381 | 1.81725141 | 1.79857441 |
| 17 | | 20.00 | 1.00 | 1.00000000 | 1.00000000 | 1.00000000 |
| 18 | S-BSM81 | 25.00 | 1.00 | 1.65011121 | 1.64405670 | 1.63764082 |
| 19 | | 20.00 | 1.00 | 1.00000000 | 1.00000000 | 1.00000000 |
| 20 | | 20.00 | 1.00 | 1.00000000 | 1.00000000 | 1.00000000 |
| 21 | POLYCARB | 20.00 | 1.00 | 1.60505860 | 1.59293157 | 1.58138766 |
| 22 | | 20.00 | 1.00 | 1.00000000 | 1.00000000 | 1.00000000 |

THERMAL COEFFICIENT OF EXPANSION DATA:

| Surf | Glass | TCE*10E−6 |
|---|---|---|
| 0 | | 0.00000000 |
| 1 | | 0.00000000 |
| 2 | N-FK5 | 9.20000000 |
| 3 | | 0.00000000 |
| 4 | N-BK7 | 7.10000000 |
| 5 | | 0.00000000 |
| 6 | S-PHM53 | 9.30000000 |
| 7 | | 0.00000000 |
| 8 | S-BSM81 | 5.80000000 |
| 9 | | 0.00000000 |
| 10 | S-FSL5 | 9.00000000 |
| 11 | S-TIH6 | 8.90000000 |
| 12 | | 0.00000000 |
| 13 | | 0.00000000 |
| 14 | S-TIH3 | 8.50000000 |
| 15 | | 0.00000000 |
| 16 | S-TIH6 | 8.90000000 |
| 17 | | 0.00000000 |
| 18 | S-BSM81 | 5.80000000 |
| 19 | | 0.00000000 |
| 20 | | 0.00000000 |
| 21 | POLYCARB | 67.00000000 |
| 22 | | 0.00000000 |

F/# DATA:
F/# calculations consider vignetting factors and ignore surface apertures.

| | | Wavelength: | | | | | |
|---|---|---|---|---|---|---|---|
| | | 0.460000 | | 0.525000 | | 0.635000 | |
| # | Field | Tan | Sag | Tan | Sag | Tan | Sag |
| 1 | 0.0000 mm: | 29.0031 | 29.0031 | 28.8420 | 28.8420 | 28.9161 | 28.9161 |
| 2 | 2.5000 mm: | 29.2056 | 29.0837 | 29.0481 | 28.9190 | 29.0876 | 28.9776 |
| 3 | 5.0000 mm: | 29.5933 | 29.3230 | 29.5306 | 29.1621 | 29.5295 | 29.1850 |
| 4 | 7.0000 mm: | 29.0724 | 29.5275 | 29.2642 | 29.4061 | 29.3265 | 29.4099 |
| 5 | 7.4290 mm: | 28.6953 | 29.5394 | 28.9573 | 29.4353 | 29.0457 | 29.4397 |

GLOBAL VERTEX COORDINATES, ORIENTATIONS, AND ROTATION/OFFSET MATRICES:
Reference Surface: 0

| Surf | R11<br>R21<br>R31 | R12<br>R22<br>R32 | R13<br>R23<br>R33 | X<br>Y<br>Z |
|---|---|---|---|---|
| 0 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>0.000000000E+000 |
| 1 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>0.000000000E+000 |
| 2 | 1.0000000000<br>0.0000000000<br>0.0000000000 | 0.0000000000<br>1.0000000000<br>0.0000000000 | 0.0000000000<br>0.0000000000<br>1.0000000000 | 0.000000000E+000<br>0.000000000E+000<br>5.000000000E−001 |

TABLE 2-continued

ZEMAX Software Output Describing Surface Data Summary and Detail for Each Individual Element within the Projection Optical System 99

| | | | | |
|---|---|---|---|---|
| 3  | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 3.500000000E+000 |
| 4  | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 6.000000000E+000 |
| 5  | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 2.900000000E+001 |
| 6  | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 3.100000000E+001 |
| 7  | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 3.677850848E+001 |
| 8  | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 3.697850848E+001 |
| 9  | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 4.317217864E+001 |
| 10 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 4.337217864E+001 |
| 11 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 5.066948953E+001 |
| 12 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 5.885089610E+001 |
| 13 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 5.976138604E+001 |
| 14 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 6.616129816E+001 |
| 15 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 7.739386198E+001 |
| 16 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 7.759386198E+001 |
| 17 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 8.255391027E+001 |
| 18 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 1.319079376E+002 |
| 19 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 1.438966413E+002 |
| 20 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 3.051757408E+002 |
| 21 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 3.051757408E+002 |
| 22 | 1.0000000000 | 0.0000000000 | 0.0000000000 | 0.000000000E+000 |
|    | 0.0000000000 | 1.0000000000 | 0.0000000000 | 0.000000000E+000 |
|    | 0.0000000000 | 0.0000000000 | 1.0000000000 | 3.301757408E+002 |

ELEMENT VOLUME DATA:

For centered elements with plane or spherical circular faces, exact volumes are computed by assuming edges are squared up to the larger of the front and back radial aperture.
For all other elements, approximate volumes are numerically integrated to 0.1% accuracy.
Zero volume means the volume cannot be accurately computed.
Single elements that are duplicated in the Lens Data Editor for ray tracing purposes may be listed more than once yielding incorrect total mass estimates.

| | Volume cc | Density g/cc | Mass g |
|---|---|---|---|
| Element surf 2 to 3 | 0.718686 | 2.450000 | 1.760781 |
| Element surf 4 to 5 | 11.586722 | 2.510000 | 29.082673 |
| Element surf 6 to 7 | 2.231471 | 3.510000 | 7.832462 |
| Element surf 8 to 9 | 2.387256 | 3.060000 | 7.305005 |

TABLE 2-continued

ZEMAX Software Output Describing Surface Data Summary and Detail for Each
Individual Element within the Projection Optical System 99

| | | | |
|---|---|---|---|
| Element surf 10 to 11 | 1.482899 | 2.460000 | 3.647932 |
| Element surf 11 to 12 | 2.886252 | 3.370000 | 9.726669 |
| Element surf 14 to 15 | 5.826621 | 3.110000 | 18.120791 |
| Element surf 16 to 17 | 3.888465 | 3.370000 | 13.104127 |
| Element surf 18 to 19 | 60.212756 | 3.060000 | 184.251035 |
| Element surf 21 to 22 | 449.470461 | 1.250000 | 561.838077 |
| Total Mass: | | | 836.669550 |

CARDINAL POINTS:

Object space positions are measured with respect to surface 1.
Image space positions are measured with respect to the image surface.
The index in both the object space and image space is considered.

| | Object Space | Image Space |
|---|---|---|
| W = 0.460000 (Primary) | | |
| Focal Length: | −53.390829 | 53.390829 |
| Focal Planes: | 4.498166 | −622.227272 |
| Principal Planes: | 57.888995 | −675.618101 |
| Anti-Principal Planes: | −48.892663 | −568.836444 |
| Nodal Planes: | 57.888995 | −675.618101 |
| Anti-Nodal Planes: | −48.892663 | −568.836444 |
| W = 0.525000 | | |
| Focal Length: | −51.915834 | 51.915834 |
| Focal Planes: | 4.391026 | −604.898243 |
| Principal Planes: | 56.306860 | −656.814077 |
| Anti-Principal Planes: | −47.524807 | −552.982409 |
| Nodal Planes: | 56.306860 | −656.814077 |
| Anti-Nodal Planes: | −47.524807 | −552.982409 |
| W = 0.635000 | | |
| Focal Length: | −50.637947 | 50.637947 |
| Focal Planes: | 4.268027 | −589.053890 |
| Principal Planes: | 54.905974 | −639.691837 |
| Anti-Principal Planes: | −46.369920 | −538.415942 |
| Nodal Planes: | 54.905974 | −639.691837 |
| Anti-Nodal Planes: | −46.369920 | −538.415942 |

The illumination optical system 98 as described above properly images the output surface of the optical concentrator element 16 directly on the digital imaging device 75.

Instead of comprising lenses, the elements within the illumination and projection optical systems each may alternatively comprise a refractive element, a reflective element (e.g. mirror), a diffractive element, or combinations thereof. The surface shapes may be provided in whole, or in part, by Fresnel steps or facets. It may be desirable to provide additional mirror elements to effect additional folds in the optical path of the optical system to thereby reduce the overall dimensions of the housing containing the DLP system 100. These design variations may also be envisioned with any of the following alternative illumination optical systems.

The DLP system 100 described above preferably has the following characteristics: high resolution (e.g. XGA or greater); low power requirement of less than 30 watts; light weight (less than 30 pounds); small form factor; inputs such as, for example, DVI, VGA, USB, RS232, composite, and HDMI may be employed. These characteristics may also be envisioned with any of the following alternative illumination optical systems.

The DLP system 100 of the present invention may be employed as a free-standing or hand-held projector (i.e. without a screen), or alternatively may be employed in conjunction with a screen such as, for example, the types disclosed in U.S. Pat. No. 6,301,417 issued to Biscardi et al or U.S. Pat. No. 6,487,350 issued to Veligdan et al. These screens (or optical display panels) are known to have superior brightness and contrast even in ambient conditions. These different utilizations may also be envisioned with any of the following alternative illumination optical systems.

The below illumination optical systems may alternatively be contemplated and may work in conjunction with the projection optical system described above or may work with other types of projection optical systems.

Figure 13:
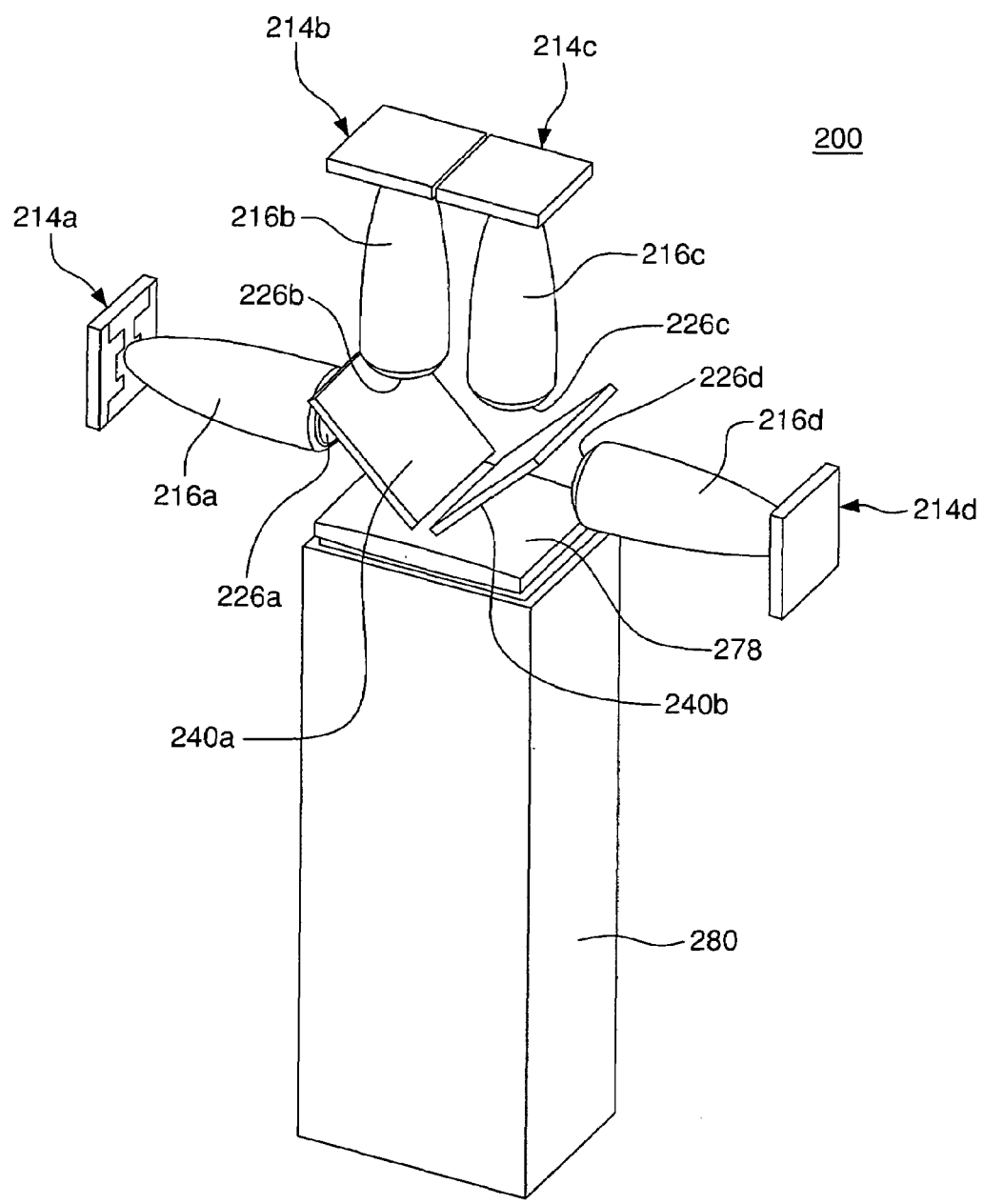
FIG. 13 is an isometric view illustrating a portion of another digital light projection system including a 4-channel LED array configuration, in accordance with a preferred embodiment of the present invention.
Figure 14:
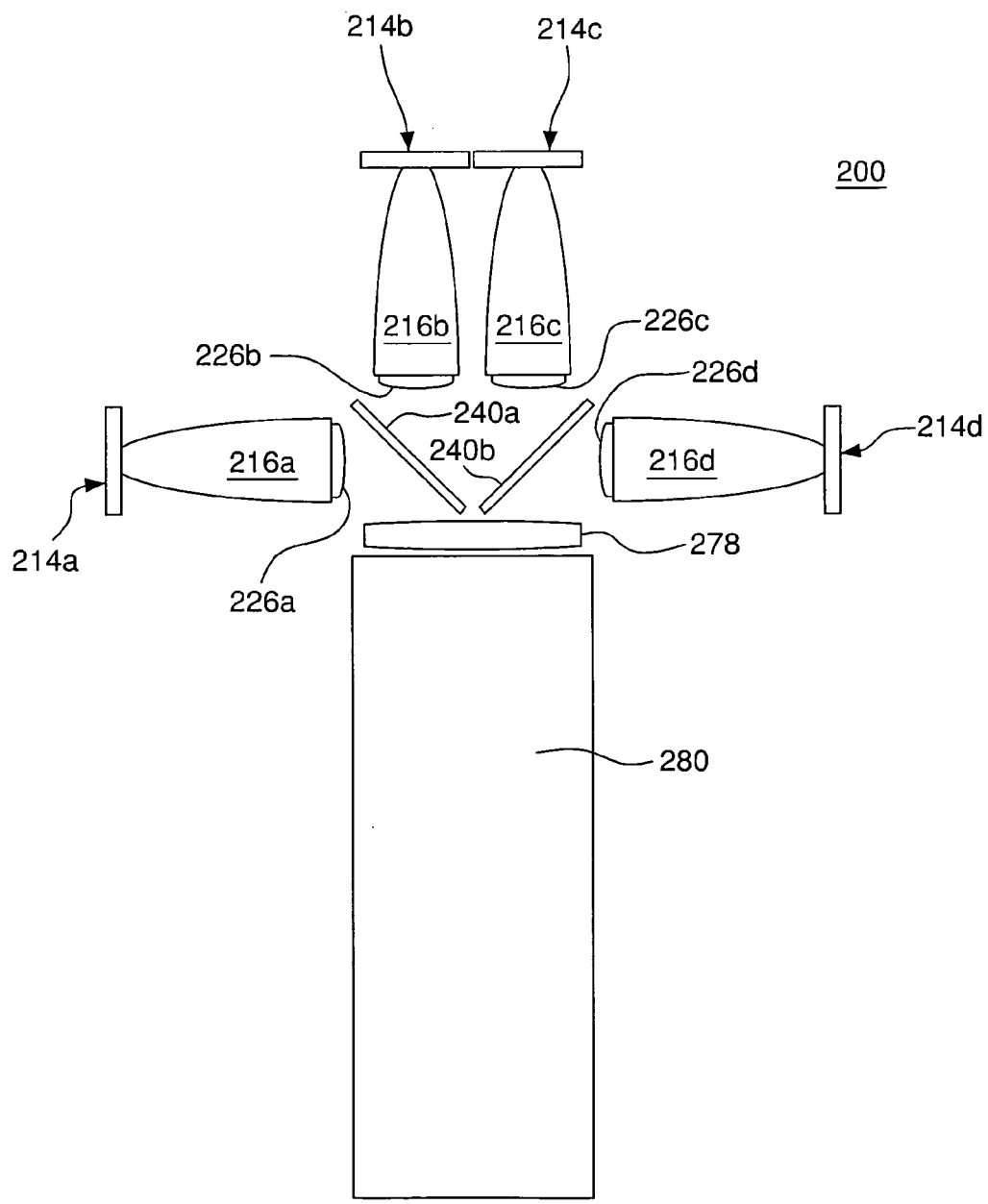
FIG. 14 is a side view of the portion of the digital light projection system shown in FIG. 13.

FIG. 13 is an isometric view illustrating a portion 200 of another digital light projection system including a 4-channel LED array configuration, in accordance with a preferred embodiment of the present invention. FIG. 13 illustrates the use of LED array mounting boards 214a-d with respective corresponding optical concentrator elements 216a-d. Field lenses 226a-d are optically aligned between the output of the concentrator elements and dielectric plates 240a, 240b. A single imaging lens 278 is optically aligned between the dielectric plates 240a, 240b and integrator element (e.g. rod) 280. FIG. 14 is a side view of the portion 200 of the digital light projection system shown in FIG. 13.

Figure 15:
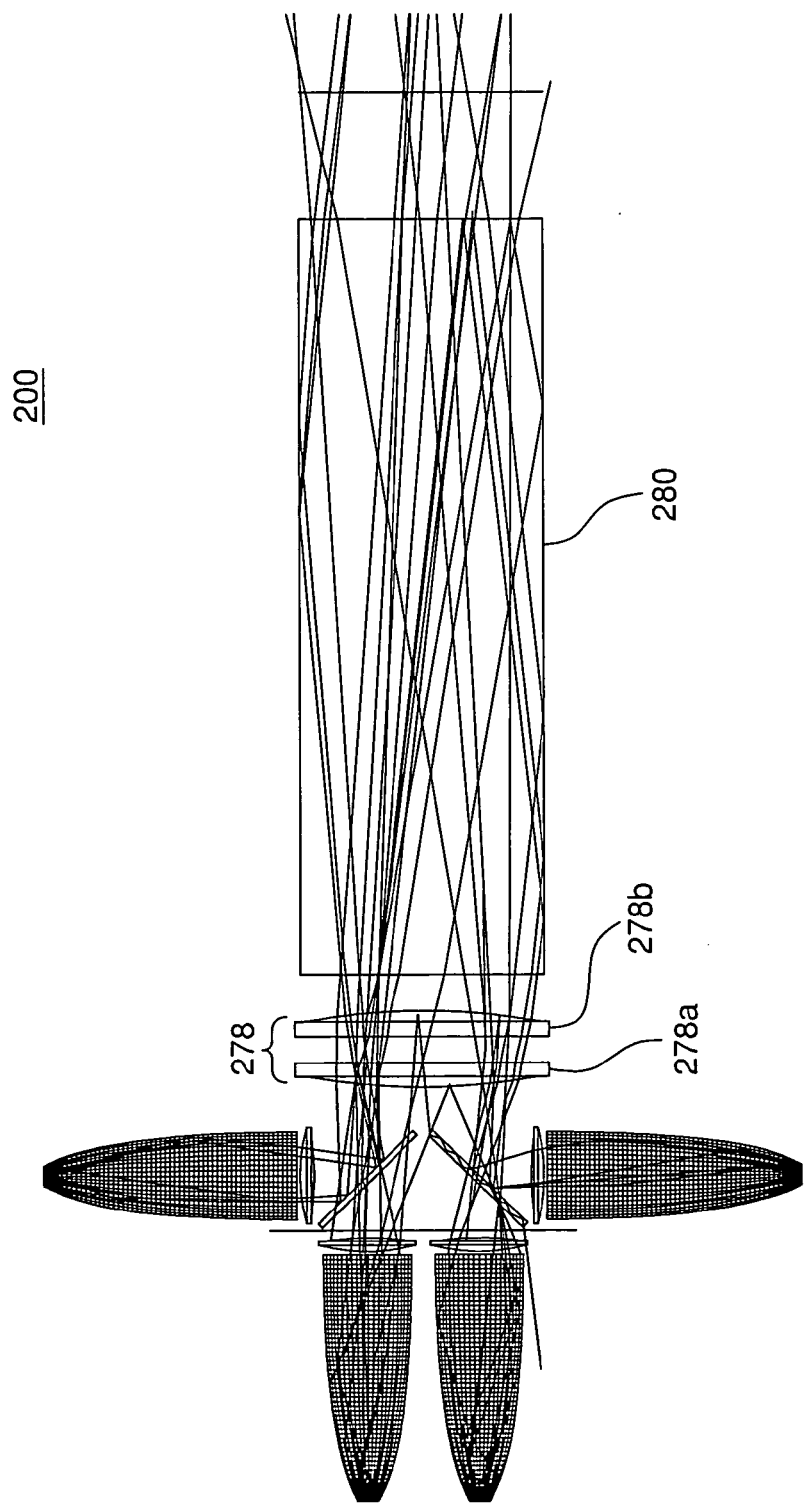
FIG. 15 is a side view of the portion of the digital light projection system shown in FIG. 13 with the addition of an optional second imaging lens. Select sample ray traces are also illustrated.

FIG. 15 is a side view of the portion 200 of the digital light projection system shown in FIG. 13 with imaging lens 278 alternatively comprising two imaging lenses 278a, 278b. Select sample ray traces are also illustrated.

Figure 16:
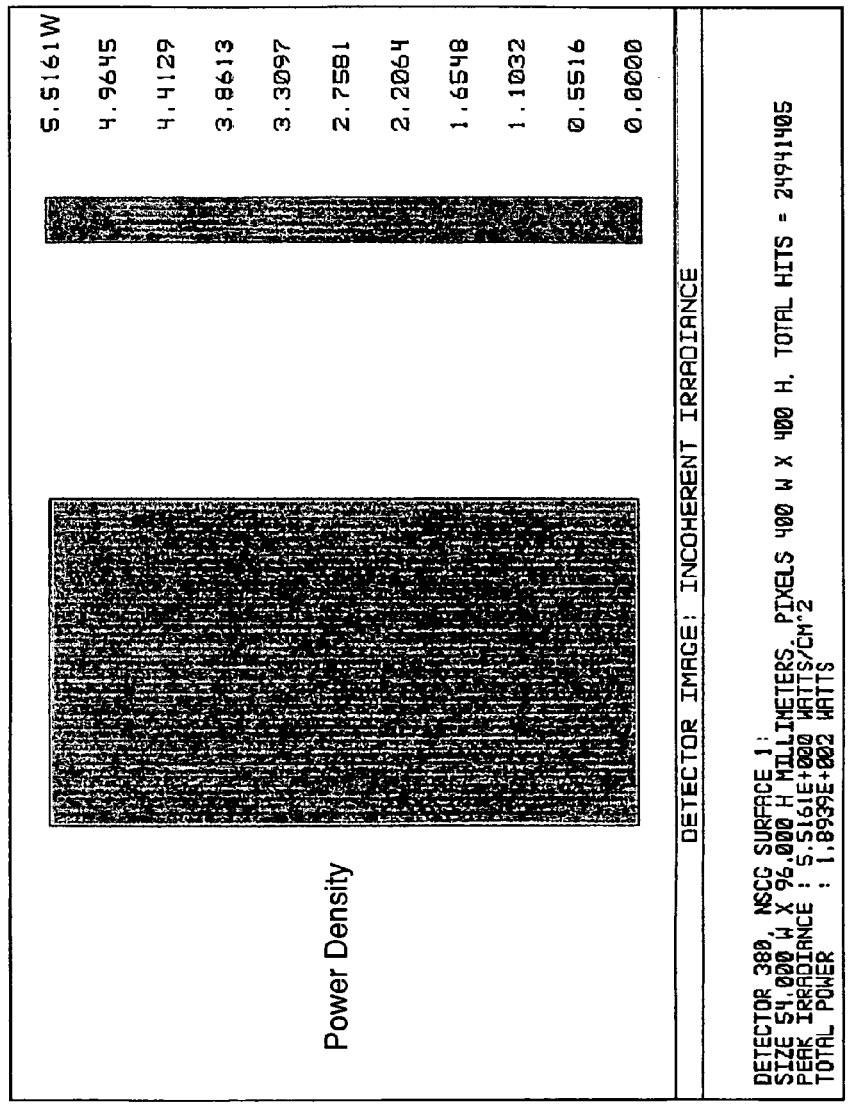
FIG. 16 is a Power Density plot of the portion of the digital light projection system shown in FIG. 13.

FIG. 16 is a Power Density plot of the portion 200 of the digital light projection system shown in FIG. 13. Since there are two adjacent light paths from LED array mounting boards 214b,214c and respective concentrator element 216b, 216c, light from these two paths are directed towards different, opposite, and/or separate portions of the digital imaging device which is optically aligned subsequent the integrator element 280. This configuration is most beneficial in systems which employ a digital imaging device having an aspect ratio other than 1:1, and which is preferably 16:9. With this configuration, light substantially fills the etendue of the imaging device as depicted in FIG. 16. It is noted that the LED arrays mounted on LED array mounting boards 214b, 214c are preferably the same color and are more preferably green. LED array mounting boards 214a,214d are preferably red and blue, respectively or vice-versa. Variations of these preferred colors are possible. The two green sources produce circles which overlap and provide a better fill for a 16:9 imaging device and can therefore capture more brightness. This design also achieves greater thermal energy isolation for the green channels thereby providing the ability to overdrive the system while achieving better heat dissipation.

Also, although there are two adjacent green paths in this embodiment, one path may be alternatively contemplated. In this alternative configuration, light from a single green LED array mounting board and corresponding single concentrator may be transmitted through a single dichroic plate 240a or 240b, or preferably both dichroic plates 240a and 240b.

Optical concentrator elements 216a-d are individually positioned substantially adjacent to each of the LED arrays, wherein each concentrator element reflects light emitted from the plurality of LEDs within the corresponding LED array so as to provide substantially uniform light at an output surface of each concentrator element. The substantially uniform light provided at the output surface of at least two of the concentrator elements (i.e. 216b,216c) is directed towards different portions of the imaging device so as to substantially fill the etendue of the imaging device. The system preferably comprises an optical combiner element (e.g. comprising dichroic plates 240a, 240b), wherein the combiner element chromatically combines the substantially uniform light provided at the output surface of each concentrator element so as to form color-combined light at an output surface of the combiner element.

The output surface of each concentrator element is optically aligned with a corresponding side of the combiner element, wherein the combiner element chromatically combines the substantially uniform light provided at the output surface of each concentrator element so as to form color-combined light at an output surface of the combiner element;

The first dichroic element 240a and the second dichroic element 240b are positioned substantially adjacent to each other and are angled with respect to each other so as to form a substantially V-shaped pattern, wherein each of the first dichroic element and the second dichroic element spatially combines the substantially uniform light provided at the output surface of at most two of the concentrator elements.

The first dichroic element 240a spatially combines the substantially uniform light provided at the output surface of each of a first and a second of the concentrator elements (i.e. 216a,216b), wherein the second dichroic element 240b spatially combines the substantially uniform light provided at the output surface of each of a third and a fourth of the concentrator elements (i.e. 216c,216d), and wherein the second concentrator element 216b and the third concentrator element 216c are positioned substantially adjacent to each other such that the output surfaces of the second concentrator element and third concentrator element are optically aligned with a common side of the combiner element which comprises dichroic plates 240a,240b. The first dichroic element 240a reflects the substantially uniform light provided at the output surface of the first concentrator element 216a, and wherein the first dichroic element 240a transmits the substantially uniform light provided at the output surface of the second concentrator element 216b. The second dichroic element 240b reflects the substantially uniform light provided at the output surface of the fourth concentrator element 216d, and wherein the second dichroic element 240b transmits the substantially uniform light provided at the output surface of the third concentrator element 216c. The first concentrator element 216a and the fourth concentrator element 216d are oriented in substantially opposite directions from each other such that the output surfaces of the first concentrator element and the fourth concentrator element are optically aligned with opposite sides of the combiner element, and wherein the common side of the combiner element joins the opposite sides of the combiner element.

The plurality of LED arrays mounted on LED array mounting boards 214a-d preferably consists of 4 LED arrays, wherein the 4 LED arrays consist of 4 single-color LED arrays, and wherein 3 of the 4 single-color LED arrays is of a different color from one another. The 4 single-color LED arrays more preferably consist of an LED array consisting of only red LEDs, an LED array consisting of only green LEDs, an LED array consisting of only blue LEDs, and an LED array consisting of only either red, green, or blue LEDs.

The substantially uniform light at the output surface of the second and third concentrator elements 216b,216c is substantially the same color and is preferably green.

In a preferred embodiment, the blue LED array comprises 32 blue LEDs, the red LED array comprises 45 red LEDs, and each of the green LED arrays comprise 45 green LEDs. It is noted that the number and overall positions of the individual LEDs within a particular LED array may vary and is selected based on the etendue of the spatial light modulator (imaging device) combined with the desired white point of the imaging system.

The system further comprises a common field lens provided between the output surfaces of the second and third concentrator elements, and the common side of the combiner element.

The system further comprises a digital imaging device, wherein the imaging device has an aspect ratio other than 1:1, and wherein the substantially uniform light provided at the output surfaces of the second and third concentrator elements are directed towards different, opposite, or separate portions of the imaging device so as to substantially fill the etendue of the imaging device.

In an alternative configuration, a field lens may be provided between the output surface of each concentrator element and the corresponding side of the combiner element.

At least one of the first dichroic element and the second dichroic element is a dichroic plate. The first dichroic element and the second dichroic element may be defined by dichroic coatings on two adjacent facets of a prism.

The reflection of light performed by the concentrator elements may be specular reflection but is preferably total internal reflection.

The output surface of the combiner element is optically aligned with an input surface of the integrator element 280, wherein the integrator element spatially homogenizes the color-combined light provided at the output surface of the combiner element so as to form color-combined light which is substantially homogenized at an output surface of the integrator element.

At least one field lens may be provided between the output surface of the combiner element and the input surface of the integrator element.

The concentrator elements preferably each have a conic shape, and more preferably have a complex conic shape. The concentrator elements may each either have a substantially parabolic cross section, a cross section which is a portion of a substantially hyperbolic shape, a cross section which is a portion of a substantially elliptical shape, or combinations thereof. The concentrator elements may comprise a material selected from the group consisting of a polymer, plastic, glass, metal, and combinations thereof. The concentrator elements preferably comprise Zeonex®.

The output surface of each concentrator element is imaged directly on the digital imaging device, wherein the imaging device may have an aspect ratio other than 1:1, and is preferably 16:9. With the two adjacent concentrators 216b,216c, the system is able to more efficiently couple to a rectangular imaging device.

In the preferred exemplary configuration shown in FIGS. 13-15, the ZEMAX software outputs surface data describing these surface characteristics as illustrated in Table 3.

TABLE 3

ZEMAX Software Output Describing Surface Data Summary and Detail for Each Individual Element within the Illumination Optical System illustrated in FIGS. 13-15

GENERAL LENS DATA:

| | |
|---|---|
| Glass Catalogs: | SCHOTT MISC |
| Temperature (C.): | 2.00000E+001 |
| Pressure (ATM): | 1.00000E+000 |
| Adjust Index Data To Environment: | Off |
| Primary Wavelength: | 0.5875618 μm |
| Lens Units: | Millimeters |

Wavelengths: 3
Units: μm

| # | Value | Weight |
|---|---|---|
| 1 | 0.486133 | 1.000000 |
| 2 | 0.587562 | 1.000000 |
| 3 | 0.656273 | 1.000000 |

OBJECT DATA DETAIL:
There are 385 objects:

| | |
|---|---|
| Object 1: | SUBSTRATE |
| Object type: | Rectangular Volume (NSC_RBLK) |
| CSG 0: | Side Faces |
| Coating: | (none) |
| Scattering: | Lambertian |
| Scatter Fraction: | 0.4 |
| Number of Scatter Rays: | 0 |
| CSG 1: | Front Face |
| Coating: | (none) |
| Scattering: | None |
| CSG 2: | Back Face |
| Coating: | (none) |
| Scattering: | None |
| Reference object: | 0 |
| Inside of: | 0 |

| | | | | | |
|---|---|---|---|---|---|
| XYZ position: | 0 | 148 | 130 | | |
| Tilt about XYZ: | 90 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | −1.00000000E+000 | 1.48000000E+002 | |
| Pos. Mtrx. R31 R32 R33 Z: | 0.00000000E+000 | 1.00000000E+000 | −3.82858892E−016 | 1.30000000E+002 | |

| | |
|---|---|
| Material: | MIRROR |
| X1 Half Width: | 4 |
| Y1 Half Width: | 4 |
| Z Length: | 0.5 |
| X2 Half Width: | 4 |
| Y2 Half Width: | 4 |
| Front X Angle: | 0 |
| Front Y Angle: | 0 |
| Rear X Angle: | 0 |
| Rear Y Angle: | 0 |
| Object 2: | ROW 5 |
| Object type: | Null Object (NSC_NULL) |
| Reference object: | 0 |
| Inside of: | 0 |

| | | | | | |
|---|---|---|---|---|---|
| XYZ position: | −0.3556 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −3.55600000E−001 | |
| Pos. Mtrx. R21 R22 R23 Y: | 0.00000000E+000 | 1.00000000E+000 | 0.00000000E+000 | 0.00000000E+000 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000
Object 3:     LED EMITTER C5
Object type:     Source Volume Rectangle (NSC__VSRR)
Reference object:     −2
Inside of:     0
XYZ position:     0     0     0.6
Tilt about XYZ:     0     0     0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |

Layout Rays:     0
Analysis Rays:     10000
Power(Watts):     1
Wavenumber:     1
Color #:     1
X Half Width:     0.1778
Y Half Width:     0.1778
Z Half Width:     0.01
Object 4:     LED EMITTER C4
Object type:     Source Volume Rectangle (NSC__VSRR)
Reference object:     −1
Inside of:     0
XYZ position:     0     0.7112     0
Tilt about XYZ:     0     0     0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |

Layout Rays:     1
Analysis Rays:     10000
Power(Watts):     1
Wavenumber:     1
Color #:     1
X Half Width:     0.1778
Y Half Width:     0.1778
Z Half Width:     0.01
Object 5:     LED EMITTER C3
Object type:     Source Volume Rectangle (NSC__VSRR)
Reference object:     −1
Inside of:     0
XYZ position:     0     0.7112     0
Tilt about XYZ:     0     0     0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |

Layout Rays:     0
Analysis Rays:     10000
Power(Watts):     1
Wavenumber:     1
Color #:     1
X Half Width:     0.1778
Y Half Width:     0.1778
Z Half Width:     0.01
Object 6:     LED EMITTER C2
Object type:     Source Volume Rectangle (NSC__VSRR)
Reference object:     −1
Inside of:     0
XYZ position:     0     0.7112     0
Tilt about XYZ:     0     0     0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Layout Rays:     0
Analysis Rays:     10000
Power(Watts):     1
Wavenumber:     1
Color #:     1
X Half Width:     0.1778
Y Half Width:     0.1778
Z Half Width:     0.01
Object 7:     LED EMITTER C1
Object type:     Source Volume Rectangle (NSC__VSRR)
Reference object:     −1

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32844800E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 1 | | | | |
| X Half Width: | 0.1778 | | | | |
| Y Half Width: | 0.1778 | | | | |
| Z Half Width: | 0.01 | | | | |
| Object 8: | LED EMITTER C6 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32133600E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 1 | | | | |
| X Half Width: | 0.1778 | | | | |
| Y Half Width: | 0.1778 | | | | |
| Z Half Width: | 0.01 | | | | |
| Object 9: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.31422400E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 1 | | | | |
| X Half Width: | 0.1778 | | | | |
| Y Half Width: | 0.1778 | | | | |
| Z Half Width: | 0.01 | | | | |
| Object 10: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30711200E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 1 | | | | |
| X Half Width: | 0.1778 | | | | |
| Y Half Width: | 0.1778 | | | | |
| Z Half Width: | 0.01 | | | | |
| Object 11: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30000000E+002 | |
| # Layout Rays: | 0 | | | | |
| # Analysis Rays: | 10000 | | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Power(Watts): | 1 | | | |
| Wavenumber: | 1 | | | |
| Color #: | 1 | | | |
| X Half Width: | 0.1778 | | | |
| Y Half Width: | 0.1778 | | | |
| Z Half Width: | 0.01 | | | |
| Object 12: | ROW 4 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 µm = 1.00000000 | | | | |
| Index at 0.587562 µm = 1.00000000 | | | | |
| Index at 0.656273 µm = 1.00000000 | | | | |
| Object 13: | LED EMITTER C5 | | | |
| Object type: | Source Volume Rectangle (NSC_VSRR) | | | |
| Reference object: | −10 | | | |
| Inside of: | 0 | | | |
| XYZ position: | −0.7112 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |
| X Half Width: | 0.1778 | | | |
| Y Half Width: | 0.1778 | | | |
| Z Half Width: | 0.01 | | | |
| Object 14: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |
| X Half Width: | 0.1778 | | | |
| Y Half Width: | 0.1778 | | | |
| Z Half Width: | 0.01 | | | |
| Object 15: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |
| X Half Width: | 0.1778 | | | |
| Y Half Width: | 0.1778 | | | |
| Z Half Width: | 0.01 | | | |
| Object 16: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |
| X Half Width: | 0.1778 | | | |
| Y Half Width: | 0.1778 | | | |
| Z Half Width: | 0.01 | | | |
| Object 17: | LED EMITTER C1 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |
| X Half Width: | 0.1778 | | | |
| Y Half Width: | 0.1778 | | | |
| Z Half Width: | 0.01 | | | |
| Object 18: | LED EMITTER C6 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |
| X Half Width: | 0.1778 | | | |
| Y Half Width: | 0.1778 | | | |
| Z Half Width: | 0.01 | | | |
| Object 19: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |
| X Half Width: | 0.1778 | | | |
| Y Half Width: | 0.1778 | | | |
| Z Half Width: | 0.01 | | | |
| Object 20: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |
| # Layout Rays: | 0 | | | |
| # Analysis Rays: | 10000 | | | |
| Power(Watts): | 1 | | | |
| Wavenumber: | 1 | | | |
| Color #: | 2 | | | |

TABLE 3-continued

ZEMAX Software Output Describing Surface Data Summary and Detail for Each
Individual Element within the Illumination Optical System illustrated in FIGS. 13-15

| | |
|---|---|
| X Half Width: | 0.1778 |
| Y Half Width: | 0.1778 |
| Z Half Width: | 0.01 |
| Object 21: | LED EMITTER C9 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −7.11200000E−001 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.30000000E+002 |
| # Layout Rays: | 0 |
| # Analysis Rays: | 10000 |
| Power(Watts): | 1 |
| Wavenumber: | 1 |
| Color #: | 2 |
| X Half Width: | 0.1778 |
| Y Half Width: | 0.1778 |
| Z Half Width: | 0.01 |
| Object 22: | ROW 3 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.486133 µm = 1.00000000 | |
| Index at 0.587562 µm = 1.00000000 | |
| Index at 0.656273 µm = 1.00000000 | |
| Object 23: | LED EMITTER C5 |
| Object type: | Source Volume Rectangle (NSC_VSRR) |
| Reference object: | −20 |
| Inside of: | 0 |
| XYZ position: | −1.4224    0    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.30000000E+002 |
| # Layout Rays: | 0 |
| # Analysis Rays: | 10000 |
| Power(Watts): | 1 |
| Wavenumber: | 1 |
| Color #: | 3 |
| X Half Width: | 0.1778 |
| Y Half Width: | 0.1778 |
| Z Half Width: | 0.01 |
| Object 24: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.30711200E+002 |
| # Layout Rays: | 0 |
| # Analysis Rays: | 10000 |
| Power(Watts): | 1 |
| Wavenumber: | 1 |
| Color #: | 3 |
| X Half Width: | 0.1778 |
| Y Half Width: | 0.1778 |
| Z Half Width: | 0.01 |
| Object 25: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.31422400E+002 |

TABLE 3-continued

ZEMAX Software Output Describing Surface Data Summary and Detail for Each
Individual Element within the Illumination Optical System illustrated in FIGS. 13-15

| | |
|---|---|
| # Layout Rays: | 0 |
| # Analysis Rays: | 10000 |
| Power(Watts): | 1 |
| Wavenumber: | 1 |
| Color #: | 3 |
| X Half Width: | 0.1778 |
| Y Half Width: | 0.1778 |
| Z Half Width: | 0.01 |
| Object 26: | LED EMITTER C2 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32133600E+002 |
| # Layout Rays: | 0 |
| # Analysis Rays: | 10000 |
| Power(Watts): | 1 |
| Wavenumber: | 1 |
| Color #: | 3 |
| X Half Width: | 0.1778 |
| Y Half Width: | 0.1778 |
| Z Half Width: | 0.01 |
| Object 27: | LED EMITTER C1 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32844800E+002 |
| # Layout Rays: | 1 |
| # Analysis Rays: | 10000 |
| Power(Watts): | 1 |
| Wavenumber: | 1 |
| Color #: | 3 |
| X Half Width: | 0.1778 |
| Y Half Width: | 0.1778 |
| Z Half Width: | 0.01 |
| Object 28: | LED EMITTER C6 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32133600E+002 |
| # Layout Rays: | 0 |
| # Analysis Rays: | 10000 |
| Power(Watts): | 1 |
| Wavenumber: | 1 |
| Color #: | 3 |
| X Half Width: | 0.1778 |
| Y Half Width: | 0.1778 |
| Z Half Width: | 0.01 |
| Object 29: | LED EMITTER C7 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.31422400E+002 |
| # Layout Rays: | 0 |
| # Analysis Rays: | 10000 |
| Power(Watts): | 1 |
| Wavenumber: | 1 |
| Color #: | 3 |
| X Half Width: | 0.1778 |
| Y Half Width: | 0.1778 |
| Z Half Width: | 0.01 |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Object 30: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −1.42240000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30711200E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 3 | | | | |
| X Half Width: | 0.1778 | | | | |
| Y Half Width: | 0.1778 | | | | |
| Z Half Width: | 0.01 | | | | |
| Object 31: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −1.42240000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30000000E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 3 | | | | |
| X Half Width: | 0.1778 | | | | |
| Y Half Width: | 0.1778 | | | | |
| Z Half Width: | 0.01 | | | | |
| Object 32: | ROW 2 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 33: | LED EMITTER C5 | | | | |
| Object type: | Source Volume Rectangle (NSC_VSRR) | | | | |
| Reference object: | −30 | | | | |
| Inside of: | 0 | | | | |
| XYZ position: | −2.1336 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30000000E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 4 | | | | |
| X Half Width: | 0.1778 | | | | |
| Y Half Width: | 0.1778 | | | | |
| Z Half Width: | 0.01 | | | | |
| Object 34: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30711200E+002 | |
| # Layout Rays: | 0 | | | | |
| # Analysis Rays: | 10000 | | | | |
| Power(Watts): | 1 | | | | |

TABLE 3-continued

ZEMAX Software Output Describing Surface Data Summary and Detail for Each
Individual Element within the Illumination Optical System illustrated in FIGS. 13-15

| | |
|---|---|
| Wavenumber: | 1 |
| Color #: | 4 |
| X Half Width: | 0.1778 |
| Y Half Width: | 0.1778 |
| Z Half Width: | 0.01 |
| Object 35: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.31422400E+002 |
| # Layout Rays: | 0 |
| # Analysis Rays: | 10000 |
| Power(Watts): | 1 |
| Wavenumber: | 1 |
| Color #: | 4 |
| X Half Width: | 0.1778 |
| Y Half Width: | 0.1778 |
| Z Half Width: | 0.01 |
| Object 36: | LED EMITTER C2 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32133600E+002 |
| # Layout Rays: | 0 |
| # Analysis Rays: | 10000 |
| Power(Watts): | 1 |
| Wavenumber: | 1 |
| Color #: | 4 |
| X Half Width: | 0.1778 |
| Y Half Width: | 0.1778 |
| Z Half Width: | 0.01 |
| Object 37: | LED EMITTER C1 |
| Object type: | Null Object (NSC_NULL) |
| Reference object: | 36 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32844800E+002 |
| Material: | |
| Index at 0.486133 μm = 1.00000000 | |
| Index at 0.587562 μm = 1.00000000 | |
| Index at 0.656273 μm = 1.00000000 | |
| Object 38: | LED EMITTER C6 |
| Object type: | Source Volume Rectangle (NSC_VSRR) |
| Reference object: | −5 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.29288800E+002 |
| # Layout Rays: | 0 |
| # Analysis Rays: | 10000 |
| Power(Watts): | 1 |
| Wavenumber: | 1 |
| Color #: | 4 |
| X Half Width: | 0.1778 |
| Y Half Width: | 0.1778 |
| Z Half Width: | 0.01 |
| Object 39: | LED EMITTER C7 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 1 | | | |
| Color #: | 4 | | | |
| X Half Width: | 0.1778 | | | |
| Y Half Width: | 0.1778 | | | |
| Z Half Width: | 0.01 | | | |
| Object 40: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |
| # Layout Rays: | 0 | | | |
| # Analysis Rays: | 10000 | | | |
| Power(Watts): | 1 | | | |
| Wavenumber: | 1 | | | |
| Color #: | 4 | | | |
| X Half Width: | 0.1778 | | | |
| Y Half Width: | 0.1778 | | | |
| Z Half Width: | 0.01 | | | |
| Object 41: | LED EMITTER C9 | | | |
| Object type: | Null Object (NSC_NULL) | | | |
| Reference object: | 40 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 42: | ROW 1 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 43: | LED EMITTER C5 | | | |
| Object type: | Source Volume Rectangle (NSC_VSRR) | | | |
| Reference object: | −40 | | | |
| Inside of: | 0 | | | |
| XYZ position: | −2.8448 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 1 | | | |
| Color #: | 5 | | | |
| X Half Width: | 0.1778 | | | |
| Y Half Width: | 0.1778 | | | |
| Z Half Width: | 0.01 | | | |
| Object 44: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |
| # Layout Rays: | 0 | | | |
| # Analysis Rays: | 10000 | | | |
| Power(Watts): | 1 | | | |
| Wavenumber: | 1 | | | |
| Color #: | 5 | | | |
| X Half Width: | 0.1778 | | | |
| Y Half Width: | 0.1778 | | | |
| Z Half Width: | 0.01 | | | |
| Object 45: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |
| # Layout Rays: | 0 | | | |
| # Analysis Rays: | 10000 | | | |
| Power(Watts): | 1 | | | |
| Wavenumber: | 1 | | | |
| Color #: | 5 | | | |
| X Half Width: | 0.1778 | | | |
| Y Half Width: | 0.1778 | | | |
| Z Half Width: | 0.01 | | | |
| Object 46: | LED EMITTER C2 | | | |
| Object type: | Null Object (NSC_NULL) | | | |
| Reference object: | 45 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 47: | LED EMITTER C1 | | | |
| Object type: | Null Object (NSC_NULL) | | | |
| Reference object: | 46 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 48: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.29288800E+002 |
| # Layout Rays: | 0 | | | |
| # Analysis Rays: | 10000 | | | |
| Power(Watts): | 1 | | | |
| Wavenumber: | 1 | | | |
| Color #: | 5 | | | |
| X Half Width: | 0.1778 | | | |
| Y Half Width: | 0.1778 | | | |
| Z Half Width: | 0.01 | | | |
| Object 49: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 1 | | | |
| Color #: | 5 | | | |
| X Half Width: | 0.1778 | | | |
| Y Half Width: | 0.1778 | | | |
| Z Half Width: | 0.01 | | | |
| Object 50: | LED EMITTER C8 | | | |
| Object type: | Null Object (NSC_NULL) | | | |
| Reference object: | 49 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 51: | LED EMITTER C9 | | | |
| Object type: | Null Object (NSC_NULL) | | | |
| Reference object: | 50 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 52: | ROW 6 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 53: | LED EMITTER C5 | | | |
| Object type: | Source Volume Rectangle (NSC_VSRR) | | | |
| Reference object: | −50 | | | |
| Inside of: | 0 | | | |
| XYZ position: | 0.7112 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 54: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R31 R32 R33 Z: | 0.00000000E+000 | 1.00000000E+000 | −3.82858892E−016 | 1.30711200E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 55: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |
| # Layout Rays: | 1 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 56: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 57: | LED EMITTER C1 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 58: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.29288800E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Z Half Width: | 0.01 | | | |
| Object 59: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 60: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 61: | LED EMITTER C9 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| # Layout Rays: | 0 | | | |
| # Analysis Rays: | 10000 | | | |
| Power(Watts): | 1 | | | |
| Wavenumber: | 1 | | | |
| Color #: | 6 | | | |
| X Half Width: | 0.1778 | | | |
| Y Half Width: | 0.1778 | | | |
| Z Half Width: | 0.01 | | | |
| Object 62: | ROW 7 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 63: | LED EMITTER C5 | | | |
| Object type: | Source Volume Rectangle (NSC_VSRR) | | | |
| Reference object: | −60 | | | |
| Inside of: | 0 | | | |
| XYZ position: | 1.4224 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |
| # Layout Rays: | 0 | | | |
| # Analysis Rays: | 10000 | | | |

TABLE 3-continued

ZEMAX Software Output Describing Surface Data Summary and Detail for Each
Individual Element within the Illumination Optical System illustrated in FIGS. 13-15

| | |
|---|---|
| Power(Watts): | 1 |
| Wavenumber: | 1 |
| Color #: | 7 |
| X Half Width: | 0.1778 |
| Y Half Width: | 0.1778 |
| Z Half Width: | 0.01 |
| Object 64: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.30711200E+002 |
| # Layout Rays: | 0 |
| # Analysis Rays: | 10000 |
| Power(Watts): | 1 |
| Wavenumber: | 1 |
| Color #: | 7 |
| X Half Width: | 0.1778 |
| Y Half Width: | 0.1778 |
| Z Half Width: | 0.01 |
| Object 65: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.31422400E+002 |
| # Layout Rays: | 0 |
| # Analysis Rays: | 10000 |
| Power(Watts): | 1 |
| Wavenumber: | 1 |
| Color #: | 7 |
| X Half Width: | 0.1778 |
| Y Half Width: | 0.1778 |
| Z Half Width: | 0.01 |
| Object 66: | LED EMITTER C2 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32133600E+002 |
| # Layout Rays: | 0 |
| # Analysis Rays: | 10000 |
| Power(Watts): | 1 |
| Wavenumber: | 1 |
| Color #: | 7 |
| X Half Width: | 0.1778 |
| Y Half Width: | 0.1778 |
| Z Half Width: | 0.01 |
| Object 67: | LED EMITTER C1 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32844800E+002 |
| # Layout Rays: | 0 |
| # Analysis Rays: | 10000 |
| Power(Watts): | 1 |
| Wavenumber: | 1 |
| Color #: | 7 |
| X Half Width: | 0.1778 |
| Y Half Width: | 0.1778 |
| Z Half Width: | 0.01 |
| Object 68: | LED EMITTER C6 |
| Object type: | Source Volume Rectangle (NSC_VSRR) |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| # Layout Rays: | 0 | | | |
| # Analysis Rays: | 10000 | | | |
| Power(Watts): | 1 | | | |
| Wavenumber: | 1 | | | |
| Color #: | 7 | | | |
| X Half Width: | 0.1778 | | | |
| Y Half Width: | 0.1778 | | | |
| Z Half Width: | 0.01 | | | |
| Object 69: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.31422400E+002 |
| # Layout Rays: | 0 | | | |
| # Analysis Rays: | 10000 | | | |
| Power(Watts): | 1 | | | |
| Wavenumber: | 1 | | | |
| Color #: | 7 | | | |
| X Half Width: | 0.1778 | | | |
| Y Half Width: | 0.1778 | | | |
| Z Half Width: | 0.01 | | | |
| Object 70: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30711200E+002 |
| # Layout Rays: | 0 | | | |
| # Analysis Rays: | 10000 | | | |
| Power(Watts): | 1 | | | |
| Wavenumber: | 1 | | | |
| Color #: | 7 | | | |
| X Half Width: | 0.1778 | | | |
| Y Half Width: | 0.1778 | | | |
| Z Half Width: | 0.01 | | | |
| Object 71: | LED EMITTER C9 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 1 | | | |
| Color #: | 7 | | | |
| X Half Width: | 0.1778 | | | |
| Y Half Width: | 0.1778 | | | |
| Z Half Width: | 0.01 | | | |
| Object 72: | ROW 8 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |

TABLE 3-continued

ZEMAX Software Output Describing Surface Data Summary and Detail for Each
Individual Element within the Illumination Optical System illustrated in FIGS. 13-15

| | |
|---|---|
| Index at 0.486133 μm = | 1.00000000 |
| Index at 0.587562 μm = | 1.00000000 |
| Index at 0.656273 μm = | 1.00000000 |
| Object 73: | LED EMITTER C5 |
| Object type: | Source Volume Rectangle (NSC_VSRR) |
| Reference object: | −70 |
| Inside of: | 0 |
| XYZ position: | 2.1336    0    0 |
| Tilt about XYZ: | 0    0    0 |
| Pos. Mtrx. R11 R12 R13 X: | 1.00000000E+000    0.00000000E+000    0.00000000E+000    2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.30000000E+002 |
| # Layout Rays: | 0 |
| # Analysis Rays: | 10000 |
| Power(Watts): | 1 |
| Wavenumber: | 1 |
| Color #: | 8 |
| X Half Width: | 0.1778 |
| Y Half Width: | 0.1778 |
| Z Half Width: | 0.01 |
| Object 74: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.30711200E+002 |
| # Layout Rays: | 0 |
| # Analysis Rays: | 10000 |
| Power(Watts): | 1 |
| Wavenumber: | 1 |
| Color #: | 8 |
| X Half Width: | 0.1778 |
| Y Half Width: | 0.1778 |
| Z Half Width: | 0.01 |
| Object 75: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.31422400E+002 |
| # Layout Rays: | 0 |
| # Analysis Rays: | 10000 |
| Power(Watts): | 1 |
| Wavenumber: | 1 |
| Color #: | 8 |
| X Half Width: | 0.1778 |
| Y Half Width: | 0.1778 |
| Z Half Width: | 0.01 |
| Object 76: | LED EMITTER C2 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32133600E+002 |
| # Layout Rays: | 0 |
| # Analysis Rays: | 10000 |
| Power(Watts): | 1 |
| Wavenumber: | 1 |
| Color #: | 8 |
| X Half Width: | 0.1778 |
| Y Half Width: | 0.1778 |
| Z Half Width: | 0.01 |
| Object 77: | LED EMITTER C1 |
| Object type: | Null Object (NSC_NULL) |
| Reference object: | 76 |
| Inside of: | 0 |
| XYZ position: | 0    0.7112    0 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 μm = 1.00000000
Index at 0.587562 μm = 1.00000000
Index at 0.656273 μm = 1.00000000
Object 78: LED EMITTER C6
Object type: Source Volume Rectangle (NSC_VSRR)
Reference object: −5
Inside of: 0
XYZ position: 0   −0.7112   0
Tilt about XYZ: 0   0   0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.29288800E+002 |

\# Layout Rays: 0
\# Analysis Rays: 10000
Power(Watts): 1
Wavenumber: 1
Color #: 8
X Half Width: 0.1778
Y Half Width: 0.1778
Z Half Width: 0.01
Object 79: LED EMITTER C7
Object type: Source Volume Rectangle (NSC_VSRR)
Reference object: −1
Inside of: 0
XYZ position: 0   −0.7112   0
Tilt about XYZ: 0   0   0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.28577600E+002 |

\# Layout Rays: 0
\# Analysis Rays: 10000
Power(Watts): 1
Wavenumber: 1
Color #: 8
X Half Width: 0.1778
Y Half Width: 0.1778
Z Half Width: 0.01
Object 80: LED EMITTER C8
Object type: Source Volume Rectangle (NSC_VSRR)
Reference object: −1
Inside of: 0
XYZ position: 0   −0.7112   0
Tilt about XYZ: 0   0   0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

\# Layout Rays: 0
\# Analysis Rays: 10000
Power(Watts): 1
Wavenumber: 1
Color #: 8
X Half Width: 0.1778
Y Half Width: 0.1778
Z Half Width: 0.01
Object 81: LED EMITTER C9
Object type: Null Object (NSC_NULL)
Reference object: 80
Inside of: 0
XYZ position: 0   −0.7112   0
Tilt about XYZ: 0   0   0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 82: ROW 9
Object type: Null Object (NSC_NULL)
Reference object: 0
Inside of: 0

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 83: | LED EMITTER C5 | | | | |
| Object type: | Source Volume Rectangle (NSC_VSRR) | | | | |
| Reference object: | −80 | | | | |
| Inside of: | 0 | | | | |
| XYZ position: | 2.8448 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30000000E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 9 | | | | |
| X Half Width: | 0.1778 | | | | |
| Y Half Width: | 0.1778 | | | | |
| Z Half Width: | 0.01 | | | | |
| Object 84: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.30711200E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 9 | | | | |
| X Half Width: | 0.1778 | | | | |
| Y Half Width: | 0.1778 | | | | |
| Z Half Width: | 0.01 | | | | |
| Object 85: | LED EMITTER C3 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.31422400E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 9 | | | | |
| X Half Width: | 0.1778 | | | | |
| Y Half Width: | 0.1778 | | | | |
| Z Half Width: | 0.01 | | | | |
| Object 86: | LED EMITTER C2 | | | | |
| Object type: | Null Object (NSC_NULL) | | | | |
| Reference object: | 85 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32133600E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 87: | LED EMITTER C1 | | | | |
| Object type: | Null Object (NSC_NULL) | | | | |
| Reference object: | 86 | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32844800E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 88: | LED EMITTER C6 | | | | |
| Object type: | Source Volume Rectangle (NSC_VSRR) | | | | |
| Reference object: | −5 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.29288800E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 9 | | | | |
| X Half Width: | 0.1778 | | | | |
| Y Half Width: | 0.1778 | | | | |
| Z Half Width: | 0.01 | | | | |
| Object 89: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.28577600E+002 | |
| # Layout Rays: | 0 | | | | |
| # Analysis Rays: | 10000 | | | | |
| Power(Watts): | 1 | | | | |
| Wavenumber: | 1 | | | | |
| Color #: | 9 | | | | |
| X Half Width: | 0.1778 | | | | |
| Y Half Width: | 0.1778 | | | | |
| Z Half Width: | 0.01 | | | | |
| Object 90: | LED EMITTER C8 | | | | |
| Object type: | Null Object (NSC_NULL) | | | | |
| Reference object: | 89 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.27866400E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 91: | LED EMITTER C9 | | | | |
| Object type: | Null Object (NSC_NULL) | | | | |
| Reference object: | 90 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.27155200E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 92: | | | | | |
| Object type: | CPC (NSC_CPCO) | | | | |
| CSG 0: | Side Faces | | | | |
| Coating: | (none) | | | | |
| Scattering: | None | | | | |
| CSG 1: | Front Face | | | | |

TABLE 3-continued

ZEMAX Software Output Describing Surface Data Summary and Detail for Each Individual Element within the Illumination Optical System illustrated in FIGS. 13-15

| | |
|---|---|
| Coating: | (none) |
| Scattering: | None |
| CSG 2: | Back Face |
| Coating: | (none) |
| Scattering: | None |
| Reference object: | −91 |
| Inside of: | 0 |
| XYZ position: | 0    0    0.5 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    −3.82858892E−016    −1.00000000E+000    1.47500000E+002 |
| Pos. Mtrx. R31 R32 R33 Z: | 0.00000000E+000    1.00000000E+000    −3.82858892E−016    1.30000000E+002 |
| Material: | MIRROR |
| Radial Aperture: | 3.6 |
| Angle (deg): | 12 |
| Length: | 98.4 |
| #Angle Facets: | 50 |
| #Length Facets: | 48 |
| Is Volume?: | 0 |
| Object 93: | Condenser |
| Object type: | Standard Lens (NSC_SLEN) |
| CSG 0: | Side Faces |
| Coating: | (none) |
| Scattering: | None |
| CSG 1: | Front Face |
| Coating: | (none) |
| Scattering: | None |
| CSG 2: | Back Face |
| Coating: | (none) |
| Scattering: | None |
| Reference object: | −92 |
| Inside of: | 0 |
| XYZ position: | 0    0    100 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    −3.82858892E−016    −1.00000000E+000    4.80000000E+001 |
| Pos. Mtrx. R31 R32 R33 Z: | 0.00000000E+000    1.00000000E+000    −3.82858892E−016    1.30000000E+002 |
| Material: | BK7 |
| Index at 0.486133 μm = 1.52237629 | |
| Index at 0.587562 μm = 1.51680003 | |
| Index at 0.656273 μm = 1.51432235 | |
| Radius 1: | 75 |
| Conic 1: | 0 |
| Clear 1: | 19 |
| Edge 1: | 19 |
| Thickness: | 5 |
| Radius 2: | −175 |
| Conic 2: | 0 |
| Clear 2: | 19 |
| Edge 2: | 19 |
| Object 94: | |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.486133 μm = 1.00000000 | |
| Index at 0.587562 μm = 1.00000000 | |
| Index at 0.656273 μm = 1.00000000 | |
| Object 95: | SUBSTRATE |
| Object type: | Rectangular Volume (NSC_RBLK) |
| CSG 0: | Side Faces |
| Coating: | (none) |
| Scattering: | Lambertian |
| Scatter Fraction: | 0.4 |
| Number of Scatter Rays: | 0 |
| CSG 1: | Front Face |
| Coating: | (none) |
| Scattering: | None |
| CSG 2: | Back Face |
| Coating: | (none) |
| Scattering: | None |

TABLE 3-continued

ZEMAX Software Output Describing Surface Data Summary and Detail for Each
Individual Element within the Illumination Optical System illustrated in FIGS. 13-15

| | |
|---|---|
| Reference object: | 0 |
| Inside of: | 0 |
| XYZ position: | 0    22    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.20000000E+001 |
| Pos. Mtrx. R31 R32 R33 Z: | 0.00000000E+000    0.00000000E+000    1.00000000E+000    0.00000000E+000 |
| Material: | MIRROR |
| X1 Half Width: | 4 |
| Y1 Half Width: | 4 |
| Z Length: | 0.5 |
| X2 Half Width: | 4 |
| Y2 Half Width: | 4 |
| Front X Angle: | 0 |
| Front Y Angle: | 0 |
| Rear X Angle: | 0 |
| Rear Y Angle: | 0 |
| Object 96: | ROW 5 |
| Object type: | Null Object (NSC_NULL) |
| Reference object: | 0 |
| Inside of: | 0 |
| XYZ position: | −0.3556    0    0 |
| Tilt about XYZ: | 0    0    0 |
| Pos. Mtrx. R11 R12 R13 X: | 1.00000000E+000    0.00000000E+000    0.00000000E+000    −3.55600000E−001 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.486133 μm = 1.00000000 | |
| Index at 0.587562 μm = 1.00000000 | |
| Index at 0.656273 μm = 1.00000000 | |
| Object 97: | LED EMITTER C5 |
| Object type: | Source Volume Rectangle (NSC_VSRR) |
| Reference object: | −2 |
| Inside of: | 0 |
| XYZ position: | 0    0    0.6 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.20000000E+001 |
| Pos. Mtrx. R31 R32 R33 Z: | 0.00000000E+000    0.00000000E+000    1.00000000E+000    6.00000000E−001 |
| # Layout Rays: | 1 |
| # Analysis Rays: | 10000 |
| Power(Watts): | 1 |
| Wavenumber: | 2 |
| Color #: | 1 |
| X Half Width: | 0.1778 |
| Y Half Width: | 0.1778 |
| Z Half Width: | 0.01 |
| Object 98: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.27112000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 1 |
| X Half Width: | 0.1778 |
| Y Half Width: | 0.1778 |
| Z Half Width: | 0.01 |
| Object 99: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.34224000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |

TABLE 3-continued

ZEMAX Software Output Describing Surface Data Summary and Detail for Each
Individual Element within the Illumination Optical System illustrated in FIGS. 13-15

| | |
|---|---|
| Wavenumber: | 2 |
| Color #: | 1 |
| X Half Width: | 0.1778 |
| Y Half Width: | 0.1778 |
| Z Half Width: | 0.01 |
| Object 100: | LED EMITTER C2 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.41336000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 1 |
| X Half Width: | 0.1778 |
| Y Half Width: | 0.1778 |
| Z Half Width: | 0.01 |
| Object 101: | LED EMITTER C1 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.48448000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 1 |
| X Half Width: | 0.1778 |
| Y Half Width: | 0.1778 |
| Z Half Width: | 0.01 |
| Object 102: | LED EMITTER C6 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.41336000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 1 |
| X Half Width: | 0.1778 |
| Y Half Width: | 0.1778 |
| Z Half Width: | 0.01 |
| Object 103: | LED EMITTER C7 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    2.34224000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 1 |
| X Half Width: | 0.1778 |
| Y Half Width: | 0.1778 |
| Z Half Width: | 0.01 |
| Object 104: | LED EMITTER C8 |
| Object type: | Source Volume Rectangle (NSC_VSRR) |
| Reference object: | −1 |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 105: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 106: | ROW 4 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 107: | LED EMITTER C5 | | | | |
| Object type: | Source Volume Rectangle (NSC_VSRR) | | | | |
| Reference object: | −10 | | | | |
| Inside of: | 0 | | | | |
| XYZ position: | −0.7112 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −7.11200000E−001 | |
| Pos. Mtrx. R21 R22 R23 Y: | 0.00000000E+000 | 1.00000000E+000 | 0.00000000E+000 | 2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 2 | | | | |
| X Half Width: | 0.1778 | | | | |
| Y Half Width: | 0.1778 | | | | |
| Z Half Width: | 0.01 | | | | |
| Object 108: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −7.11200000E−001 | |
| Pos. Mtrx. R21 R22 R23 Y: | 0.00000000E+000 | 1.00000000E+000 | 0.00000000E+000 | 2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 2 | | | | |
| X Half Width: | 0.1778 | | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Y Half Width: | 0.1778 | | | |
| Z Half Width: | 0.01 | | | |
| Object 109: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 110: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 111: | LED EMITTER C1 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.48448000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 112: | LED EMITTER C6 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |
| # Layout Rays: | 1 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 113: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 114: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 115: | LED EMITTER C9 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 116: | ROW 3 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 µm = 1.00000000 | | | | |
| Index at 0.587562 µm = 1.00000000 | | | | |
| Index at 0.656273 µm = 1.00000000 | | | | |
| Object 117: | LED EMITTER C5 | | | |
| Object type: | Source Volume Rectangle (NSC_VSRR) | | | |
| Reference object: | −20 | | | |
| Inside of: | 0 | | | |
| XYZ position: | −1.4224 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 118: | LED EMITTER C4 | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Object type: | Source Volume Rectangle (NSC_VSRR) | | | |
| Reference object: | −1 | | | |
| Inside of: | 0 | | | |
| XYZ position: | 0    0.7112    0 | | | |
| Tilt about XYZ: | 0    0    0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 119: | LED EMITTER C3 | | | |
| Object type: | Source Volume Rectangle (NSC_VSRR) | | | |
| Reference object: | −1 | | | |
| Inside of: | 0 | | | |
| XYZ position: | 0    0.7112    0 | | | |
| Tilt about XYZ: | 0    0    0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 120: | LED EMITTER C2 | | | |
| Object type: | Source Volume Rectangle (NSC_VSRR) | | | |
| Reference object: | −1 | | | |
| Inside of: | 0 | | | |
| XYZ position: | 0    0.7112    0 | | | |
| Tilt about XYZ: | 0    0    0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 121: | LED EMITTER C1 | | | |
| Object type: | Source Volume Rectangle (NSC_VSRR) | | | |
| Reference object: | −1 | | | |
| Inside of: | 0 | | | |
| XYZ position: | 0    0.7112    0 | | | |
| Tilt about XYZ: | 0    0    0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.48448000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 122: | LED EMITTER C6 | | | |
| Object type: | Source Volume Rectangle (NSC_VSRR) | | | |
| Reference object: | −1 | | | |
| Inside of: | 0 | | | |
| XYZ position: | 0    −0.7112    0 | | | |
| Tilt about XYZ: | 0    0    0 | | | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each
Individual Element within the Illumination Optical System illustrated in FIGS. 13-15

| | |
|---|---|
| # Layout Rays: | 0 |
| # Analysis Rays: | 10000 |
| Power(Watts): | 1 |
| Wavenumber: | 2 |
| Color #: | 3 |
| X Half Width: | 0.1778 |
| Y Half Width: | 0.1778 |
| Z Half Width: | 0.01 |
| Object 123: | LED EMITTER C7 |
| Object type: | Source Volume Rectangle (NSC_VSRR) |
| Reference object: | −1 |
| Inside of: | 0 |
| XYZ position: | 0   −0.7112   0 |
| Tilt about XYZ: | 0   0   0 |
| Pos. Mtrx. R11 R12 R13 X: | 1.00000000E+000   0.00000000E+000   0.00000000E+000   −1.42240000E+000 |
| Pos. Mtrx. R21 R22 R23 Y: | 0.00000000E+000   1.00000000E+000   0.00000000E+000   2.34224000E+001 |
| Pos. Mtrx. R31 R32 R33 Z: | 0.00000000E+000   0.00000000E+000   1.00000000E+000   6.00000000E−001 |
| # Layout Rays: | 0 |
| # Analysis Rays: | 10000 |
| Power(Watts): | 1 |
| Wavenumber: | 2 |
| Color #: | 3 |
| X Half Width: | 0.1778 |
| Y Half Width: | 0.1778 |
| Z Half Width: | 0.01 |
| Object 124: | LED EMITTER C8 |
| Object type: | Source Volume Rectangle (NSC_VSRR) |
| Reference object: | −1 |
| Inside of: | 0 |
| XYZ position: | 0   −0.7112   0 |
| Tilt about XYZ: | 0   0   0 |
| Pos. Mtrx. R11 R12 R13 X: | 1.00000000E+000   0.00000000E+000   0.00000000E+000   −1.42240000E+000 |
| Pos. Mtrx. R21 R22 R23 Y: | 0.00000000E+000   1.00000000E+000   0.00000000E+000   2.27112000E+001 |
| Pos. Mtrx. R31 R32 R33 Z: | 0.00000000E+000   0.00000000E+000   1.00000000E+000   6.00000000E−001 |
| # Layout Rays: | 0 |
| # Analysis Rays: | 10000 |
| Power(Watts): | 1 |
| Wavenumber: | 2 |
| Color #: | 3 |
| X Half Width: | 0.1778 |
| Y Half Width: | 0.1778 |
| Z Half Width: | 0.01 |
| Object 125: | LED EMITTER C9 |
| Object type: | Source Volume Rectangle (NSC_VSRR) |
| Reference object: | −1 |
| Inside of: | 0 |
| XYZ position: | 0   −0.7112   0 |
| Tilt about XYZ: | 0   0   0 |
| Pos. Mtrx. R11 R12 R13 X: | 1.00000000E+000   0.00000000E+000   0.00000000E+000   −1.42240000E+000 |
| Pos. Mtrx. R21 R22 R23 Y: | 0.00000000E+000   1.00000000E+000   0.00000000E+000   2.20000000E+001 |
| Pos. Mtrx. R31 R32 R33 Z: | 0.00000000E+000   0.00000000E+000   1.00000000E+000   6.00000000E−001 |
| # Layout Rays: | 0 |
| # Analysis Rays: | 10000 |
| Power(Watts): | 1 |
| Wavenumber: | 2 |
| Color #: | 3 |
| X Half Width: | 0.1778 |
| Y Half Width: | 0.1778 |
| Z Half Width: | 0.01 |
| Object 126: | ROW 2 |
| Object type: | Null Object (NSC_NULL) |
| Reference object: | 0 |
| Inside of: | 0 |
| XYZ position: | 0   0   0 |
| Tilt about XYZ: | 0   0   0 |
| Pos. Mtrx. R11 R12 R13 X: | 1.00000000E+000   0.00000000E+000   0.00000000E+000   0.00000000E+000 |
| Pos. Mtrx. R21 R22 R23 Y: | 0.00000000E+000   1.00000000E+000   0.00000000E+000   0.00000000E+000 |
| Pos. Mtrx. R31 R32 R33 Z: | 0.00000000E+000   0.00000000E+000   1.00000000E+000   0.00000000E+000 |
| Material: | |
| Index at 0.486133 μm = 1.00000000 | |
| Index at 0.587562 μm = 1.00000000 | |
| Index at 0.656273 μm = 1.00000000 | |
| Object 127: | LED EMITTER C5 |
| Object type: | Source Volume Rectangle (NSC_VSRR) |
| Reference object: | −30 |
| Inside of: | 0 |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| XYZ position: | −2.1336 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | 2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |
| Z Half Width: | 0.01 | | | | |
| Object 128: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | 2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |
| Z Half Width: | 0.01 | | | | |
| Object 129: | LED EMITTER C3 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | 2.34224000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |
| Z Half Width: | 0.01 | | | | |
| Object 130: | LED EMITTER C2 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | 2.41336000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |
| Z Half Width: | 0.01 | | | | |
| Object 131: | LED EMITTER C1 | | | | |
| Object type: | Null Object (NSC_NULL) | | | | |
| Reference object: | 36 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32844800E+002 | |
| Material: | | | | | |
| Index at 0.486133 μm = 1.00000000 | | | | | |
| Index at 0.587562 μm = 1.00000000 | | | | | |

TABLE 3-continued

ZEMAX Software Output Describing Surface Data Summary and Detail for Each
Individual Element within the Illumination Optical System illustrated in FIGS. 13-15

| | |
|---|---|
| Index at 0.656273 μm = | 1.00000000 |
| Object 132: | LED EMITTER C6 |
| Object type: | Source Volume Rectangle (NSC_VSRR) |
| Reference object: | −5 |
| Inside of: | 0 |
| XYZ position: | 0     −0.7112     0 |
| Tilt about XYZ: | 0     0     0 |
| Pos. Mtrx. R11 R12 R13 X: | 1.00000000E+000     0.00000000E+000     0.00000000E+000     −2.13360000E+000 |
| Pos. Mtrx. R21 R22 R23 Y: | 0.00000000E+000     1.00000000E+000     0.00000000E+000     2.12888000E+001 |
| Pos. Mtrx. R31 R32 R33 Z: | 0.00000000E+000     0.00000000E+000     1.00000000E+000     6.00000000E−001 |
| # Layout Rays: | 0 |
| # Analysis Rays: | 10000 |
| Power(Watts): | 1 |
| Wavenumber: | 2 |
| Color #: | 4 |
| X Half Width: | 0.1778 |
| Y Half Width: | 0.1778 |
| Z Half Width: | 0.01 |
| Object 133: | LED EMITTER C7 |
| Object type: | Source Volume Rectangle (NSC_VSRR) |
| Reference object: | −1 |
| Inside of: | 0 |
| XYZ position: | 0     −0.7112     0 |
| Tilt about XYZ: | 0     0     0 |
| Pos. Mtrx. R11 R12 R13 X: | 1.00000000E+000     0.00000000E+000     0.00000000E+000     −2.13360000E+000 |
| Pos. Mtrx. R21 R22 R23 Y: | 0.00000000E+000     1.00000000E+000     0.00000000E+000     2.05776000E+001 |
| Pos. Mtrx. R31 R32 R33 Z: | 0.00000000E+000     0.00000000E+000     1.00000000E+000     6.00000000E−001 |
| # Layout Rays: | 0 |
| # Analysis Rays: | 10000 |
| Power(Watts): | 1 |
| Wavenumber: | 2 |
| Color #: | 4 |
| X Half Width: | 0.1778 |
| Y Half Width: | 0.1778 |
| Z Half Width: | 0.01 |
| Object 134: | LED EMITTER C8 |
| Object type: | Source Volume Rectangle (NSC_VSRR) |
| Reference object: | −1 |
| Inside of: | 0 |
| XYZ position: | 0     −0.7112     0 |
| Tilt about XYZ: | 0     0     0 |
| Pos. Mtrx. R11 R12 R13 X: | 1.00000000E+000     0.00000000E+000     0.00000000E+000     −2.13360000E+000 |
| Pos. Mtrx. R21 R22 R23 Y: | 0.00000000E+000     1.00000000E+000     0.00000000E+000     1.98664000E+001 |
| Pos. Mtrx. R31 R32 R33 Z: | 0.00000000E+000     0.00000000E+000     1.00000000E+000     6.00000000E−001 |
| # Layout Rays: | 0 |
| # Analysis Rays: | 10000 |
| Power(Watts): | 1 |
| Wavenumber: | 2 |
| Color #: | 4 |
| X Half Width: | 0.1778 |
| Y Half Width: | 0.1778 |
| Z Half Width: | 0.01 |
| Object 135: | LED EMITTER C9 |
| Object type: | Null Object (NSC_NULL) |
| Reference object: | 40 |
| Inside of: | 0 |
| XYZ position: | 0     −0.7112     0 |
| Tilt about XYZ: | 0     0     0 |
| Pos. Mtrx. R11 R12 R13 X: | 1.00000000E+000     0.00000000E+000     0.00000000E+000     −2.13360000E+000 |
| Pos. Mtrx. R21 R22 R23 Y: | 0.00000000E+000     −3.82858892E−016     −1.00000000E+000     1.47400000E+002 |
| Pos. Mtrx. R31 R32 R33 Z: | 0.00000000E+000     1.00000000E+000     −3.82858892E−016     1.27155200E+002 |
| Material: | |
| Index at 0.486133 μm = | 1.00000000 |
| Index at 0.587562 μm = | 1.00000000 |
| Index at 0.656273 μm = | 1.00000000 |
| Object 136: | ROW 1 |
| Object type: | Null Object (NSC_NULL) |
| Reference object: | 0 |
| Inside of: | 0 |
| XYZ position: | 0     0     0 |
| Tilt about XYZ: | 0     0     0 |
| Pos. Mtrx. R11 R12 R13 X: | 1.00000000E+000     0.00000000E+000     0.00000000E+000     0.00000000E+000 |
| Pos. Mtrx. R21 R22 R23 Y: | 0.00000000E+000     1.00000000E+000     0.00000000E+000     0.00000000E+000 |
| Pos. Mtrx. R31 R32 R33 Z: | 0.00000000E+000     0.00000000E+000     1.00000000E+000     0.00000000E+000 |
| Material: | |
| Index at 0.486133 μm = | 1.00000000 |

TABLE 3-continued

ZEMAX Software Output Describing Surface Data Summary and Detail for Each
Individual Element within the Illumination Optical System illustrated in FIGS. 13-15

| | |
|---|---|
| Index at 0.587562 μm = | 1.00000000 |
| Index at 0.656273 μm = | 1.00000000 |
| Object 137: | LED EMITTER C5 |
| Object type: | Source Volume Rectangle (NSC_VSRR) |
| Reference object: | −40 |
| Inside of: | 0 |
| XYZ position: | −2.8448   0   0 |
| Tilt about XYZ: | 0   0   0 |
| Pos. Mtrx. R11 R12 R13 X: | 1.00000000E+000   0.00000000E+000   0.00000000E+000   −2.84480000E+000 |
| Pos. Mtrx. R21 R22 R23 Y: | 0.00000000E+000   1.00000000E+000   0.00000000E+000   2.20000000E+001 |
| Pos. Mtrx. R31 R32 R33 Z: | 0.00000000E+000   0.00000000E+000   1.00000000E+000   6.00000000E−001 |
| # Layout Rays: | 0 |
| # Analysis Rays: | 10000 |
| Power(Watts): | 1 |
| Wavenumber: | 2 |
| Color #: | 5 |
| X Half Width: | 0.1778 |
| Y Half Width: | 0.1778 |
| Z Half Width: | 0.01 |
| Object 138: | LED EMITTER C4 |
| Object type: | Source Volume Rectangle (NSC_VSRR) |
| Reference object: | −1 |
| Inside of: | 0 |
| XYZ position: | 0   0.7112   0 |
| Tilt about XYZ: | 0   0   0 |
| Pos. Mtrx. R11 R12 R13 X: | 1.00000000E+000   0.00000000E+000   0.00000000E+000   −2.84480000E+000 |
| Pos. Mtrx. R21 R22 R23 Y: | 0.00000000E+000   1.00000000E+000   0.00000000E+000   2.27112000E+001 |
| Pos. Mtrx. R31 R32 R33 Z: | 0.00000000E+000   0.00000000E+000   1.00000000E+000   6.00000000E−001 |
| # Layout Rays: | 1 |
| # Analysis Rays: | 10000 |
| Power(Watts): | 1 |
| Wavenumber: | 2 |
| Color #: | 5 |
| X Half Width: | 0.1778 |
| Y Half Width: | 0.1778 |
| Z Half Width: | 0.01 |
| Object 139: | LED EMITTER C3 |
| Object type: | Source Volume Rectangle (NSC_VSRR) |
| Reference object: | −1 |
| Inside of: | 0 |
| XYZ position: | 0   0.7112   0 |
| Tilt about XYZ: | 0   0   0 |
| Pos. Mtrx. R11 R12 R13 X: | 1.00000000E+000   0.00000000E+000   0.00000000E+000   −2.84480000E+000 |
| Pos. Mtrx. R21 R22 R23 Y: | 0.00000000E+000   1.00000000E+000   0.00000000E+000   2.34224000E+001 |
| Pos. Mtrx. R31 R32 R33 Z: | 0.00000000E+000   0.00000000E+000   1.00000000E+000   6.00000000E−001 |
| # Layout Rays: | 0 |
| # Analysis Rays: | 10000 |
| Power(Watts): | 1 |
| Wavenumber: | 2 |
| Color #: | 5 |
| X Half Width: | 0.1778 |
| Y Half Width: | 0.1778 |
| Z Half Width: | 0.01 |
| Object 140: | LED EMITTER C2 |
| Object type: | Null Object (NSC_NULL) |
| Reference object: | 45 |
| Inside of: | 0 |
| XYZ position: | 0   0.7112   0 |
| Tilt about XYZ: | 0   0   0 |
| Pos. Mtrx. R11 R12 R13 X: | 1.00000000E+000   0.00000000E+000   0.00000000E+000   −2.84480000E+000 |
| Pos. Mtrx. R21 R22 R23 Y: | 0.00000000E+000   −3.82858892E−016   −1.00000000E+000   1.47400000E+002 |
| Pos. Mtrx. R31 R32 R33 Z: | 0.00000000E+000   1.00000000E+000   −3.82858892E−016   1.32133600E+002 |
| Material: | |
| Index at 0.486133 μm = | 1.00000000 |
| Index at 0.587562 μm = | 1.00000000 |
| Index at 0.656273 μm = | 1.00000000 |
| Object 141: | LED EMITTER C1 |
| Object type: | Null Object (NSC_NULL) |
| Reference object: | 46 |
| Inside of: | 0 |
| XYZ position: | 0   0.7112   0 |
| Tilt about XYZ: | 0   0   0 |
| Pos. Mtrx. R11 R12 R13 X: | 1.00000000E+000   0.00000000E+000   0.00000000E+000   −2.84480000E+000 |
| Pos. Mtrx. R21 R22 R23 Y: | 0.00000000E+000   −3.82858892E−016   −1.00000000E+000   1.47400000E+002 |
| Pos. Mtrx. R31 R32 R33 Z: | 0.00000000E+000   1.00000000E+000   −3.82858892E−016   1.32844800E+002 |
| Material: | |

TABLE 3-continued

ZEMAX Software Output Describing Surface Data Summary and Detail for Each
Individual Element within the Illumination Optical System illustrated in FIGS. 13-15

| | |
|---|---|
| Index at 0.486133 μm = 1.00000000 | |
| Index at 0.587562 μm = 1.00000000 | |
| Index at 0.656273 μm = 1.00000000 | |
| Object 142: | LED EMITTER C6 |
| Object type: | Source Volume Rectangle (NSC_VSRR) |
| Reference object: | −5 |
| Inside of: | 0 |

XYZ position: 0  −0.7112  0
Tilt about XYZ: 0  0  0
Pos. Mtrx. R11 R12 R13 X: 1.00000000E+000  0.00000000E+000  0.00000000E+000  −2.84480000E+000
Pos. Mtrx. R21 R22 R23 Y: 0.00000000E+000  1.00000000E+000  0.00000000E+000  2.12888000E+001
Pos. Mtrx. R31 R32 R33 Z: 0.00000000E+000  0.00000000E+000  1.00000000E+000  6.00000000E−001
Layout Rays: 0
Analysis Rays: 10000
Power(Watts): 1
Wavenumber: 2
Color #: 5
X Half Width: 0.1778
Y Half Width: 0.1778
Z Half Width: 0.01
Object 143: LED EMITTER C7
Object type: Source Volume Rectangle (NSC_VSRR)
Reference object: −1
Inside of: 0
XYZ position: 0  −0.7112  0
Tilt about XYZ: 0  0  0
Pos. Mtrx. R11 R12 R13 X: 1.00000000E+000  0.00000000E+000  0.00000000E+000  −2.84480000E+000
Pos. Mtrx. R21 R22 R23 Y: 0.00000000E+000  1.00000000E+000  0.00000000E+000  2.05776000E+001
Pos. Mtrx. R31 R32 R33 Z: 0.00000000E+000  0.00000000E+000  1.00000000E+000  6.00000000E−001
Layout Rays: 0
Analysis Rays: 10000
Power(Watts): 1
Wavenumber: 2
Color #: 5
X Half Width: 0.1778
Y Half Width: 0.1778
Z Half Width: 0.01
Object 144: LED EMITTER C8
Object type: Null Object (NSC_NULL)
Reference object: 49
Inside of: 0
XYZ position: 0  −0.7112  0
Tilt about XYZ: 0  0  0
Pos. Mtrx. R11 R12 R13 X: 1.00000000E+000  0.00000000E+000  0.00000000E+000  −2.84480000E+000
Pos. Mtrx. R21 R22 R23 Y: 0.00000000E+000  −3.82858892E−016  −1.00000000E+000  1.47400000E+002
Pos. Mtrx. R31 R32 R33 Z: 0.00000000E+000  1.00000000E+000  −3.82858892E−016  1.27866400E+002
Material:
Index at 0.486133 μm = 1.00000000
Index at 0.587562 μm = 1.00000000
Index at 0.656273 μm = 1.00000000
Object 145: LED EMITTER C9
Object type: Null Object (NSC_NULL)
Reference object: 50
Inside of: 0
XYZ position: 0  −0.7112  0
Tilt about XYZ: 0  0  0
Pos. Mtrx. R11 R12 R13 X: 1.00000000E+000  0.00000000E+000  0.00000000E+000  −2.84480000E+000
Pos. Mtrx. R21 R22 R23 Y: 0.00000000E+000  −3.82858892E−016  −1.00000000E+000  1.47400000E+002
Pos. Mtrx. R31 R32 R33 Z: 0.00000000E+000  1.00000000E+000  −3.82858892E−016  1.27155200E+002
Material:
Index at 0.486133 μm = 1.00000000
Index at 0.587562 μm = 1.00000000
Index at 0.656273 μm = 1.00000000
Object 146: ROW 6
Object type: Null Object (NSC_NULL)
Reference object: 0
Inside of: 0
XYZ position: 0  0  0
Tilt about XYZ: 0  0  0
Pos. Mtrx. R11 R12 R13 X: 1.00000000E+000  0.00000000E+000  0.00000000E+000  0.00000000E+000
Pos. Mtrx. R21 R22 R23 Y: 0.00000000E+000  1.00000000E+000  0.00000000E+000  0.00000000E+000
Pos. Mtrx. R31 R32 R33 Z: 0.00000000E+000  0.00000000E+000  1.00000000E+000  0.00000000E+000
Material:
Index at 0.486133 μm = 1.00000000
Index at 0.587562 μm = 1.00000000
Index at 0.656273 μm = 1.00000000

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Object 147: | LED EMITTER C5 | | | | |
| Object type: | Source Volume Rectangle (NSC_VSRR) | | | | |
| Reference object: | −50 | | | | |
| Inside of: | 0 | | | | |
| XYZ position: | 0.7112 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | 2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 148: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | 2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 149: | LED EMITTER C3 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | 2.34224000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 150: | LED EMITTER C2 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | 2.41336000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 151: | LED EMITTER C1 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | 2.48448000E+001 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 6 | | | |
| X Half Width: | 0.1778 | | | |
| Y Half Width: | 0.1778 | | | |
| Z Half Width: | 0.01 | | | |
| Object 152: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 6 | | | |
| X Half Width: | 0.1778 | | | |
| Y Half Width: | 0.1778 | | | |
| Z Half Width: | 0.01 | | | |
| Object 153: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 6 | | | |
| X Half Width: | 0.1778 | | | |
| Y Half Width: | 0.1778 | | | |
| Z Half Width: | 0.01 | | | |
| Object 154: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 1.98664000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 6 | | | |
| X Half Width: | 0.1778 | | | |
| Y Half Width: | 0.1778 | | | |
| Z Half Width: | 0.01 | | | |
| Object 155: | LED EMITTER C9 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | 1.91552000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 6 | | | |
| X Half Width: | 0.1778 | | | |
| Y Half Width: | 0.1778 | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Z Half Width: | 0.01 | | | | |
| Object 156: | ROW 7 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 157: | LED EMITTER C5 | | | | |
| Object type: | Source Volume Rectangle (NSC_VSRR) | | | | |
| Reference object: | −60 | | | | |
| Inside of: | 0 | | | | |
| XYZ position: | 1.4224 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | 2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 7 | | | | |
| X Half Width: | 0.1778 | | | | |
| Y Half Width: | 0.1778 | | | | |
| Z Half Width: | 0.01 | | | | |
| Object 158: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | 2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 7 | | | | |
| X Half Width: | 0.1778 | | | | |
| Y Half Width: | 0.1778 | | | | |
| Z Half Width: | 0.01 | | | | |
| Object 159: | LED EMITTER C3 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | 2.34224000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 7 | | | | |
| X Half Width: | 0.1778 | | | | |
| Y Half Width: | 0.1778 | | | | |
| Z Half Width: | 0.01 | | | | |
| Object 160: | LED EMITTER C2 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | 2.41336000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |

TABLE 3-continued

ZEMAX Software Output Describing Surface Data Summary and Detail for Each Individual Element within the Illumination Optical System illustrated in FIGS. 13-15

| | |
|---|---|
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 161: | LED EMITTER C1 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    1.00000000E+000    0.00000000E+000    2.48448000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 162: | LED EMITTER C6 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    1.00000000E+000    0.00000000E+000    2.41336000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 163: | LED EMITTER C7 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    1.00000000E+000    0.00000000E+000    2.34224000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 164: | LED EMITTER C8 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    1.00000000E+000    0.00000000E+000    2.27112000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 165: | LED EMITTER C9 |
| Object type: | Source Volume Rectangle (NSC_VSRR) |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 7 | | | |
| X Half Width: | 0.1778 | | | |
| Y Half Width: | 0.1778 | | | |
| Z Half Width: | 0.01 | | | |
| Object 166: | ROW 8 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 167: | LED EMITTER C5 | | | |
| Object type: | Source Volume Rectangle (NSC_VSRR) | | | |
| Reference object: | −70 | | | |
| Inside of: | 0 | | | |
| XYZ position: | 2.1336 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 168: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 169: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.34224000E+001 |
| Pos. Mtrx. R31 R32 R33 Z: | 0.00000000E+000 | 0.00000000E+000 | 1.00000000E+000 | 6.00000000E−001 |
| # Layout Rays: | 1 | | | |
| # Analysis Rays: | 10000 | | | |
| Power(Watts): | 1 | | | |
| Wavenumber: | 2 | | | |
| Color #: | 8 | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| X Half Width: | 0.1778 | | | |
| Y Half Width: | 0.1778 | | | |
| Z Half Width: | 0.01 | | | |
| Object 170: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.41336000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 171: | LED EMITTER C1 | | | |
| Object type: | Null Object (NSC_NULL) | | | |
| Reference object: | 76 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 172: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 173: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 174: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | 1.98664000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 175: | LED EMITTER C9 | | | |
| Object type: | Null Object (NSC_NULL) | | | |
| Reference object: | 80 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| Material: | | | | |
| Index at 0.486133 µm = 1.00000000 | | | | |
| Index at 0.587562 µm = 1.00000000 | | | | |
| Index at 0.656273 µm = 1.00000000 | | | | |
| Object 176: | ROW 9 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 µm = 1.00000000 | | | | |
| Index at 0.587562 µm = 1.00000000 | | | | |
| Index at 0.656273 µm = 1.00000000 | | | | |
| Object 177: | LED EMITTER C5 | | | |
| Object type: | Source Volume Rectangle (NSC_VSRR) | | | |
| Reference object: | −80 | | | |
| Inside of: | 0 | | | |
| XYZ position: | 2.8448 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 9 | | | |
| X Half Width: | 0.1778 | | | |
| Y Half Width: | 0.1778 | | | |
| Z Half Width: | 0.01 | | | |
| Object 178: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | 2.27112000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 9 | | | |
| X Half Width: | 0.1778 | | | |
| Y Half Width: | 0.1778 | | | |
| Z Half Width: | 0.01 | | | |
| Object 179: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | 2.34224000E+001 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 9 | | | |
| X Half Width: | 0.1778 | | | |
| Y Half Width: | 0.1778 | | | |
| Z Half Width: | 0.01 | | | |
| Object 180: | LED EMITTER C2 | | | |
| Object type: | Null Object (NSC_NULL) | | | |
| Reference object: | 85 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 181: | LED EMITTER C1 | | | |
| Object type: | Null Object (NSC_NULL) | | | |
| Reference object: | 86 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 182: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | 2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 9 | | | |
| X Half Width: | 0.1778 | | | |
| Y Half Width: | 0.1778 | | | |
| Z Half Width: | 0.01 | | | |
| Object 183: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | 2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 9 | | | |
| X Half Width: | 0.1778 | | | |
| Y Half Width: | 0.1778 | | | |
| Z Half Width: | 0.01 | | | |
| Object 184: | LED EMITTER C8 | | | |
| Object type: | Null Object (NSC_NULL) | | | |
| Reference object: | 89 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |

Material:
Index at 0.486133 μm = 1.00000000
Index at 0.587562 μm = 1.00000000
Index at 0.656273 μm = 1.00000000
Object 185: LED EMITTER C9
Object type: Null Object (NSC_NULL)
Reference object: 90
Inside of: 0
XYZ position: 0    −0.7112    0
Tilt about XYZ: 0    0    0

| | | | | |
|---|---|---|---|---|
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 186:
Object type: CPC (NSC_CPCO)
CSG 0: Side Faces
Coating: (none)
Scattering: None
CSG 1: Front Face
Coating: (none)
Scattering: None
CSG 2: Back Face
Coating: (none)
Scattering: None
Reference object: −91
Inside of: 0
XYZ position: 0    0    0.5
Tilt about XYZ: 0    0    0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 5.00000000E−001 |

Material: MIRROR
Radial Aperture: 3.6
Angle (deg): 12
Length: 98.4
Angle Facets: 50
Length Facets: 48
Is Volume?: 0
Object 187: Condenser
Object type: Standard Lens (NSC_SLEN)
CSG 0: Side Faces
Coating: (none)
Scattering: None
CSG 1: Front Face
Coating: (none)
Scattering: None
CSG 2: Back Face
Coating: (none)
Scattering: None
Reference object: −92
Inside of: 0
XYZ position: 0    0    100
Tilt about XYZ: 0    0    0

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 2.20000000E+001 |
| Pos. Mtrx. R31 R32 R33 Z: | 0.00000000E+000 | 0.00000000E+000 | 1.00000000E+000 | 1.00000000E+002 |

Material: BK7
Index at 0.486133 μm = 1.52237629
Index at 0.587562 μm = 1.51680003
Index at 0.656273 μm = 1.51432235
Radius 1: 75
Conic 1: 0
Clear 1: 19
Edge 1: 19
Thickness: 5
Radius 2: −175
Conic 2: 0
Clear 2: 19
Edge 2: 19
Object 188:

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 189: | SUBSTRATE | | | |
| Object type: | Rectangular Volume (NSC_RBLK) | | | |
| CSG 0: | Side Faces | | | |
| Coating: | (none) | | | |
| Scattering: | Lambertian | | | |
| Scatter Fraction: | 0.4 | | | |
| Number of Scatter Rays: | 0 | | | |
| CSG 1: | Front Face | | | |
| Coating: | (none) | | | |
| Scattering: | None | | | |
| CSG 2: | Back Face | | | |
| Coating: | (none) | | | |
| Scattering: | None | | | |
| Reference object: | 0 | | | |
| Inside of: | 0 | | | |
| XYZ position: | 0 | −22 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 0.00000000E+000 |
| Material: | MIRROR | | | |
| X1 Half Width: | 4 | | | |
| Y1 Half Width: | 4 | | | |
| Z Length: | 0.5 | | | |
| X2 Half Width: | 4 | | | |
| Y2 Half Width: | 4 | | | |
| Front X Angle: | 0 | | | |
| Front Y Angle: | 0 | | | |
| Rear X Angle: | 0 | | | |
| Rear Y Angle: | 0 | | | |
| Object 190: | ROW 5 | | | |
| Object type: | Null Object (NSC_NULL) | | | |
| Reference object: | 0 | | | |
| Inside of: | 0 | | | |
| XYZ position: | −0.3556 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −3.55600000E−001 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 191: | LED EMITTER C5 | | | |
| Object type: | Source Volume Rectangle (NSC_VSRR) | | | |
| Reference object: | −2 | | | |
| Inside of: | 0 | | | |
| XYZ position: | 0 | 0 | 0.6 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 1 | | | |
| X Half Width: | 0.1778 | | | |
| Y Half Width: | 0.1778 | | | |
| Z Half Width: | 0.01 | | | |
| Object 192: | LED EMITTER C4 | | | |
| Object type: | Source Volume Rectangle (NSC_VSRR) | | | |
| Reference object: | −1 | | | |
| Inside of: | 0 | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| XYZ position: | | 0 | 0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 193: | LED EMITTER C3 | | | | |
| Object type: | Source Volume Rectangle (NSC_VSRR) | | | | |
| Reference object: | −1 | | | | |
| Inside of: | 0 | | | | |
| XYZ position: | | 0 | 0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 194: | LED EMITTER C2 | | | | |
| Object type: | Source Volume Rectangle (NSC_VSRR) | | | | |
| Reference object: | −1 | | | | |
| Inside of: | 0 | | | | |
| XYZ position: | | 0 | 0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |
| # Layout Rays: | 1 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 195: | LED EMITTER C1 | | | | |
| Object type: | Source Volume Rectangle (NSC_VSRR) | | | | |
| Reference object: | −1 | | | | |
| Inside of: | 0 | | | | |
| XYZ position: | | 0 | 0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −1.91552000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 196: | LED EMITTER C6 | | | | |
| Object type: | Source Volume Rectangle (NSC_VSRR) | | | | |
| Reference object: | −1 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | | |
| # Analysis Rays: | 10000 | | | | |
| Power(Watts): | 1 | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 197: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | −2.05776000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 198: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | −2.12888000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 199: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | −2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 1 | | | | |
| X Half Width: | 0.1778 | | | | |
| Y Half Width: | 0.1778 | | | | |
| Z Half Width: | 0.01 | | | | |
| Object 200: | ROW 4 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 201: | LED EMITTER C5 | | | | |
| Object type: | Source Volume Rectangle (NSC_VSRR) | | | | |
| Reference object: | −10 | | | | |
| Inside of: | 0 | | | | |
| XYZ position: | −0.7112 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −7.11200000E−001 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 202: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 203: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 204: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |
| Y Half Width: | 0.1778 | | | |
| Z Half Width: | 0.01 | | | |
| Object 205: | LED EMITTER C1 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | 1.00000000E+000 | 0.00000000E+000 | −1.91552000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 2 | | | |
| X Half Width: | 0.1778 | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Y Half Width: | 0.1778 | | | | |
| Z Half Width: | 0.01 | | | | |
| Object 206: | LED EMITTER C6 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −7.11200000E−001 | |
| Pos. Mtrx. R21 R22 R23 Y: | 0.00000000E+000 | 1.00000000E+000 | 0.00000000E+000 | −1.98664000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 2 | | | | |
| X Half Width: | 0.1778 | | | | |
| Y Half Width: | 0.1778 | | | | |
| Z Half Width: | 0.01 | | | | |
| Object 207: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −7.11200000E−001 | |
| Pos. Mtrx. R21 R22 R23 Y: | 0.00000000E+000 | 1.00000000E+000 | 0.00000000E+000 | −2.05776000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 2 | | | | |
| X Half Width: | 0.1778 | | | | |
| Y Half Width: | 0.1778 | | | | |
| Z Half Width: | 0.01 | | | | |
| Object 208: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −7.11200000E−001 | |
| Pos. Mtrx. R21 R22 R23 Y: | 0.00000000E+000 | 1.00000000E+000 | 0.00000000E+000 | −2.12888000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 2 | | | | |
| X Half Width: | 0.1778 | | | | |
| Y Half Width: | 0.1778 | | | | |
| Z Half Width: | 0.01 | | | | |
| Object 209: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −7.11200000E−001 | |
| Pos. Mtrx. R21 R22 R23 Y: | 0.00000000E+000 | 1.00000000E+000 | 0.00000000E+000 | −2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 2 | | | | |
| X Half Width: | 0.1778 | | | | |
| Y Half Width: | 0.1778 | | | | |
| Z Half Width: | 0.01 | | | | |
| Object 210: | ROW 3 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 211: | LED EMITTER C5 | | | |
| Object type: | Source Volume Rectangle (NSC_VSRR) | | | |
| Reference object: | −20 | | | |
| Inside of: | 0 | | | |
| XYZ position: | −1.4224 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 212: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 213: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 214: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 215: | LED EMITTER C1 | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −1.91552000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 216: | LED EMITTER C6 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 217: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 218: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 219: | LED EMITTER C9 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| # Layout Rays: | 0 | | | |
| # Analysis Rays: | 10000 | | | |
| Power(Watts): | 1 | | | |
| Wavenumber: | 2 | | | |
| Color #: | 3 | | | |
| X Half Width: | 0.1778 | | | |
| Y Half Width: | 0.1778 | | | |
| Z Half Width: | 0.01 | | | |
| Object 220: | ROW 2 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 µm = 1.00000000 | | | | |
| Index at 0.587562 µm = 1.00000000 | | | | |
| Index at 0.656273 µm = 1.00000000 | | | | |
| Object 221: | LED EMITTER C5 | | | |
| Object type: | Source Volume Rectangle (NSC_VSRR) | | | |
| Reference object: | −30 | | | |
| Inside of: | 0 | | | |
| XYZ position: | −2.1336 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 4 | | | |
| X Half Width: | 0.1778 | | | |
| Y Half Width: | 0.1778 | | | |
| Z Half Width: | 0.01 | | | |
| Object 222: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 4 | | | |
| X Half Width: | 0.1778 | | | |
| Y Half Width: | 0.1778 | | | |
| Z Half Width: | 0.01 | | | |
| Object 223: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 4 | | | |
| X Half Width: | 0.1778 | | | |
| Y Half Width: | 0.1778 | | | |
| Z Half Width: | 0.01 | | | |
| Object 224: | LED EMITTER C2 | | | |
| Object type: | Source Volume Rectangle (NSC_VSRR) | | | |
| Reference object: | −1 | | | |
| Inside of: | 0 | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| XYZ position: | | 0 | 0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | −1.98664000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |
| Z Half Width: | 0.01 | | | | |
| Object 225: | LED EMITTER C1 | | | | |
| Object type: | Null Object (NSC_NULL) | | | | |
| Reference object: | 36 | | | | |
| Inside of: | 0 | | | | |
| XYZ position: | | 0 | 0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32844800E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 226: | LED EMITTER C6 | | | | |
| Object type: | Source Volume Rectangle (NSC_VSRR) | | | | |
| Reference object: | −5 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | −2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |
| Z Half Width: | 0.01 | | | | |
| Object 227: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | −2.34224000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |
| Z Half Width: | 0.01 | | | | |
| Object 228: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | 1.00000000E+000 | 0.00000000E+000 | −2.41336000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 4 | | | | |
| X Half Width: | 0.1778 | | | | |
| Y Half Width: | 0.1778 | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Z Half Width: | 0.01 | | | | |
| Object 229: | LED EMITTER C9 | | | | |
| Object type: | Null Object (NSC__NULL) | | | | |
| Reference object: | 40 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.13360000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.27155200E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 230: | ROW 1 | | | | |
| Object type: | Null Object (NSC__NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 231: | LED EMITTER C5 | | | | |
| Object type: | Source Volume Rectangle (NSC__VSRR) | | | | |
| Reference object: | −40 | | | | |
| Inside of: | 0 | | | | |
| XYZ position: | −2.8448 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | 1.00000000E+000 | 0.00000000E+000 | −2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 5 | | | | |
| X Half Width: | 0.1778 | | | | |
| Y Half Width: | 0.1778 | | | | |
| Z Half Width: | 0.01 | | | | |
| Object 232: | LED EMITTER C4 | | | | |
| Object type: | Source Volume Rectangle (NSC__VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | 1.00000000E+000 | 0.00000000E+000 | −2.12888000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 5 | | | | |
| X Half Width: | 0.1778 | | | | |
| Y Half Width: | 0.1778 | | | | |
| Z Half Width: | 0.01 | | | | |
| Object 233: | LED EMITTER C3 | | | | |
| Object type: | Source Volume Rectangle (NSC__VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | 1.00000000E+000 | 0.00000000E+000 | −2.05776000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 5 | | | | |
| X Half Width: | 0.1778 | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Y Half Width: | 0.1778 | | | | |
| Z Half Width: | 0.01 | | | | |
| Object 234: | LED EMITTER C2 | | | | |
| Object type: | Null Object (NSC_NULL) | | | | |
| Reference object: | 45 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32133600E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 235: | LED EMITTER C1 | | | | |
| Object type: | Null Object (NSC_NULL) | | | | |
| Reference object: | 46 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32844800E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 236: | LED EMITTER C6 | | | | |
| Object type: | Source Volume Rectangle (NSC_VSRR) | | | | |
| Reference object: | −5 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | 1.00000000E+000 | 0.00000000E+000 | −2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 5 | | | | |
| X Half Width: | 0.1778 | | | | |
| Y Half Width: | 0.1778 | | | | |
| Z Half Width: | 0.01 | | | | |
| Object 237: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | 1.00000000E+000 | 0.00000000E+000 | −2.34224000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 5 | | | | |
| X Half Width: | 0.1778 | | | | |
| Y Half Width: | 0.1778 | | | | |
| Z Half Width: | 0.01 | | | | |
| Object 238: | LED EMITTER C8 | | | | |
| Object type: | Null Object (NSC_NULL) | | | | |
| Reference object: | 49 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.27866400E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 239: | LED EMITTER C9 | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Object type: | Null Object (NSC_NULL) | | | | |
| Reference object: | 50 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.27155200E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 240: | ROW 6 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 241: | LED EMITTER C5 | | | | |
| Object type: | Source Volume Rectangle (NSC_VSRR) | | | | |
| Reference object: | −50 | | | | |
| Inside of: | 0 | | | | |
| XYZ position: | 0.7112 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −2.20000000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 242: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −2.12888000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 243: | LED EMITTER C3 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −2.05776000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Object 244: | LED EMITTER C2 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −1.98664000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 245: | LED EMITTER C1 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −1.91552000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 246: | LED EMITTER C6 | | | | |
| Object type: | Source Volume Rectangle (NSC_VSRR) | | | | |
| Reference object: | −5 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 247: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −2.34224000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 6 | | | | |
| X Half Width: | 0.1778 | | | | |
| Y Half Width: | 0.1778 | | | | |
| Z Half Width: | 0.01 | | | | |
| Object 248: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | 1.00000000E+000 | 0.00000000E+000 | −2.41336000E+001 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 6 | | | |
| X Half Width: | 0.1778 | | | |
| Y Half Width: | 0.1778 | | | |
| Z Half Width: | 0.01 | | | |
| Object 249: | LED EMITTER C9 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | 1.00000000E+000 | 0.00000000E+000 | −2.48448000E+001 |
| Pos. Mtrx. R31 R32 R33 Z: | 0.00000000E+000 | 0.00000000E+000 | 1.00000000E+000 | 6.00000000E−001 |
| # Layout Rays: | 1 | | | |
| # Analysis Rays: | 10000 | | | |
| Power(Watts): | 1 | | | |
| Wavenumber: | 2 | | | |
| Color #: | 6 | | | |
| X Half Width: | 0.1778 | | | |
| Y Half Width: | 0.1778 | | | |
| Z Half Width: | 0.01 | | | |
| Object 250: | ROW 7 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 251: | LED EMITTER C5 | | | |
| Object type: | Source Volume Rectangle (NSC_VSRR) | | | |
| Reference object: | −60 | | | |
| Inside of: | 0 | | | |
| XYZ position: | 1.4224 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 7 | | | |
| X Half Width: | 0.1778 | | | |
| Y Half Width: | 0.1778 | | | |
| Z Half Width: | 0.01 | | | |
| Object 252: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.42240000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 7 | | | |
| X Half Width: | 0.1778 | | | |
| Y Half Width: | 0.1778 | | | |
| Z Half Width: | 0.01 | | | |
| Object 253: | LED EMITTER C3 | | | |
| Object type: | Source Volume Rectangle (NSC_VSRR) | | | |
| Reference object: | −1 | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | −2.05776000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 7 | | | | |
| X Half Width: | 0.1778 | | | | |
| Y Half Width: | 0.1778 | | | | |
| Z Half Width: | 0.01 | | | | |
| Object 254: | LED EMITTER C2 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | −1.98664000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 7 | | | | |
| X Half Width: | 0.1778 | | | | |
| Y Half Width: | 0.1778 | | | | |
| Z Half Width: | 0.01 | | | | |
| Object 255: | LED EMITTER C1 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | −1.91552000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 7 | | | | |
| X Half Width: | 0.1778 | | | | |
| Y Half Width: | 0.1778 | | | | |
| Z Half Width: | 0.01 | | | | |
| Object 256: | LED EMITTER C6 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | −1.98664000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 7 | | | | |
| X Half Width: | 0.1778 | | | | |
| Y Half Width: | 0.1778 | | | | |
| Z Half Width: | 0.01 | | | | |
| Object 257: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | 1.00000000E+000 | 0.00000000E+000 | −2.05776000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |

TABLE 3-continued

ZEMAX Software Output Describing Surface Data Summary and Detail for Each Individual Element within the Illumination Optical System illustrated in FIGS. 13-15

| | |
|---|---|
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 258: | LED EMITTER C8 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    1.00000000E+000    0.00000000E+000    −2.12888000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 259: | LED EMITTER C9 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000    1.00000000E+000    0.00000000E+000    −2.20000000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 7 |
| X Half Width: | 0.1778 |
| Y Half Width: | 0.1778 |
| Z Half Width: | 0.01 |
| Object 260: | ROW 8 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.486133 μm = 1.00000000 | |
| Index at 0.587562 μm = 1.00000000 | |
| Index at 0.656273 μm = 1.00000000 | |
| Object 261: | LED EMITTER C5 |
| Object type: | Source Volume Rectangle (NSC_VSRR) |
| Reference object: | −70 |
| Inside of: | 0 |
| XYZ position: | 2.1336    0    0 |
| Tilt about XYZ: | 0    0    0 |
| Pos. Mtrx. R11 R12 R13 X: | 1.00000000E+000    0.00000000E+000    0.00000000E+000    2.13360000E+000 |
| Pos. Mtrx. R21 R22 R23 Y: | 0.00000000E+000    1.00000000E+000    0.00000000E+000    −2.20000000E+001 |
| Pos. Mtrx. R31 R32 R33 Z: | 0.00000000E+000    0.00000000E+000    1.00000000E+000    6.00000000E−001 |
| # Layout Rays: | 0 |
| # Analysis Rays: | 10000 |
| Power(Watts): | 1 |
| Wavenumber: | 2 |
| Color #: | 8 |
| X Half Width: | 0.1778 |
| Y Half Width: | 0.1778 |
| Z Half Width: | 0.01 |
| Object 262: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.12888000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 263: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.05776000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 264: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −1.98664000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 265: | LED EMITTER C1 | | | |
| Object type: | Null Object (NSC_NULL) | | | |
| Reference object: | 76 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 266: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.27112000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 267: | LED EMITTER C7 | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.34224000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 268: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | 1.00000000E+000 | 0.00000000E+000 | −2.41336000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 8 | | | |
| X Half Width: | 0.1778 | | | |
| Y Half Width: | 0.1778 | | | |
| Z Half Width: | 0.01 | | | |
| Object 269: | LED EMITTER C9 | | | |
| Object type: | Null Object (NSC_NULL) | | | |
| Reference object: | 80 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 270: | ROW 9 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 271: | LED EMITTER C5 | | | |
| Object type: | Source Volume Rectangle (NSC_VSRR) | | | |
| Reference object: | −80 | | | |
| Inside of: | 0 | | | |
| XYZ position: | 2.8448 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | 1.00000000E+000 | 0.00000000E+000 | −2.20000000E+001 |
| Pos. Mtrx. R31 R32 R33 Z: | 0.00000000E+000 | 0.00000000E+000 | 1.00000000E+000 | 6.00000000E−001 |
| # Layout Rays: | 0 | | | |
| # Analysis Rays: | 10000 | | | |
| Power(Watts): | 1 | | | |
| Wavenumber: | 2 | | | |
| Color #: | 9 | | | |
| X Half Width: | 0.1778 | | | |
| Y Half Width: | 0.1778 | | | |
| Z Half Width: | 0.01 | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Object 272: | LED EMITTER C4 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | 1.00000000E+000 | 0.00000000E+000 | −2.12888000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 9 | | | | |
| X Half Width: | 0.1778 | | | | |
| Y Half Width: | 0.1778 | | | | |
| Z Half Width: | 0.01 | | | | |
| Object 273: | LED EMITTER C3 | | | | |
| Object type: | Source Volume Rectangle (NSC_VSRR) | | | | |
| Reference object: | −1 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | 1.00000000E+000 | 0.00000000E+000 | −2.05776000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 9 | | | | |
| X Half Width: | 0.1778 | | | | |
| Y Half Width: | 0.1778 | | | | |
| Z Half Width: | 0.01 | | | | |
| Object 274: | LED EMITTER C2 | | | | |
| Object type: | Null Object (NSC_NULL) | | | | |
| Reference object: | 85 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32133600E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 275: | LED EMITTER C1 | | | | |
| Object type: | Null Object (NSC_NULL) | | | | |
| Reference object: | 86 | | | | |
| Inside of: | 0 | | | | |
| XYZ position: | 0 | 0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.32844800E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 276: | LED EMITTER C6 | | | | |
| Object type: | Source Volume Rectangle (NSC_VSRR) | | | | |
| Reference object: | −5 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | 1.00000000E+000 | 0.00000000E+000 | −2.27112000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 9 | | | | |
| X Half Width: | 0.1778 | | | | |
| Y Half Width: | 0.1778 | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Z Half Width: | 0.01 | | | | |
| Object 277: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | 1.00000000E+000 | 0.00000000E+000 | −2.34224000E+001 | |
| Pos. Mtrx. R31 R32 R33 Z: | 0.00000000E+000 | 0.00000000E+000 | 1.00000000E+000 | 6.00000000E−001 | |
| # Layout Rays: | 0 | | | | |
| # Analysis Rays: | 10000 | | | | |
| Power(Watts): | 1 | | | | |
| Wavenumber: | 2 | | | | |
| Color #: | 9 | | | | |
| X Half Width: | 0.1778 | | | | |
| Y Half Width: | 0.1778 | | | | |
| Z Half Width: | 0.01 | | | | |
| Object 278: | LED EMITTER C8 | | | | |
| Object type: | Null Object (NSC_NULL) | | | | |
| Reference object: | 89 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.27866400E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 279: | LED EMITTER C9 | | | | |
| Object type: | Null Object (NSC_NULL) | | | | |
| Reference object: | 90 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 2.84480000E+000 | |
| Pos. Mtrx. R21 R22 R23 Y: | 0.00000000E+000 | −3.82858892E−016 | −1.00000000E+000 | 1.47400000E+002 | |
| Pos. Mtrx. R31 R32 R33 Z: | 0.00000000E+000 | 1.00000000E+000 | −3.82858892E−016 | 1.27155200E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 280: | | | | | |
| Object type: | CPC (NSC_CPCO) | | | | |
| CSG 0: | Side Faces | | | | |
| Coating: | (none) | | | | |
| Scattering: | None | | | | |
| CSG 1: | Front Face | | | | |
| Coating: | (none) | | | | |
| Scattering: | None | | | | |
| CSG 2: | Back Face | | | | |
| Coating: | (none) | | | | |
| Scattering: | None | | | | |
| Reference object: | −91 | | | | |
| Inside of: | 0 | | | | |
| XYZ position: | 0 | 0 | 0.5 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | −2.20000000E+001 | |
| Pos. Mtrx. R31 R32 R33 Z: | 0.00000000E+000 | 0.00000000E+000 | 1.00000000E+000 | 5.00000000E−001 | |
| Material: | MIRROR | | | | |
| Radial Aperture: | 3.6 | | | | |
| Angle (deg): | 12 | | | | |
| Length: | 98.4 | | | | |
| #Angle Facets: | 50 | | | | |
| #Length Facets: | 48 | | | | |
| Is Volume?: | 0 | | | | |
| Object 281: | Condenser | | | | |
| Object type: | Standard Lens (NSC_SLEN) | | | | |
| CSG 0: | Side Faces | | | | |
| Coating: | (none) | | | | |
| Scattering: | None | | | | |
| CSG 1: | Front Face | | | | |
| Coating: | (none) | | | | |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Scattering: | None | | | | |
| CSG 2: | Back Face | | | | |
| Coating: | (none) | | | | |
| Scattering: | None | | | | |
| Reference object: | −92 | | | | |
| Inside of: | 0 | | | | |
| XYZ position: | 0 | 0 | 100 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | −2.20000000E+001 | |
| Pos. Mtrx. R31 R32 R33 Z: | 0.00000000E+000 | 0.00000000E+000 | 1.00000000E+000 | 1.00000000E+002 | |
| Material: | BK7 | | | | |
| Index at 0.486133 µm = 1.52237629 | | | | | |
| Index at 0.587562 µm = 1.51680003 | | | | | |
| Index at 0.656273 µm = 1.51432235 | | | | | |
| Radius 1: | 75 | | | | |
| Conic 1: | 0 | | | | |
| Clear 1: | 19 | | | | |
| Edge 1: | 19 | | | | |
| Thickness: | 5 | | | | |
| Radius 2: | −175 | | | | |
| Conic 2: | 0 | | | | |
| Clear 2: | 19 | | | | |
| Edge 2: | 19 | | | | |
| Object 282: | | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 µm = 1.00000000 | | | | | |
| Index at 0.587562 µm = 1.00000000 | | | | | |
| Index at 0.656273 µm = 1.00000000 | | | | | |
| Object 283: | SUBSTRATE | | | | |
| Object type: | Rectangular Volume (NSC_RBLK) | | | | |
| CSG 0: | Side Faces | | | | |
| Coating: | (none) | | | | |
| Scattering: | Lambertian | | | | |
| Scatter Fraction: | 0.4 | | | | |
| Number of Scatter Rays: | 0 | | | | |
| CSG 1: | Front Face | | | | |
| Coating: | (none) | | | | |
| Scattering: | None | | | | |
| CSG 2: | Back Face | | | | |
| Coating: | (none) | | | | |
| Scattering: | None | | | | |
| Reference object: | 0 | | | | |
| Inside of: | 0 | | | | |
| XYZ position: | 0 | −148 | 130 | | |
| Tilt about XYZ: | −90 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | 1.00000000E+000 | −1.48000000E+002 | |
| Pos. Mtrx. R31 R32 R33 Z: | 0.00000000E+000 | −1.00000000E+000 | −3.82858892E−016 | 1.30000000E+002 | |
| Material: | MIRROR | | | | |
| X1 Half Width: | 4 | | | | |
| Y1 Half Width: | 4 | | | | |
| Z Length: | 0.5 | | | | |
| X2 Half Width: | 4 | | | | |
| Y2 Half Width: | 4 | | | | |
| Front X Angle: | 0 | | | | |
| Front Y Angle: | 0 | | | | |
| Rear X Angle: | 0 | | | | |
| Rear Y Angle: | 0 | | | | |
| Object 284: | ROW 5 | | | | |
| Object type: | Null Object (NSC_NULL) | | | | |
| Reference object: | 0 | | | | |
| Inside of: | 0 | | | | |
| XYZ position: | −0.3556 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | −3.55600000E−001 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |

TABLE 3-continued

ZEMAX Software Output Describing Surface Data Summary and Detail for Each
Individual Element within the Illumination Optical System illustrated in FIGS. 13-15

Material:
Index at 0.486133 μm = 1.00000000
Index at 0.587562 μm = 1.00000000
Index at 0.656273 μm = 1.00000000
Object 285:                LED EMITTER C5
Object type:               Source Volume Rectangle (NSC_VSRR)
Reference object:          −2
Inside of:                 0
XYZ position:              0          0          0.6
Tilt about XYZ:            0          0          0
Pos. Mtrx. R11 R12 R13 X:  1.00000000E+000     0.00000000E+000     0.00000000E+000     0.00000000E+000
Pos. Mtrx. R21 R22 R23 Y:  0.00000000E+000    −3.82858892E−016     1.00000000E+000    −1.47400000E+002
Pos. Mtrx. R31 R32 R33 Z:  0.00000000E+000    −1.00000000E+000    −3.82858892E−016     1.30000000E+002
Layout Rays:             0
Analysis Rays:           10000
Power(Watts):              1
Wavenumber:                3
Color #:                   1
X Half Width:              0.1778
Y Half Width:              0.1778
Z Half Width:              0.01
Object 286:                LED EMITTER C4
Object type:               Source Volume Rectangle (NSC_VSRR)
Reference object:          −1
Inside of:                 0
XYZ position:              0          0.7112     0
Tilt about XYZ:            0          0          0
Pos. Mtrx. R11 R12 R13 X:  1.00000000E+000     0.00000000E+000     0.00000000E+000     0.00000000E+000
Pos. Mtrx. R21 R22 R23 Y:  0.00000000E+000    −3.82858892E−016     1.00000000E+000    −1.47400000E+002
Pos. Mtrx. R31 R32 R33 Z:  0.00000000E+000    −1.00000000E+000    −3.82858892E−016     1.29288800E+002
Layout Rays:             0
Analysis Rays:           10000
Power(Watts):              1
Wavenumber:                3
Color #:                   1
X Half Width:              0.1778
Y Half Width:              0.1778
Z Half Width:              0.01
Object 287:                LED EMITTER C3
Object type:               Source Volume Rectangle (NSC_VSRR)
Reference object:          −1
Inside of:                 0
XYZ position:              0          0.7112     0
Tilt about XYZ:            0          0          0
Pos. Mtrx. R11 R12 R13 X:  1.00000000E+000     0.00000000E+000     0.00000000E+000     0.00000000E+000
Pos. Mtrx. R21 R22 R23 Y:  0.00000000E+000    −3.82858892E−016     1.00000000E+000    −1.47400000E+002
Pos. Mtrx. R31 R32 R33 Z:  0.00000000E+000    −1.00000000E+000    −3.82858892E−016     1.28577600E+002
Layout Rays:             0
Analysis Rays:           10000
Power(Watts):              1
Wavenumber:                3
Color #:                   1
X Half Width:              0.1778
Y Half Width:              0.1778
Z Half Width:              0.01
Object 288:                LED EMITTER C2
Object type:               Source Volume Rectangle (NSC_VSRR)
Reference object:          −1
Inside of:                 0
XYZ position:              0          0.7112     0
Tilt about XYZ:            0          0          0
Pos. Mtrx. R11 R12 R13 X:  1.00000000E+000     0.00000000E+000     0.00000000E+000     0.00000000E+000
Pos. Mtrx. R21 R22 R23 Y:  0.00000000E+000    −3.82858892E−016     1.00000000E+000    −1.47400000E+002
Pos. Mtrx. R31 R32 R33 Z:  0.00000000E+000    −1.00000000E+000    −3.82858892E−016     1.27866400E+002
Layout Rays:             0
Analysis Rays:           10000
Power(Watts):              1
Wavenumber:                3
Color #:                   1
X Half Width:              0.1778
Y Half Width:              0.1778
Z Half Width:              0.01
Object 289:                LED EMITTER C1
Object type:               Source Volume Rectangle (NSC_VSRR)
Reference object:          −1
Inside of:                 0

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| XYZ position: | | 0 | 0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.27155200E+002 | |
| # Layout Rays: | 1 | | | | |
| # Analysis Rays: | 10000 | | | | |
| Power(Watts): | 1 | | | | |
| Wavenumber: | 3 | | | | |
| Color #: | 1 | | | | |
| X Half Width: | 0.1778 | | | | |
| Y Half Width: | 0.1778 | | | | |
| Z Half Width: | 0.01 | | | | |
| Object 290: | LED EMITTER C6 | | | | |
| Object type: | Source Volume Rectangle (NSC_VSRR) | | | | |
| Reference object: | −1 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.27866400E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 1 | | | | |
| X Half Width: | 0.1778 | | | | |
| Y Half Width: | 0.1778 | | | | |
| Z Half Width: | 0.01 | | | | |
| Object 291: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.28577600E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 1 | | | | |
| X Half Width: | 0.1778 | | | | |
| Y Half Width: | 0.1778 | | | | |
| Z Half Width: | 0.01 | | | | |
| Object 292: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.29288800E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 1 | | | | |
| X Half Width: | 0.1778 | | | | |
| Y Half Width: | 0.1778 | | | | |
| Z Half Width: | 0.01 | | | | |
| Object 293: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | | 0 | −0.7112 | 0 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.30000000E+002 | |
| # Layout Rays: | 0 | | | | |
| # Analysis Rays: | 10000 | | | | |
| Power(Watts): | 1 | | | | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Wavenumber: | 3 | | | |
| Color #: | 1 | | | |
| X Half Width: | 0.1778 | | | |
| Y Half Width: | 0.1778 | | | |
| Z Half Width: | 0.01 | | | |
| Object 294: | ROW 4 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 295: | LED EMITTER C5 | | | |
| Object type: | Source Volume Rectangle (NSC_VSRR) | | | |
| Reference object: | −10 | | | |
| Inside of: | 0 | | | |
| XYZ position: | −0.7112 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |
| Y Half Width: | 0.1778 | | | |
| Z Half Width: | 0.01 | | | |
| Object 296: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |
| Y Half Width: | 0.1778 | | | |
| Z Half Width: | 0.01 | | | |
| Object 297: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |
| Y Half Width: | 0.1778 | | | |
| Z Half Width: | 0.01 | | | |
| Object 298: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |
| Y Half Width: | 0.1778 | | | |
| Z Half Width: | 0.01 | | | |
| Object 299: | LED EMITTER C1 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27155200E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |
| Y Half Width: | 0.1778 | | | |
| Z Half Width: | 0.01 | | | |
| Object 300: | LED EMITTER C6 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |
| Y Half Width: | 0.1778 | | | |
| Z Half Width: | 0.01 | | | |
| Object 301: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |
| Y Half Width: | 0.1778 | | | |
| Z Half Width: | 0.01 | | | |
| Object 302: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |
| # Layout Rays: | 0 | | | |
| # Analysis Rays: | 10000 | | | |
| Power(Watts): | 1 | | | |
| Wavenumber: | 3 | | | |
| Color #: | 2 | | | |
| X Half Width: | 0.1778 | | | |

TABLE 3-continued

ZEMAX Software Output Describing Surface Data Summary and Detail for Each
Individual Element within the Illumination Optical System illustrated in FIGS. 13-15

| | |
|---|---|
| Y Half Width: | 0.1778 |
| Z Half Width: | 0.01 |
| Object 303: | LED EMITTER C9 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −7.11200000E−001 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.30000000E+002 |
| # Layout Rays: | 0 |
| # Analysis Rays: | 10000 |
| Power(Watts): | 1 |
| Wavenumber: | 3 |
| Color #: | 2 |
| X Half Width: | 0.1778 |
| Y Half Width: | 0.1778 |
| Z Half Width: | 0.01 |
| Object 304: | ROW 3 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.486133 μm = 1.00000000 | |
| Index at 0.587562 μm = 1.00000000 | |
| Index at 0.656273 μm = 1.00000000 | |
| Object 305: | LED EMITTER C5 |
| Object type: | Source Volume Rectangle (NSC_VSRR) |
| Reference object: | −20 |
| Inside of: | 0 |
| XYZ position: | −1.4224    0    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.30000000E+002 |
| # Layout Rays: | 0 |
| # Analysis Rays: | 10000 |
| Power(Watts): | 1 |
| Wavenumber: | 3 |
| Color #: | 3 |
| X Half Width: | 0.1778 |
| Y Half Width: | 0.1778 |
| Z Half Width: | 0.01 |
| Object 306: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.29288800E+002 |
| # Layout Rays: | 0 |
| # Analysis Rays: | 10000 |
| Power(Watts): | 1 |
| Wavenumber: | 3 |
| Color #: | 3 |
| X Half Width: | 0.1778 |
| Y Half Width: | 0.1778 |
| Z Half Width: | 0.01 |
| Object 307: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.28577600E+002 |
| # Layout Rays: | 0 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| # Analysis Rays: | 10000 | | | |
| Power(Watts): | 1 | | | |
| Wavenumber: | 3 | | | |
| Color #: | 3 | | | |
| X Half Width: | 0.1778 | | | |
| Y Half Width: | 0.1778 | | | |
| Z Half Width: | 0.01 | | | |
| Object 308: | LED EMITTER C2 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |
| # Layout Rays: | 0 | | | |
| # Analysis Rays: | 10000 | | | |
| Power(Watts): | 1 | | | |
| Wavenumber: | 3 | | | |
| Color #: | 3 | | | |
| X Half Width: | 0.1778 | | | |
| Y Half Width: | 0.1778 | | | |
| Z Half Width: | 0.01 | | | |
| Object 309: | LED EMITTER C1 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27155200E+002 |
| # Layout Rays: | 0 | | | |
| # Analysis Rays: | 10000 | | | |
| Power(Watts): | 1 | | | |
| Wavenumber: | 3 | | | |
| Color #: | 3 | | | |
| X Half Width: | 0.1778 | | | |
| Y Half Width: | 0.1778 | | | |
| Z Half Width: | 0.01 | | | |
| Object 310: | LED EMITTER C6 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.27866400E+002 |
| # Layout Rays: | 0 | | | |
| # Analysis Rays: | 10000 | | | |
| Power(Watts): | 1 | | | |
| Wavenumber: | 3 | | | |
| Color #: | 3 | | | |
| X Half Width: | 0.1778 | | | |
| Y Half Width: | 0.1778 | | | |
| Z Half Width: | 0.01 | | | |
| Object 311: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.42240000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 3 | | | |
| Color #: | 3 | | | |
| X Half Width: | 0.1778 | | | |
| Y Half Width: | 0.1778 | | | |
| Z Half Width: | 0.01 | | | |
| Object 312: | LED EMITTER C8 | | | |

TABLE 3-continued

ZEMAX Software Output Describing Surface Data Summary and Detail for Each
Individual Element within the Illumination Optical System illustrated in FIGS. 13-15

| | |
|---|---|
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.29288800E+002 |
| # Layout Rays: | 0 |
| # Analysis Rays: | 10000 |
| Power(Watts): | 1 |
| Wavenumber: | 3 |
| Color #: | 3 |
| X Half Width: | 0.1778 |
| Y Half Width: | 0.1778 |
| Z Half Width: | 0.01 |
| Object 313: | LED EMITTER C9 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −1.42240000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.30000000E+002 |
| # Layout Rays: | 0 |
| # Analysis Rays: | 10000 |
| Power(Watts): | 1 |
| Wavenumber: | 3 |
| Color #: | 3 |
| X Half Width: | 0.1778 |
| Y Half Width: | 0.1778 |
| Z Half Width: | 0.01 |
| Object 314: | ROW 2 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.486133 μm = 1.00000000 | |
| Index at 0.587562 μm = 1.00000000 | |
| Index at 0.656273 μm = 1.00000000 | |
| Object 315: | LED EMITTER C5 |
| Object type: | Source Volume Rectangle (NSC_VSRR) |
| Reference object: | −30 |
| Inside of: | 0 |
| XYZ position: | −2.1336    0    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.30000000E+002 |
| # Layout Rays: | 0 |
| # Analysis Rays: | 10000 |
| Power(Watts): | 1 |
| Wavenumber: | 3 |
| Color #: | 4 |
| X Half Width: | 0.1778 |
| Y Half Width: | 0.1778 |
| Z Half Width: | 0.01 |
| Object 316: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.29288800E+002 |
| # Layout Rays: | 0 |
| # Analysis Rays: | 10000 |
| Power(Watts): | 1 |
| Wavenumber: | 3 |

TABLE 3-continued

ZEMAX Software Output Describing Surface Data Summary and Detail for Each
Individual Element within the Illumination Optical System illustrated in FIGS. 13-15

| | |
|---|---|
| Color #: | 4 |
| X Half Width: | 0.1778 |
| Y Half Width: | 0.1778 |
| Z Half Width: | 0.01 |
| Object 317: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.28577600E+002 |
| # Layout Rays: | 0 |
| # Analysis Rays: | 10000 |
| Power(Watts): | 1 |
| Wavenumber: | 3 |
| Color #: | 4 |
| X Half Width: | 0.1778 |
| Y Half Width: | 0.1778 |
| Z Half Width: | 0.01 |
| Object 318: | LED EMITTER C2 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.27866400E+002 |
| # Layout Rays: | 0 |
| # Analysis Rays: | 10000 |
| Power(Watts): | 1 |
| Wavenumber: | 3 |
| Color #: | 4 |
| X Half Width: | 0.1778 |
| Y Half Width: | 0.1778 |
| Z Half Width: | 0.01 |
| Object 319: | LED EMITTER C1 |
| Object type: | Null Object (NSC_NULL) |
| Reference object: | 36 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    −1.00000000E+000    1.47400000E+002 |
| Pos. Mtrx. R31 R32 R33 Z: | 0.00000000E+000    1.00000000E+000    −3.82858892E−016    1.32844800E+002 |
| Material: | |
| Index at 0.486133 μm = 1.00000000 | |
| Index at 0.587562 μm = 1.00000000 | |
| Index at 0.656273 μm = 1.00000000 | |
| Object 320: | LED EMITTER C6 |
| Object type: | Source Volume Rectangle (NSC_VSRR) |
| Reference object: | −5 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    1.00000000E+000    −1.47400000E+002 |
| Pos. Mtrx. R31 R32 R33 Z: | 0.00000000E+000    −1.00000000E+000    −3.82858892E−016    1.30711200E+002 |
| # Layout Rays: | 0 |
| # Analysis Rays: | 10000 |
| Power(Watts): | 1 |
| Wavenumber: | 3 |
| Color #: | 4 |
| X Half Width: | 0.1778 |
| Y Half Width: | 0.1778 |
| Z Half Width: | 0.01 |
| Object 321: | LED EMITTER C7 |
| Object type: | Source Volume Rectangle (NSC_VSRR) |
| Reference object: | −1 |
| Inside of: | 0 |
| XYZ position: | 0    −0.7112    0 |
| Tilt about XYZ: | 0    0    0 |
| Pos. Mtrx. R11 R12 R13 X: | 1.00000000E+000    0.00000000E+000    0.00000000E+000    −2.13360000E+000 |
| Pos. Mtrx. R21 R22 R23 Y: | 0.00000000E+000    −3.82858892E−016    1.00000000E+000    −1.47400000E+002 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R31 R32 R33 Z: | 0.00000000E+000 | −1.00000000E+000 | −3.82858892E−016 | 1.31422400E+002 |
| # Layout Rays: | 0 | | | |
| # Analysis Rays: | 10000 | | | |
| Power(Watts): | 1 | | | |
| Wavenumber: | 3 | | | |
| Color #: | 4 | | | |
| X Half Width: | 0.1778 | | | |
| Y Half Width: | 0.1778 | | | |
| Z Half Width: | 0.01 | | | |
| Object 322: | LED EMITTER C8 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.32133600E+002 |
| # Layout Rays: | 0 | | | |
| # Analysis Rays: | 10000 | | | |
| Power(Watts): | 1 | | | |
| Wavenumber: | 3 | | | |
| Color #: | 4 | | | |
| X Half Width: | 0.1778 | | | |
| Y Half Width: | 0.1778 | | | |
| Z Half Width: | 0.01 | | | |
| Object 323: | LED EMITTER C9 | | | |
| Object type: | Null Object (NSC_NULL) | | | |
| Reference object: | 40 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 324: | ROW 1 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 325: | LED EMITTER C5 | | | |
| Object type: | Source Volume Rectangle (NSC_VSRR) | | | |
| Reference object: | −40 | | | |
| Inside of: | 0 | | | |
| XYZ position: | −2.8448 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 3 | | | |
| Color #: | 5 | | | |
| X Half Width: | 0.1778 | | | |
| Y Half Width: | 0.1778 | | | |
| Z Half Width: | 0.01 | | | |
| Object 326: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |
| # Layout Rays: | 0 | | | |
| # Analysis Rays: | 10000 | | | |
| Power(Watts): | 1 | | | |
| Wavenumber: | 3 | | | |
| Color #: | 5 | | | |
| X Half Width: | 0.1778 | | | |
| Y Half Width: | 0.1778 | | | |
| Z Half Width: | 0.01 | | | |
| Object 327: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 3 | | | |
| Color #: | 5 | | | |
| X Half Width: | 0.1778 | | | |
| Y Half Width: | 0.1778 | | | |
| Z Half Width: | 0.01 | | | |
| Object 328: | LED EMITTER C2 | | | |
| Object type: | Null Object (NSC_NULL) | | | |
| Reference object: | 45 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 329: | LED EMITTER C1 | | | |
| Object type: | Null Object (NSC_NULL) | | | |
| Reference object: | 46 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 330: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30711200E+002 |
| # Layout Rays: | 0 | | | |
| # Analysis Rays: | 10000 | | | |
| Power(Watts): | 1 | | | |
| Wavenumber: | 3 | | | |
| Color #: | 5 | | | |
| X Half Width: | 0.1778 | | | |
| Y Half Width: | 0.1778 | | | |
| Z Half Width: | 0.01 | | | |
| Object 331: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.31422400E+002 |
| # Layout Rays: | 0 | | | |
| # Analysis Rays: | 10000 | | | |
| Power(Watts): | 1 | | | |
| Wavenumber: | 3 | | | |
| Color #: | 5 | | | |
| X Half Width: | 0.1778 | | | |
| Y Half Width: | 0.1778 | | | |
| Z Half Width: | 0.01 | | | |
| Object 332: | LED EMITTER C8 | | | |
| Object type: | Null Object (NSC_NULL) | | | |
| Reference object: | 49 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 333: | LED EMITTER C9 | | | |
| Object type: | Null Object (NSC_NULL) | | | |
| Reference object: | 50 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 334: | ROW 6 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 335: | LED EMITTER C5 | | | |
| Object type: | Source Volume Rectangle (NSC_VSRR) | | | |
| Reference object: | −50 | | | |
| Inside of: | 0 | | | |
| XYZ position: | 0.7112 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 3 | | | |
| Color #: | 6 | | | |
| X Half Width: | 0.1778 | | | |
| Y Half Width: | 0.1778 | | | |
| Z Half Width: | 0.01 | | | |
| Object 336: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 7.11200000E−001 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |

TABLE 3-continued

ZEMAX Software Output Describing Surface Data Summary and Detail for Each Individual Element within the Illumination Optical System illustrated in FIGS. 13-15

| | |
|---|---|
| # Layout Rays: | 0 |
| # Analysis Rays: | 10000 |
| Power(Watts): | 1 |
| Wavenumber: | 3 |
| Color #: | 6 |
| X Half Width: | 0.1778 |
| Y Half Width: | 0.1778 |
| Z Half Width: | 0.01 |
| Object 337: | LED EMITTER C3 |
| Object type: | Source Volume Rectangle (NSC_VSRR) |
| Reference object: | −1 |
| Inside of: | 0 |
| XYZ position: | 0   0.7112   0 |
| Tilt about XYZ: | 0   0   0 |
| Pos. Mtrx. R11 R12 R13 X: | 1.00000000E+000   0.00000000E+000   0.00000000E+000   7.11200000E−001 |
| Pos. Mtrx. R21 R22 R23 Y: | 0.00000000E+000   −3.82858892E−016   1.00000000E+000   −1.47400000E+002 |
| Pos. Mtrx. R31 R32 R33 Z: | 0.00000000E+000   −1.00000000E+000   −3.82858892E−016   1.28577600E+002 |
| # Layout Rays: | 0 |
| # Analysis Rays: | 10000 |
| Power(Watts): | 1 |
| Wavenumber: | 3 |
| Color #: | 6 |
| X Half Width: | 0.1778 |
| Y Half Width: | 0.1778 |
| Z Half Width: | 0.01 |
| Object 338: | LED EMITTER C2 |
| Object type: | Source Volume Rectangle (NSC_VSRR) |
| Reference object: | −1 |
| Inside of: | 0 |
| XYZ position: | 0   0.7112   0 |
| Tilt about XYZ: | 0   0   0 |
| Pos. Mtrx. R11 R12 R13 X: | 1.00000000E+000   0.00000000E+000   0.00000000E+000   7.11200000E−001 |
| Pos. Mtrx. R21 R22 R23 Y: | 0.00000000E+000   −3.82858892E−016   1.00000000E+000   −1.47400000E+002 |
| Pos. Mtrx. R31 R32 R33 Z: | 0.00000000E+000   −1.00000000E+000   −3.82858892E−016   1.27866400E+002 |
| # Layout Rays: | 0 |
| # Analysis Rays: | 10000 |
| Power(Watts): | 1 |
| Wavenumber: | 3 |
| Color #: | 6 |
| X Half Width: | 0.1778 |
| Y Half Width: | 0.1778 |
| Z Half Width: | 0.01 |
| Object 339: | LED EMITTER C1 |
| Object type: | Source Volume Rectangle (NSC_VSRR) |
| Reference object: | −1 |
| Inside of: | 0 |
| XYZ position: | 0   0.7112   0 |
| Tilt about XYZ: | 0   0   0 |
| Pos. Mtrx. R11 R12 R13 X: | 1.00000000E+000   0.00000000E+000   0.00000000E+000   7.11200000E−001 |
| Pos. Mtrx. R21 R22 R23 Y: | 0.00000000E+000   −3.82858892E−016   1.00000000E+000   −1.47400000E+002 |
| Pos. Mtrx. R31 R32 R33 Z: | 0.00000000E+000   −1.00000000E+000   −3.82858892E−016   1.27155200E+002 |
| # Layout Rays: | 0 |
| # Analysis Rays: | 10000 |
| Power(Watts): | 1 |
| Wavenumber: | 3 |
| Color #: | 6 |
| X Half Width: | 0.1778 |
| Y Half Width: | 0.1778 |
| Z Half Width: | 0.01 |
| Object 340: | LED EMITTER C6 |
| Object type: | Source Volume Rectangle (NSC_VSRR) |
| Reference object: | −5 |
| Inside of: | 0 |
| XYZ position: | 0   −0.7112   0 |
| Tilt about XYZ: | 0   0   0 |
| Pos. Mtrx. R11 R12 R13 X: | 1.00000000E+000   0.00000000E+000   0.00000000E+000   7.11200000E−001 |
| Pos. Mtrx. R21 R22 R23 Y: | 0.00000000E+000   −3.82858892E−016   1.00000000E+000   −1.47400000E+002 |
| Pos. Mtrx. R31 R32 R33 Z: | 0.00000000E+000   −1.00000000E+000   −3.82858892E−016   1.30711200E+002 |
| # Layout Rays: | 0 |
| # Analysis Rays: | 10000 |
| Power(Watts): | 1 |
| Wavenumber: | 3 |
| Color #: | 6 |
| X Half Width: | 0.1778 |
| Y Half Width: | 0.1778 |
| Z Half Width: | 0.01 |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Object 341: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.31422400E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 6 | | | | |
| X Half Width: | 0.1778 | | | | |
| Y Half Width: | 0.1778 | | | | |
| Z Half Width: | 0.01 | | | | |
| Object 342: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.32133600E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 6 | | | | |
| X Half Width: | 0.1778 | | | | |
| Y Half Width: | 0.1778 | | | | |
| Z Half Width: | 0.01 | | | | |
| Object 343: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 7.11200000E−001 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.32844800E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 6 | | | | |
| X Half Width: | 0.1778 | | | | |
| Y Half Width: | 0.1778 | | | | |
| Z Half Width: | 0.01 | | | | |
| Object 344: | ROW 7 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Object 345: | LED EMITTER C5 | | | | |
| Object type: | Source Volume Rectangle (NSC_VSRR) | | | | |
| Reference object: | −60 | | | | |
| Inside of: | 0 | | | | |
| XYZ position: | 1.4224 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.30000000E+002 | |
| # Layout Rays: | 0 | | | | |
| # Analysis Rays: | 10000 | | | | |
| Power(Watts): | 1 | | | | |

TABLE 3-continued

ZEMAX Software Output Describing Surface Data Summary and Detail for Each
Individual Element within the Illumination Optical System illustrated in FIGS. 13-15

| | |
|---|---|
| Wavenumber: | 3 |
| Color #: | 7 |
| X Half Width: | 0.1778 |
| Y Half Width: | 0.1778 |
| Z Half Width: | 0.01 |
| Object 346: | LED EMITTER C4 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000   −3.82858892E−016    1.00000000E+000   −1.47400000E+002 |
| Pos. Mtrx. R31 R32 R33 Z: | 0.00000000E+000   −1.00000000E+000   −3.82858892E−016    1.29288800E+002 |
| # Layout Rays: | 0 |
| # Analysis Rays: | 10000 |
| Power(Watts): | 1 |
| Wavenumber: | 3 |
| Color #: | 7 |
| X Half Width: | 0.1778 |
| Y Half Width: | 0.1778 |
| Z Half Width: | 0.01 |
| Object 347: | LED EMITTER C3 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000   −3.82858892E−016    1.00000000E+000   −1.47400000E+002 |
| Pos. Mtrx. R31 R32 R33 Z: | 0.00000000E+000   −1.00000000E+000   −3.82858892E−016    1.28577600E+002 |
| # Layout Rays: | 0 |
| # Analysis Rays: | 10000 |
| Power(Watts): | 1 |
| Wavenumber: | 3 |
| Color #: | 7 |
| X Half Width: | 0.1778 |
| Y Half Width: | 0.1778 |
| Z Half Width: | 0.01 |
| Object 348: | LED EMITTER C2 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000   −3.82858892E−016    1.00000000E+000   −1.47400000E+002 |
| Pos. Mtrx. R31 R32 R33 Z: | 0.00000000E+000   −1.00000000E+000   −3.82858892E−016    1.27866400E+002 |
| # Layout Rays: | 0 |
| # Analysis Rays: | 10000 |
| Power(Watts): | 1 |
| Wavenumber: | 3 |
| Color #: | 7 |
| X Half Width: | 0.1778 |
| Y Half Width: | 0.1778 |
| Z Half Width: | 0.01 |
| Object 349: | LED EMITTER C1 |
| Object type: | Source Volume Rectangle (NSC_VSRR) |
| Reference object: | −1 |
| Inside of: | 0 |
| XYZ position: | 0    0.7112    0 |
| Tilt about XYZ: | 0    0    0 |
| Pos. Mtrx. R11 R12 R13 X: | 1.00000000E+000    0.00000000E+000    0.00000000E+000    1.42240000E+000 |
| Pos. Mtrx. R21 R22 R23 Y: | 0.00000000E+000   −3.82858892E−016    1.00000000E+000   −1.47400000E+002 |
| Pos. Mtrx. R31 R32 R33 Z: | 0.00000000E+000   −1.00000000E+000   −3.82858892E−016    1.27155200E+002 |
| # Layout Rays: | 0 |
| # Analysis Rays: | 10000 |
| Power(Watts): | 1 |
| Wavenumber: | 3 |
| Color #: | 7 |
| X Half Width: | 0.1778 |
| Y Half Width: | 0.1778 |
| Z Half Width: | 0.01 |
| Object 350: | LED EMITTER C6 |
| Object type: | Source Volume Rectangle (NSC_VSRR) |
| Reference object: | −1 |

TABLE 3-continued

ZEMAX Software Output Describing Surface Data Summary and Detail for Each
Individual Element within the Illumination Optical System illustrated in FIGS. 13-15

| | | | | | |
|---|---|---|---|---|---|
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.27866400E+002 | |
| # Layout Rays: | 1 | | | | |
| # Analysis Rays: | 10000 | | | | |
| Power(Watts): | 1 | | | | |
| Wavenumber: | 3 | | | | |
| Color #: | 7 | | | | |
| X Half Width: | 0.1778 | | | | |
| Y Half Width: | 0.1778 | | | | |
| Z Half Width: | 0.01 | | | | |
| Object 351: | LED EMITTER C7 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.28577600E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 7 | | | | |
| X Half Width: | 0.1778 | | | | |
| Y Half Width: | 0.1778 | | | | |
| Z Half Width: | 0.01 | | | | |
| Object 352: | LED EMITTER C8 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.29288800E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 7 | | | | |
| X Half Width: | 0.1778 | | | | |
| Y Half Width: | 0.1778 | | | | |
| Z Half Width: | 0.01 | | | | |
| Object 353: | LED EMITTER C9 | | | | |
| Object type: | Source Volume Rectangle (NSC_VSRR) | | | | |
| Reference object: | −1 | | | | |
| Inside of: | 0 | | | | |
| XYZ position: | 0 | −0.7112 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 1.42240000E+000 | |
| Pos. Mtrx. R21 R22 R23 Y: | 0.00000000E+000 | −3.82858892E−016 | 1.00000000E+000 | −1.47400000E+002 | |
| Pos. Mtrx. R31 R32 R33 Z: | 0.00000000E+000 | −1.00000000E+000 | −3.82858892E−016 | 1.30000000E+002 | |
| # Layout Rays: | 0 | | | | |
| # Analysis Rays: | 10000 | | | | |
| Power(Watts): | 1 | | | | |
| Wavenumber: | 3 | | | | |
| Color #: | 7 | | | | |
| X Half Width: | 0.1778 | | | | |
| Y Half Width: | 0.1778 | | | | |
| Z Half Width: | 0.01 | | | | |
| Object 354: | ROW 8 | | | | |
| Object type: | Null Object (NSC_NULL) | | | | |
| Reference object: | 0 | | | | |
| Inside of: | 0 | | | | |
| XYZ position: | 0 | 0 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 0.00000000E+000 | |
| Material: | | | | | |
| Index at 0.486133 μm = 1.00000000 | | | | | |

TABLE 3-continued

ZEMAX Software Output Describing Surface Data Summary and Detail for Each
Individual Element within the Illumination Optical System illustrated in FIGS. 13-15

Index at 0.587562 μm = 1.00000000
Index at 0.656273 μm = 1.00000000
Object 355:            LED EMITTER C5
Object type:           Source Volume Rectangle (NSC_VSRR)
Reference object:      −70
Inside of:             0
XYZ position:          2.1336        0              0
Tilt about XYZ:        0             0              0
Pos. Mtrx. R11 R12 R13 X:   1.00000000E+000    0.00000000E+000    0.00000000E+000    2.13360000E+000
Pos. Mtrx. R21 R22 R23 Y:   0.00000000E+000   −3.82858892E−016    1.00000000E+000   −1.47400000E+002
Pos. Mtrx. R31 R32 R33 Z:   0.00000000E+000   −1.00000000E+000   −3.82858892E−016    1.30000000E+002
Layout Rays:         0
Analysis Rays:       10000
Power(Watts):          1
Wavenumber:            3
Color #:               8
X Half Width:          0.1778
Y Half Width:          0.1778
Z Half Width:          0.01
Object 356:            LED EMITTER C4
Object type:           Source Volume Rectangle (NSC_VSRR)
Reference object:      −1
Inside of:             0
XYZ position:          0             0.7112         0
Tilt about XYZ:        0             0              0
Pos. Mtrx. R11 R12 R13 X:   1.00000000E+000    0.00000000E+000    0.00000000E+000    2.13360000E+000
Pos. Mtrx. R21 R22 R23 Y:   0.00000000E+000   −3.82858892E−016    1.00000000E+000   −1.47400000E+002
Pos. Mtrx. R31 R32 R33 Z:   0.00000000E+000   −1.00000000E+000   −3.82858892E−016    1.29288800E+002
Layout Rays:         0
Analysis Rays:       10000
Power(Watts):          1
Wavenumber:            3
Color #:               8
X Half Width:          0.1778
Y Half Width:          0.1778
Z Half Width:          0.01
Object 357:            LED EMITTER C3
Object type:           Source Volume Rectangle (NSC_VSRR)
Reference object:      −1
Inside of:             0
XYZ position:          0             0.7112         0
Tilt about XYZ:        0             0              0
Pos. Mtrx. R11 R12 R13 X:   1.00000000E+000    0.00000000E+000    0.00000000E+000    2.13360000E+000
Pos. Mtrx. R21 R22 R23 Y:   0.00000000E+000   −3.82858892E−016    1.00000000E+000   −1.47400000E+002
Pos. Mtrx. R31 R32 R33 Z:   0.00000000E+000   −1.00000000E+000   −3.82858892E−016    1.28577600E+002
Layout Rays:         0
Analysis Rays:       10000
Power(Watts):          1
Wavenumber:            3
Color #:               8
X Half Width:          0.1778
Y Half Width:          0.1778
Z Half Width:          0.01
Object 358:            LED EMITTER C2
Object type:           Source Volume Rectangle (NSC_VSRR)
Reference object:      −1
Inside of:             0
XYZ position:          0             0.7112         0
Tilt about XYZ:        0             0              0
Pos. Mtrx. R11 R12 R13 X:   1.00000000E+000    0.00000000E+000    0.00000000E+000    2.13360000E+000
Pos. Mtrx. R21 R22 R23 Y:   0.00000000E+000   −3.82858892E−016    1.00000000E+000   −1.47400000E+002
Pos. Mtrx. R31 R32 R33 Z:   0.00000000E+000   −1.00000000E+000   −3.82858892E−016    1.27866400E+002
Layout Rays:         0
Analysis Rays:       10000
Power(Watts):          1
Wavenumber:            3
Color #:               8
X Half Width:          0.1778
Y Half Width:          0.1778
Z Half Width:          0.01
Object 359:            LED EMITTER C1
Object type:           Null Object (NSC_NULL)
Reference object:      76
Inside of:             0
XYZ position:          0             0.7112         0
Tilt about XYZ:        0             0              0

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |

Material:
Index at 0.486133 μm = 1.00000000
Index at 0.587562 μm = 1.00000000
Index at 0.656273 μm = 1.00000000
Object 360:           LED EMITTER C6
Object type:          Source Volume Rectangle (NSC_VSRR)
Reference object:     −5
Inside of:            0
XYZ position:         0       −0.7112    0
Tilt about XYZ:       0        0         0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30711200E+002 |

Layout Rays:       0
Analysis Rays:     10000
Power(Watts):        1
Wavenumber:          3
Color #:             8
X Half Width:        0.1778
Y Half Width:        0.1778
Z Half Width:        0.01
Object 361:          LED EMITTER C7
Object type:         Source Volume Rectangle (NSC_VSRR)
Reference object:    −1
Inside of:           0
XYZ position:        0       −0.7112    0
Tilt about XYZ:      0        0         0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.31422400E+002 |

Layout Rays:       0
Analysis Rays:     10000
Power(Watts):        1
Wavenumber:          3
Color #:             8
X Half Width:        0.1778
Y Half Width:        0.1778
Z Half Width:        0.01
Object 362:          LED EMITTER C8
Object type:         Source Volume Rectangle (NSC_VSRR)
Reference object:    −1
Inside of:           0
XYZ position:        0       −0.7112    0
Tilt about XYZ:      0        0         0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.32133600E+002 |

Layout Rays:       0
Analysis Rays:     10000
Power(Watts):        1
Wavenumber:          3
Color #:             8
X Half Width:        0.1778
Y Half Width:        0.1778
Z Half Width:        0.01
Object 363:          LED EMITTER C9
Object type:         Null Object (NSC_NULL)
Reference object:    80
Inside of:           0
XYZ position:        0       −0.7112    0
Tilt about XYZ:      0        0         0

| | | | | |
|---|---|---|---|---|
| Pos. Mtrx. R11 R12 R13 X: | 1.00000000E+000 | 0.00000000E+000 | 0.00000000E+000 | 2.13360000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |

Material:
Index at 0.486133 μm = 1.00000000
Index at 0.587562 μm = 1.00000000
Index at 0.656273 μm = 1.00000000
Object 364:          ROW 9
Object type:         Null Object (NSC_NULL)
Reference object:    0
Inside of:           0
XYZ position:        0        0         0

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

Material:
Index at 0.486133 μm = 1.00000000
Index at 0.587562 μm = 1.00000000
Index at 0.656273 μm = 1.00000000

| | | | | |
|---|---|---|---|---|
| Object 365: | LED EMITTER C5 | | | |
| Object type: | Source Volume Rectangle (NSC_VSRR) | | | |
| Reference object: | −80 | | | |
| Inside of: | 0 | | | |
| XYZ position: | 2.8448 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30000000E+002 |
| # Layout Rays: | 0 | | | |
| # Analysis Rays: | 10000 | | | |
| Power(Watts): | 1 | | | |
| Wavenumber: | 3 | | | |
| Color #: | 9 | | | |
| X Half Width: | 0.1778 | | | |
| Y Half Width: | 0.1778 | | | |
| Z Half Width: | 0.01 | | | |
| Object 366: | LED EMITTER C4 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.29288800E+002 |
| # Layout Rays: | 0 | | | |
| # Analysis Rays: | 10000 | | | |
| Power(Watts): | 1 | | | |
| Wavenumber: | 3 | | | |
| Color #: | 9 | | | |
| X Half Width: | 0.1778 | | | |
| Y Half Width: | 0.1778 | | | |
| Z Half Width: | 0.01 | | | |
| Object 367: | LED EMITTER C3 | | | |
| Object type: | Source Volume Rectangle (NSC_VSRR) | | | |
| Reference object: | −1 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.28577600E+002 |
| # Layout Rays: | 0 | | | |
| # Analysis Rays: | 10000 | | | |
| Power(Watts): | 1 | | | |
| Wavenumber: | 3 | | | |
| Color #: | 9 | | | |
| X Half Width: | 0.1778 | | | |
| Y Half Width: | 0.1778 | | | |
| Z Half Width: | 0.01 | | | |
| Object 368: | LED EMITTER C2 | | | |
| Object type: | Null Object (NSC_NULL) | | | |
| Reference object: | 85 | | | |
| Inside of: | 0 | | | |
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32133600E+002 |

Material:
Index at 0.486133 μm = 1.00000000
Index at 0.587562 μm = 1.00000000
Index at 0.656273 μm = 1.00000000

| | |
|---|---|
| Object 369: | LED EMITTER C1 |
| Object type: | Null Object (NSC_NULL) |
| Reference object: | 86 |
| Inside of: | 0 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| XYZ position: | 0 | 0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.32844800E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 370: | LED EMITTER C6 | | | |
| Object type: | Source Volume Rectangle (NSC_VSRR) | | | |
| Reference object: | −5 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.30711200E+002 |
| # Layout Rays: | 0 | | | |
| # Analysis Rays: | 10000 | | | |
| Power(Watts): | 1 | | | |
| Wavenumber: | 3 | | | |
| Color #: | 9 | | | |
| X Half Width: | 0.1778 | | | |
| Y Half Width: | 0.1778 | | | |
| Z Half Width: | 0.01 | | | |
| Object 371: | LED EMITTER C7 | | | |
| Object type: | Source Volume Rectangle (NSC_VSRR) | | | |
| Reference object: | −1 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | 1.00000000E+000 | −1.47400000E+002 |
| Pos. Mtrx. R31 R32 R33 Z: | 0.00000000E+000 | −1.00000000E+000 | −3.82858892E−016 | 1.31422400E+002 |
| # Layout Rays: | 0 | | | |
| # Analysis Rays: | 10000 | | | |
| Power(Watts): | 1 | | | |
| Wavenumber: | 3 | | | |
| Color #: | 9 | | | |
| X Half Width: | 0.1778 | | | |
| Y Half Width: | 0.1778 | | | |
| Z Half Width: | 0.01 | | | |
| Object 372: | LED EMITTER C8 | | | |
| Object type: | Null Object (NSC_NULL) | | | |
| Reference object: | 89 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27866400E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 373: | LED EMITTER C9 | | | |
| Object type: | Null Object (NSC_NULL) | | | |
| Reference object: | 90 | | | |
| Inside of: | 0 | | | |
| XYZ position: | 0 | −0.7112 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 2.84480000E+000 |
| Pos. Mtrx. R21 R22 R23 Y: | 0.00000000E+000 | −3.82858892E−016 | −1.00000000E+000 | 1.47400000E+002 |
| Pos. Mtrx. R31 R32 R33 Z: | 0.00000000E+000 | 1.00000000E+000 | −3.82858892E−016 | 1.27155200E+002 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 374: | | | | |
| Object type: | CPC (NSC_CPCO) | | | |
| CSG 0: | Side Faces | | | |
| Coating: | (none) | | | |
| Scattering: | None | | | |
| CSG 1: | Front Face | | | |
| Coating: | (none) | | | |

TABLE 3-continued

ZEMAX Software Output Describing Surface Data Summary and Detail for Each
Individual Element within the Illumination Optical System illustrated in FIGS. 13-15

| | |
|---|---|
| Scattering: | None |
| CSG 2: | Back Face |
| Coating: | (none) |
| Scattering: | None |
| Reference object: | −91 |
| Inside of: | 0 |
| XYZ position: | 0    0    0.5 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    −3.82858892E−016    1.00000000E+000    −1.47500000E+002 |
| Pos. Mtrx. R31 R32 R33 Z: | 0.00000000E+000    −1.00000000E+000    −3.82858892E−016    1.30000000E+002 |
| Material: | MIRROR |
| Radial Aperture: | 3.6 |
| Angle (deg): | 12 |
| Length: | 98.4 |
| #Angle Facets: | 50 |
| #Length Facets: | 48 |
| Is Volume?: | 0 |
| Object 375: | Condenser |
| Object type: | Standard Lens (NSC_SLEN) |
| CSG 0: | Side Faces |
| Coating: | (none) |
| Scattering: | None |
| CSG 1: | Front Face |
| Coating: | (none) |
| Scattering: | None |
| CSG 2: | Back Face |
| Coating: | (none) |
| Scattering: | None |
| Reference object: | −92 |
| Inside of: | 0 |
| XYZ position: | 0    0    100 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    −3.82858892E−016    1.00000000E+000    −4.80000000E+001 |
| Pos. Mtrx. R31 R32 R33 Z: | 0.00000000E+000    −1.00000000E+000    −3.82858892E−016    1.30000000E+002 |
| Material: | BK7 |
| Index at 0.486133 μm = | 1.52237629 |
| Index at 0.587562 μm = | 1.51680003 |
| Index at 0.656273 μm = | 1.51432235 |
| Radius 1: | 75 |
| Conic 1: | 0 |
| Clear 1: | 19 |
| Edge 1: | 19 |
| Thickness: | 5 |
| Radius 2: | −175 |
| Conic 2: | 0 |
| Clear 2: | 19 |
| Edge 2: | 19 |
| Object 376: | Combiner Optics |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.486133 μm = | 1.00000000 |
| Index at 0.587562 μm = | 1.00000000 |
| Index at 0.656273 μm = | 1.00000000 |
| Object 377: | Blue R/Green T |
| Object type: | Rectangular Volume (NSC_RBLK) |
| CSG 0: | Side Faces |
| Coating: | (none) |
| Scattering: | None |
| CSG 1: | Front Face |
| Coating: | (none) |
| Scattering: | None |
| CSG 2: | Back Face |
| Coating: | ILL_BRGT |
| Scattering: | None |
| Reference object: | 0 |
| Inside of: | 0 |
| XYZ position: | 0    21    128 |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Tilt about XYZ: | −45 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 7.07106781E−001 | 7.07106781E−001 | 2.10000000E+001 |
| Pos. Mtrx. R31 R32 R33 Z: | 0.00000000E+000 | −7.07106781E−001 | 7.07106781E−001 | 1.28000000E+002 |
| Material: | BK7 | | | |
| Index at 0.486133 µm = 1.52237629 | | | | |
| Index at 0.587562 µm = 1.51680003 | | | | |
| Index at 0.656273 µm = 1.51432235 | | | | |
| X1 Half Width: | 26 | | | |
| Y1 Half Width: | 26 | | | |
| Z Length: | 2 | | | |
| X2 Half Width: | 26 | | | |
| Y2 Half Width: | 26 | | | |
| Front X Angle: | 0 | | | |
| Front Y Angle: | 0 | | | |
| Rear X Angle: | 0 | | | |
| Rear Y Angle: | 0 | | | |
| Object 378: | Red R/Green T | | | |
| Object type: | Rectangular Volume (NSC_RBLK) | | | |
| CSG 0: | Side Faces | | | |
| Coating: | (none) | | | |
| Scattering: | None | | | |
| CSG 1: | Front Face | | | |
| Coating: | (none) | | | |
| Scattering: | None | | | |
| CSG 2: | Back Face | | | |
| Coating: | ILL_RRGT | | | |
| Scattering: | None | | | |
| Reference object: | 0 | | | |
| Inside of: | 0 | | | |
| XYZ position: | 0 | −21 | 128 | |
| Tilt about XYZ: | 45 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 7.07106781E−001 | −7.07106781E−001 | −2.10000000E+001 |
| Pos. Mtrx. R31 R32 R33 Z: | 0.00000000E+000 | 7.07106781E−001 | 7.07106781E−001 | 1.28000000E+002 |
| Material: | BK7 | | | |
| Index at 0.486133 µm = 1.52237629 | | | | |
| Index at 0.587562 µm = 1.51680003 | | | | |
| Index at 0.656273 µm = 1.51432235 | | | | |
| X1 Half Width: | 26 | | | |
| Y1 Half Width: | 26 | | | |
| Z Length: | 2 | | | |
| X2 Half Width: | 26 | | | |
| Y2 Half Width: | 26 | | | |
| Front X Angle: | 0 | | | |
| Front Y Angle: | 0 | | | |
| Rear X Angle: | 0 | | | |
| Rear Y Angle: | 0 | | | |
| Object 379: | | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 µm = 1.00000000 | | | | |
| Index at 0.587562 µm = 1.00000000 | | | | |
| Index at 0.656273 µm = 1.00000000 | | | | |
| Object 380: | | | | |
| Object type: | Standard Lens (NSC_SLEN) | | | |
| CSG 0: | Side Faces | | | |
| Coating: | (none) | | | |
| Scattering: | None | | | |
| CSG 1: | Front Face | | | |
| Coating: | (none) | | | |
| Scattering: | None | | | |
| CSG 2: | Back Face | | | |
| Coating: | (none) | | | |
| Scattering: | None | | | |
| Reference object: | 0 | | | |
| Inside of: | 0 | | | |
| XYZ position: | 0 | 0 | 165 | |
| Tilt about XYZ: | 0 | 0 | 0 | |

TABLE 3-continued

ZEMAX Software Output Describing Surface Data Summary and Detail for Each
Individual Element within the Illumination Optical System illustrated in FIGS. 13-15

| | | | | |
|---|---|---|---|---|
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 1.65000000E+002 |
| Material: | BK7 | | | |
| Index at 0.486133 μm = 1.52237629 | | | | |
| Index at 0.587562 μm = 1.51680003 | | | | |
| Index at 0.656273 μm = 1.51432235 | | | | |
| Radius 1: | 300 | | | |
| Conic 1: | 20 | | | |
| Clear 1: | 48 | | | |
| Edge 1: | 50 | | | |
| Thickness: | 10 | | | |
| Radius 2: | 0 | | | |
| Conic 2: | 0 | | | |
| Clear 2: | 48 | | | |
| Edge 2: | 50 | | | |
| Object 381: | | | | |
| Object type: | Standard Lens (NSC_SLEN) | | | |
| CSG 0: | Side Faces | | | |
| Coating: | (none) | | | |
| Scattering: | None | | | |
| CSG 1: | Front Face | | | |
| Coating: | (none) | | | |
| Scattering: | None | | | |
| CSG 2: | Back Face | | | |
| Coating: | (none) | | | |
| Scattering: | None | | | |
| Reference object: | 0 | | | |
| Inside of: | 0 | | | |
| XYZ position: | 0 | 0 | 185 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 1.85000000E+002 |
| Material: | SK5 | | | |
| Index at 0.486133 μm = 1.59580857 | | | | |
| Index at 0.587562 μm = 1.58913012 | | | | |
| Index at 0.656273 μm = 1.58619276 | | | | |
| Radius 1: | 0 | | | |
| Conic 1: | 0 | | | |
| Clear 1: | 48 | | | |
| Edge 1: | 50 | | | |
| Thickness: | 10 | | | |
| Radius 2: | −325 | | | |
| Conic 2: | 0 | | | |
| Clear 2: | 48 | | | |
| Edge 2: | 50 | | | |
| Object 382: | | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.486133 μm = 1.00000000 | | | | |
| Index at 0.587562 μm = 1.00000000 | | | | |
| Index at 0.656273 μm = 1.00000000 | | | | |
| Object 383: | ILLUMINATOR_RECTANGLE.POB | | | |
| Object type: | Poly Object (NSC_POBJ) | | | |
| CSG 0: | User Defined Faces | | | |
| Coating: | (none) | | | |
| Scattering: | None | | | |
| CSG 1: | User Defined Faces | | | |
| Coating: | (none) | | | |
| Scattering: | None | | | |
| CSG 2: | User Defined Faces | | | |
| Coating: | (none) | | | |
| Scattering: | None | | | |
| CSG 3: | User Defined Faces | | | |
| Coating: | (none) | | | |
| Scattering: | None | | | |
| Reference object: | 0 | | | |
| Inside of: | 0 | | | |

TABLE 3-continued

ZEMAX Software Output Describing Surface Data Summary and Detail for Each Individual Element within the Illumination Optical System illustrated in FIGS. 13-15

| | | | | | |
|---|---|---|---|---|---|
| XYZ position: | | 0 | 0 | 210 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 2.10000000E+002 | |
| Material: | ACRYLIC | | | | |
| Index at 0.486133 μm = 1.49782763 | | | | | |
| Index at 0.587562 μm = 1.49166834 | | | | | |
| Index at 0.656273 μm = 1.48893834 | | | | | |
| Scale: | 6 | | | | |
| Is Volume?: | 1 | | | | |
| Object 384: | | | | | |
| Object type: | Detector Rect (NSC_DETE) | | | | |
| CSG 0: | All Faces | | | | |
| Coating: | (none) | | | | |
| Scattering: | None | | | | |
| Reference object: | −1 | | | | |
| Inside of: | 0 | | | | |
| XYZ position: | | 0 | 0 | 350 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 5.60000000E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| X Half Width: | 27 | | | | |
| Y Half Width: | 48 | | | | |
| # X Pixels: | 400 | | | | |
| # Y Pixels: | 400 | | | | |
| Data Type: | 0 | | | | |
| Color: | 0 | | | | |
| Smoothing: | 0 | | | | |
| Scale: | 0 | | | | |
| Plot Scale: | 0 | | | | |
| Front Only: | 1 | | | | |
| PSF Wave#: | 0 | | | | |
| X Angle Min: | −90 | | | | |
| X Angle Max: | 90 | | | | |
| Y Angle Min: | −90 | | | | |
| Y Angle Max: | 90 | | | | |
| Polarization: | 0 | | | | |
| Object 385: | | | | | |
| Object type: | Standard Surface (NSC_SSUR) | | | | |
| CSG 0: | All Faces | | | | |
| Coating: | (none) | | | | |
| Scattering: | None | | | | |
| Reference object: | 0 | | | | |
| Inside of: | 0 | | | | |
| XYZ position: | | 0 | 0 | 108 | |
| Tilt about XYZ: | | 0 | 0 | 0 | |
| Pos. Mtrx. R11 R12 R13 X: | 1.00000000E+000 | 0.00000000E+000 | 0.00000000E+000 | 0.00000000E+000 | |
| Pos. Mtrx. R21 R22 R23 Y: | 0.00000000E+000 | 1.00000000E+000 | 0.00000000E+000 | 0.00000000E+000 | |
| Pos. Mtrx. R31 R32 R33 Z: | 0.00000000E+000 | 0.00000000E+000 | 1.00000000E+000 | 1.08000000E+002 | |
| Material: | | | | | |
| Index at 0.486133 μm = 1.00000000 | | | | | |
| Index at 0.587562 μm = 1.00000000 | | | | | |
| Index at 0.656273 μm = 1.00000000 | | | | | |
| Radius: | 0 | | | | |
| Conic: | 0 | | | | |
| Max Aper: | 60 | | | | |
| Min Aper: | 0 | | | | |

COATING DEFINITIONS:

Coating Name: ILL_BRGT (TABLE)
Coating Name: ILL_RRGT (TABLE)
MULTI-CONFIGURATION DATA:

Configuration 1:
1 Comment:
Configuration 2:
1 Comment:
SOLVE AND VARIABLE DATA:

| | | | | | | | | |
|---|---|---|---|---|---|---|---|---|
| Surf 1 | NSC Object 4 | Parameter 2: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| Surf 1 | NSC Object 4 | Parameter 3: | Pickup From 3 | Scale | 1.0000E+000 | Offset | 0.0000E+000 | Column Parameter −6 |
|---|---|---|---|---|---|---|---|---|
| Surf 1 | NSC Object 4 | Parameter 5: | Pickup From 3 | Scale | 1.0000E+000 | Offset | 0.0000E+000 | Column Parameter −6 |
| Surf 1 | NSC Object 4 | Parameter 6: | Pickup From 3 | Scale | 1.0000E+000 | Offset | 0.0000E+000 | Column Parameter −6 |
| Surf 1 | NSC Object 4 | Parameter 7: | Pickup From 3 | Scale | 1.0000E+000 | Offset | 0.0000E+000 | Column Parameter −6 |
| Surf 1 | NSC Object 4 | Parameter 8: | Pickup From 3 | Scale | 1.0000E+000 | Offset | 0.0000E+000 | Column Parameter −6 |
| Surf 1 | NSC Object 5 | Position Y: | Pickup From 4 | Scale | 1.0000E+000 | Offset | 0.0000E+000 | Column Parameter −6 |
| Surf 1 | NSC Object 5 | Parameter 1: | Pickup From 3 | Scale | 1.0000E+000 | Offset | 0.0000E+000 | Column Parameter −6 |
| Surf 1 | NSC Object 5 | Parameter 2: | Pickup From 3 | Scale | 1.0000E+000 | Offset | 0.0000E+000 | Column Parameter −6 |
| Surf 1 | NSC Object 5 | Parameter 3: | Pickup From 3 | Scale | 1.0000E+000 | Offset | 0.0000E+000 | Column Parameter −6 |
| Surf 1 | NSC Object 5 | Parameter 5: | Pickup From 3 | Scale | 1.0000E+000 | Offset | 0.0000E+000 | Column Parameter −6 |
| Surf 1 | NSC Object 5 | Parameter 6: | Pickup From 3 | Scale | 1.0000E+000 | Offset | 0.0000E+000 | Column Parameter −6 |
| Surf 1 | NSC Object 5 | Parameter 7: | Pickup From 3 | Scale | 1.0000E+000 | Offset | 0.0000E+000 | Column Parameter −6 |
| Surf 1 | NSC Object 5 | Parameter 8: | Pickup From 3 | Scale | 1.0000E+000 | Offset | 0.0000E+000 | Column Parameter −6 |
| Surf 1 | NSC Object 6 | Position Y: | Pickup From 4 | Scale | 1.0000E+000 | Offset | 0.0000E+000 | Column Parameter −6 |
| Surf 1 | NSC Object 6 | Parameter 1: | Pickup From 3 | Scale | 1.0000E+000 | Offset | 0.0000E+000 | Column Parameter −6 |
| Surf 1 | NSC Object 6 | Parameter 2: | Pickup From 3 | Scale | 1.0000E+000 | Offset | 0.0000E+000 | Column Parameter −6 |
| Surf 1 | NSC Object 6 | Parameter 3: | Pickup From 3 | Scale | 1.0000E+000 | Offset | 0.0000E+000 | Column Parameter −6 |
| Surf 1 | NSC Object 6 | Parameter 5: | Pickup From 3 | Scale | 1.0000E+000 | Offset | 0.0000E+000 | Column Parameter −6 |
| Surf 1 | NSC Object 6 | Parameter 6: | Pickup From 3 | Scale | 1.0000E+000 | Offset | 0.0000E+000 | Column Parameter −6 |
| Surf 1 | NSC Object 6 | Parameter 7: | Pickup From 3 | Scale | 1.0000E+000 | Offset | 0.0000E+000 | Column Parameter −6 |
| Surf 1 | NSC Object 6 | Parameter 8: | Pickup From 3 | Scale | 1.0000E+000 | Offset | 0.0000E+000 | Column Parameter −6 |
| Surf 1 | NSC Object 7 | Position Y: | Pickup From 4 | Scale | 1.0000E+000 | Offset | 0.0000E+000 | Column Parameter −6 |
| Surf 1 | NSC Object 7 | Parameter 1: | Pickup From 3 | Scale | 1.0000E+000 | Offset | 0.0000E+000 | Column Parameter −6 |
| Surf 1 | NSC Object 7 | Parameter 2: | Pickup From 3 | Scale | 1.0000E+000 | Offset | 0.0000E+000 | Column Parameter −6 |
| Surf 1 | NSC Object 7 | Parameter 3: | Pickup From 3 | Scale | 1.0000E+000 | Offset | 0.0000E+000 | Column Parameter −6 |
| Surf 1 | NSC Object 7 | Parameter 5: | Pickup From 3 | Scale | 1.0000E+000 | Offset | 0.0000E+000 | Column Parameter −6 |
| Surf 1 | NSC Object 7 | Parameter 6: | Pickup From 3 | Scale | 1.0000E+000 | Offset | 0.0000E+000 | Column Parameter −6 |
| Surf 1 | NSC Object 7 | Parameter 7: | Pickup From 3 | Scale | 1.0000E+000 | Offset | 0.0000E+000 | Column Parameter −6 |
| Surf 1 | NSC Object 7 | Parameter 8: | Pickup From 3 | Scale | 1.0000E+000 | Offset | 0.0000E+000 | Column Parameter −6 |
| Surf 1 | NSC Object 8 | Position Y: | Pickup From 4 | Scale | −1.0000E+000 | Offset | 0.0000E+000 | Column Parameter −6 |
| Surf 1 | NSC Object 8 | Parameter 1: | Pickup From 3 | Scale | 1.0000E+000 | Offset | 0.0000E+000 | Column Parameter −6 |
| Surf 1 | NSC Object 8 | Parameter 2: | Pickup From 3 | Scale | 1.0000E+000 | Offset | 0.0000E+000 | Column Parameter −6 |
| Surf 1 | NSC Object 8 | Parameter 3: | Pickup From 3 | Scale | 1.0000E+000 | Offset | 0.0000E+000 | Column Parameter −6 |
| Surf 1 | NSC Object 8 | Parameter 5: | Pickup From 3 | Scale | 1.0000E+000 | Offset | 0.0000E+000 | Column Parameter −6 |
| Surf 1 | NSC Object 8 | Parameter 6: | Pickup From 3 | Scale | 1.0000E+000 | Offset | 0.0000E+000 | Column Parameter −6 |
| Surf 1 | NSC Object 8 | Parameter 7: | Pickup From 3 | Scale | 1.0000E+000 | Offset | 0.0000E+000 | Column Parameter −6 |
| Surf 1 | NSC Object 8 | Parameter 8: | Pickup From 3 | Scale | 1.0000E+000 | Offset | 0.0000E+000 | Column Parameter −6 |
| Surf 1 | NSC Object 9 | Position Y: | Pickup From 4 | Scale | −1.0000E+000 | Offset | 0.0000E+000 | Column Parameter −6 |
| Surf 1 | NSC Object 9 | Parameter 1: | Pickup From 3 | Scale | 1.0000E+000 | Offset | 0.0000E+000 | Column Parameter −6 |
| Surf 1 | NSC Object 9 | Parameter 2: | Pickup From 3 | Scale | 1.0000E+000 | Offset | 0.0000E+000 | Column Parameter −6 |
| Surf 1 | NSC Object 9 | Parameter 3: | Pickup From 3 | Scale | 1.0000E+000 | Offset | 0.0000E+000 | Column Parameter −6 |
| Surf 1 | NSC Object 9 | Parameter 5: | Pickup From 3 | Scale | 1.0000E+000 | Offset | 0.0000E+000 | Column Parameter −6 |
| Surf 1 | NSC Object 9 | Parameter 6: | Pickup From 3 | Scale | 1.0000E+000 | Offset | 0.0000E+000 | Column Parameter −6 |
| Surf 1 | NSC Object 9 | Parameter 7: | Pickup From 3 | Scale | 1.0000E+000 | Offset | 0.0000E+000 | Column Parameter −6 |
| Surf 1 | NSC Object 9 | Parameter 8: | Pickup From 3 | Scale | 1.0000E+000 | Offset | 0.0000E+000 | Column Parameter −6 |
| Surf 1 | NSC Object 10 | Position Y: | Pickup From 4 | Scale | −1.0000E+000 | Offset | 0.0000E+000 | Column Parameter −6 |
| Surf 1 | NSC Object 10 | Parameter 1: | Pickup From 3 | Scale | 1.0000E+000 | Offset | 0.0000E+000 | Column Parameter −6 |
| Surf 1 | NSC Object 10 | Parameter 2: | Pickup From 3 | Scale | 1.0000E+000 | Offset | 0.0000E+000 | Column Parameter −6 |
| Surf 1 | NSC Object 10 | Parameter 3: | Pickup From 3 | Scale | 1.0000E+000 | Offset | 0.0000E+000 | Column Parameter −6 |
| Surf 1 | NSC Object 10 | Parameter 5: | Pickup From 3 | Scale | 1.0000E+000 | Offset | 0.0000E+000 | Column Parameter −6 |
| Surf 1 | NSC Object 10 | Parameter 6: | Pickup From 3 | Scale | 1.0000E+000 | Offset | 0.0000E+000 | Column Parameter −6 |
| Surf 1 | NSC Object 10 | Parameter 7: | Pickup From 3 | Scale | 1.0000E+000 | Offset | 0.0000E+000 | Column Parameter −6 |
| Surf 1 | NSC Object 10 | Parameter 8: | Pickup From 3 | Scale | 1.0000E+000 | Offset | 0.0000E+000 | Column Parameter −6 |
| Surf 1 | NSC Object 11 | Position Y: | Pickup From 4 | Scale | −1.0000E+000 | Offset | 0.0000E+000 | Column Parameter −6 |
| Surf 1 | NSC Object 11 | Parameter 1: | Pickup From 3 | Scale | 1.0000E+000 | Offset | 0.0000E+000 | Column Parameter −6 |
| Surf 1 | NSC Object 11 | Parameter 2: | Pickup From 3 | Scale | 1.0000E+000 | Offset | 0.0000E+000 | Column Parameter −6 |
| Surf 1 | NSC Object 11 | Parameter 3: | Pickup From 3 | Scale | 1.0000E+000 | Offset | 0.0000E+000 | Column Parameter −6 |
| Surf 1 | NSC Object 11 | Parameter 5: | Pickup From 3 | Scale | 1.0000E+000 | Offset | 0.0000E+000 | Column Parameter −6 |
| Surf 1 | NSC Object 11 | Parameter 6: | Pickup From 3 | Scale | 1.0000E+000 | Offset | 0.0000E+000 | Column Parameter −6 |
| Surf 1 | NSC Object 11 | Parameter 7: | Pickup From 3 | Scale | 1.0000E+000 | Offset | 0.0000E+000 | Column Parameter −6 |
| Surf 1 | NSC Object 11 | Parameter 8: | Pickup From 3 | Scale | 1.0000E+000 | Offset | 0.0000E+000 | Column Parameter −6 |
| Surf 1 | NSC Object 13 | Position X: | Pickup From 2 | Scale | 2.0000E+000 | Offset | 0.0000E+000 | Column Parameter −6 |
| Surf 1 | NSC Object 13 | Parameter 1: | Pickup From 3 | Scale | 1.0000E+000 | Offset | 0.0000E+000 | Column Parameter −6 |
| Surf 1 | NSC Object 13 | Parameter 2: | Pickup From 3 | Scale | 1.0000E+000 | Offset | 0.0000E+000 | Column Parameter −6 |
| Surf 1 | NSC Object 13 | Parameter 3: | Pickup From 3 | Scale | 1.0000E+000 | Offset | 0.0000E+000 | Column Parameter −6 |
| Surf 1 | NSC Object 13 | Parameter 6: | Pickup From 3 | Scale | 1.0000E+000 | Offset | 0.0000E+000 | Column Parameter −6 |
| Surf 1 | NSC Object 13 | Parameter 7: | Pickup From 3 | Scale | 1.0000E+000 | Offset | 0.0000E+000 | Column Parameter −6 |
| Surf 1 | NSC Object 13 | Parameter 8: | Pickup From 3 | Scale | 1.0000E+000 | Offset | 0.0000E+000 | Column Parameter −6 |
| Surf 1 | NSC Object 14 | Position Y: | Pickup From 4 | Scale | 1.0000E+000 | Offset | 0.0000E+000 | Column Parameter −6 |
| Surf 1 | NSC Object 14 | Parameter 1: | Pickup From 3 | Scale | 1.0000E+000 | Offset | 0.0000E+000 | Column Parameter −6 |
| Surf 1 | NSC Object 14 | Parameter 2: | Pickup From 3 | Scale | 1.0000E+000 | Offset | 0.0000E+000 | Column Parameter −6 |
| Surf 1 | NSC Object 14 | Parameter 3: | Pickup From 3 | Scale | 1.0000E+000 | Offset | 0.0000E+000 | Column Parameter −6 |
| Surf 1 | NSC Object 14 | Parameter 5: | Pickup From 13 | Scale | 1.0000E+000 | Offset | 0.0000E+000 | Column Parameter −6 |
| Surf 1 | NSC Object 14 | Parameter 6: | Pickup From 3 | Scale | 1.0000E+000 | Offset | 0.0000E+000 | Column Parameter −6 |
| Surf 1 | NSC Object 14 | Parameter 7: | Pickup From 3 | Scale | 1.0000E+000 | Offset | 0.0000E+000 | Column Parameter −6 |
| Surf 1 | NSC Object 14 | Parameter 8: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 15 | Position Y: | Pickup From 4 | Scale | 1.0000E+000 | Offset | 0.0000E+000 | Column Parameter | −6 |
| Surf 1 | NSC Object 15 | Parameter 1: | Pickup From 3 | Scale | 1.0000E+000 | Offset | 0.0000E+000 | Column Parameter | −6 |
| Surf 1 | NSC Object 15 | Parameter 2: | Pickup From 3 | Scale | 1.0000E+000 | Offset | 0.0000E+000 | Column Parameter | −6 |
| Surf 1 | NSC Object 15 | Parameter 3: | Pickup From 3 | Scale | 1.0000E+000 | Offset | 0.0000E+000 | Column Parameter | −6 |
| Surf 1 | NSC Object 15 | Parameter 5: | Pickup From 13 | Scale | 1.0000E+000 | Offset | 0.0000E+000 | Column Parameter | −6 |
| Surf 1 | NSC Object 15 | Parameter 6: | Pickup From 3 | Scale | 1.0000E+000 | Offset | 0.0000E+000 | Column Parameter | −6 |
| Surf 1 | NSC Object 15 | Parameter 7: | Pickup From 3 | Scale | 1.0000E+000 | Offset | 0.0000E+000 | Column Parameter | −6 |
| Surf 1 | NSC Object 15 | Parameter 8: | Pickup From 3 | Scale | 1.0000E+000 | Offset | 0.0000E+000 | Column Parameter | −6 |
| Surf 1 | NSC Object 16 | Position Y: | Pickup From 4 | Scale | 1.0000E+000 | Offset | 0.0000E+000 | Column Parameter | −6 |
| Surf 1 | NSC Object 16 | Parameter 1: | Pickup From 3 | Scale | 1.0000E+000 | Offset | 0.0000E+000 | Column Parameter | −6 |
| Surf 1 | NSC Object 16 | Parameter 2: | Pickup From 3 | Scale | 1.0000E+000 | Offset | 0.0000E+000 | Column Parameter | −6 |
| Surf 1 | NSC Object 16 | Parameter 3: | Pickup From 3 | Scale | 1.0000E+000 | Offset | 0.0000E+000 | Column Parameter | −6 |
| Surf 1 | NSC Object 16 | Parameter 5: | Pickup From 13 | Scale | 1.0000E+000 | Offset | 0.0000E+000 | Column Parameter | −6 |
| Surf 1 | NSC Object 16 | Parameter 6: | Pickup From 3 | Scale | 1.0000E+000 | Offset | 0.0000E+000 | Column Parameter | −6 |
| Surf 1 | NSC Object 16 | Parameter 7: | Pickup From 3 | Scale | 1.0000E+000 | Offset | 0.0000E+000 | Column Parameter | −6 |
| Surf 1 | NSC Object 16 | Parameter 8: | Pickup From 3 | Scale | 1.0000E+000 | Offset | 0.0000E+000 | Column Parameter | −6 |
| Surf 1 | NSC Object 17 | Position Y: | Pickup From 4 | Scale | 1.0000E+000 | Offset | 0.0000E+000 | Column Parameter | −6 |
| Surf 1 | NSC Object 17 | Parameter 1: | Pickup From 3 | Scale | 1.0000E+000 | Offset | 0.0000E+000 | Column Parameter | −6 |
| Surf 1 | NSC Object 17 | Parameter 2: | Pickup From 3 | Scale | 1.0000E+000 | Offset | 0.0000E+000 | Column Parameter | −6 |
| Surf 1 | NSC Object 17 | Parameter 3: | Pickup From 3 | Scale | 1.0000E+000 | Offset | 0.0000E+000 | Column Parameter | −6 |
| Surf 1 | NSC Object 17 | Parameter 5: | Pickup From 13 | Scale | 1.0000E+000 | Offset | 0.0000E+000 | Column Parameter | −6 |
| Surf 1 | NSC Object 17 | Parameter 6: | Pickup From 3 | Scale | 1.0000E+000 | Offset | 0.0000E+000 | Column Parameter | −6 |
| Surf 1 | NSC Object 17 | Parameter 7: | Pickup From 3 | Scale | 1.0000E+000 | Offset | 0.0000E+000 | Column Parameter | −6 |
| Surf 1 | NSC Object 17 | Parameter 8: | Pickup From 3 | Scale | 1.0000E+000 | Offset | 0.0000E+000 | Column Parameter | −6 |
| Surf 1 | NSC Object 18 | Position Y: | Pickup From 4 | Scale | −1.0000E+000 | Offset | 0.0000E+000 | Column Parameter | −6 |
| Surf 1 | NSC Object 18 | Parameter 1: | Pickup From 3 | Scale | 1.0000E+000 | Offset | 0.0000E+000 | Column Parameter | −6 |
| Surf 1 | NSC Object 18 | Parameter 2: | Pickup From 3 | Scale | 1.0000E+000 | Offset | 0.0000E+000 | Column Parameter | −6 |
| Surf 1 | NSC Object 18 | Parameter 3: | Pickup From 3 | Scale | 1.0000E+000 | Offset | 0.0000E+000 | Column Parameter | −6 |
| Surf 1 | NSC Object 18 | Parameter 5: | Pickup From 13 | Scale | 1.0000E+000 | Offset | 0.0000E+000 | Column Parameter | −6 |
| Surf 1 | NSC Object 18 | Parameter 6: | Pickup From 3 | Scale | 1.0000E+000 | Offset | 0.0000E+000 | Column Parameter | −6 |
| Surf 1 | NSC Object 18 | Parameter 7: | Pickup From 3 | Scale | 1.0000E+000 | Offset | 0.0000E+000 | Column Parameter | −6 |
| Surf 1 | NSC Object 18 | Parameter 8: | Pickup From 3 | Scale | 1.0000E+000 | Offset | 0.0000E+000 | Column Parameter | −6 |
| Surf 1 | NSC Object 19 | Position Y: | Pickup From 4 | Scale | −1.0000E+000 | Offset | 0.0000E+000 | Column Parameter | −6 |
| Surf 1 | NSC Object 19 | Parameter 1: | Pickup From 3 | Scale | 1.0000E+000 | Offset | 0.0000E+000 | Column Parameter | −6 |
| Surf 1 | NSC Object 19 | Parameter 2: | Pickup From 3 | Scale | 1.0000E+000 | Offset | 0.0000E+000 | Column Parameter | −6 |
| Surf 1 | NSC Object 19 | Parameter 3: | Pickup From 3 | Scale | 1.0000E+000 | Offset | 0.0000E+000 | Column Parameter | −6 |
| Surf 1 | NSC Object 19 | Parameter 5: | Pickup From 13 | Scale | 1.0000E+000 | Offset | 0.0000E+000 | Column Parameter | −6 |
| Surf 1 | NSC Object 19 | Parameter 6: | Pickup From 3 | Scale | 1.0000E+000 | Offset | 0.0000E+000 | Column Parameter | −6 |
| Surf 1 | NSC Object 19 | Parameter 7: | Pickup From 3 | Scale | 1.0000E+000 | Offset | 0.0000E+000 | Column Parameter | −6 |
| Surf 1 | NSC Object 19 | Parameter 8: | Pickup From 3 | Scale | 1.0000E+000 | Offset | 0.0000E+000 | Column Parameter | −6 |
| Surf 1 | NSC Object 20 | Position Y: | Pickup From 4 | Scale | −1.0000E+000 | Offset | 0.0000E+000 | Column Parameter | −6 |
| Surf 1 | NSC Object 20 | Parameter 1: | Pickup From 3 | Scale | 1.0000E+000 | Offset | 0.0000E+000 | Column Parameter | −6 |
| Surf 1 | NSC Object 20 | Parameter 2: | Pickup From 3 | Scale | 1.0000E+000 | Offset | 0.0000E+000 | Column Parameter | −6 |
| Surf 1 | NSC Object 20 | Parameter 3: | Pickup From 3 | Scale | 1.0000E+000 | Offset | 0.0000E+000 | Column Parameter | −6 |
| Surf 1 | NSC Object 20 | Parameter 5: | Pickup From 13 | Scale | 1.0000E+000 | Offset | 0.0000E+000 | Column Parameter | −6 |
| Surf 1 | NSC Object 20 | Parameter 6: | Pickup From 3 | Scale | 1.0000E+000 | Offset | 0.0000E+000 | Column Parameter | −6 |
| Surf 1 | NSC Object 20 | Parameter 7: | Pickup From 3 | Scale | 1.0000E+000 | Offset | 0.0000E+000 | Column Parameter | −6 |
| Surf 1 | NSC Object 20 | Parameter 8: | Pickup From 3 | Scale | 1.0000E+000 | Offset | 0.0000E+000 | Column Parameter | −6 |
| Surf 1 | NSC Object 21 | Position Y: | Pickup From 4 | Scale | −1.0000E+000 | Offset | 0.0000E+000 | Column Parameter | −6 |
| Surf 1 | NSC Object 21 | Parameter 1: | Pickup From 3 | Scale | 1.0000E+000 | Offset | 0.0000E+000 | Column Parameter | −6 |
| Surf 1 | NSC Object 21 | Parameter 2: | Pickup From 3 | Scale | 1.0000E+000 | Offset | 0.0000E+000 | Column Parameter | −6 |
| Surf 1 | NSC Object 21 | Parameter 3: | Pickup From 3 | Scale | 1.0000E+000 | Offset | 0.0000E+000 | Column Parameter | −6 |
| Surf 1 | NSC Object 21 | Parameter 5: | Pickup From 13 | Scale | 1.0000E+000 | Offset | 0.0000E+000 | Column Parameter | −6 |
| Surf 1 | NSC Object 21 | Parameter 6: | Pickup From 3 | Scale | 1.0000E+000 | Offset | 0.0000E+000 | Column Parameter | −6 |
| Surf 1 | NSC Object 21 | Parameter 7: | Pickup From 3 | Scale | 1.0000E+000 | Offset | 0.0000E+000 | Column Parameter | −6 |
| Surf 1 | NSC Object 21 | Parameter 8: | Pickup From 3 | Scale | 1.0000E+000 | Offset | 0.0000E+000 | Column Parameter | −6 |
| Surf 1 | NSC Object 23 | Position X: | Pickup From 2 | Scale | 4.0000E+000 | Offset | 0.0000E+000 | Column Parameter | −6 |
| Surf 1 | NSC Object 23 | Parameter 1: | Pickup From 3 | Scale | 1.0000E+000 | Offset | 0.0000E+000 | Column Parameter | −6 |
| Surf 1 | NSC Object 23 | Parameter 2: | Pickup From 3 | Scale | 1.0000E+000 | Offset | 0.0000E+000 | Column Parameter | −6 |
| Surf 1 | NSC Object 23 | Parameter 3: | Pickup From 3 | Scale | 1.0000E+000 | Offset | 0.0000E+000 | Column Parameter | −6 |
| Surf 1 | NSC Object 23 | Parameter 6: | Pickup From 3 | Scale | 1.0000E+000 | Offset | 0.0000E+000 | Column Parameter | −6 |
| Surf 1 | NSC Object 23 | Parameter 7: | Pickup From 3 | Scale | 1.0000E+000 | Offset | 0.0000E+000 | Column Parameter | −6 |
| Surf 1 | NSC Object 23 | Parameter 8: | Pickup From 3 | Scale | 1.0000E+000 | Offset | 0.0000E+000 | Column Parameter | −6 |
| Surf 1 | NSC Object 24 | Position Y: | Pickup From 4 | Scale | 1.0000E+000 | Offset | 0.0000E+000 | Column Parameter | −6 |
| Surf 1 | NSC Object 24 | Parameter 1: | Pickup From 3 | Scale | 1.0000E+000 | Offset | 0.0000E+000 | Column Parameter | −6 |
| Surf 1 | NSC Object 24 | Parameter 2: | Pickup From 3 | Scale | 1.0000E+000 | Offset | 0.0000E+000 | Column Parameter | −6 |
| Surf 1 | NSC Object 24 | Parameter 3: | Pickup From 3 | Scale | 1.0000E+000 | Offset | 0.0000E+000 | Column Parameter | −6 |
| Surf 1 | NSC Object 24 | Parameter 5: | Pickup From 23 | Scale | 1.0000E+000 | Offset | 0.0000E+000 | Column Parameter | −6 |
| Surf 1 | NSC Object 24 | Parameter 6: | Pickup From 3 | Scale | 1.0000E+000 | Offset | 0.0000E+000 | Column Parameter | −6 |
| Surf 1 | NSC Object 24 | Parameter 7: | Pickup From 3 | Scale | 1.0000E+000 | Offset | 0.0000E+000 | Column Parameter | −6 |
| Surf 1 | NSC Object 24 | Parameter 8: | Pickup From 3 | Scale | 1.0000E+000 | Offset | 0.0000E+000 | Column Parameter | −6 |
| Surf 1 | NSC Object 25 | Position Y: | Pickup From 4 | Scale | 1.0000E+000 | Offset | 0.0000E+000 | Column Parameter | −6 |
| Surf 1 | NSC Object 25 | Parameter 1: | Pickup From 3 | Scale | 1.0000E+000 | Offset | 0.0000E+000 | Column Parameter | −6 |
| Surf 1 | NSC Object 25 | Parameter 2: | Pickup From 3 | Scale | 1.0000E+000 | Offset | 0.0000E+000 | Column Parameter | −6 |
| Surf 1 | NSC Object 25 | Parameter 3: | Pickup From 3 | Scale | 1.0000E+000 | Offset | 0.0000E+000 | Column Parameter | −6 |
| Surf 1 | NSC Object 25 | Parameter 5: | Pickup From 23 | Scale | 1.0000E+000 | Offset | 0.0000E+000 | Column Parameter | −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 25 | Parameter 6: | Pickup From 3 | Scale | 1.0000E+000 | Offset | 0.0000E+000 | Column Parameter −6 |
| Surf 1 | NSC Object 25 | Parameter 7: | Pickup From 3 | Scale | 1.0000E+000 | Offset | 0.0000E+000 | Column Parameter −6 |
| Surf 1 | NSC Object 25 | Parameter 8: | Pickup From 3 | Scale | 1.0000E+000 | Offset | 0.0000E+000 | Column Parameter −6 |
| Surf 1 | NSC Object 26 | Position Y: | Pickup From 4 | Scale | 1.0000E+000 | Offset | 0.0000E+000 | Column Parameter −6 |
| Surf 1 | NSC Object 26 | Parameter 1: | Pickup From 3 | Scale | 1.0000E+000 | Offset | 0.0000E+000 | Column Parameter −6 |
| Surf 1 | NSC Object 26 | Parameter 2: | Pickup From 3 | Scale | 1.0000E+000 | Offset | 0.0000E+000 | Column Parameter −6 |
| Surf 1 | NSC Object 26 | Parameter 3: | Pickup From 3 | Scale | 1.0000E+000 | Offset | 0.0000E+000 | Column Parameter −6 |
| Surf 1 | NSC Object 26 | Parameter 5: | Pickup From 23 | Scale | 1.0000E+000 | Offset | 0.0000E+000 | Column Parameter −6 |
| Surf 1 | NSC Object 26 | Parameter 6: | Pickup From 3 | Scale | 1.0000E+000 | Offset | 0.0000E+000 | Column Parameter −6 |
| Surf 1 | NSC Object 26 | Parameter 7: | Pickup From 3 | Scale | 1.0000E+000 | Offset | 0.0000E+000 | Column Parameter −6 |
| Surf 1 | NSC Object 26 | Parameter 8: | Pickup From 3 | Scale | 1.0000E+000 | Offset | 0.0000E+000 | Column Parameter −6 |
| Surf 1 | NSC Object 27 | Position Y: | Pickup From 4 | Scale | 1.0000E+000 | Offset | 0.0000E+000 | Column Parameter −6 |
| Surf 1 | NSC Object 27 | Parameter 2: | Pickup From 3 | Scale | 1.0000E+000 | Offset | 0.0000E+000 | Column Parameter −6 |
| Surf 1 | NSC Object 27 | Parameter 3: | Pickup From 3 | Scale | 1.0000E+000 | Offset | 0.0000E+000 | Column Parameter −6 |
| Surf 1 | NSC Object 27 | Parameter 5: | Pickup From 23 | Scale | 1.0000E+000 | Offset | 0.0000E+000 | Column Parameter −6 |
| Surf 1 | NSC Object 27 | Parameter 6: | Pickup From 3 | Scale | 1.0000E+000 | Offset | 0.0000E+000 | Column Parameter −6 |
| Surf 1 | NSC Object 27 | Parameter 7: | Pickup From 3 | Scale | 1.0000E+000 | Offset | 0.0000E+000 | Column Parameter −6 |
| Surf 1 | NSC Object 27 | Parameter 8: | Pickup From 3 | Scale | 1.0000E+000 | Offset | 0.0000E+000 | Column Parameter −6 |
| Surf 1 | NSC Object 28 | Position Y: | Pickup From 4 | Scale | −1.0000E+000 | Offset | 0.0000E+000 | Column Parameter −6 |
| Surf 1 | NSC Object 28 | Parameter 1: | Pickup From 3 | Scale | 1.0000E+000 | Offset | 0.0000E+000 | Column Parameter −6 |
| Surf 1 | NSC Object 28 | Parameter 2: | Pickup From 3 | Scale | 1.0000E+000 | Offset | 0.0000E+000 | Column Parameter −6 |
| Surf 1 | NSC Object 28 | Parameter 3: | Pickup From 3 | Scale | 1.0000E+000 | Offset | 0.0000E+000 | Column Parameter −6 |
| Surf 1 | NSC Object 28 | Parameter 5: | Pickup From 23 | Scale | 1.0000E+000 | Offset | 0.0000E+000 | Column Parameter −6 |
| Surf 1 | NSC Object 28 | Parameter 6: | Pickup From 3 | Scale | 1.0000E+000 | Offset | 0.0000E+000 | Column Parameter −6 |
| Surf 1 | NSC Object 28 | Parameter 7: | Pickup From 3 | Scale | 1.0000E+000 | Offset | 0.0000E+000 | Column Parameter −6 |
| Surf 1 | NSC Object 28 | Parameter 8: | Pickup From 3 | Scale | 1.0000E+000 | Offset | 0.0000E+000 | Column Parameter −6 |
| Surf 1 | NSC Object 29 | Position Y: | Pickup From 4 | Scale | −1.0000E+000 | Offset | 0.0000E+000 | Column Parameter −6 |
| Surf 1 | NSC Object 29 | Parameter 1: | Pickup From 3 | Scale | 1.0000E+000 | Offset | 0.0000E+000 | Column Parameter −6 |
| Surf 1 | NSC Object 29 | Parameter 2: | Pickup From 3 | Scale | 1.0000E+000 | Offset | 0.0000E+000 | Column Parameter −6 |
| Surf 1 | NSC Object 29 | Parameter 3: | Pickup From 3 | Scale | 1.0000E+000 | Offset | 0.0000E+000 | Column Parameter −6 |
| Surf 1 | NSC Object 29 | Parameter 5: | Pickup From 23 | Scale | 1.0000E+000 | Offset | 0.0000E+000 | Column Parameter −6 |
| Surf 1 | NSC Object 29 | Parameter 6: | Pickup From 3 | Scale | 1.0000E+000 | Offset | 0.0000E+000 | Column Parameter −6 |
| Surf 1 | NSC Object 29 | Parameter 7: | Pickup From 3 | Scale | 1.0000E+000 | Offset | 0.0000E+000 | Column Parameter −6 |
| Surf 1 | NSC Object 29 | Parameter 8: | Pickup From 3 | Scale | 1.0000E+000 | Offset | 0.0000E+000 | Column Parameter −6 |
| Surf 1 | NSC Object 30 | Position Y: | Pickup From 4 | Scale | −1.0000E+000 | Offset | 0.0000E+000 | Column Parameter −6 |
| Surf 1 | NSC Object 30 | Parameter 1: | Pickup From 3 | Scale | 1.0000E+000 | Offset | 0.0000E+000 | Column Parameter −6 |
| Surf 1 | NSC Object 30 | Parameter 2: | Pickup From 3 | Scale | 1.0000E+000 | Offset | 0.0000E+000 | Column Parameter −6 |
| Surf 1 | NSC Object 30 | Parameter 3: | Pickup From 3 | Scale | 1.0000E+000 | Offset | 0.0000E+000 | Column Parameter −6 |
| Surf 1 | NSC Object 30 | Parameter 5: | Pickup From 23 | Scale | 1.0000E+000 | Offset | 0.0000E+000 | Column Parameter −6 |
| Surf 1 | NSC Object 30 | Parameter 6: | Pickup From 3 | Scale | 1.0000E+000 | Offset | 0.0000E+000 | Column Parameter −6 |
| Surf 1 | NSC Object 30 | Parameter 7: | Pickup From 3 | Scale | 1.0000E+000 | Offset | 0.0000E+000 | Column Parameter −6 |
| Surf 1 | NSC Object 30 | Parameter 8: | Pickup From 3 | Scale | 1.0000E+000 | Offset | 0.0000E+000 | Column Parameter −6 |
| Surf 1 | NSC Object 31 | Position Y: | Pickup From 4 | Scale | −1.0000E+000 | Offset | 0.0000E+000 | Column Parameter −6 |
| Surf 1 | NSC Object 31 | Parameter 1: | Pickup From 3 | Scale | 1.0000E+000 | Offset | 0.0000E+000 | Column Parameter −6 |
| Surf 1 | NSC Object 31 | Parameter 2: | Pickup From 3 | Scale | 1.0000E+000 | Offset | 0.0000E+000 | Column Parameter −6 |
| Surf 1 | NSC Object 31 | Parameter 3: | Pickup From 3 | Scale | 1.0000E+000 | Offset | 0.0000E+000 | Column Parameter −6 |
| Surf 1 | NSC Object 31 | Parameter 5: | Pickup From 23 | Scale | 1.0000E+000 | Offset | 0.0000E+000 | Column Parameter −6 |
| Surf 1 | NSC Object 31 | Parameter 6: | Pickup From 3 | Scale | 1.0000E+000 | Offset | 0.0000E+000 | Column Parameter −6 |
| Surf 1 | NSC Object 31 | Parameter 7: | Pickup From 3 | Scale | 1.0000E+000 | Offset | 0.0000E+000 | Column Parameter −6 |
| Surf 1 | NSC Object 31 | Parameter 8: | Pickup From 3 | Scale | 1.0000E+000 | Offset | 0.0000E+000 | Column Parameter −6 |
| Surf 1 | NSC Object 33 | Position X: | Pickup From 2 | Scale | 6.0000E+000 | Offset | 0.0000E+000 | Column Parameter −6 |
| Surf 1 | NSC Object 33 | Parameter 1: | Pickup From 3 | Scale | 1.0000E+000 | Offset | 0.0000E+000 | Column Parameter −6 |
| Surf 1 | NSC Object 33 | Parameter 2: | Pickup From 3 | Scale | 1.0000E+000 | Offset | 0.0000E+000 | Column Parameter −6 |
| Surf 1 | NSC Object 33 | Parameter 3: | Pickup From 3 | Scale | 1.0000E+000 | Offset | 0.0000E+000 | Column Parameter −6 |
| Surf 1 | NSC Object 33 | Parameter 6: | Pickup From 3 | Scale | 1.0000E+000 | Offset | 0.0000E+000 | Column Parameter −6 |
| Surf 1 | NSC Object 33 | Parameter 7: | Pickup From 3 | Scale | 1.0000E+000 | Offset | 0.0000E+000 | Column Parameter −6 |
| Surf 1 | NSC Object 33 | Parameter 8: | Pickup From 3 | Scale | 1.0000E+000 | Offset | 0.0000E+000 | Column Parameter −6 |
| Surf 1 | NSC Object 34 | Position Y: | Pickup From 4 | Scale | 1.0000E+000 | Offset | 0.0000E+000 | Column Parameter −6 |
| Surf 1 | NSC Object 34 | Parameter 1: | Pickup From 3 | Scale | 1.0000E+000 | Offset | 0.0000E+000 | Column Parameter −6 |
| Surf 1 | NSC Object 34 | Parameter 2: | Pickup From 3 | Scale | 1.0000E+000 | Offset | 0.0000E+000 | Column Parameter −6 |
| Surf 1 | NSC Object 34 | Parameter 3: | Pickup From 3 | Scale | 1.0000E+000 | Offset | 0.0000E+000 | Column Parameter −6 |
| Surf 1 | NSC Object 34 | Parameter 5: | Pickup From 33 | Scale | 1.0000E+000 | Offset | 0.0000E+000 | Column Parameter −6 |
| Surf 1 | NSC Object 34 | Parameter 6: | Pickup From 3 | Scale | 1.0000E+000 | Offset | 0.0000E+000 | Column Parameter −6 |
| Surf 1 | NSC Object 34 | Parameter 7: | Pickup From 3 | Scale | 1.0000E+000 | Offset | 0.0000E+000 | Column Parameter −6 |
| Surf 1 | NSC Object 34 | Parameter 8: | Pickup From 3 | Scale | 1.0000E+000 | Offset | 0.0000E+000 | Column Parameter −6 |
| Surf 1 | NSC Object 35 | Position Y: | Pickup From 4 | Scale | 1.0000E+000 | Offset | 0.0000E+000 | Column Parameter −6 |
| Surf 1 | NSC Object 35 | Parameter 1: | Pickup From 3 | Scale | 1.0000E+000 | Offset | 0.0000E+000 | Column Parameter −6 |
| Surf 1 | NSC Object 35 | Parameter 2: | Pickup From 3 | Scale | 1.0000E+000 | Offset | 0.0000E+000 | Column Parameter −6 |
| Surf 1 | NSC Object 35 | Parameter 3: | Pickup From 3 | Scale | 1.0000E+000 | Offset | 0.0000E+000 | Column Parameter −6 |
| Surf 1 | NSC Object 35 | Parameter 5: | Pickup From 33 | Scale | 1.0000E+000 | Offset | 0.0000E+000 | Column Parameter −6 |
| Surf 1 | NSC Object 35 | Parameter 6: | Pickup From 3 | Scale | 1.0000E+000 | Offset | 0.0000E+000 | Column Parameter −6 |
| Surf 1 | NSC Object 35 | Parameter 7: | Pickup From 3 | Scale | 1.0000E+000 | Offset | 0.0000E+000 | Column Parameter −6 |
| Surf 1 | NSC Object 35 | Parameter 8: | Pickup From 3 | Scale | 1.0000E+000 | Offset | 0.0000E+000 | Column Parameter −6 |
| Surf 1 | NSC Object 36 | Position Y: | Pickup From 4 | Scale | 1.0000E+000 | Offset | 0.0000E+000 | Column Parameter −6 |
| Surf 1 | NSC Object 36 | Parameter 2: | Pickup From 3 | Scale | 1.0000E+000 | Offset | 0.0000E+000 | Column Parameter −6 |
| Surf 1 | NSC Object 36 | Parameter 3: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 36 | Parameter 5: | Pickup From 33 | Scale | 1.0000E+000 | Offset | 0.0000E+000 | Column Parameter | −6 |
| Surf 1 | NSC Object 36 | Parameter 6: | Pickup From 3 | Scale | 1.0000E+000 | Offset | 0.0000E+000 | Column Parameter | −6 |
| Surf 1 | NSC Object 36 | Parameter 7: | Pickup From 3 | Scale | 1.0000E+000 | Offset | 0.0000E+000 | Column Parameter | −6 |
| Surf 1 | NSC Object 36 | Parameter 8: | Pickup From 3 | Scale | 1.0000E+000 | Offset | 0.0000E+000 | Column Parameter | −6 |
| Surf 1 | NSC Object 37 | Position Y: | Pickup From 4 | Scale | 1.0000E+000 | Offset | 0.0000E+000 | Column Parameter | −6 |
| Surf 1 | NSC Object 38 | Position Y: | Pickup From 4 | Scale | −1.0000E+000 | Offset | 0.0000E+000 | Column Parameter | −6 |
| Surf 1 | NSC Object 38 | Parameter 1: | Pickup From 3 | Scale | 1.0000E+000 | Offset | 0.0000E+000 | Column Parameter | −6 |
| Surf 1 | NSC Object 38 | Parameter 2: | Pickup From 3 | Scale | 1.0000E+000 | Offset | 0.0000E+000 | Column Parameter | −6 |
| Surf 1 | NSC Object 38 | Parameter 3: | Pickup From 3 | Scale | 1.0000E+000 | Offset | 0.0000E+000 | Column Parameter | −6 |
| Surf 1 | NSC Object 38 | Parameter 5: | Pickup From 33 | Scale | 1.0000E+000 | Offset | 0.0000E+000 | Column Parameter | −6 |
| Surf 1 | NSC Object 38 | Parameter 6: | Pickup From 3 | Scale | 1.0000E+000 | Offset | 0.0000E+000 | Column Parameter | −6 |
| Surf 1 | NSC Object 38 | Parameter 7: | Pickup From 3 | Scale | 1.0000E+000 | Offset | 0.0000E+000 | Column Parameter | −6 |
| Surf 1 | NSC Object 38 | Parameter 8: | Pickup From 3 | Scale | 1.0000E+000 | Offset | 0.0000E+000 | Column Parameter | −6 |
| Surf 1 | NSC Object 39 | Position Y: | Pickup From 4 | Scale | −1.0000E+000 | Offset | 0.0000E+000 | Column Parameter | −6 |
| Surf 1 | NSC Object 39 | Parameter 1: | Pickup From 3 | Scale | 1.0000E+000 | Offset | 0.0000E+000 | Column Parameter | −6 |
| Surf 1 | NSC Object 39 | Parameter 2: | Pickup From 3 | Scale | 1.0000E+000 | Offset | 0.0000E+000 | Column Parameter | −6 |
| Surf 1 | NSC Object 39 | Parameter 3: | Pickup From 3 | Scale | 1.0000E+000 | Offset | 0.0000E+000 | Column Parameter | −6 |
| Surf 1 | NSC Object 39 | Parameter 5: | Pickup From 33 | Scale | 1.0000E+000 | Offset | 0.0000E+000 | Column Parameter | −6 |
| Surf 1 | NSC Object 39 | Parameter 6: | Pickup From 3 | Scale | 1.0000E+000 | Offset | 0.0000E+000 | Column Parameter | −6 |
| Surf 1 | NSC Object 39 | Parameter 7: | Pickup From 3 | Scale | 1.0000E+000 | Offset | 0.0000E+000 | Column Parameter | −6 |
| Surf 1 | NSC Object 39 | Parameter 8: | Pickup From 3 | Scale | 1.0000E+000 | Offset | 0.0000E+000 | Column Parameter | −6 |
| Surf 1 | NSC Object 40 | Position Y: | Pickup From 4 | Scale | −1.0000E+000 | Offset | 0.0000E+000 | Column Parameter | −6 |
| Surf 1 | NSC Object 40 | Parameter 1: | Pickup From 3 | Scale | 1.0000E+000 | Offset | 0.0000E+000 | Column Parameter | −6 |
| Surf 1 | NSC Object 40 | Parameter 2: | Pickup From 3 | Scale | 1.0000E+000 | Offset | 0.0000E+000 | Column Parameter | −6 |
| Surf 1 | NSC Object 40 | Parameter 3: | Pickup From 3 | Scale | 1.0000E+000 | Offset | 0.0000E+000 | Column Parameter | −6 |
| Surf 1 | NSC Object 40 | Parameter 5: | Pickup From 33 | Scale | 1.0000E+000 | Offset | 0.0000E+000 | Column Parameter | −6 |
| Surf 1 | NSC Object 40 | Parameter 6: | Pickup From 3 | Scale | 1.0000E+000 | Offset | 0.0000E+000 | Column Parameter | −6 |
| Surf 1 | NSC Object 40 | Parameter 7: | Pickup From 3 | Scale | 1.0000E+000 | Offset | 0.0000E+000 | Column Parameter | −6 |
| Surf 1 | NSC Object 40 | Parameter 8: | Pickup From 3 | Scale | 1.0000E+000 | Offset | 0.0000E+000 | Column Parameter | −6 |
| Surf 1 | NSC Object 41 | Position Y: | Pickup From 4 | Scale | −1.0000E+000 | Offset | 0.0000E+000 | Column Parameter | −6 |
| Surf 1 | NSC Object 43 | Position X: | Pickup From 2 | Scale | 8.0000E+000 | Offset | 0.0000E+000 | Column Parameter | −6 |
| Surf 1 | NSC Object 43 | Parameter 1: | Pickup From 3 | Scale | 1.0000E+000 | Offset | 0.0000E+000 | Column Parameter | −6 |
| Surf 1 | NSC Object 43 | Parameter 2: | Pickup From 3 | Scale | 1.0000E+000 | Offset | 0.0000E+000 | Column Parameter | −6 |
| Surf 1 | NSC Object 43 | Parameter 3: | Pickup From 3 | Scale | 1.0000E+000 | Offset | 0.0000E+000 | Column Parameter | −6 |
| Surf 1 | NSC Object 43 | Parameter 6: | Pickup From 3 | Scale | 1.0000E+000 | Offset | 0.0000E+000 | Column Parameter | −6 |
| Surf 1 | NSC Object 43 | Parameter 7: | Pickup From 3 | Scale | 1.0000E+000 | Offset | 0.0000E+000 | Column Parameter | −6 |
| Surf 1 | NSC Object 43 | Parameter 8: | Pickup From 3 | Scale | 1.0000E+000 | Offset | 0.0000E+000 | Column Parameter | −6 |
| Surf 1 | NSC Object 44 | Position Y: | Pickup From 4 | Scale | 1.0000E+000 | Offset | 0.0000E+000 | Column Parameter | −6 |
| Surf 1 | NSC Object 44 | Parameter 1: | Pickup From 3 | Scale | 1.0000E+000 | Offset | 0.0000E+000 | Column Parameter | −6 |
| Surf 1 | NSC Object 44 | Parameter 2: | Pickup From 3 | Scale | 1.0000E+000 | Offset | 0.0000E+000 | Column Parameter | −6 |
| Surf 1 | NSC Object 44 | Parameter 3: | Pickup From 3 | Scale | 1.0000E+000 | Offset | 0.0000E+000 | Column Parameter | −6 |
| Surf 1 | NSC Object 44 | Parameter 5: | Pickup From 43 | Scale | 1.0000E+000 | Offset | 0.0000E+000 | Column Parameter | −6 |
| Surf 1 | NSC Object 44 | Parameter 6: | Pickup From 3 | Scale | 1.0000E+000 | Offset | 0.0000E+000 | Column Parameter | −6 |
| Surf 1 | NSC Object 44 | Parameter 7: | Pickup From 3 | Scale | 1.0000E+000 | Offset | 0.0000E+000 | Column Parameter | −6 |
| Surf 1 | NSC Object 44 | Parameter 8: | Pickup From 3 | Scale | 1.0000E+000 | Offset | 0.0000E+000 | Column Parameter | −6 |
| Surf 1 | NSC Object 45 | Position Y: | Pickup From 4 | Scale | 1.0000E+000 | Offset | 0.0000E+000 | Column Parameter | −6 |
| Surf 1 | NSC Object 45 | Parameter 1: | Pickup From 3 | Scale | 1.0000E+000 | Offset | 0.0000E+000 | Column Parameter | −6 |
| Surf 1 | NSC Object 45 | Parameter 2: | Pickup From 3 | Scale | 1.0000E+000 | Offset | 0.0000E+000 | Column Parameter | −6 |
| Surf 1 | NSC Object 45 | Parameter 3: | Pickup From 3 | Scale | 1.0000E+000 | Offset | 0.0000E+000 | Column Parameter | −6 |
| Surf 1 | NSC Object 45 | Parameter 5: | Pickup From 43 | Scale | 1.0000E+000 | Offset | 0.0000E+000 | Column Parameter | −6 |
| Surf 1 | NSC Object 45 | Parameter 6: | Pickup From 3 | Scale | 1.0000E+000 | Offset | 0.0000E+000 | Column Parameter | −6 |
| Surf 1 | NSC Object 45 | Parameter 7: | Pickup From 3 | Scale | 1.0000E+000 | Offset | 0.0000E+000 | Column Parameter | −6 |
| Surf 1 | NSC Object 45 | Parameter 8: | Pickup From 3 | Scale | 1.0000E+000 | Offset | 0.0000E+000 | Column Parameter | −6 |
| Surf 1 | NSC Object 46 | Position Y: | Pickup From 4 | Scale | 1.0000E+000 | Offset | 0.0000E+000 | Column Parameter | −6 |
| Surf 1 | NSC Object 47 | Position Y: | Pickup From 4 | Scale | 1.0000E+000 | Offset | 0.0000E+000 | Column Parameter | −6 |
| Surf 1 | NSC Object 48 | Position Y: | Pickup From 4 | Scale | −1.0000E+000 | Offset | 0.0000E+000 | Column Parameter | −6 |
| Surf 1 | NSC Object 48 | Parameter 1: | Pickup From 3 | Scale | 1.0000E+000 | Offset | 0.0000E+000 | Column Parameter | −6 |
| Surf 1 | NSC Object 48 | Parameter 2: | Pickup From 3 | Scale | 1.0000E+000 | Offset | 0.0000E+000 | Column Parameter | −6 |
| Surf 1 | NSC Object 48 | Parameter 3: | Pickup From 3 | Scale | 1.0000E+000 | Offset | 0.0000E+000 | Column Parameter | −6 |
| Surf 1 | NSC Object 48 | Parameter 5: | Pickup From 43 | Scale | 1.0000E+000 | Offset | 0.0000E+000 | Column Parameter | −6 |
| Surf 1 | NSC Object 48 | Parameter 6: | Pickup From 3 | Scale | 1.0000E+000 | Offset | 0.0000E+000 | Column Parameter | −6 |
| Surf 1 | NSC Object 48 | Parameter 7: | Pickup From 3 | Scale | 1.0000E+000 | Offset | 0.0000E+000 | Column Parameter | −6 |
| Surf 1 | NSC Object 48 | Parameter 8: | Pickup From 3 | Scale | 1.0000E+000 | Offset | 0.0000E+000 | Column Parameter | −6 |
| Surf 1 | NSC Object 49 | Position Y: | Pickup From 4 | Scale | −1.0000E+000 | Offset | 0.0000E+000 | Column Parameter | −6 |
| Surf 1 | NSC Object 49 | Parameter 1: | Pickup From 3 | Scale | 1.0000E+000 | Offset | 0.0000E+000 | Column Parameter | −6 |
| Surf 1 | NSC Object 49 | Parameter 2: | Pickup From 3 | Scale | 1.0000E+000 | Offset | 0.0000E+000 | Column Parameter | −6 |
| Surf 1 | NSC Object 49 | Parameter 3: | Pickup From 3 | Scale | 1.0000E+000 | Offset | 0.0000E+000 | Column Parameter | −6 |
| Surf 1 | NSC Object 49 | Parameter 5: | Pickup From 43 | Scale | 1.0000E+000 | Offset | 0.0000E+000 | Column Parameter | −6 |
| Surf 1 | NSC Object 49 | Parameter 6: | Pickup From 3 | Scale | 1.0000E+000 | Offset | 0.0000E+000 | Column Parameter | −6 |
| Surf 1 | NSC Object 49 | Parameter 7: | Pickup From 3 | Scale | 1.0000E+000 | Offset | 0.0000E+000 | Column Parameter | −6 |
| Surf 1 | NSC Object 49 | Parameter 8: | Pickup From 3 | Scale | 1.0000E+000 | Offset | 0.0000E+000 | Column Parameter | −6 |
| Surf 1 | NSC Object 50 | Position Y: | Pickup From 4 | Scale | −1.0000E+000 | Offset | 0.0000E+000 | Column Parameter | −6 |
| Surf 1 | NSC Object 51 | Position Y: | Pickup From 4 | Scale | −1.0000E+000 | Offset | 0.0000E+000 | Column Parameter | −6 |
| Surf 1 | NSC Object 53 | Position X: | Pickup From 2 | Scale | −2.0000E+000 | Offset | 0.0000E+000 | Column Parameter | −6 |
| Surf 1 | NSC Object 53 | Parameter 1: | Pickup From 3 | Scale | 1.0000E+000 | Offset | 0.0000E+000 | Column Parameter | −6 |
| Surf 1 | NSC Object 53 | Parameter 2: | Pickup From 3 | Scale | 1.0000E+000 | Offset | 0.0000E+000 | Column Parameter | −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 53 | Parameter 3: | Pickup From 3 | Scale | 1.0000E+000 | Offset | 0.0000E+000 | Column Parameter −6 |
| Surf 1 | NSC Object 53 | Parameter 6: | Pickup From 3 | Scale | 1.0000E+000 | Offset | 0.0000E+000 | Column Parameter −6 |
| Surf 1 | NSC Object 53 | Parameter 7: | Pickup From 3 | Scale | 1.0000E+000 | Offset | 0.0000E+000 | Column Parameter −6 |
| Surf 1 | NSC Object 53 | Parameter 8: | Pickup From 3 | Scale | 1.0000E+000 | Offset | 0.0000E+000 | Column Parameter −6 |
| Surf 1 | NSC Object 54 | Position Y: | Pickup From 4 | Scale | 1.0000E+000 | Offset | 0.0000E+000 | Column Parameter −6 |
| Surf 1 | NSC Object 54 | Parameter 1: | Pickup From 3 | Scale | 1.0000E+000 | Offset | 0.0000E+000 | Column Parameter −6 |
| Surf 1 | NSC Object 54 | Parameter 2: | Pickup From 3 | Scale | 1.0000E+000 | Offset | 0.0000E+000 | Column Parameter −6 |
| Surf 1 | NSC Object 54 | Parameter 3: | Pickup From 3 | Scale | 1.0000E+000 | Offset | 0.0000E+000 | Column Parameter −6 |
| Surf 1 | NSC Object 54 | Parameter 5: | Pickup From 53 | Scale | 1.0000E+000 | Offset | 0.0000E+000 | Column Parameter −6 |
| Surf 1 | NSC Object 54 | Parameter 6: | Pickup From 3 | Scale | 1.0000E+000 | Offset | 0.0000E+000 | Column Parameter −6 |
| Surf 1 | NSC Object 54 | Parameter 7: | Pickup From 3 | Scale | 1.0000E+000 | Offset | 0.0000E+000 | Column Parameter −6 |
| Surf 1 | NSC Object 54 | Parameter 8: | Pickup From 3 | Scale | 1.0000E+000 | Offset | 0.0000E+000 | Column Parameter −6 |
| Surf 1 | NSC Object 55 | Position Y: | Pickup From 4 | Scale | 1.0000E+000 | Offset | 0.0000E+000 | Column Parameter −6 |
| Surf 1 | NSC Object 55 | Parameter 2: | Pickup From 3 | Scale | 1.0000E+000 | Offset | 0.0000E+000 | Column Parameter −6 |
| Surf 1 | NSC Object 55 | Parameter 3: | Pickup From 3 | Scale | 1.0000E+000 | Offset | 0.0000E+000 | Column Parameter −6 |
| Surf 1 | NSC Object 55 | Parameter 5: | Pickup From 53 | Scale | 1.0000E+000 | Offset | 0.0000E+000 | Column Parameter −6 |
| Surf 1 | NSC Object 55 | Parameter 6: | Pickup From 3 | Scale | 1.0000E+000 | Offset | 0.0000E+000 | Column Parameter −6 |
| Surf 1 | NSC Object 55 | Parameter 7: | Pickup From 3 | Scale | 1.0000E+000 | Offset | 0.0000E+000 | Column Parameter −6 |
| Surf 1 | NSC Object 55 | Parameter 8: | Pickup From 3 | Scale | 1.0000E+000 | Offset | 0.0000E+000 | Column Parameter −6 |
| Surf 1 | NSC Object 56 | Position Y: | Pickup From 4 | Scale | 1.0000E+000 | Offset | 0.0000E+000 | Column Parameter −6 |
| Surf 1 | NSC Object 56 | Parameter 1: | Pickup From 3 | Scale | 1.0000E+000 | Offset | 0.0000E+000 | Column Parameter −6 |
| Surf 1 | NSC Object 56 | Parameter 2: | Pickup From 3 | Scale | 1.0000E+000 | Offset | 0.0000E+000 | Column Parameter −6 |
| Surf 1 | NSC Object 56 | Parameter 3: | Pickup From 3 | Scale | 1.0000E+000 | Offset | 0.0000E+000 | Column Parameter −6 |
| Surf 1 | NSC Object 56 | Parameter 5: | Pickup From 53 | Scale | 1.0000E+000 | Offset | 0.0000E+000 | Column Parameter −6 |
| Surf 1 | NSC Object 56 | Parameter 6: | Pickup From 3 | Scale | 1.0000E+000 | Offset | 0.0000E+000 | Column Parameter −6 |
| Surf 1 | NSC Object 56 | Parameter 7: | Pickup From 3 | Scale | 1.0000E+000 | Offset | 0.0000E+000 | Column Parameter −6 |
| Surf 1 | NSC Object 56 | Parameter 8: | Pickup From 3 | Scale | 1.0000E+000 | Offset | 0.0000E+000 | Column Parameter −6 |
| Surf 1 | NSC Object 57 | Position Y: | Pickup From 4 | Scale | 1.0000E+000 | Offset | 0.0000E+000 | Column Parameter −6 |
| Surf 1 | NSC Object 57 | Parameter 1: | Pickup From 3 | Scale | 1.0000E+000 | Offset | 0.0000E+000 | Column Parameter −6 |
| Surf 1 | NSC Object 57 | Parameter 2: | Pickup From 3 | Scale | 1.0000E+000 | Offset | 0.0000E+000 | Column Parameter −6 |
| Surf 1 | NSC Object 57 | Parameter 3: | Pickup From 3 | Scale | 1.0000E+000 | Offset | 0.0000E+000 | Column Parameter −6 |
| Surf 1 | NSC Object 57 | Parameter 5: | Pickup From 53 | Scale | 1.0000E+000 | Offset | 0.0000E+000 | Column Parameter −6 |
| Surf 1 | NSC Object 57 | Parameter 6: | Pickup From 3 | Scale | 1.0000E+000 | Offset | 0.0000E+000 | Column Parameter −6 |
| Surf 1 | NSC Object 57 | Parameter 7: | Pickup From 3 | Scale | 1.0000E+000 | Offset | 0.0000E+000 | Column Parameter −6 |
| Surf 1 | NSC Object 57 | Parameter 8: | Pickup From 3 | Scale | 1.0000E+000 | Offset | 0.0000E+000 | Column Parameter −6 |
| Surf 1 | NSC Object 58 | Position Y: | Pickup From 4 | Scale | −1.0000E+000 | Offset | 0.0000E+000 | Column Parameter −6 |
| Surf 1 | NSC Object 58 | Parameter 1: | Pickup From 3 | Scale | 1.0000E+000 | Offset | 0.0000E+000 | Column Parameter −6 |
| Surf 1 | NSC Object 58 | Parameter 2: | Pickup From 3 | Scale | 1.0000E+000 | Offset | 0.0000E+000 | Column Parameter −6 |
| Surf 1 | NSC Object 58 | Parameter 3: | Pickup From 3 | Scale | 1.0000E+000 | Offset | 0.0000E+000 | Column Parameter −6 |
| Surf 1 | NSC Object 58 | Parameter 5: | Pickup From 53 | Scale | 1.0000E+000 | Offset | 0.0000E+000 | Column Parameter −6 |
| Surf 1 | NSC Object 58 | Parameter 6: | Pickup From 3 | Scale | 1.0000E+000 | Offset | 0.0000E+000 | Column Parameter −6 |
| Surf 1 | NSC Object 58 | Parameter 7: | Pickup From 3 | Scale | 1.0000E+000 | Offset | 0.0000E+000 | Column Parameter −6 |
| Surf 1 | NSC Object 58 | Parameter 8: | Pickup From 3 | Scale | 1.0000E+000 | Offset | 0.0000E+000 | Column Parameter −6 |
| Surf 1 | NSC Object 59 | Position Y: | Pickup From 4 | Scale | −1.0000E+000 | Offset | 0.0000E+000 | Column Parameter −6 |
| Surf 1 | NSC Object 59 | Parameter 1: | Pickup From 3 | Scale | 1.0000E+000 | Offset | 0.0000E+000 | Column Parameter −6 |
| Surf 1 | NSC Object 59 | Parameter 2: | Pickup From 3 | Scale | 1.0000E+000 | Offset | 0.0000E+000 | Column Parameter −6 |
| Surf 1 | NSC Object 59 | Parameter 3: | Pickup From 3 | Scale | 1.0000E+000 | Offset | 0.0000E+000 | Column Parameter −6 |
| Surf 1 | NSC Object 59 | Parameter 5: | Pickup From 53 | Scale | 1.0000E+000 | Offset | 0.0000E+000 | Column Parameter −6 |
| Surf 1 | NSC Object 59 | Parameter 6: | Pickup From 3 | Scale | 1.0000E+000 | Offset | 0.0000E+000 | Column Parameter −6 |
| Surf 1 | NSC Object 59 | Parameter 7: | Pickup From 3 | Scale | 1.0000E+000 | Offset | 0.0000E+000 | Column Parameter −6 |
| Surf 1 | NSC Object 59 | Parameter 8: | Pickup From 3 | Scale | 1.0000E+000 | Offset | 0.0000E+000 | Column Parameter −6 |
| Surf 1 | NSC Object 60 | Position Y: | Pickup From 4 | Scale | −1.0000E+000 | Offset | 0.0000E+000 | Column Parameter −6 |
| Surf 1 | NSC Object 60 | Parameter 1: | Pickup From 3 | Scale | 1.0000E+000 | Offset | 0.0000E+000 | Column Parameter −6 |
| Surf 1 | NSC Object 60 | Parameter 2: | Pickup From 3 | Scale | 1.0000E+000 | Offset | 0.0000E+000 | Column Parameter −6 |
| Surf 1 | NSC Object 60 | Parameter 3: | Pickup From 3 | Scale | 1.0000E+000 | Offset | 0.0000E+000 | Column Parameter −6 |
| Surf 1 | NSC Object 60 | Parameter 5: | Pickup From 53 | Scale | 1.0000E+000 | Offset | 0.0000E+000 | Column Parameter −6 |
| Surf 1 | NSC Object 60 | Parameter 6: | Pickup From 3 | Scale | 1.0000E+000 | Offset | 0.0000E+000 | Column Parameter −6 |
| Surf 1 | NSC Object 60 | Parameter 7: | Pickup From 3 | Scale | 1.0000E+000 | Offset | 0.0000E+000 | Column Parameter −6 |
| Surf 1 | NSC Object 60 | Parameter 8: | Pickup From 3 | Scale | 1.0000E+000 | Offset | 0.0000E+000 | Column Parameter −6 |
| Surf 1 | NSC Object 61 | Position Y: | Pickup From 4 | Scale | −1.0000E+000 | Offset | 0.0000E+000 | Column Parameter −6 |
| Surf 1 | NSC Object 61 | Parameter 1: | Pickup From 3 | Scale | 1.0000E+000 | Offset | 0.0000E+000 | Column Parameter −6 |
| Surf 1 | NSC Object 61 | Parameter 2: | Pickup From 3 | Scale | 1.0000E+000 | Offset | 0.0000E+000 | Column Parameter −6 |
| Surf 1 | NSC Object 61 | Parameter 3: | Pickup From 3 | Scale | 1.0000E+000 | Offset | 0.0000E+000 | Column Parameter −6 |
| Surf 1 | NSC Object 61 | Parameter 5: | Pickup From 53 | Scale | 1.0000E+000 | Offset | 0.0000E+000 | Column Parameter −6 |
| Surf 1 | NSC Object 61 | Parameter 6: | Pickup From 3 | Scale | 1.0000E+000 | Offset | 0.0000E+000 | Column Parameter −6 |
| Surf 1 | NSC Object 61 | Parameter 7: | Pickup From 3 | Scale | 1.0000E+000 | Offset | 0.0000E+000 | Column Parameter −6 |
| Surf 1 | NSC Object 61 | Parameter 8: | Pickup From 3 | Scale | 1.0000E+000 | Offset | 0.0000E+000 | Column Parameter −6 |
| Surf 1 | NSC Object 63 | Position X: | Pickup From 2 | Scale | −4.0000E+000 | Offset | 0.0000E+000 | Column Parameter −6 |
| Surf 1 | NSC Object 63 | Parameter 1: | Pickup From 3 | Scale | 1.0000E+000 | Offset | 0.0000E+000 | Column Parameter −6 |
| Surf 1 | NSC Object 63 | Parameter 2: | Pickup From 3 | Scale | 1.0000E+000 | Offset | 0.0000E+000 | Column Parameter −6 |
| Surf 1 | NSC Object 63 | Parameter 3: | Pickup From 3 | Scale | 1.0000E+000 | Offset | 0.0000E+000 | Column Parameter −6 |
| Surf 1 | NSC Object 63 | Parameter 6: | Pickup From 3 | Scale | 1.0000E+000 | Offset | 0.0000E+000 | Column Parameter −6 |
| Surf 1 | NSC Object 63 | Parameter 7: | Pickup From 3 | Scale | 1.0000E+000 | Offset | 0.0000E+000 | Column Parameter −6 |
| Surf 1 | NSC Object 63 | Parameter 8: | Pickup From 3 | Scale | 1.0000E+000 | Offset | 0.0000E+000 | Column Parameter −6 |
| Surf 1 | NSC Object 64 | Position Y: | Pickup From 4 | Scale | 1.0000E+000 | Offset | 0.0000E+000 | Column Parameter −6 |
| Surf 1 | NSC Object 64 | Parameter 1: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | |
|---|---|---|---|---|---|---|---|---|
| Surf 1 | NSC Object 64 | Parameter 2: | Pickup From 3 | Scale | 1.0000E+000 | Offset | 0.0000E+000 | Column Parameter −6 |
| Surf 1 | NSC Object 64 | Parameter 3: | Pickup From 3 | Scale | 1.0000E+000 | Offset | 0.0000E+000 | Column Parameter −6 |
| Surf 1 | NSC Object 64 | Parameter 5: | Pickup From 63 | Scale | 1.0000E+000 | Offset | 0.0000E+000 | Column Parameter −6 |
| Surf 1 | NSC Object 64 | Parameter 6: | Pickup From 3 | Scale | 1.0000E+000 | Offset | 0.0000E+000 | Column Parameter −6 |
| Surf 1 | NSC Object 64 | Parameter 7: | Pickup From 3 | Scale | 1.0000E+000 | Offset | 0.0000E+000 | Column Parameter −6 |
| Surf 1 | NSC Object 64 | Parameter 8: | Pickup From 3 | Scale | 1.0000E+000 | Offset | 0.0000E+000 | Column Parameter −6 |
| Surf 1 | NSC Object 65 | Position Y: | Pickup From 4 | Scale | 1.0000E+000 | Offset | 0.0000E+000 | Column Parameter −6 |
| Surf 1 | NSC Object 65 | Parameter 1: | Pickup From 3 | Scale | 1.0000E+000 | Offset | 0.0000E+000 | Column Parameter −6 |
| Surf 1 | NSC Object 65 | Parameter 2: | Pickup From 3 | Scale | 1.0000E+000 | Offset | 0.0000E+000 | Column Parameter −6 |
| Surf 1 | NSC Object 65 | Parameter 3: | Pickup From 3 | Scale | 1.0000E+000 | Offset | 0.0000E+000 | Column Parameter −6 |
| Surf 1 | NSC Object 65 | Parameter 5: | Pickup From 63 | Scale | 1.0000E+000 | Offset | 0.0000E+000 | Column Parameter −6 |
| Surf 1 | NSC Object 65 | Parameter 6: | Pickup From 3 | Scale | 1.0000E+000 | Offset | 0.0000E+000 | Column Parameter −6 |
| Surf 1 | NSC Object 65 | Parameter 7: | Pickup From 3 | Scale | 1.0000E+000 | Offset | 0.0000E+000 | Column Parameter −6 |
| Surf 1 | NSC Object 65 | Parameter 8: | Pickup From 3 | Scale | 1.0000E+000 | Offset | 0.0000E+000 | Column Parameter −6 |
| Surf 1 | NSC Object 66 | Position Y: | Pickup From 4 | Scale | 1.0000E+000 | Offset | 0.0000E+000 | Column Parameter −6 |
| Surf 1 | NSC Object 66 | Parameter 1: | Pickup From 3 | Scale | 1.0000E+000 | Offset | 0.0000E+000 | Column Parameter −6 |
| Surf 1 | NSC Object 66 | Parameter 2: | Pickup From 3 | Scale | 1.0000E+000 | Offset | 0.0000E+000 | Column Parameter −6 |
| Surf 1 | NSC Object 66 | Parameter 3: | Pickup From 3 | Scale | 1.0000E+000 | Offset | 0.0000E+000 | Column Parameter −6 |
| Surf 1 | NSC Object 66 | Parameter 5: | Pickup From 63 | Scale | 1.0000E+000 | Offset | 0.0000E+000 | Column Parameter −6 |
| Surf 1 | NSC Object 66 | Parameter 6: | Pickup From 3 | Scale | 1.0000E+000 | Offset | 0.0000E+000 | Column Parameter −6 |
| Surf 1 | NSC Object 66 | Parameter 7: | Pickup From 3 | Scale | 1.0000E+000 | Offset | 0.0000E+000 | Column Parameter −6 |
| Surf 1 | NSC Object 66 | Parameter 8: | Pickup From 3 | Scale | 1.0000E+000 | Offset | 0.0000E+000 | Column Parameter −6 |
| Surf 1 | NSC Object 67 | Position Y: | Pickup From 4 | Scale | 1.0000E+000 | Offset | 0.0000E+000 | Column Parameter −6 |
| Surf 1 | NSC Object 67 | Parameter 1: | Pickup From 3 | Scale | 1.0000E+000 | Offset | 0.0000E+000 | Column Parameter −6 |
| Surf 1 | NSC Object 67 | Parameter 2: | Pickup From 3 | Scale | 1.0000E+000 | Offset | 0.0000E+000 | Column Parameter −6 |
| Surf 1 | NSC Object 67 | Parameter 3: | Pickup From 3 | Scale | 1.0000E+000 | Offset | 0.0000E+000 | Column Parameter −6 |
| Surf 1 | NSC Object 67 | Parameter 5: | Pickup From 63 | Scale | 1.0000E+000 | Offset | 0.0000E+000 | Column Parameter −6 |
| Surf 1 | NSC Object 67 | Parameter 6: | Pickup From 3 | Scale | 1.0000E+000 | Offset | 0.0000E+000 | Column Parameter −6 |
| Surf 1 | NSC Object 67 | Parameter 7: | Pickup From 3 | Scale | 1.0000E+000 | Offset | 0.0000E+000 | Column Parameter −6 |
| Surf 1 | NSC Object 67 | Parameter 8: | Pickup From 3 | Scale | 1.0000E+000 | Offset | 0.0000E+000 | Column Parameter −6 |
| Surf 1 | NSC Object 68 | Position Y: | Pickup From 4 | Scale | −1.0000E+000 | Offset | 0.0000E+000 | Column Parameter −6 |
| Surf 1 | NSC Object 68 | Parameter 1: | Pickup From 3 | Scale | 1.0000E+000 | Offset | 0.0000E+000 | Column Parameter −6 |
| Surf 1 | NSC Object 68 | Parameter 2: | Pickup From 3 | Scale | 1.0000E+000 | Offset | 0.0000E+000 | Column Parameter −6 |
| Surf 1 | NSC Object 68 | Parameter 3: | Pickup From 3 | Scale | 1.0000E+000 | Offset | 0.0000E+000 | Column Parameter −6 |
| Surf 1 | NSC Object 68 | Parameter 5: | Pickup From 63 | Scale | 1.0000E+000 | Offset | 0.0000E+000 | Column Parameter −6 |
| Surf 1 | NSC Object 68 | Parameter 6: | Pickup From 3 | Scale | 1.0000E+000 | Offset | 0.0000E+000 | Column Parameter −6 |
| Surf 1 | NSC Object 68 | Parameter 7: | Pickup From 3 | Scale | 1.0000E+000 | Offset | 0.0000E+000 | Column Parameter −6 |
| Surf 1 | NSC Object 68 | Parameter 8: | Pickup From 3 | Scale | 1.0000E+000 | Offset | 0.0000E+000 | Column Parameter −6 |
| Surf 1 | NSC Object 69 | Position Y: | Pickup From 4 | Scale | −1.0000E+000 | Offset | 0.0000E+000 | Column Parameter −6 |
| Surf 1 | NSC Object 69 | Parameter 1: | Pickup From 3 | Scale | 1.0000E+000 | Offset | 0.0000E+000 | Column Parameter −6 |
| Surf 1 | NSC Object 69 | Parameter 2: | Pickup From 3 | Scale | 1.0000E+000 | Offset | 0.0000E+000 | Column Parameter −6 |
| Surf 1 | NSC Object 69 | Parameter 3: | Pickup From 3 | Scale | 1.0000E+000 | Offset | 0.0000E+000 | Column Parameter −6 |
| Surf 1 | NSC Object 69 | Parameter 5: | Pickup From 63 | Scale | 1.0000E+000 | Offset | 0.0000E+000 | Column Parameter −6 |
| Surf 1 | NSC Object 69 | Parameter 6: | Pickup From 3 | Scale | 1.0000E+000 | Offset | 0.0000E+000 | Column Parameter −6 |
| Surf 1 | NSC Object 69 | Parameter 7: | Pickup From 3 | Scale | 1.0000E+000 | Offset | 0.0000E+000 | Column Parameter −6 |
| Surf 1 | NSC Object 69 | Parameter 8: | Pickup From 3 | Scale | 1.0000E+000 | Offset | 0.0000E+000 | Column Parameter −6 |
| Surf 1 | NSC Object 70 | Position Y: | Pickup From 4 | Scale | −1.0000E+000 | Offset | 0.0000E+000 | Column Parameter −6 |
| Surf 1 | NSC Object 70 | Parameter 1: | Pickup From 3 | Scale | 1.0000E+000 | Offset | 0.0000E+000 | Column Parameter −6 |
| Surf 1 | NSC Object 70 | Parameter 2: | Pickup From 3 | Scale | 1.0000E+000 | Offset | 0.0000E+000 | Column Parameter −6 |
| Surf 1 | NSC Object 70 | Parameter 3: | Pickup From 3 | Scale | 1.0000E+000 | Offset | 0.0000E+000 | Column Parameter −6 |
| Surf 1 | NSC Object 70 | Parameter 5: | Pickup From 63 | Scale | 1.0000E+000 | Offset | 0.0000E+000 | Column Parameter −6 |
| Surf 1 | NSC Object 70 | Parameter 6: | Pickup From 3 | Scale | 1.0000E+000 | Offset | 0.0000E+000 | Column Parameter −6 |
| Surf 1 | NSC Object 70 | Parameter 7: | Pickup From 3 | Scale | 1.0000E+000 | Offset | 0.0000E+000 | Column Parameter −6 |
| Surf 1 | NSC Object 70 | Parameter 8: | Pickup From 3 | Scale | 1.0000E+000 | Offset | 0.0000E+000 | Column Parameter −6 |
| Surf 1 | NSC Object 71 | Position Y: | Pickup From 4 | Scale | −1.0000E+000 | Offset | 0.0000E+000 | Column Parameter −6 |
| Surf 1 | NSC Object 71 | Parameter 1: | Pickup From 3 | Scale | 1.0000E+000 | Offset | 0.0000E+000 | Column Parameter −6 |
| Surf 1 | NSC Object 71 | Parameter 2: | Pickup From 3 | Scale | 1.0000E+000 | Offset | 0.0000E+000 | Column Parameter −6 |
| Surf 1 | NSC Object 71 | Parameter 3: | Pickup From 3 | Scale | 1.0000E+000 | Offset | 0.0000E+000 | Column Parameter −6 |
| Surf 1 | NSC Object 71 | Parameter 5: | Pickup From 63 | Scale | 1.0000E+000 | Offset | 0.0000E+000 | Column Parameter −6 |
| Surf 1 | NSC Object 71 | Parameter 6: | Pickup From 3 | Scale | 1.0000E+000 | Offset | 0.0000E+000 | Column Parameter −6 |
| Surf 1 | NSC Object 71 | Parameter 7: | Pickup From 3 | Scale | 1.0000E+000 | Offset | 0.0000E+000 | Column Parameter −6 |
| Surf 1 | NSC Object 71 | Parameter 8: | Pickup From 3 | Scale | 1.0000E+000 | Offset | 0.0000E+000 | Column Parameter −6 |
| Surf 1 | NSC Object 73 | Position X: | Pickup From 2 | Scale | −6.0000E+000 | Offset | 0.0000E+000 | Column Parameter −6 |
| Surf 1 | NSC Object 73 | Parameter 1: | Pickup From 3 | Scale | 1.0000E+000 | Offset | 0.0000E+000 | Column Parameter −6 |
| Surf 1 | NSC Object 73 | Parameter 2: | Pickup From 3 | Scale | 1.0000E+000 | Offset | 0.0000E+000 | Column Parameter −6 |
| Surf 1 | NSC Object 73 | Parameter 3: | Pickup From 3 | Scale | 1.0000E+000 | Offset | 0.0000E+000 | Column Parameter −6 |
| Surf 1 | NSC Object 73 | Parameter 6: | Pickup From 3 | Scale | 1.0000E+000 | Offset | 0.0000E+000 | Column Parameter −6 |
| Surf 1 | NSC Object 73 | Parameter 7: | Pickup From 3 | Scale | 1.0000E+000 | Offset | 0.0000E+000 | Column Parameter −6 |
| Surf 1 | NSC Object 73 | Parameter 8: | Pickup From 3 | Scale | 1.0000E+000 | Offset | 0.0000E+000 | Column Parameter −6 |
| Surf 1 | NSC Object 74 | Position Y: | Pickup From 4 | Scale | 1.0000E+000 | Offset | 0.0000E+000 | Column Parameter −6 |
| Surf 1 | NSC Object 74 | Parameter 1: | Pickup From 3 | Scale | 1.0000E+000 | Offset | 0.0000E+000 | Column Parameter −6 |
| Surf 1 | NSC Object 74 | Parameter 2: | Pickup From 3 | Scale | 1.0000E+000 | Offset | 0.0000E+000 | Column Parameter −6 |
| Surf 1 | NSC Object 74 | Parameter 3: | Pickup From 3 | Scale | 1.0000E+000 | Offset | 0.0000E+000 | Column Parameter −6 |
| Surf 1 | NSC Object 74 | Parameter 5: | Pickup From 73 | Scale | 1.0000E+000 | Offset | 0.0000E+000 | Column Parameter −6 |
| Surf 1 | NSC Object 74 | Parameter 6: | Pickup From 3 | Scale | 1.0000E+000 | Offset | 0.0000E+000 | Column Parameter −6 |
| Surf 1 | NSC Object 74 | Parameter 7: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 74 | Parameter 8: | Pickup From 3 | Scale | 1.0000E+000 | Offset | 0.0000E+000 | Column Parameter −6 |
| Surf 1 | NSC Object 75 | Position Y: | Pickup From 4 | Scale | 1.0000E+000 | Offset | 0.0000E+000 | Column Parameter −6 |
| Surf 1 | NSC Object 75 | Parameter 1: | Pickup From 3 | Scale | 1.0000E+000 | Offset | 0.0000E+000 | Column Parameter −6 |
| Surf 1 | NSC Object 75 | Parameter 2: | Pickup From 3 | Scale | 1.0000E+000 | Offset | 0.0000E+000 | Column Parameter −6 |
| Surf 1 | NSC Object 75 | Parameter 3: | Pickup From 3 | Scale | 1.0000E+000 | Offset | 0.0000E+000 | Column Parameter −6 |
| Surf 1 | NSC Object 75 | Parameter 5: | Pickup From 73 | Scale | 1.0000E+000 | Offset | 0.0000E+000 | Column Parameter −6 |
| Surf 1 | NSC Object 75 | Parameter 6: | Pickup From 3 | Scale | 1.0000E+000 | Offset | 0.0000E+000 | Column Parameter −6 |
| Surf 1 | NSC Object 75 | Parameter 7: | Pickup From 3 | Scale | 1.0000E+000 | Offset | 0.0000E+000 | Column Parameter −6 |
| Surf 1 | NSC Object 75 | Parameter 8: | Pickup From 3 | Scale | 1.0000E+000 | Offset | 0.0000E+000 | Column Parameter −6 |
| Surf 1 | NSC Object 76 | Position Y: | Pickup From 4 | Scale | 1.0000E+000 | Offset | 0.0000E+000 | Column Parameter −6 |
| Surf 1 | NSC Object 76 | Parameter 1: | Pickup From 3 | Scale | 1.0000E+000 | Offset | 0.0000E+000 | Column Parameter −6 |
| Surf 1 | NSC Object 76 | Parameter 2: | Pickup From 3 | Scale | 1.0000E+000 | Offset | 0.0000E+000 | Column Parameter −6 |
| Surf 1 | NSC Object 76 | Parameter 3: | Pickup From 3 | Scale | 1.0000E+000 | Offset | 0.0000E+000 | Column Parameter −6 |
| Surf 1 | NSC Object 76 | Parameter 5: | Pickup From 73 | Scale | 1.0000E+000 | Offset | 0.0000E+000 | Column Parameter −6 |
| Surf 1 | NSC Object 76 | Parameter 6: | Pickup From 3 | Scale | 1.0000E+000 | Offset | 0.0000E+000 | Column Parameter −6 |
| Surf 1 | NSC Object 76 | Parameter 7: | Pickup From 3 | Scale | 1.0000E+000 | Offset | 0.0000E+000 | Column Parameter −6 |
| Surf 1 | NSC Object 76 | Parameter 8: | Pickup From 3 | Scale | 1.0000E+000 | Offset | 0.0000E+000 | Column Parameter −6 |
| Surf 1 | NSC Object 77 | Position Y: | Pickup From 4 | Scale | 1.0000E+000 | Offset | 0.0000E+000 | Column Parameter −6 |
| Surf 1 | NSC Object 78 | Position Y: | Pickup From 4 | Scale | −1.0000E+000 | Offset | 0.0000E+000 | Column Parameter −6 |
| Surf 1 | NSC Object 78 | Parameter 1: | Pickup From 3 | Scale | 1.0000E+000 | Offset | 0.0000E+000 | Column Parameter −6 |
| Surf 1 | NSC Object 78 | Parameter 2: | Pickup From 3 | Scale | 1.0000E+000 | Offset | 0.0000E+000 | Column Parameter −6 |
| Surf 1 | NSC Object 78 | Parameter 3: | Pickup From 3 | Scale | 1.0000E+000 | Offset | 0.0000E+000 | Column Parameter −6 |
| Surf 1 | NSC Object 78 | Parameter 5: | Pickup From 73 | Scale | 1.0000E+000 | Offset | 0.0000E+000 | Column Parameter −6 |
| Surf 1 | NSC Object 78 | Parameter 6: | Pickup From 3 | Scale | 1.0000E+000 | Offset | 0.0000E+000 | Column Parameter −6 |
| Surf 1 | NSC Object 78 | Parameter 7: | Pickup From 3 | Scale | 1.0000E+000 | Offset | 0.0000E+000 | Column Parameter −6 |
| Surf 1 | NSC Object 78 | Parameter 8: | Pickup From 3 | Scale | 1.0000E+000 | Offset | 0.0000E+000 | Column Parameter −6 |
| Surf 1 | NSC Object 79 | Position Y: | Pickup From 4 | Scale | −1.0000E+000 | Offset | 0.0000E+000 | Column Parameter −6 |
| Surf 1 | NSC Object 79 | Parameter 1: | Pickup From 3 | Scale | 1.0000E+000 | Offset | 0.0000E+000 | Column Parameter −6 |
| Surf 1 | NSC Object 79 | Parameter 2: | Pickup From 3 | Scale | 1.0000E+000 | Offset | 0.0000E+000 | Column Parameter −6 |
| Surf 1 | NSC Object 79 | Parameter 3: | Pickup From 3 | Scale | 1.0000E+000 | Offset | 0.0000E+000 | Column Parameter −6 |
| Surf 1 | NSC Object 79 | Parameter 5: | Pickup From 73 | Scale | 1.0000E+000 | Offset | 0.0000E+000 | Column Parameter −6 |
| Surf 1 | NSC Object 79 | Parameter 6: | Pickup From 3 | Scale | 1.0000E+000 | Offset | 0.0000E+000 | Column Parameter −6 |
| Surf 1 | NSC Object 79 | Parameter 7: | Pickup From 3 | Scale | 1.0000E+000 | Offset | 0.0000E+000 | Column Parameter −6 |
| Surf 1 | NSC Object 79 | Parameter 8: | Pickup From 3 | Scale | 1.0000E+000 | Offset | 0.0000E+000 | Column Parameter −6 |
| Surf 1 | NSC Object 80 | Position Y: | Pickup From 4 | Scale | −1.0000E+000 | Offset | 0.0000E+000 | Column Parameter −6 |
| Surf 1 | NSC Object 80 | Parameter 1: | Pickup From 3 | Scale | 1.0000E+000 | Offset | 0.0000E+000 | Column Parameter −6 |
| Surf 1 | NSC Object 80 | Parameter 2: | Pickup From 3 | Scale | 1.0000E+000 | Offset | 0.0000E+000 | Column Parameter −6 |
| Surf 1 | NSC Object 80 | Parameter 3: | Pickup From 3 | Scale | 1.0000E+000 | Offset | 0.0000E+000 | Column Parameter −6 |
| Surf 1 | NSC Object 80 | Parameter 5: | Pickup From 73 | Scale | 1.0000E+000 | Offset | 0.0000E+000 | Column Parameter −6 |
| Surf 1 | NSC Object 80 | Parameter 6: | Pickup From 3 | Scale | 1.0000E+000 | Offset | 0.0000E+000 | Column Parameter −6 |
| Surf 1 | NSC Object 80 | Parameter 7: | Pickup From 3 | Scale | 1.0000E+000 | Offset | 0.0000E+000 | Column Parameter −6 |
| Surf 1 | NSC Object 80 | Parameter 8: | Pickup From 3 | Scale | 1.0000E+000 | Offset | 0.0000E+000 | Column Parameter −6 |
| Surf 1 | NSC Object 81 | Position Y: | Pickup From 4 | Scale | −1.0000E+000 | Offset | 0.0000E+000 | Column Parameter −6 |
| Surf 1 | NSC Object 83 | Position X: | Pickup From 2 | Scale | −8.0000E+000 | Offset | 0.0000E+000 | Column Parameter −6 |
| Surf 1 | NSC Object 83 | Parameter 1: | Pickup From 3 | Scale | 1.0000E+000 | Offset | 0.0000E+000 | Column Parameter −6 |
| Surf 1 | NSC Object 83 | Parameter 2: | Pickup From 3 | Scale | 1.0000E+000 | Offset | 0.0000E+000 | Column Parameter −6 |
| Surf 1 | NSC Object 83 | Parameter 3: | Pickup From 3 | Scale | 1.0000E+000 | Offset | 0.0000E+000 | Column Parameter −6 |
| Surf 1 | NSC Object 83 | Parameter 6: | Pickup From 3 | Scale | 1.0000E+000 | Offset | 0.0000E+000 | Column Parameter −6 |
| Surf 1 | NSC Object 83 | Parameter 7: | Pickup From 3 | Scale | 1.0000E+000 | Offset | 0.0000E+000 | Column Parameter −6 |
| Surf 1 | NSC Object 83 | Parameter 8: | Pickup From 3 | Scale | 1.0000E+000 | Offset | 0.0000E+000 | Column Parameter −6 |
| Surf 1 | NSC Object 84 | Position Y: | Pickup From 4 | Scale | 1.0000E+000 | Offset | 0.0000E+000 | Column Parameter −6 |
| Surf 1 | NSC Object 84 | Parameter 1: | Pickup From 3 | Scale | 1.0000E+000 | Offset | 0.0000E+000 | Column Parameter −6 |
| Surf 1 | NSC Object 84 | Parameter 2: | Pickup From 3 | Scale | 1.0000E+000 | Offset | 0.0000E+000 | Column Parameter −6 |
| Surf 1 | NSC Object 84 | Parameter 3: | Pickup From 3 | Scale | 1.0000E+000 | Offset | 0.0000E+000 | Column Parameter −6 |
| Surf 1 | NSC Object 84 | Parameter 5: | Pickup From 83 | Scale | 1.0000E+000 | Offset | 0.0000E+000 | Column Parameter −6 |
| Surf 1 | NSC Object 84 | Parameter 6: | Pickup From 3 | Scale | 1.0000E+000 | Offset | 0.0000E+000 | Column Parameter −6 |
| Surf 1 | NSC Object 84 | Parameter 7: | Pickup From 3 | Scale | 1.0000E+000 | Offset | 0.0000E+000 | Column Parameter −6 |
| Surf 1 | NSC Object 84 | Parameter 8: | Pickup From 3 | Scale | 1.0000E+000 | Offset | 0.0000E+000 | Column Parameter −6 |
| Surf 1 | NSC Object 85 | Position Y: | Pickup From 4 | Scale | 1.0000E+000 | Offset | 0.0000E+000 | Column Parameter −6 |
| Surf 1 | NSC Object 85 | Parameter 1: | Pickup From 3 | Scale | 1.0000E+000 | Offset | 0.0000E+000 | Column Parameter −6 |
| Surf 1 | NSC Object 85 | Parameter 2: | Pickup From 3 | Scale | 1.0000E+000 | Offset | 0.0000E+000 | Column Parameter −6 |
| Surf 1 | NSC Object 85 | Parameter 3: | Pickup From 3 | Scale | 1.0000E+000 | Offset | 0.0000E+000 | Column Parameter −6 |
| Surf 1 | NSC Object 85 | Parameter 5: | Pickup From 83 | Scale | 1.0000E+000 | Offset | 0.0000E+000 | Column Parameter −6 |
| Surf 1 | NSC Object 85 | Parameter 6: | Pickup From 3 | Scale | 1.0000E+000 | Offset | 0.0000E+000 | Column Parameter −6 |
| Surf 1 | NSC Object 85 | Parameter 7: | Pickup From 3 | Scale | 1.0000E+000 | Offset | 0.0000E+000 | Column Parameter −6 |
| Surf 1 | NSC Object 85 | Parameter 8: | Pickup From 3 | Scale | 1.0000E+000 | Offset | 0.0000E+000 | Column Parameter −6 |
| Surf 1 | NSC Object 86 | Position Y: | Pickup From 4 | Scale | 1.0000E+000 | Offset | 0.0000E+000 | Column Parameter −6 |
| Surf 1 | NSC Object 87 | Position Y: | Pickup From 4 | Scale | 1.0000E+000 | Offset | 0.0000E+000 | Column Parameter −6 |
| Surf 1 | NSC Object 88 | Position Y: | Pickup From 4 | Scale | −1.0000E+000 | Offset | 0.0000E+000 | Column Parameter −6 |
| Surf 1 | NSC Object 88 | Parameter 1: | Pickup From 3 | Scale | 1.0000E+000 | Offset | 0.0000E+000 | Column Parameter −6 |
| Surf 1 | NSC Object 88 | Parameter 2: | Pickup From 3 | Scale | 1.0000E+000 | Offset | 0.0000E+000 | Column Parameter −6 |
| Surf 1 | NSC Object 88 | Parameter 3: | Pickup From 3 | Scale | 1.0000E+000 | Offset | 0.0000E+000 | Column Parameter −6 |
| Surf 1 | NSC Object 88 | Parameter 5: | Pickup From 83 | Scale | 1.0000E+000 | Offset | 0.0000E+000 | Column Parameter −6 |
| Surf 1 | NSC Object 88 | Parameter 6: | Pickup From 3 | Scale | 1.0000E+000 | Offset | 0.0000E+000 | Column Parameter −6 |
| Surf 1 | NSC Object 88 | Parameter 7: | Pickup From 3 | Scale | 1.0000E+000 | Offset | 0.0000E+000 | Column Parameter −6 |
| Surf 1 | NSC Object 88 | Parameter 8: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| Surf 1 | NSC Object 89 | Position Y: | Pickup From 4 | Scale | −1.0000E+000 | Offset | 0.0000E+000 | Column Parameter −6 |
|---|---|---|---|---|---|---|---|---|
| Surf 1 | NSC Object 89 | Parameter 1: | Pickup From 3 | Scale | 1.0000E+000 | Offset | 0.0000E+000 | Column Parameter −6 |
| Surf 1 | NSC Object 89 | Parameter 2: | Pickup From 3 | Scale | 1.0000E+000 | Offset | 0.0000E+000 | Column Parameter −6 |
| Surf 1 | NSC Object 89 | Parameter 3: | Pickup From 3 | Scale | 1.0000E+000 | Offset | 0.0000E+000 | Column Parameter −6 |
| Surf 1 | NSC Object 89 | Parameter 5: | Pickup From 83 | Scale | 1.0000E+000 | Offset | 0.0000E+000 | Column Parameter −6 |
| Surf 1 | NSC Object 89 | Parameter 6: | Pickup From 3 | Scale | 1.0000E+000 | Offset | 0.0000E+000 | Column Parameter −6 |
| Surf 1 | NSC Object 89 | Parameter 7: | Pickup From 3 | Scale | 1.0000E+000 | Offset | 0.0000E+000 | Column Parameter −6 |
| Surf 1 | NSC Object 89 | Parameter 8: | Pickup From 3 | Scale | 1.0000E+000 | Offset | 0.0000E+000 | Column Parameter −6 |
| Surf 1 | NSC Object 90 | Position Y: | Pickup From 4 | Scale | −1.0000E+000 | Offset | 0.0000E+000 | Column Parameter −6 |
| Surf 1 | NSC Object 91 | Position Y: | Pickup From 4 | Scale | −1.0000E+000 | Offset | 0.0000E+000 | Column Parameter −6 |
| Surf 1 | NSC Object 97 | Parameter 2: | Pickup From 3 | Scale | 1.0000E+000 | Offset | 0.0000E+000 | Column Parameter −6 |
| Surf 1 | NSC Object 98 | Parameter 1: | Pickup From 3 | Scale | 1.0000E+000 | Offset | 0.0000E+000 | Column Parameter −6 |
| Surf 1 | NSC Object 98 | Parameter 2: | Pickup From 3 | Scale | 1.0000E+000 | Offset | 0.0000E+000 | Column Parameter −6 |
| Surf 1 | NSC Object 98 | Parameter 3: | Pickup From 3 | Scale | 1.0000E+000 | Offset | 0.0000E+000 | Column Parameter −6 |
| Surf 1 | NSC Object 98 | Parameter 5: | Pickup From 3 | Scale | 1.0000E+000 | Offset | 0.0000E+000 | Column Parameter −6 |
| Surf 1 | NSC Object 98 | Parameter 6: | Pickup From 3 | Scale | 1.0000E+000 | Offset | 0.0000E+000 | Column Parameter −6 |
| Surf 1 | NSC Object 98 | Parameter 7: | Pickup From 3 | Scale | 1.0000E+000 | Offset | 0.0000E+000 | Column Parameter −6 |
| Surf 1 | NSC Object 98 | Parameter 8: | Pickup From 3 | Scale | 1.0000E+000 | Offset | 0.0000E+000 | Column Parameter −6 |
| Surf 1 | NSC Object 99 | Position Y: | Pickup From 4 | Scale | 1.0000E+000 | Offset | 0.0000E+000 | Column Parameter −6 |
| Surf 1 | NSC Object 99 | Parameter 1: | Pickup From 3 | Scale | 1.0000E+000 | Offset | 0.0000E+000 | Column Parameter −6 |
| Surf 1 | NSC Object 99 | Parameter 2: | Pickup From 3 | Scale | 1.0000E+000 | Offset | 0.0000E+000 | Column Parameter −6 |
| Surf 1 | NSC Object 99 | Parameter 3: | Pickup From 3 | Scale | 1.0000E+000 | Offset | 0.0000E+000 | Column Parameter −6 |
| Surf 1 | NSC Object 99 | Parameter 5: | Pickup From 3 | Scale | 1.0000E+000 | Offset | 0.0000E+000 | Column Parameter −6 |
| Surf 1 | NSC Object 99 | Parameter 6: | Pickup From 3 | Scale | 1.0000E+000 | Offset | 0.0000E+000 | Column Parameter −6 |
| Surf 1 | NSC Object 99 | Parameter 7: | Pickup From 3 | Scale | 1.0000E+000 | Offset | 0.0000E+000 | Column Parameter −6 |
| Surf 1 | NSC Object 99 | Parameter 8: | Pickup From 3 | Scale | 1.0000E+000 | Offset | 0.0000E+000 | Column Parameter −6 |
| Surf 1 | NSC Object 100 | Position Y: | Pickup From 4 | Scale | 1.0000E+000 | Offset | 0.0000E+000 | Column Parameter −6 |
| Surf 1 | NSC Object 100 | Parameter 1: | Pickup From 3 | Scale | 1.0000E+000 | Offset | 0.0000E+000 | Column Parameter −6 |
| Surf 1 | NSC Object 100 | Parameter 2: | Pickup From 3 | Scale | 1.0000E+000 | Offset | 0.0000E+000 | Column Parameter −6 |
| Surf 1 | NSC Object 100 | Parameter 3: | Pickup From 3 | Scale | 1.0000E+000 | Offset | 0.0000E+000 | Column Parameter −6 |
| Surf 1 | NSC Object 100 | Parameter 5: | Pickup From 3 | Scale | 1.0000E+000 | Offset | 0.0000E+000 | Column Parameter −6 |
| Surf 1 | NSC Object 100 | Parameter 6: | Pickup From 3 | Scale | 1.0000E+000 | Offset | 0.0000E+000 | Column Parameter −6 |
| Surf 1 | NSC Object 100 | Parameter 7: | Pickup From 3 | Scale | 1.0000E+000 | Offset | 0.0000E+000 | Column Parameter −6 |
| Surf 1 | NSC Object 100 | Parameter 8: | Pickup From 3 | Scale | 1.0000E+000 | Offset | 0.0000E+000 | Column Parameter −6 |
| Surf 1 | NSC Object 101 | Position Y: | Pickup From 4 | Scale | 1.0000E+000 | Offset | 0.0000E+000 | Column Parameter −6 |
| Surf 1 | NSC Object 101 | Parameter 1: | Pickup From 3 | Scale | 1.0000E+000 | Offset | 0.0000E+000 | Column Parameter −6 |
| Surf 1 | NSC Object 101 | Parameter 2: | Pickup From 3 | Scale | 1.0000E+000 | Offset | 0.0000E+000 | Column Parameter −6 |
| Surf 1 | NSC Object 101 | Parameter 3: | Pickup From 3 | Scale | 1.0000E+000 | Offset | 0.0000E+000 | Column Parameter −6 |
| Surf 1 | NSC Object 101 | Parameter 5: | Pickup From 3 | Scale | 1.0000E+000 | Offset | 0.0000E+000 | Column Parameter −6 |
| Surf 1 | NSC Object 101 | Parameter 6: | Pickup From 3 | Scale | 1.0000E+000 | Offset | 0.0000E+000 | Column Parameter −6 |
| Surf 1 | NSC Object 101 | Parameter 7: | Pickup From 3 | Scale | 1.0000E+000 | Offset | 0.0000E+000 | Column Parameter −6 |
| Surf 1 | NSC Object 101 | Parameter 8: | Pickup From 3 | Scale | 1.0000E+000 | Offset | 0.0000E+000 | Column Parameter −6 |
| Surf 1 | NSC Object 102 | Position Y: | Pickup From 4 | Scale | −1.0000E+000 | Offset | 0.0000E+000 | Column Parameter −6 |
| Surf 1 | NSC Object 102 | Parameter 1: | Pickup From 3 | Scale | 1.0000E+000 | Offset | 0.0000E+000 | Column Parameter −6 |
| Surf 1 | NSC Object 102 | Parameter 2: | Pickup From 3 | Scale | 1.0000E+000 | Offset | 0.0000E+000 | Column Parameter −6 |
| Surf 1 | NSC Object 102 | Parameter 3: | Pickup From 3 | Scale | 1.0000E+000 | Offset | 0.0000E+000 | Column Parameter −6 |
| Surf 1 | NSC Object 102 | Parameter 5: | Pickup From 3 | Scale | 1.0000E+000 | Offset | 0.0000E+000 | Column Parameter −6 |
| Surf 1 | NSC Object 102 | Parameter 6: | Pickup From 3 | Scale | 1.0000E+000 | Offset | 0.0000E+000 | Column Parameter −6 |
| Surf 1 | NSC Object 102 | Parameter 7: | Pickup From 3 | Scale | 1.0000E+000 | Offset | 0.0000E+000 | Column Parameter −6 |
| Surf 1 | NSC Object 102 | Parameter 8: | Pickup From 3 | Scale | 1.0000E+000 | Offset | 0.0000E+000 | Column Parameter −6 |
| Surf 1 | NSC Object 103 | Position Y: | Pickup From 4 | Scale | −1.0000E+000 | Offset | 0.0000E+000 | Column Parameter −6 |
| Surf 1 | NSC Object 103 | Parameter 1: | Pickup From 3 | Scale | 1.0000E+000 | Offset | 0.0000E+000 | Column Parameter −6 |
| Surf 1 | NSC Object 103 | Parameter 2: | Pickup From 3 | Scale | 1.0000E+000 | Offset | 0.0000E+000 | Column Parameter −6 |
| Surf 1 | NSC Object 103 | Parameter 3: | Pickup From 3 | Scale | 1.0000E+000 | Offset | 0.0000E+000 | Column Parameter −6 |
| Surf 1 | NSC Object 103 | Parameter 5: | Pickup From 3 | Scale | 1.0000E+000 | Offset | 0.0000E+000 | Column Parameter −6 |
| Surf 1 | NSC Object 103 | Parameter 6: | Pickup From 3 | Scale | 1.0000E+000 | Offset | 0.0000E+000 | Column Parameter −6 |
| Surf 1 | NSC Object 103 | Parameter 7: | Pickup From 3 | Scale | 1.0000E+000 | Offset | 0.0000E+000 | Column Parameter −6 |
| Surf 1 | NSC Object 103 | Parameter 8: | Pickup From 3 | Scale | 1.0000E+000 | Offset | 0.0000E+000 | Column Parameter −6 |
| Surf 1 | NSC Object 104 | Position Y: | Pickup From 4 | Scale | −1.0000E+000 | Offset | 0.0000E+000 | Column Parameter −6 |
| Surf 1 | NSC Object 104 | Parameter 1: | Pickup From 3 | Scale | 1.0000E+000 | Offset | 0.0000E+000 | Column Parameter −6 |
| Surf 1 | NSC Object 104 | Parameter 2: | Pickup From 3 | Scale | 1.0000E+000 | Offset | 0.0000E+000 | Column Parameter −6 |
| Surf 1 | NSC Object 104 | Parameter 3: | Pickup From 3 | Scale | 1.0000E+000 | Offset | 0.0000E+000 | Column Parameter −6 |
| Surf 1 | NSC Object 104 | Parameter 5: | Pickup From 3 | Scale | 1.0000E+000 | Offset | 0.0000E+000 | Column Parameter −6 |
| Surf 1 | NSC Object 104 | Parameter 6: | Pickup From 3 | Scale | 1.0000E+000 | Offset | 0.0000E+000 | Column Parameter −6 |
| Surf 1 | NSC Object 104 | Parameter 7: | Pickup From 3 | Scale | 1.0000E+000 | Offset | 0.0000E+000 | Column Parameter −6 |
| Surf 1 | NSC Object 104 | Parameter 8: | Pickup From 3 | Scale | 1.0000E+000 | Offset | 0.0000E+000 | Column Parameter −6 |
| Surf 1 | NSC Object 105 | Position Y: | Pickup From 4 | Scale | −1.0000E+000 | Offset | 0.0000E+000 | Column Parameter −6 |
| Surf 1 | NSC Object 105 | Parameter 1: | Pickup From 3 | Scale | 1.0000E+000 | Offset | 0.0000E+000 | Column Parameter −6 |
| Surf 1 | NSC Object 105 | Parameter 2: | Pickup From 3 | Scale | 1.0000E+000 | Offset | 0.0000E+000 | Column Parameter −6 |
| Surf 1 | NSC Object 105 | Parameter 3: | Pickup From 3 | Scale | 1.0000E+000 | Offset | 0.0000E+000 | Column Parameter −6 |
| Surf 1 | NSC Object 105 | Parameter 5: | Pickup From 3 | Scale | 1.0000E+000 | Offset | 0.0000E+000 | Column Parameter −6 |
| Surf 1 | NSC Object 105 | Parameter 6: | Pickup From 3 | Scale | 1.0000E+000 | Offset | 0.0000E+000 | Column Parameter −6 |
| Surf 1 | NSC Object 105 | Parameter 7: | Pickup From 3 | Scale | 1.0000E+000 | Offset | 0.0000E+000 | Column Parameter −6 |
| Surf 1 | NSC Object 105 | Parameter 8: | Pickup From 3 | Scale | 1.0000E+000 | Offset | 0.0000E+000 | Column Parameter −6 |
| Surf 1 | NSC Object 107 | Position X: | Pickup From 2 | Scale | 2.0000E+000 | Offset | 0.0000E+000 | Column Parameter −6 |
| Surf 1 | NSC Object 107 | Parameter 1: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 107 | Parameter 2: | Pickup From 3 | Scale | 1.0000E+000 | Offset | 0.0000E+000 | Column Parameter −6 |
| Surf 1 | NSC Object 107 | Parameter 3: | Pickup From 3 | Scale | 1.0000E+000 | Offset | 0.0000E+000 | Column Parameter −6 |
| Surf 1 | NSC Object 107 | Parameter 6: | Pickup From 3 | Scale | 1.0000E+000 | Offset | 0.0000E+000 | Column Parameter −6 |
| Surf 1 | NSC Object 107 | Parameter 7: | Pickup From 3 | Scale | 1.0000E+000 | Offset | 0.0000E+000 | Column Parameter −6 |
| Surf 1 | NSC Object 107 | Parameter 8: | Pickup From 3 | Scale | 1.0000E+000 | Offset | 0.0000E+000 | Column Parameter −6 |
| Surf 1 | NSC Object 108 | Position Y: | Pickup From 4 | Scale | 1.0000E+000 | Offset | 0.0000E+000 | Column Parameter −6 |
| Surf 1 | NSC Object 108 | Parameter 1: | Pickup From 3 | Scale | 1.0000E+000 | Offset | 0.0000E+000 | Column Parameter −6 |
| Surf 1 | NSC Object 108 | Parameter 2: | Pickup From 3 | Scale | 1.0000E+000 | Offset | 0.0000E+000 | Column Parameter −6 |
| Surf 1 | NSC Object 108 | Parameter 3: | Pickup From 3 | Scale | 1.0000E+000 | Offset | 0.0000E+000 | Column Parameter −6 |
| Surf 1 | NSC Object 108 | Parameter 5: | Pickup From 13 | Scale | 1.0000E+000 | Offset | 0.0000E+000 | Column Parameter −6 |
| Surf 1 | NSC Object 108 | Parameter 6: | Pickup From 3 | Scale | 1.0000E+000 | Offset | 0.0000E+000 | Column Parameter −6 |
| Surf 1 | NSC Object 108 | Parameter 7: | Pickup From 3 | Scale | 1.0000E+000 | Offset | 0.0000E+000 | Column Parameter −6 |
| Surf 1 | NSC Object 108 | Parameter 8: | Pickup From 3 | Scale | 1.0000E+000 | Offset | 0.0000E+000 | Column Parameter −6 |
| Surf 1 | NSC Object 109 | Position Y: | Pickup From 4 | Scale | 1.0000E+000 | Offset | 0.0000E+000 | Column Parameter −6 |
| Surf 1 | NSC Object 109 | Parameter 1: | Pickup From 3 | Scale | 1.0000E+000 | Offset | 0.0000E+000 | Column Parameter −6 |
| Surf 1 | NSC Object 109 | Parameter 2: | Pickup From 3 | Scale | 1.0000E+000 | Offset | 0.0000E+000 | Column Parameter −6 |
| Surf 1 | NSC Object 109 | Parameter 3: | Pickup From 3 | Scale | 1.0000E+000 | Offset | 0.0000E+000 | Column Parameter −6 |
| Surf 1 | NSC Object 109 | Parameter 5: | Pickup From 13 | Scale | 1.0000E+000 | Offset | 0.0000E+000 | Column Parameter −6 |
| Surf 1 | NSC Object 109 | Parameter 6: | Pickup From 3 | Scale | 1.0000E+000 | Offset | 0.0000E+000 | Column Parameter −6 |
| Surf 1 | NSC Object 109 | Parameter 7: | Pickup From 3 | Scale | 1.0000E+000 | Offset | 0.0000E+000 | Column Parameter −6 |
| Surf 1 | NSC Object 109 | Parameter 8: | Pickup From 3 | Scale | 1.0000E+000 | Offset | 0.0000E+000 | Column Parameter −6 |
| Surf 1 | NSC Object 110 | Position Y: | Pickup From 4 | Scale | 1.0000E+000 | Offset | 0.0000E+000 | Column Parameter −6 |
| Surf 1 | NSC Object 110 | Parameter 1: | Pickup From 3 | Scale | 1.0000E+000 | Offset | 0.0000E+000 | Column Parameter −6 |
| Surf 1 | NSC Object 110 | Parameter 2: | Pickup From 3 | Scale | 1.0000E+000 | Offset | 0.0000E+000 | Column Parameter −6 |
| Surf 1 | NSC Object 110 | Parameter 3: | Pickup From 3 | Scale | 1.0000E+000 | Offset | 0.0000E+000 | Column Parameter −6 |
| Surf 1 | NSC Object 110 | Parameter 5: | Pickup From 13 | Scale | 1.0000E+000 | Offset | 0.0000E+000 | Column Parameter −6 |
| Surf 1 | NSC Object 110 | Parameter 6: | Pickup From 3 | Scale | 1.0000E+000 | Offset | 0.0000E+000 | Column Parameter −6 |
| Surf 1 | NSC Object 110 | Parameter 7: | Pickup From 3 | Scale | 1.0000E+000 | Offset | 0.0000E+000 | Column Parameter −6 |
| Surf 1 | NSC Object 110 | Parameter 8: | Pickup From 3 | Scale | 1.0000E+000 | Offset | 0.0000E+000 | Column Parameter −6 |
| Surf 1 | NSC Object 111 | Position Y: | Pickup From 4 | Scale | 1.0000E+000 | Offset | 0.0000E+000 | Column Parameter −6 |
| Surf 1 | NSC Object 111 | Parameter 1: | Pickup From 3 | Scale | 1.0000E+000 | Offset | 0.0000E+000 | Column Parameter −6 |
| Surf 1 | NSC Object 111 | Parameter 2: | Pickup From 3 | Scale | 1.0000E+000 | Offset | 0.0000E+000 | Column Parameter −6 |
| Surf 1 | NSC Object 111 | Parameter 3: | Pickup From 3 | Scale | 1.0000E+000 | Offset | 0.0000E+000 | Column Parameter −6 |
| Surf 1 | NSC Object 111 | Parameter 5: | Pickup From 13 | Scale | 1.0000E+000 | Offset | 0.0000E+000 | Column Parameter −6 |
| Surf 1 | NSC Object 111 | Parameter 6: | Pickup From 3 | Scale | 1.0000E+000 | Offset | 0.0000E+000 | Column Parameter −6 |
| Surf 1 | NSC Object 111 | Parameter 7: | Pickup From 3 | Scale | 1.0000E+000 | Offset | 0.0000E+000 | Column Parameter −6 |
| Surf 1 | NSC Object 111 | Parameter 8: | Pickup From 3 | Scale | 1.0000E+000 | Offset | 0.0000E+000 | Column Parameter −6 |
| Surf 1 | NSC Object 112 | Position Y: | Pickup From 4 | Scale | −1.0000E+000 | Offset | 0.0000E+000 | Column Parameter −6 |
| Surf 1 | NSC Object 112 | Parameter 2: | Pickup From 3 | Scale | 1.0000E+000 | Offset | 0.0000E+000 | Column Parameter −6 |
| Surf 1 | NSC Object 112 | Parameter 3: | Pickup From 3 | Scale | 1.0000E+000 | Offset | 0.0000E+000 | Column Parameter −6 |
| Surf 1 | NSC Object 112 | Parameter 5: | Pickup From 13 | Scale | 1.0000E+000 | Offset | 0.0000E+000 | Column Parameter −6 |
| Surf 1 | NSC Object 112 | Parameter 6: | Pickup From 3 | Scale | 1.0000E+000 | Offset | 0.0000E+000 | Column Parameter −6 |
| Surf 1 | NSC Object 112 | Parameter 7: | Pickup From 3 | Scale | 1.0000E+000 | Offset | 0.0000E+000 | Column Parameter −6 |
| Surf 1 | NSC Object 112 | Parameter 8: | Pickup From 3 | Scale | 1.0000E+000 | Offset | 0.0000E+000 | Column Parameter −6 |
| Surf 1 | NSC Object 113 | Position Y: | Pickup From 4 | Scale | −1.0000E+000 | Offset | 0.0000E+000 | Column Parameter −6 |
| Surf 1 | NSC Object 113 | Parameter 1: | Pickup From 3 | Scale | 1.0000E+000 | Offset | 0.0000E+000 | Column Parameter −6 |
| Surf 1 | NSC Object 113 | Parameter 2: | Pickup From 3 | Scale | 1.0000E+000 | Offset | 0.0000E+000 | Column Parameter −6 |
| Surf 1 | NSC Object 113 | Parameter 3: | Pickup From 3 | Scale | 1.0000E+000 | Offset | 0.0000E+000 | Column Parameter −6 |
| Surf 1 | NSC Object 113 | Parameter 5: | Pickup From 13 | Scale | 1.0000E+000 | Offset | 0.0000E+000 | Column Parameter −6 |
| Surf 1 | NSC Object 113 | Parameter 6: | Pickup From 3 | Scale | 1.0000E+000 | Offset | 0.0000E+000 | Column Parameter −6 |
| Surf 1 | NSC Object 113 | Parameter 7: | Pickup From 3 | Scale | 1.0000E+000 | Offset | 0.0000E+000 | Column Parameter −6 |
| Surf 1 | NSC Object 113 | Parameter 8: | Pickup From 3 | Scale | 1.0000E+000 | Offset | 0.0000E+000 | Column Parameter −6 |
| Surf 1 | NSC Object 114 | Position Y: | Pickup From 4 | Scale | −1.0000E+000 | Offset | 0.0000E+000 | Column Parameter −6 |
| Surf 1 | NSC Object 114 | Parameter 1: | Pickup From 3 | Scale | 1.0000E+000 | Offset | 0.0000E+000 | Column Parameter −6 |
| Surf 1 | NSC Object 114 | Parameter 2: | Pickup From 3 | Scale | 1.0000E+000 | Offset | 0.0000E+000 | Column Parameter −6 |
| Surf 1 | NSC Object 114 | Parameter 3: | Pickup From 3 | Scale | 1.0000E+000 | Offset | 0.0000E+000 | Column Parameter −6 |
| Surf 1 | NSC Object 114 | Parameter 5: | Pickup From 13 | Scale | 1.0000E+000 | Offset | 0.0000E+000 | Column Parameter −6 |
| Surf 1 | NSC Object 114 | Parameter 6: | Pickup From 3 | Scale | 1.0000E+000 | Offset | 0.0000E+000 | Column Parameter −6 |
| Surf 1 | NSC Object 114 | Parameter 7: | Pickup From 3 | Scale | 1.0000E+000 | Offset | 0.0000E+000 | Column Parameter −6 |
| Surf 1 | NSC Object 114 | Parameter 8: | Pickup From 3 | Scale | 1.0000E+000 | Offset | 0.0000E+000 | Column Parameter −6 |
| Surf 1 | NSC Object 115 | Position Y: | Pickup From 4 | Scale | −1.0000E+000 | Offset | 0.0000E+000 | Column Parameter −6 |
| Surf 1 | NSC Object 115 | Parameter 1: | Pickup From 3 | Scale | 1.0000E+000 | Offset | 0.0000E+000 | Column Parameter −6 |
| Surf 1 | NSC Object 115 | Parameter 2: | Pickup From 3 | Scale | 1.0000E+000 | Offset | 0.0000E+000 | Column Parameter −6 |
| Surf 1 | NSC Object 115 | Parameter 3: | Pickup From 3 | Scale | 1.0000E+000 | Offset | 0.0000E+000 | Column Parameter −6 |
| Surf 1 | NSC Object 115 | Parameter 5: | Pickup From 13 | Scale | 1.0000E+000 | Offset | 0.0000E+000 | Column Parameter −6 |
| Surf 1 | NSC Object 115 | Parameter 6: | Pickup From 3 | Scale | 1.0000E+000 | Offset | 0.0000E+000 | Column Parameter −6 |
| Surf 1 | NSC Object 115 | Parameter 7: | Pickup From 3 | Scale | 1.0000E+000 | Offset | 0.0000E+000 | Column Parameter −6 |
| Surf 1 | NSC Object 115 | Parameter 8: | Pickup From 3 | Scale | 1.0000E+000 | Offset | 0.0000E+000 | Column Parameter −6 |
| Surf 1 | NSC Object 117 | Position X: | Pickup From 2 | Scale | 4.0000E+000 | Offset | 0.0000E+000 | Column Parameter −6 |
| Surf 1 | NSC Object 117 | Parameter 1: | Pickup From 3 | Scale | 1.0000E+000 | Offset | 0.0000E+000 | Column Parameter −6 |
| Surf 1 | NSC Object 117 | Parameter 2: | Pickup From 3 | Scale | 1.0000E+000 | Offset | 0.0000E+000 | Column Parameter −6 |
| Surf 1 | NSC Object 117 | Parameter 3: | Pickup From 3 | Scale | 1.0000E+000 | Offset | 0.0000E+000 | Column Parameter −6 |
| Surf 1 | NSC Object 117 | Parameter 6: | Pickup From 3 | Scale | 1.0000E+000 | Offset | 0.0000E+000 | Column Parameter −6 |
| Surf 1 | NSC Object 117 | Parameter 7: | Pickup From 3 | Scale | 1.0000E+000 | Offset | 0.0000E+000 | Column Parameter −6 |
| Surf 1 | NSC Object 117 | Parameter 8: | Pickup From 3 | Scale | 1.0000E+000 | Offset | 0.0000E+000 | Column Parameter −6 |
| Surf 1 | NSC Object 118 | Position Y: | Pickup From 4 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 118 | Parameter 1: | Pickup From 3 | Scale | 1.0000E+000 | Offset | 0.0000E+000 | Column Parameter −6 |
| Surf 1 | NSC Object 118 | Parameter 2: | Pickup From 3 | Scale | 1.0000E+000 | Offset | 0.0000E+000 | Column Parameter −6 |
| Surf 1 | NSC Object 118 | Parameter 3: | Pickup From 3 | Scale | 1.0000E+000 | Offset | 0.0000E+000 | Column Parameter −6 |
| Surf 1 | NSC Object 118 | Parameter 5: | Pickup From 23 | Scale | 1.0000E+000 | Offset | 0.0000E+000 | Column Parameter −6 |
| Surf 1 | NSC Object 118 | Parameter 6: | Pickup From 3 | Scale | 1.0000E+000 | Offset | 0.0000E+000 | Column Parameter −6 |
| Surf 1 | NSC Object 118 | Parameter 7: | Pickup From 3 | Scale | 1.0000E+000 | Offset | 0.0000E+000 | Column Parameter −6 |
| Surf 1 | NSC Object 118 | Parameter 8: | Pickup From 3 | Scale | 1.0000E+000 | Offset | 0.0000E+000 | Column Parameter −6 |
| Surf 1 | NSC Object 119 | Position Y: | Pickup From 4 | Scale | 1.0000E+000 | Offset | 0.0000E+000 | Column Parameter −6 |
| Surf 1 | NSC Object 119 | Parameter 1: | Pickup From 3 | Scale | 1.0000E+000 | Offset | 0.0000E+000 | Column Parameter −6 |
| Surf 1 | NSC Object 119 | Parameter 2: | Pickup From 3 | Scale | 1.0000E+000 | Offset | 0.0000E+000 | Column Parameter −6 |
| Surf 1 | NSC Object 119 | Parameter 3: | Pickup From 3 | Scale | 1.0000E+000 | Offset | 0.0000E+000 | Column Parameter −6 |
| Surf 1 | NSC Object 119 | Parameter 5: | Pickup From 23 | Scale | 1.0000E+000 | Offset | 0.0000E+000 | Column Parameter −6 |
| Surf 1 | NSC Object 119 | Parameter 6: | Pickup From 3 | Scale | 1.0000E+000 | Offset | 0.0000E+000 | Column Parameter −6 |
| Surf 1 | NSC Object 119 | Parameter 7: | Pickup From 3 | Scale | 1.0000E+000 | Offset | 0.0000E+000 | Column Parameter −6 |
| Surf 1 | NSC Object 119 | Parameter 8: | Pickup From 3 | Scale | 1.0000E+000 | Offset | 0.0000E+000 | Column Parameter −6 |
| Surf 1 | NSC Object 120 | Position Y: | Pickup From 4 | Scale | 1.0000E+000 | Offset | 0.0000E+000 | Column Parameter −6 |
| Surf 1 | NSC Object 120 | Parameter 1: | Pickup From 3 | Scale | 1.0000E+000 | Offset | 0.0000E+000 | Column Parameter −6 |
| Surf 1 | NSC Object 120 | Parameter 2: | Pickup From 3 | Scale | 1.0000E+000 | Offset | 0.0000E+000 | Column Parameter −6 |
| Surf 1 | NSC Object 120 | Parameter 3: | Pickup From 3 | Scale | 1.0000E+000 | Offset | 0.0000E+000 | Column Parameter −6 |
| Surf 1 | NSC Object 120 | Parameter 5: | Pickup From 23 | Scale | 1.0000E+000 | Offset | 0.0000E+000 | Column Parameter −6 |
| Surf 1 | NSC Object 120 | Parameter 6: | Pickup From 3 | Scale | 1.0000E+000 | Offset | 0.0000E+000 | Column Parameter −6 |
| Surf 1 | NSC Object 120 | Parameter 7: | Pickup From 3 | Scale | 1.0000E+000 | Offset | 0.0000E+000 | Column Parameter −6 |
| Surf 1 | NSC Object 120 | Parameter 8: | Pickup From 3 | Scale | 1.0000E+000 | Offset | 0.0000E+000 | Column Parameter −6 |
| Surf 1 | NSC Object 121 | Position Y: | Pickup From 4 | Scale | 1.0000E+000 | Offset | 0.0000E+000 | Column Parameter −6 |
| Surf 1 | NSC Object 121 | Parameter 1: | Pickup From 3 | Scale | 1.0000E+000 | Offset | 0.0000E+000 | Column Parameter −6 |
| Surf 1 | NSC Object 121 | Parameter 2: | Pickup From 3 | Scale | 1.0000E+000 | Offset | 0.0000E+000 | Column Parameter −6 |
| Surf 1 | NSC Object 121 | Parameter 3: | Pickup From 3 | Scale | 1.0000E+000 | Offset | 0.0000E+000 | Column Parameter −6 |
| Surf 1 | NSC Object 121 | Parameter 5: | Pickup From 23 | Scale | 1.0000E+000 | Offset | 0.0000E+000 | Column Parameter −6 |
| Surf 1 | NSC Object 121 | Parameter 6: | Pickup From 3 | Scale | 1.0000E+000 | Offset | 0.0000E+000 | Column Parameter −6 |
| Surf 1 | NSC Object 121 | Parameter 7: | Pickup From 3 | Scale | 1.0000E+000 | Offset | 0.0000E+000 | Column Parameter −6 |
| Surf 1 | NSC Object 121 | Parameter 8: | Pickup From 3 | Scale | 1.0000E+000 | Offset | 0.0000E+000 | Column Parameter −6 |
| Surf 1 | NSC Object 122 | Position Y: | Pickup From 4 | Scale | −1.0000E+000 | Offset | 0.0000E+000 | Column Parameter −6 |
| Surf 1 | NSC Object 122 | Parameter 1: | Pickup From 3 | Scale | 1.0000E+000 | Offset | 0.0000E+000 | Column Parameter −6 |
| Surf 1 | NSC Object 122 | Parameter 2: | Pickup From 3 | Scale | 1.0000E+000 | Offset | 0.0000E+000 | Column Parameter −6 |
| Surf 1 | NSC Object 122 | Parameter 3: | Pickup From 3 | Scale | 1.0000E+000 | Offset | 0.0000E+000 | Column Parameter −6 |
| Surf 1 | NSC Object 122 | Parameter 5: | Pickup From 23 | Scale | 1.0000E+000 | Offset | 0.0000E+000 | Column Parameter −6 |
| Surf 1 | NSC Object 122 | Parameter 6: | Pickup From 3 | Scale | 1.0000E+000 | Offset | 0.0000E+000 | Column Parameter −6 |
| Surf 1 | NSC Object 122 | Parameter 7: | Pickup From 3 | Scale | 1.0000E+000 | Offset | 0.0000E+000 | Column Parameter −6 |
| Surf 1 | NSC Object 122 | Parameter 8: | Pickup From 3 | Scale | 1.0000E+000 | Offset | 0.0000E+000 | Column Parameter −6 |
| Surf 1 | NSC Object 123 | Position Y: | Pickup From 4 | Scale | −1.0000E+000 | Offset | 0.0000E+000 | Column Parameter −6 |
| Surf 1 | NSC Object 123 | Parameter 1: | Pickup From 3 | Scale | 1.0000E+000 | Offset | 0.0000E+000 | Column Parameter −6 |
| Surf 1 | NSC Object 123 | Parameter 2: | Pickup From 3 | Scale | 1.0000E+000 | Offset | 0.0000E+000 | Column Parameter −6 |
| Surf 1 | NSC Object 123 | Parameter 3: | Pickup From 3 | Scale | 1.0000E+000 | Offset | 0.0000E+000 | Column Parameter −6 |
| Surf 1 | NSC Object 123 | Parameter 5: | Pickup From 23 | Scale | 1.0000E+000 | Offset | 0.0000E+000 | Column Parameter −6 |
| Surf 1 | NSC Object 123 | Parameter 6: | Pickup From 3 | Scale | 1.0000E+000 | Offset | 0.0000E+000 | Column Parameter −6 |
| Surf 1 | NSC Object 123 | Parameter 7: | Pickup From 3 | Scale | 1.0000E+000 | Offset | 0.0000E+000 | Column Parameter −6 |
| Surf 1 | NSC Object 123 | Parameter 8: | Pickup From 3 | Scale | 1.0000E+000 | Offset | 0.0000E+000 | Column Parameter −6 |
| Surf 1 | NSC Object 124 | Position Y: | Pickup From 4 | Scale | −1.0000E+000 | Offset | 0.0000E+000 | Column Parameter −6 |
| Surf 1 | NSC Object 124 | Parameter 1: | Pickup From 3 | Scale | 1.0000E+000 | Offset | 0.0000E+000 | Column Parameter −6 |
| Surf 1 | NSC Object 124 | Parameter 2: | Pickup From 3 | Scale | 1.0000E+000 | Offset | 0.0000E+000 | Column Parameter −6 |
| Surf 1 | NSC Object 124 | Parameter 3: | Pickup From 3 | Scale | 1.0000E+000 | Offset | 0.0000E+000 | Column Parameter −6 |
| Surf 1 | NSC Object 124 | Parameter 5: | Pickup From 23 | Scale | 1.0000E+000 | Offset | 0.0000E+000 | Column Parameter −6 |
| Surf 1 | NSC Object 124 | Parameter 6: | Pickup From 3 | Scale | 1.0000E+000 | Offset | 0.0000E+000 | Column Parameter −6 |
| Surf 1 | NSC Object 124 | Parameter 7: | Pickup From 3 | Scale | 1.0000E+000 | Offset | 0.0000E+000 | Column Parameter −6 |
| Surf 1 | NSC Object 124 | Parameter 8: | Pickup From 3 | Scale | 1.0000E+000 | Offset | 0.0000E+000 | Column Parameter −6 |
| Surf 1 | NSC Object 125 | Position Y: | Pickup From 4 | Scale | −1.0000E+000 | Offset | 0.0000E+000 | Column Parameter −6 |
| Surf 1 | NSC Object 125 | Parameter 1: | Pickup From 3 | Scale | 1.0000E+000 | Offset | 0.0000E+000 | Column Parameter −6 |
| Surf 1 | NSC Object 125 | Parameter 2: | Pickup From 3 | Scale | 1.0000E+000 | Offset | 0.0000E+000 | Column Parameter −6 |
| Surf 1 | NSC Object 125 | Parameter 3: | Pickup From 3 | Scale | 1.0000E+000 | Offset | 0.0000E+000 | Column Parameter −6 |
| Surf 1 | NSC Object 125 | Parameter 5: | Pickup From 23 | Scale | 1.0000E+000 | Offset | 0.0000E+000 | Column Parameter −6 |
| Surf 1 | NSC Object 125 | Parameter 6: | Pickup From 3 | Scale | 1.0000E+000 | Offset | 0.0000E+000 | Column Parameter −6 |
| Surf 1 | NSC Object 125 | Parameter 7: | Pickup From 3 | Scale | 1.0000E+000 | Offset | 0.0000E+000 | Column Parameter −6 |
| Surf 1 | NSC Object 125 | Parameter 8: | Pickup From 3 | Scale | 1.0000E+000 | Offset | 0.0000E+000 | Column Parameter −6 |
| Surf 1 | NSC Object 127 | Position X: | Pickup From 2 | Scale | 6.0000E+000 | Offset | 0.0000E+000 | Column Parameter −6 |
| Surf 1 | NSC Object 127 | Parameter 1: | Pickup From 3 | Scale | 1.0000E+000 | Offset | 0.0000E+000 | Column Parameter −6 |
| Surf 1 | NSC Object 127 | Parameter 2: | Pickup From 3 | Scale | 1.0000E+000 | Offset | 0.0000E+000 | Column Parameter −6 |
| Surf 1 | NSC Object 127 | Parameter 3: | Pickup From 3 | Scale | 1.0000E+000 | Offset | 0.0000E+000 | Column Parameter −6 |
| Surf 1 | NSC Object 127 | Parameter 6: | Pickup From 3 | Scale | 1.0000E+000 | Offset | 0.0000E+000 | Column Parameter −6 |
| Surf 1 | NSC Object 127 | Parameter 7: | Pickup From 3 | Scale | 1.0000E+000 | Offset | 0.0000E+000 | Column Parameter −6 |
| Surf 1 | NSC Object 127 | Parameter 8: | Pickup From 3 | Scale | 1.0000E+000 | Offset | 0.0000E+000 | Column Parameter −6 |
| Surf 1 | NSC Object 128 | Position Y: | Pickup From 4 | Scale | 1.0000E+000 | Offset | 0.0000E+000 | Column Parameter −6 |
| Surf 1 | NSC Object 128 | Parameter 1: | Pickup From 3 | Scale | 1.0000E+000 | Offset | 0.0000E+000 | Column Parameter −6 |
| Surf 1 | NSC Object 128 | Parameter 2: | Pickup From 3 | Scale | 1.0000E+000 | Offset | 0.0000E+000 | Column Parameter −6 |
| Surf 1 | NSC Object 128 | Parameter 3: | Pickup From 3 | Scale | 1.0000E+000 | Offset | 0.0000E+000 | Column Parameter −6 |
| Surf 1 | NSC Object 128 | Parameter 5: | Pickup From 33 | Scale | 1.0000E+000 | Offset | 0.0000E+000 | Column Parameter −6 |
| Surf 1 | NSC Object 128 | Parameter 6: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 128 | Parameter 7: | Pickup From 3 | Scale | 1.0000E+000 | Offset | 0.0000E+000 | Column Parameter | −6 |
| Surf 1 | NSC Object 128 | Parameter 8: | Pickup From 3 | Scale | 1.0000E+000 | Offset | 0.0000E+000 | Column Parameter | −6 |
| Surf 1 | NSC Object 129 | Position Y: | Pickup From 4 | Scale | 1.0000E+000 | Offset | 0.0000E+000 | Column Parameter | −6 |
| Surf 1 | NSC Object 129 | Parameter 1: | Pickup From 3 | Scale | 1.0000E+000 | Offset | 0.0000E+000 | Column Parameter | −6 |
| Surf 1 | NSC Object 129 | Parameter 2: | Pickup From 3 | Scale | 1.0000E+000 | Offset | 0.0000E+000 | Column Parameter | −6 |
| Surf 1 | NSC Object 129 | Parameter 3: | Pickup From 3 | Scale | 1.0000E+000 | Offset | 0.0000E+000 | Column Parameter | −6 |
| Surf 1 | NSC Object 129 | Parameter 5: | Pickup From 33 | Scale | 1.0000E+000 | Offset | 0.0000E+000 | Column Parameter | −6 |
| Surf 1 | NSC Object 129 | Parameter 6: | Pickup From 3 | Scale | 1.0000E+000 | Offset | 0.0000E+000 | Column Parameter | −6 |
| Surf 1 | NSC Object 129 | Parameter 7: | Pickup From 3 | Scale | 1.0000E+000 | Offset | 0.0000E+000 | Column Parameter | −6 |
| Surf 1 | NSC Object 129 | Parameter 8: | Pickup From 3 | Scale | 1.0000E+000 | Offset | 0.0000E+000 | Column Parameter | −6 |
| Surf 1 | NSC Object 130 | Position Y: | Pickup From 4 | Scale | 1.0000E+000 | Offset | 0.0000E+000 | Column Parameter | −6 |
| Surf 1 | NSC Object 130 | Parameter 1: | Pickup From 3 | Scale | 1.0000E+000 | Offset | 0.0000E+000 | Column Parameter | −6 |
| Surf 1 | NSC Object 130 | Parameter 2: | Pickup From 3 | Scale | 1.0000E+000 | Offset | 0.0000E+000 | Column Parameter | −6 |
| Surf 1 | NSC Object 130 | Parameter 3: | Pickup From 3 | Scale | 1.0000E+000 | Offset | 0.0000E+000 | Column Parameter | −6 |
| Surf 1 | NSC Object 130 | Parameter 5: | Pickup From 33 | Scale | 1.0000E+000 | Offset | 0.0000E+000 | Column Parameter | −6 |
| Surf 1 | NSC Object 130 | Parameter 6: | Pickup From 3 | Scale | 1.0000E+000 | Offset | 0.0000E+000 | Column Parameter | −6 |
| Surf 1 | NSC Object 130 | Parameter 7: | Pickup From 3 | Scale | 1.0000E+000 | Offset | 0.0000E+000 | Column Parameter | −6 |
| Surf 1 | NSC Object 130 | Parameter 8: | Pickup From 3 | Scale | 1.0000E+000 | Offset | 0.0000E+000 | Column Parameter | −6 |
| Surf 1 | NSC Object 131 | Position Y: | Pickup From 4 | Scale | 1.0000E+000 | Offset | 0.0000E+000 | Column Parameter | −6 |
| Surf 1 | NSC Object 132 | Position Y: | Pickup From 4 | Scale | −1.0000E+000 | Offset | 0.0000E+000 | Column Parameter | −6 |
| Surf 1 | NSC Object 132 | Parameter 1: | Pickup From 3 | Scale | 1.0000E+000 | Offset | 0.0000E+000 | Column Parameter | −6 |
| Surf 1 | NSC Object 132 | Parameter 2: | Pickup From 3 | Scale | 1.0000E+000 | Offset | 0.0000E+000 | Column Parameter | −6 |
| Surf 1 | NSC Object 132 | Parameter 3: | Pickup From 3 | Scale | 1.0000E+000 | Offset | 0.0000E+000 | Column Parameter | −6 |
| Surf 1 | NSC Object 132 | Parameter 5: | Pickup From 33 | Scale | 1.0000E+000 | Offset | 0.0000E+000 | Column Parameter | −6 |
| Surf 1 | NSC Object 132 | Parameter 6: | Pickup From 3 | Scale | 1.0000E+000 | Offset | 0.0000E+000 | Column Parameter | −6 |
| Surf 1 | NSC Object 132 | Parameter 7: | Pickup From 3 | Scale | 1.0000E+000 | Offset | 0.0000E+000 | Column Parameter | −6 |
| Surf 1 | NSC Object 132 | Parameter 8: | Pickup From 3 | Scale | 1.0000E+000 | Offset | 0.0000E+000 | Column Parameter | −6 |
| Surf 1 | NSC Object 133 | Position Y: | Pickup From 4 | Scale | −1.0000E+000 | Offset | 0.0000E+000 | Column Parameter | −6 |
| Surf 1 | NSC Object 133 | Parameter 1: | Pickup From 3 | Scale | 1.0000E+000 | Offset | 0.0000E+000 | Column Parameter | −6 |
| Surf 1 | NSC Object 133 | Parameter 2: | Pickup From 3 | Scale | 1.0000E+000 | Offset | 0.0000E+000 | Column Parameter | −6 |
| Surf 1 | NSC Object 133 | Parameter 3: | Pickup From 3 | Scale | 1.0000E+000 | Offset | 0.0000E+000 | Column Parameter | −6 |
| Surf 1 | NSC Object 133 | Parameter 5: | Pickup From 33 | Scale | 1.0000E+000 | Offset | 0.0000E+000 | Column Parameter | −6 |
| Surf 1 | NSC Object 133 | Parameter 6: | Pickup From 3 | Scale | 1.0000E+000 | Offset | 0.0000E+000 | Column Parameter | −6 |
| Surf 1 | NSC Object 133 | Parameter 7: | Pickup From 3 | Scale | 1.0000E+000 | Offset | 0.0000E+000 | Column Parameter | −6 |
| Surf 1 | NSC Object 133 | Parameter 8: | Pickup From 3 | Scale | 1.0000E+000 | Offset | 0.0000E+000 | Column Parameter | −6 |
| Surf 1 | NSC Object 134 | Position Y: | Pickup From 4 | Scale | −1.0000E+000 | Offset | 0.0000E+000 | Column Parameter | −6 |
| Surf 1 | NSC Object 134 | Parameter 1: | Pickup From 3 | Scale | 1.0000E+000 | Offset | 0.0000E+000 | Column Parameter | −6 |
| Surf 1 | NSC Object 134 | Parameter 2: | Pickup From 3 | Scale | 1.0000E+000 | Offset | 0.0000E+000 | Column Parameter | −6 |
| Surf 1 | NSC Object 134 | Parameter 3: | Pickup From 3 | Scale | 1.0000E+000 | Offset | 0.0000E+000 | Column Parameter | −6 |
| Surf 1 | NSC Object 134 | Parameter 5: | Pickup From 33 | Scale | 1.0000E+000 | Offset | 0.0000E+000 | Column Parameter | −6 |
| Surf 1 | NSC Object 134 | Parameter 6: | Pickup From 3 | Scale | 1.0000E+000 | Offset | 0.0000E+000 | Column Parameter | −6 |
| Surf 1 | NSC Object 134 | Parameter 7: | Pickup From 3 | Scale | 1.0000E+000 | Offset | 0.0000E+000 | Column Parameter | −6 |
| Surf 1 | NSC Object 134 | Parameter 8: | Pickup From 3 | Scale | 1.0000E+000 | Offset | 0.0000E+000 | Column Parameter | −6 |
| Surf 1 | NSC Object 135 | Position Y: | Pickup From 4 | Scale | −1.0000E+000 | Offset | 0.0000E+000 | Column Parameter | −6 |
| Surf 1 | NSC Object 137 | Position X: | Pickup From 2 | Scale | 8.0000E+000 | Offset | 0.0000E+000 | Column Parameter | −6 |
| Surf 1 | NSC Object 137 | Parameter 1: | Pickup From 3 | Scale | 1.0000E+000 | Offset | 0.0000E+000 | Column Parameter | −6 |
| Surf 1 | NSC Object 137 | Parameter 2: | Pickup From 3 | Scale | 1.0000E+000 | Offset | 0.0000E+000 | Column Parameter | −6 |
| Surf 1 | NSC Object 137 | Parameter 3: | Pickup From 3 | Scale | 1.0000E+000 | Offset | 0.0000E+000 | Column Parameter | −6 |
| Surf 1 | NSC Object 137 | Parameter 6: | Pickup From 3 | Scale | 1.0000E+000 | Offset | 0.0000E+000 | Column Parameter | −6 |
| Surf 1 | NSC Object 137 | Parameter 7: | Pickup From 3 | Scale | 1.0000E+000 | Offset | 0.0000E+000 | Column Parameter | −6 |
| Surf 1 | NSC Object 137 | Parameter 8: | Pickup From 3 | Scale | 1.0000E+000 | Offset | 0.0000E+000 | Column Parameter | −6 |
| Surf 1 | NSC Object 138 | Position Y: | Pickup From 4 | Scale | 1.0000E+000 | Offset | 0.0000E+000 | Column Parameter | −6 |
| Surf 1 | NSC Object 138 | Parameter 2: | Pickup From 3 | Scale | 1.0000E+000 | Offset | 0.0000E+000 | Column Parameter | −6 |
| Surf 1 | NSC Object 138 | Parameter 3: | Pickup From 3 | Scale | 1.0000E+000 | Offset | 0.0000E+000 | Column Parameter | −6 |
| Surf 1 | NSC Object 138 | Parameter 5: | Pickup From 43 | Scale | 1.0000E+000 | Offset | 0.0000E+000 | Column Parameter | −6 |
| Surf 1 | NSC Object 138 | Parameter 6: | Pickup From 3 | Scale | 1.0000E+000 | Offset | 0.0000E+000 | Column Parameter | −6 |
| Surf 1 | NSC Object 138 | Parameter 7: | Pickup From 3 | Scale | 1.0000E+000 | Offset | 0.0000E+000 | Column Parameter | −6 |
| Surf 1 | NSC Object 138 | Parameter 8: | Pickup From 3 | Scale | 1.0000E+000 | Offset | 0.0000E+000 | Column Parameter | −6 |
| Surf 1 | NSC Object 139 | Position Y: | Pickup From 4 | Scale | 1.0000E+000 | Offset | 0.0000E+000 | Column Parameter | −6 |
| Surf 1 | NSC Object 139 | Parameter 1: | Pickup From 3 | Scale | 1.0000E+000 | Offset | 0.0000E+000 | Column Parameter | −6 |
| Surf 1 | NSC Object 139 | Parameter 2: | Pickup From 3 | Scale | 1.0000E+000 | Offset | 0.0000E+000 | Column Parameter | −6 |
| Surf 1 | NSC Object 139 | Parameter 3: | Pickup From 3 | Scale | 1.0000E+000 | Offset | 0.0000E+000 | Column Parameter | −6 |
| Surf 1 | NSC Object 139 | Parameter 5: | Pickup From 43 | Scale | 1.0000E+000 | Offset | 0.0000E+000 | Column Parameter | −6 |
| Surf 1 | NSC Object 139 | Parameter 6: | Pickup From 3 | Scale | 1.0000E+000 | Offset | 0.0000E+000 | Column Parameter | −6 |
| Surf 1 | NSC Object 139 | Parameter 7: | Pickup From 3 | Scale | 1.0000E+000 | Offset | 0.0000E+000 | Column Parameter | −6 |
| Surf 1 | NSC Object 139 | Parameter 8: | Pickup From 3 | Scale | 1.0000E+000 | Offset | 0.0000E+000 | Column Parameter | −6 |
| Surf 1 | NSC Object 140 | Position Y: | Pickup From 4 | Scale | 1.0000E+000 | Offset | 0.0000E+000 | Column Parameter | −6 |
| Surf 1 | NSC Object 141 | Position Y: | Pickup From 4 | Scale | 1.0000E+000 | Offset | 0.0000E+000 | Column Parameter | −6 |
| Surf 1 | NSC Object 142 | Position Y: | Pickup From 4 | Scale | −1.0000E+000 | Offset | 0.0000E+000 | Column Parameter | −6 |
| Surf 1 | NSC Object 142 | Parameter 1: | Pickup From 3 | Scale | 1.0000E+000 | Offset | 0.0000E+000 | Column Parameter | −6 |
| Surf 1 | NSC Object 142 | Parameter 2: | Pickup From 3 | Scale | 1.0000E+000 | Offset | 0.0000E+000 | Column Parameter | −6 |
| Surf 1 | NSC Object 142 | Parameter 3: | Pickup From 3 | Scale | 1.0000E+000 | Offset | 0.0000E+000 | Column Parameter | −6 |
| Surf 1 | NSC Object 142 | Parameter 5: | Pickup From 43 | Scale | 1.0000E+000 | Offset | 0.0000E+000 | Column Parameter | −6 |
| Surf 1 | NSC Object 142 | Parameter 6: | Pickup From 3 | Scale | 1.0000E+000 | Offset | 0.0000E+000 | Column Parameter | −6 |
| Surf 1 | NSC Object 142 | Parameter 7: | Pickup From 3 | Scale | 1.0000E+000 | Offset | 0.0000E+000 | Column Parameter | −6 |
| Surf 1 | NSC Object 142 | Parameter 8: | Pickup From 3 | Scale | 1.0000E+000 | Offset | 0.0000E+000 | Column Parameter | −6 |

TABLE 3-continued

ZEMAX Software Output Describing Surface Data Summary and Detail for Each
Individual Element within the Illumination Optical System illustrated in FIGS. 13-15

| Surf 1 | NSC Object 143 | Position Y:   | Pickup From 4  | Scale | −1.0000E+000 | Offset | 0.0000E+000 | Column Parameter −6 |
|--------|----------------|---------------|----------------|-------|--------------|--------|-------------|---------------------|
| Surf 1 | NSC Object 143 | Parameter 1:  | Pickup From 3  | Scale | 1.0000E+000  | Offset | 0.0000E+000 | Column Parameter −6 |
| Surf 1 | NSC Object 143 | Parameter 2:  | Pickup From 3  | Scale | 1.0000E+000  | Offset | 0.0000E+000 | Column Parameter −6 |
| Surf 1 | NSC Object 143 | Parameter 3:  | Pickup From 3  | Scale | 1.0000E+000  | Offset | 0.0000E+000 | Column Parameter −6 |
| Surf 1 | NSC Object 143 | Parameter 5:  | Pickup From 43 | Scale | 1.0000E+000  | Offset | 0.0000E+000 | Column Parameter −6 |
| Surf 1 | NSC Object 143 | Parameter 6:  | Pickup From 3  | Scale | 1.0000E+000  | Offset | 0.0000E+000 | Column Parameter −6 |
| Surf 1 | NSC Object 143 | Parameter 7:  | Pickup From 3  | Scale | 1.0000E+000  | Offset | 0.0000E+000 | Column Parameter −6 |
| Surf 1 | NSC Object 143 | Parameter 8:  | Pickup From 3  | Scale | 1.0000E+000  | Offset | 0.0000E+000 | Column Parameter −6 |
| Surf 1 | NSC Object 144 | Position Y:   | Pickup From 4  | Scale | −1.0000E+000 | Offset | 0.0000E+000 | Column Parameter −6 |
| Surf 1 | NSC Object 145 | Position Y:   | Pickup From 4  | Scale | −1.0000E+000 | Offset | 0.0000E+000 | Column Parameter −6 |
| Surf 1 | NSC Object 147 | Position X:   | Pickup From 2  | Scale | −2.0000E+000 | Offset | 0.0000E+000 | Column Parameter −6 |
| Surf 1 | NSC Object 147 | Parameter 1:  | Pickup From 3  | Scale | 1.0000E+000  | Offset | 0.0000E+000 | Column Parameter −6 |
| Surf 1 | NSC Object 147 | Parameter 2:  | Pickup From 3  | Scale | 1.0000E+000  | Offset | 0.0000E+000 | Column Parameter −6 |
| Surf 1 | NSC Object 147 | Parameter 3:  | Pickup From 3  | Scale | 1.0000E+000  | Offset | 0.0000E+000 | Column Parameter −6 |
| Surf 1 | NSC Object 147 | Parameter 6:  | Pickup From 3  | Scale | 1.0000E+000  | Offset | 0.0000E+000 | Column Parameter −6 |
| Surf 1 | NSC Object 147 | Parameter 7:  | Pickup From 3  | Scale | 1.0000E+000  | Offset | 0.0000E+000 | Column Parameter −6 |
| Surf 1 | NSC Object 147 | Parameter 8:  | Pickup From 3  | Scale | 1.0000E+000  | Offset | 0.0000E+000 | Column Parameter −6 |
| Surf 1 | NSC Object 148 | Position Y:   | Pickup From 4  | Scale | 1.0000E+000  | Offset | 0.0000E+000 | Column Parameter −6 |
| Surf 1 | NSC Object 148 | Parameter 1:  | Pickup From 3  | Scale | 1.0000E+000  | Offset | 0.0000E+000 | Column Parameter −6 |
| Surf 1 | NSC Object 148 | Parameter 2:  | Pickup From 3  | Scale | 1.0000E+000  | Offset | 0.0000E+000 | Column Parameter −6 |
| Surf 1 | NSC Object 148 | Parameter 3:  | Pickup From 3  | Scale | 1.0000E+000  | Offset | 0.0000E+000 | Column Parameter −6 |
| Surf 1 | NSC Object 148 | Parameter 5:  | Pickup From 53 | Scale | 1.0000E+000  | Offset | 0.0000E+000 | Column Parameter −6 |
| Surf 1 | NSC Object 148 | Parameter 6:  | Pickup From 3  | Scale | 1.0000E+000  | Offset | 0.0000E+000 | Column Parameter −6 |
| Surf 1 | NSC Object 148 | Parameter 7:  | Pickup From 3  | Scale | 1.0000E+000  | Offset | 0.0000E+000 | Column Parameter −6 |
| Surf 1 | NSC Object 148 | Parameter 8:  | Pickup From 3  | Scale | 1.0000E+000  | Offset | 0.0000E+000 | Column Parameter −6 |
| Surf 1 | NSC Object 149 | Position Y:   | Pickup From 4  | Scale | 1.0000E+000  | Offset | 0.0000E+000 | Column Parameter −6 |
| Surf 1 | NSC Object 149 | Parameter 1:  | Pickup From 3  | Scale | 1.0000E+000  | Offset | 0.0000E+000 | Column Parameter −6 |
| Surf 1 | NSC Object 149 | Parameter 2:  | Pickup From 3  | Scale | 1.0000E+000  | Offset | 0.0000E+000 | Column Parameter −6 |
| Surf 1 | NSC Object 149 | Parameter 3:  | Pickup From 3  | Scale | 1.0000E+000  | Offset | 0.0000E+000 | Column Parameter −6 |
| Surf 1 | NSC Object 149 | Parameter 5:  | Pickup From 53 | Scale | 1.0000E+000  | Offset | 0.0000E+000 | Column Parameter −6 |
| Surf 1 | NSC Object 149 | Parameter 6:  | Pickup From 3  | Scale | 1.0000E+000  | Offset | 0.0000E+000 | Column Parameter −6 |
| Surf 1 | NSC Object 149 | Parameter 7:  | Pickup From 3  | Scale | 1.0000E+000  | Offset | 0.0000E+000 | Column Parameter −6 |
| Surf 1 | NSC Object 149 | Parameter 8:  | Pickup From 3  | Scale | 1.0000E+000  | Offset | 0.0000E+000 | Column Parameter −6 |
| Surf 1 | NSC Object 150 | Position Y:   | Pickup From 4  | Scale | 1.0000E+000  | Offset | 0.0000E+000 | Column Parameter −6 |
| Surf 1 | NSC Object 150 | Parameter 1:  | Pickup From 3  | Scale | 1.0000E+000  | Offset | 0.0000E+000 | Column Parameter −6 |
| Surf 1 | NSC Object 150 | Parameter 2:  | Pickup From 3  | Scale | 1.0000E+000  | Offset | 0.0000E+000 | Column Parameter −6 |
| Surf 1 | NSC Object 150 | Parameter 3:  | Pickup From 3  | Scale | 1.0000E+000  | Offset | 0.0000E+000 | Column Parameter −6 |
| Surf 1 | NSC Object 150 | Parameter 5:  | Pickup From 53 | Scale | 1.0000E+000  | Offset | 0.0000E+000 | Column Parameter −6 |
| Surf 1 | NSC Object 150 | Parameter 6:  | Pickup From 3  | Scale | 1.0000E+000  | Offset | 0.0000E+000 | Column Parameter −6 |
| Surf 1 | NSC Object 150 | Parameter 7:  | Pickup From 3  | Scale | 1.0000E+000  | Offset | 0.0000E+000 | Column Parameter −6 |
| Surf 1 | NSC Object 150 | Parameter 8:  | Pickup From 3  | Scale | 1.0000E+000  | Offset | 0.0000E+000 | Column Parameter −6 |
| Surf 1 | NSC Object 151 | Position Y:   | Pickup From 4  | Scale | 1.0000E+000  | Offset | 0.0000E+000 | Column Parameter −6 |
| Surf 1 | NSC Object 151 | Parameter 1:  | Pickup From 3  | Scale | 1.0000E+000  | Offset | 0.0000E+000 | Column Parameter −6 |
| Surf 1 | NSC Object 151 | Parameter 2:  | Pickup From 3  | Scale | 1.0000E+000  | Offset | 0.0000E+000 | Column Parameter −6 |
| Surf 1 | NSC Object 151 | Parameter 3:  | Pickup From 3  | Scale | 1.0000E+000  | Offset | 0.0000E+000 | Column Parameter −6 |
| Surf 1 | NSC Object 151 | Parameter 5:  | Pickup From 53 | Scale | 1.0000E+000  | Offset | 0.0000E+000 | Column Parameter −6 |
| Surf 1 | NSC Object 151 | Parameter 6:  | Pickup From 3  | Scale | 1.0000E+000  | Offset | 0.0000E+000 | Column Parameter −6 |
| Surf 1 | NSC Object 151 | Parameter 7:  | Pickup From 3  | Scale | 1.0000E+000  | Offset | 0.0000E+000 | Column Parameter −6 |
| Surf 1 | NSC Object 151 | Parameter 8:  | Pickup From 3  | Scale | 1.0000E+000  | Offset | 0.0000E+000 | Column Parameter −6 |
| Surf 1 | NSC Object 152 | Position Y:   | Pickup From 4  | Scale | −1.0000E+000 | Offset | 0.0000E+000 | Column Parameter −6 |
| Surf 1 | NSC Object 152 | Parameter 1:  | Pickup From 3  | Scale | 1.0000E+000  | Offset | 0.0000E+000 | Column Parameter −6 |
| Surf 1 | NSC Object 152 | Parameter 2:  | Pickup From 3  | Scale | 1.0000E+000  | Offset | 0.0000E+000 | Column Parameter −6 |
| Surf 1 | NSC Object 152 | Parameter 3:  | Pickup From 3  | Scale | 1.0000E+000  | Offset | 0.0000E+000 | Column Parameter −6 |
| Surf 1 | NSC Object 152 | Parameter 5:  | Pickup From 53 | Scale | 1.0000E+000  | Offset | 0.0000E+000 | Column Parameter −6 |
| Surf 1 | NSC Object 152 | Parameter 6:  | Pickup From 3  | Scale | 1.0000E+000  | Offset | 0.0000E+000 | Column Parameter −6 |
| Surf 1 | NSC Object 152 | Parameter 7:  | Pickup From 3  | Scale | 1.0000E+000  | Offset | 0.0000E+000 | Column Parameter −6 |
| Surf 1 | NSC Object 152 | Parameter 8:  | Pickup From 3  | Scale | 1.0000E+000  | Offset | 0.0000E+000 | Column Parameter −6 |
| Surf 1 | NSC Object 153 | Position Y:   | Pickup From 4  | Scale | −1.0000E+000 | Offset | 0.0000E+000 | Column Parameter −6 |
| Surf 1 | NSC Object 153 | Parameter 1:  | Pickup From 3  | Scale | 1.0000E+000  | Offset | 0.0000E+000 | Column Parameter −6 |
| Surf 1 | NSC Object 153 | Parameter 2:  | Pickup From 3  | Scale | 1.0000E+000  | Offset | 0.0000E+000 | Column Parameter −6 |
| Surf 1 | NSC Object 153 | Parameter 3:  | Pickup From 3  | Scale | 1.0000E+000  | Offset | 0.0000E+000 | Column Parameter −6 |
| Surf 1 | NSC Object 153 | Parameter 5:  | Pickup From 53 | Scale | 1.0000E+000  | Offset | 0.0000E+000 | Column Parameter −6 |
| Surf 1 | NSC Object 153 | Parameter 6:  | Pickup From 3  | Scale | 1.0000E+000  | Offset | 0.0000E+000 | Column Parameter −6 |
| Surf 1 | NSC Object 153 | Parameter 7:  | Pickup From 3  | Scale | 1.0000E+000  | Offset | 0.0000E+000 | Column Parameter −6 |
| Surf 1 | NSC Object 153 | Parameter 8:  | Pickup From 3  | Scale | 1.0000E+000  | Offset | 0.0000E+000 | Column Parameter −6 |
| Surf 1 | NSC Object 154 | Position Y:   | Pickup From 4  | Scale | −1.0000E+000 | Offset | 0.0000E+000 | Column Parameter −6 |
| Surf 1 | NSC Object 154 | Parameter 1:  | Pickup From 3  | Scale | 1.0000E+000  | Offset | 0.0000E+000 | Column Parameter −6 |
| Surf 1 | NSC Object 154 | Parameter 2:  | Pickup From 3  | Scale | 1.0000E+000  | Offset | 0.0000E+000 | Column Parameter −6 |
| Surf 1 | NSC Object 154 | Parameter 3:  | Pickup From 3  | Scale | 1.0000E+000  | Offset | 0.0000E+000 | Column Parameter −6 |
| Surf 1 | NSC Object 154 | Parameter 5:  | Pickup From 53 | Scale | 1.0000E+000  | Offset | 0.0000E+000 | Column Parameter −6 |
| Surf 1 | NSC Object 154 | Parameter 6:  | Pickup From 3  | Scale | 1.0000E+000  | Offset | 0.0000E+000 | Column Parameter −6 |
| Surf 1 | NSC Object 154 | Parameter 7:  | Pickup From 3  | Scale | 1.0000E+000  | Offset | 0.0000E+000 | Column Parameter −6 |
| Surf 1 | NSC Object 154 | Parameter 8:  | Pickup From 3  | Scale | 1.0000E+000  | Offset | 0.0000E+000 | Column Parameter −6 |
| Surf 1 | NSC Object 155 | Position Y:   | Pickup From 4  | Scale | −1.0000E+000 | Offset | 0.0000E+000 | Column Parameter −6 |
| Surf 1 | NSC Object 155 | Parameter 1:  | Pickup From 3  | Scale | 1.0000E+000  | Offset | 0.0000E+000 | Column Parameter −6 |
| Surf 1 | NSC Object 155 | Parameter 2:  | Pickup From 3  | Scale | 1.0000E+000  | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 155 | Parameter 3: | Pickup From 3 | Scale | 1.0000E+000 | Offset | 0.0000E+000 | Column Parameter −6 | |
| Surf 1 | NSC Object 155 | Parameter 5: | Pickup From 53 | Scale | 1.0000E+000 | Offset | 0.0000E+000 | Column Parameter −6 | |
| Surf 1 | NSC Object 155 | Parameter 6: | Pickup From 3 | Scale | 1.0000E+000 | Offset | 0.0000E+000 | Column Parameter −6 | |
| Surf 1 | NSC Object 155 | Parameter 7: | Pickup From 3 | Scale | 1.0000E+000 | Offset | 0.0000E+000 | Column Parameter −6 | |
| Surf 1 | NSC Object 155 | Parameter 8: | Pickup From 3 | Scale | 1.0000E+000 | Offset | 0.0000E+000 | Column Parameter −6 | |
| Surf 1 | NSC Object 157 | Position X: | Pickup From 2 | Scale | −4.0000E+000 | Offset | 0.0000E+000 | Column Parameter −6 | |
| Surf 1 | NSC Object 157 | Parameter 1: | Pickup From 3 | Scale | 1.0000E+000 | Offset | 0.0000E+000 | Column Parameter −6 | |
| Surf 1 | NSC Object 157 | Parameter 2: | Pickup From 3 | Scale | 1.0000E+000 | Offset | 0.0000E+000 | Column Parameter −6 | |
| Surf 1 | NSC Object 157 | Parameter 3: | Pickup From 3 | Scale | 1.0000E+000 | Offset | 0.0000E+000 | Column Parameter −6 | |
| Surf 1 | NSC Object 157 | Parameter 6: | Pickup From 3 | Scale | 1.0000E+000 | Offset | 0.0000E+000 | Column Parameter −6 | |
| Surf 1 | NSC Object 157 | Parameter 7: | Pickup From 3 | Scale | 1.0000E+000 | Offset | 0.0000E+000 | Column Parameter −6 | |
| Surf 1 | NSC Object 157 | Parameter 8: | Pickup From 3 | Scale | 1.0000E+000 | Offset | 0.0000E+000 | Column Parameter −6 | |
| Surf 1 | NSC Object 158 | Position Y: | Pickup From 4 | Scale | 1.0000E+000 | Offset | 0.0000E+000 | Column Parameter −6 | |
| Surf 1 | NSC Object 158 | Parameter 1: | Pickup From 3 | Scale | 1.0000E+000 | Offset | 0.0000E+000 | Column Parameter −6 | |
| Surf 1 | NSC Object 158 | Parameter 2: | Pickup From 3 | Scale | 1.0000E+000 | Offset | 0.0000E+000 | Column Parameter −6 | |
| Surf 1 | NSC Object 158 | Parameter 3: | Pickup From 3 | Scale | 1.0000E+000 | Offset | 0.0000E+000 | Column Parameter −6 | |
| Surf 1 | NSC Object 158 | Parameter 5: | Pickup From 63 | Scale | 1.0000E+000 | Offset | 0.0000E+000 | Column Parameter −6 | |
| Surf 1 | NSC Object 158 | Parameter 6: | Pickup From 3 | Scale | 1.0000E+000 | Offset | 0.0000E+000 | Column Parameter −6 | |
| Surf 1 | NSC Object 158 | Parameter 7: | Pickup From 3 | Scale | 1.0000E+000 | Offset | 0.0000E+000 | Column Parameter −6 | |
| Surf 1 | NSC Object 158 | Parameter 8: | Pickup From 3 | Scale | 1.0000E+000 | Offset | 0.0000E+000 | Column Parameter −6 | |
| Surf 1 | NSC Object 159 | Position Y: | Pickup From 4 | Scale | 1.0000E+000 | Offset | 0.0000E+000 | Column Parameter −6 | |
| Surf 1 | NSC Object 159 | Parameter 1: | Pickup From 3 | Scale | 1.0000E+000 | Offset | 0.0000E+000 | Column Parameter −6 | |
| Surf 1 | NSC Object 159 | Parameter 2: | Pickup From 3 | Scale | 1.0000E+000 | Offset | 0.0000E+000 | Column Parameter −6 | |
| Surf 1 | NSC Object 159 | Parameter 3: | Pickup From 3 | Scale | 1.0000E+000 | Offset | 0.0000E+000 | Column Parameter −6 | |
| Surf 1 | NSC Object 159 | Parameter 5: | Pickup From 63 | Scale | 1.0000E+000 | Offset | 0.0000E+000 | Column Parameter −6 | |
| Surf 1 | NSC Object 159 | Parameter 6: | Pickup From 3 | Scale | 1.0000E+000 | Offset | 0.0000E+000 | Column Parameter −6 | |
| Surf 1 | NSC Object 159 | Parameter 7: | Pickup From 3 | Scale | 1.0000E+000 | Offset | 0.0000E+000 | Column Parameter −6 | |
| Surf 1 | NSC Object 159 | Parameter 8: | Pickup From 3 | Scale | 1.0000E+000 | Offset | 0.0000E+000 | Column Parameter −6 | |
| Surf 1 | NSC Object 160 | Position Y: | Pickup From 4 | Scale | 1.0000E+000 | Offset | 0.0000E+000 | Column Parameter −6 | |
| Surf 1 | NSC Object 160 | Parameter 1: | Pickup From 3 | Scale | 1.0000E+000 | Offset | 0.0000E+000 | Column Parameter −6 | |
| Surf 1 | NSC Object 160 | Parameter 2: | Pickup From 3 | Scale | 1.0000E+000 | Offset | 0.0000E+000 | Column Parameter −6 | |
| Surf 1 | NSC Object 160 | Parameter 3: | Pickup From 3 | Scale | 1.0000E+000 | Offset | 0.0000E+000 | Column Parameter −6 | |
| Surf 1 | NSC Object 160 | Parameter 5: | Pickup From 63 | Scale | 1.0000E+000 | Offset | 0.0000E+000 | Column Parameter −6 | |
| Surf 1 | NSC Object 160 | Parameter 6: | Pickup From 3 | Scale | 1.0000E+000 | Offset | 0.0000E+000 | Column Parameter −6 | |
| Surf 1 | NSC Object 160 | Parameter 7: | Pickup From 3 | Scale | 1.0000E+000 | Offset | 0.0000E+000 | Column Parameter −6 | |
| Surf 1 | NSC Object 160 | Parameter 8: | Pickup From 3 | Scale | 1.0000E+000 | Offset | 0.0000E+000 | Column Parameter −6 | |
| Surf 1 | NSC Object 161 | Position Y: | Pickup From 4 | Scale | 1.0000E+000 | Offset | 0.0000E+000 | Column Parameter −6 | |
| Surf 1 | NSC Object 161 | Parameter 1: | Pickup From 3 | Scale | 1.0000E+000 | Offset | 0.0000E+000 | Column Parameter −6 | |
| Surf 1 | NSC Object 161 | Parameter 2: | Pickup From 3 | Scale | 1.0000E+000 | Offset | 0.0000E+000 | Column Parameter −6 | |
| Surf 1 | NSC Object 161 | Parameter 3: | Pickup From 3 | Scale | 1.0000E+000 | Offset | 0.0000E+000 | Column Parameter −6 | |
| Surf 1 | NSC Object 161 | Parameter 5: | Pickup From 63 | Scale | 1.0000E+000 | Offset | 0.0000E+000 | Column Parameter −6 | |
| Surf 1 | NSC Object 161 | Parameter 6: | Pickup From 3 | Scale | 1.0000E+000 | Offset | 0.0000E+000 | Column Parameter −6 | |
| Surf 1 | NSC Object 161 | Parameter 7: | Pickup From 3 | Scale | 1.0000E+000 | Offset | 0.0000E+000 | Column Parameter −6 | |
| Surf 1 | NSC Object 161 | Parameter 8: | Pickup From 3 | Scale | 1.0000E+000 | Offset | 0.0000E+000 | Column Parameter −6 | |
| Surf 1 | NSC Object 162 | Position Y: | Pickup From 4 | Scale | −1.0000E+000 | Offset | 0.0000E+000 | Column Parameter −6 | |
| Surf 1 | NSC Object 162 | Parameter 1: | Pickup From 3 | Scale | 1.0000E+000 | Offset | 0.0000E+000 | Column Parameter −6 | |
| Surf 1 | NSC Object 162 | Parameter 2: | Pickup From 3 | Scale | 1.0000E+000 | Offset | 0.0000E+000 | Column Parameter −6 | |
| Surf 1 | NSC Object 162 | Parameter 3: | Pickup From 3 | Scale | 1.0000E+000 | Offset | 0.0000E+000 | Column Parameter −6 | |
| Surf 1 | NSC Object 162 | Parameter 5: | Pickup From 63 | Scale | 1.0000E+000 | Offset | 0.0000E+000 | Column Parameter −6 | |
| Surf 1 | NSC Object 162 | Parameter 6: | Pickup From 3 | Scale | 1.0000E+000 | Offset | 0.0000E+000 | Column Parameter −6 | |
| Surf 1 | NSC Object 162 | Parameter 7: | Pickup From 3 | Scale | 1.0000E+000 | Offset | 0.0000E+000 | Column Parameter −6 | |
| Surf 1 | NSC Object 162 | Parameter 8: | Pickup From 3 | Scale | 1.0000E+000 | Offset | 0.0000E+000 | Column Parameter −6 | |
| Surf 1 | NSC Object 163 | Position Y: | Pickup From 4 | Scale | −1.0000E+000 | Offset | 0.0000E+000 | Column Parameter −6 | |
| Surf 1 | NSC Object 163 | Parameter 1: | Pickup From 3 | Scale | 1.0000E+000 | Offset | 0.0000E+000 | Column Parameter −6 | |
| Surf 1 | NSC Object 163 | Parameter 2: | Pickup From 3 | Scale | 1.0000E+000 | Offset | 0.0000E+000 | Column Parameter −6 | |
| Surf 1 | NSC Object 163 | Parameter 3: | Pickup From 3 | Scale | 1.0000E+000 | Offset | 0.0000E+000 | Column Parameter −6 | |
| Surf 1 | NSC Object 163 | Parameter 5: | Pickup From 63 | Scale | 1.0000E+000 | Offset | 0.0000E+000 | Column Parameter −6 | |
| Surf 1 | NSC Object 163 | Parameter 6: | Pickup From 3 | Scale | 1.0000E+000 | Offset | 0.0000E+000 | Column Parameter −6 | |
| Surf 1 | NSC Object 163 | Parameter 7: | Pickup From 3 | Scale | 1.0000E+000 | Offset | 0.0000E+000 | Column Parameter −6 | |
| Surf 1 | NSC Object 163 | Parameter 8: | Pickup From 3 | Scale | 1.0000E+000 | Offset | 0.0000E+000 | Column Parameter −6 | |
| Surf 1 | NSC Object 164 | Position Y: | Pickup From 4 | Scale | −1.0000E+000 | Offset | 0.0000E+000 | Column Parameter −6 | |
| Surf 1 | NSC Object 164 | Parameter 1: | Pickup From 3 | Scale | 1.0000E+000 | Offset | 0.0000E+000 | Column Parameter −6 | |
| Surf 1 | NSC Object 164 | Parameter 2: | Pickup From 3 | Scale | 1.0000E+000 | Offset | 0.0000E+000 | Column Parameter −6 | |
| Surf 1 | NSC Object 164 | Parameter 3: | Pickup From 3 | Scale | 1.0000E+000 | Offset | 0.0000E+000 | Column Parameter −6 | |
| Surf 1 | NSC Object 164 | Parameter 5: | Pickup From 63 | Scale | 1.0000E+000 | Offset | 0.0000E+000 | Column Parameter −6 | |
| Surf 1 | NSC Object 164 | Parameter 6: | Pickup From 3 | Scale | 1.0000E+000 | Offset | 0.0000E+000 | Column Parameter −6 | |
| Surf 1 | NSC Object 164 | Parameter 7: | Pickup From 3 | Scale | 1.0000E+000 | Offset | 0.0000E+000 | Column Parameter −6 | |
| Surf 1 | NSC Object 164 | Parameter 8: | Pickup From 3 | Scale | 1.0000E+000 | Offset | 0.0000E+000 | Column Parameter −6 | |
| Surf 1 | NSC Object 165 | Position Y: | Pickup From 4 | Scale | −1.0000E+000 | Offset | 0.0000E+000 | Column Parameter −6 | |
| Surf 1 | NSC Object 165 | Parameter 1: | Pickup From 3 | Scale | 1.0000E+000 | Offset | 0.0000E+000 | Column Parameter −6 | |
| Surf 1 | NSC Object 165 | Parameter 2: | Pickup From 3 | Scale | 1.0000E+000 | Offset | 0.0000E+000 | Column Parameter −6 | |
| Surf 1 | NSC Object 165 | Parameter 3: | Pickup From 3 | Scale | 1.0000E+000 | Offset | 0.0000E+000 | Column Parameter −6 | |
| Surf 1 | NSC Object 165 | Parameter 5: | Pickup From 63 | Scale | 1.0000E+000 | Offset | 0.0000E+000 | Column Parameter −6 | |
| Surf 1 | NSC Object 165 | Parameter 6: | Pickup From 3 | Scale | 1.0000E+000 | Offset | 0.0000E+000 | Column Parameter −6 | |
| Surf 1 | NSC Object 165 | Parameter 7: | Pickup From 3 | Scale | 1.0000E+000 | Offset | 0.0000E+000 | Column Parameter −6 | |
| Surf 1 | NSC Object 165 | Parameter 8: | Pickup From 3 | Scale | 1.0000E+000 | Offset | 0.0000E+000 | Column Parameter −6 | |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 167 | Position X: | Pickup From 2 | Scale | −6.0000E+000 | Offset | 0.0000E+000 | Column Parameter −6 |
| Surf 1 | NSC Object 167 | Parameter 1: | Pickup From 3 | Scale | 1.0000E+000 | Offset | 0.0000E+000 | Column Parameter −6 |
| Surf 1 | NSC Object 167 | Parameter 2: | Pickup From 3 | Scale | 1.0000E+000 | Offset | 0.0000E+000 | Column Parameter −6 |
| Surf 1 | NSC Object 167 | Parameter 3: | Pickup From 3 | Scale | 1.0000E+000 | Offset | 0.0000E+000 | Column Parameter −6 |
| Surf 1 | NSC Object 167 | Parameter 6: | Pickup From 3 | Scale | 1.0000E+000 | Offset | 0.0000E+000 | Column Parameter −6 |
| Surf 1 | NSC Object 167 | Parameter 7: | Pickup From 3 | Scale | 1.0000E+000 | Offset | 0.0000E+000 | Column Parameter −6 |
| Surf 1 | NSC Object 167 | Parameter 8: | Pickup From 3 | Scale | 1.0000E+000 | Offset | 0.0000E+000 | Column Parameter −6 |
| Surf 1 | NSC Object 168 | Position Y: | Pickup From 4 | Scale | 1.0000E+000 | Offset | 0.0000E+000 | Column Parameter −6 |
| Surf 1 | NSC Object 168 | Parameter 1: | Pickup From 3 | Scale | 1.0000E+000 | Offset | 0.0000E+000 | Column Parameter −6 |
| Surf 1 | NSC Object 168 | Parameter 2: | Pickup From 3 | Scale | 1.0000E+000 | Offset | 0.0000E+000 | Column Parameter −6 |
| Surf 1 | NSC Object 168 | Parameter 3: | Pickup From 3 | Scale | 1.0000E+000 | Offset | 0.0000E+000 | Column Parameter −6 |
| Surf 1 | NSC Object 168 | Parameter 5: | Pickup From 73 | Scale | 1.0000E+000 | Offset | 0.0000E+000 | Column Parameter −6 |
| Surf 1 | NSC Object 168 | Parameter 6: | Pickup From 3 | Scale | 1.0000E+000 | Offset | 0.0000E+000 | Column Parameter −6 |
| Surf 1 | NSC Object 168 | Parameter 7: | Pickup From 3 | Scale | 1.0000E+000 | Offset | 0.0000E+000 | Column Parameter −6 |
| Surf 1 | NSC Object 168 | Parameter 8: | Pickup From 3 | Scale | 1.0000E+000 | Offset | 0.0000E+000 | Column Parameter −6 |
| Surf 1 | NSC Object 169 | Position Y: | Pickup From 4 | Scale | 1.0000E+000 | Offset | 0.0000E+000 | Column Parameter −6 |
| Surf 1 | NSC Object 169 | Parameter 2: | Pickup From 3 | Scale | 1.0000E+000 | Offset | 0.0000E+000 | Column Parameter −6 |
| Surf 1 | NSC Object 169 | Parameter 3: | Pickup From 3 | Scale | 1.0000E+000 | Offset | 0.0000E+000 | Column Parameter −6 |
| Surf 1 | NSC Object 169 | Parameter 5: | Pickup From 73 | Scale | 1.0000E+000 | Offset | 0.0000E+000 | Column Parameter −6 |
| Surf 1 | NSC Object 169 | Parameter 6: | Pickup From 3 | Scale | 1.0000E+000 | Offset | 0.0000E+000 | Column Parameter −6 |
| Surf 1 | NSC Object 169 | Parameter 7: | Pickup From 3 | Scale | 1.0000E+000 | Offset | 0.0000E+000 | Column Parameter −6 |
| Surf 1 | NSC Object 169 | Parameter 8: | Pickup From 3 | Scale | 1.0000E+000 | Offset | 0.0000E+000 | Column Parameter −6 |
| Surf 1 | NSC Object 170 | Position Y: | Pickup From 4 | Scale | 1.0000E+000 | Offset | 0.0000E+000 | Column Parameter −6 |
| Surf 1 | NSC Object 170 | Parameter 1: | Pickup From 3 | Scale | 1.0000E+000 | Offset | 0.0000E+000 | Column Parameter −6 |
| Surf 1 | NSC Object 170 | Parameter 2: | Pickup From 3 | Scale | 1.0000E+000 | Offset | 0.0000E+000 | Column Parameter −6 |
| Surf 1 | NSC Object 170 | Parameter 3: | Pickup From 3 | Scale | 1.0000E+000 | Offset | 0.0000E+000 | Column Parameter −6 |
| Surf 1 | NSC Object 170 | Parameter 5: | Pickup From 73 | Scale | 1.0000E+000 | Offset | 0.0000E+000 | Column Parameter −6 |
| Surf 1 | NSC Object 170 | Parameter 6: | Pickup From 3 | Scale | 1.0000E+000 | Offset | 0.0000E+000 | Column Parameter −6 |
| Surf 1 | NSC Object 170 | Parameter 7: | Pickup From 3 | Scale | 1.0000E+000 | Offset | 0.0000E+000 | Column Parameter −6 |
| Surf 1 | NSC Object 170 | Parameter 8: | Pickup From 3 | Scale | 1.0000E+000 | Offset | 0.0000E+000 | Column Parameter −6 |
| Surf 1 | NSC Object 171 | Position Y: | Pickup From 4 | Scale | 1.0000E+000 | Offset | 0.0000E+000 | Column Parameter −6 |
| Surf 1 | NSC Object 172 | Position Y: | Pickup From 4 | Scale | −1.0000E+000 | Offset | 0.0000E+000 | Column Parameter −6 |
| Surf 1 | NSC Object 172 | Parameter 1: | Pickup From 3 | Scale | 1.0000E+000 | Offset | 0.0000E+000 | Column Parameter −6 |
| Surf 1 | NSC Object 172 | Parameter 2: | Pickup From 3 | Scale | 1.0000E+000 | Offset | 0.0000E+000 | Column Parameter −6 |
| Surf 1 | NSC Object 172 | Parameter 3: | Pickup From 3 | Scale | 1.0000E+000 | Offset | 0.0000E+000 | Column Parameter −6 |
| Surf 1 | NSC Object 172 | Parameter 5: | Pickup From 73 | Scale | 1.0000E+000 | Offset | 0.0000E+000 | Column Parameter −6 |
| Surf 1 | NSC Object 172 | Parameter 6: | Pickup From 3 | Scale | 1.0000E+000 | Offset | 0.0000E+000 | Column Parameter −6 |
| Surf 1 | NSC Object 172 | Parameter 7: | Pickup From 3 | Scale | 1.0000E+000 | Offset | 0.0000E+000 | Column Parameter −6 |
| Surf 1 | NSC Object 172 | Parameter 8: | Pickup From 3 | Scale | 1.0000E+000 | Offset | 0.0000E+000 | Column Parameter −6 |
| Surf 1 | NSC Object 173 | Position Y: | Pickup From 4 | Scale | −1.0000E+000 | Offset | 0.0000E+000 | Column Parameter −6 |
| Surf 1 | NSC Object 173 | Parameter 1: | Pickup From 3 | Scale | 1.0000E+000 | Offset | 0.0000E+000 | Column Parameter −6 |
| Surf 1 | NSC Object 173 | Parameter 2: | Pickup From 3 | Scale | 1.0000E+000 | Offset | 0.0000E+000 | Column Parameter −6 |
| Surf 1 | NSC Object 173 | Parameter 3: | Pickup From 3 | Scale | 1.0000E+000 | Offset | 0.0000E+000 | Column Parameter −6 |
| Surf 1 | NSC Object 173 | Parameter 5: | Pickup From 73 | Scale | 1.0000E+000 | Offset | 0.0000E+000 | Column Parameter −6 |
| Surf 1 | NSC Object 173 | Parameter 6: | Pickup From 3 | Scale | 1.0000E+000 | Offset | 0.0000E+000 | Column Parameter −6 |
| Surf 1 | NSC Object 173 | Parameter 7: | Pickup From 3 | Scale | 1.0000E+000 | Offset | 0.0000E+000 | Column Parameter −6 |
| Surf 1 | NSC Object 173 | Parameter 8: | Pickup From 3 | Scale | 1.0000E+000 | Offset | 0.0000E+000 | Column Parameter −6 |
| Surf 1 | NSC Object 174 | Position Y: | Pickup From 4 | Scale | −1.0000E+000 | Offset | 0.0000E+000 | Column Parameter −6 |
| Surf 1 | NSC Object 174 | Parameter 1: | Pickup From 3 | Scale | 1.0000E+000 | Offset | 0.0000E+000 | Column Parameter −6 |
| Surf 1 | NSC Object 174 | Parameter 2: | Pickup From 3 | Scale | 1.0000E+000 | Offset | 0.0000E+000 | Column Parameter −6 |
| Surf 1 | NSC Object 174 | Parameter 3: | Pickup From 3 | Scale | 1.0000E+000 | Offset | 0.0000E+000 | Column Parameter −6 |
| Surf 1 | NSC Object 174 | Parameter 5: | Pickup From 73 | Scale | 1.0000E+000 | Offset | 0.0000E+000 | Column Parameter −6 |
| Surf 1 | NSC Object 174 | Parameter 6: | Pickup From 3 | Scale | 1.0000E+000 | Offset | 0.0000E+000 | Column Parameter −6 |
| Surf 1 | NSC Object 174 | Parameter 7: | Pickup From 3 | Scale | 1.0000E+000 | Offset | 0.0000E+000 | Column Parameter −6 |
| Surf 1 | NSC Object 174 | Parameter 8: | Pickup From 3 | Scale | 1.0000E+000 | Offset | 0.0000E+000 | Column Parameter −6 |
| Surf 1 | NSC Object 175 | Position Y: | Pickup From 4 | Scale | −1.0000E+000 | Offset | 0.0000E+000 | Column Parameter −6 |
| Surf 1 | NSC Object 177 | Position X: | Pickup From 2 | Scale | −8.0000E+000 | Offset | 0.0000E+000 | Column Parameter −6 |
| Surf 1 | NSC Object 177 | Parameter 1: | Pickup From 3 | Scale | 1.0000E+000 | Offset | 0.0000E+000 | Column Parameter −6 |
| Surf 1 | NSC Object 177 | Parameter 2: | Pickup From 3 | Scale | 1.0000E+000 | Offset | 0.0000E+000 | Column Parameter −6 |
| Surf 1 | NSC Object 177 | Parameter 3: | Pickup From 3 | Scale | 1.0000E+000 | Offset | 0.0000E+000 | Column Parameter −6 |
| Surf 1 | NSC Object 177 | Parameter 6: | Pickup From 3 | Scale | 1.0000E+000 | Offset | 0.0000E+000 | Column Parameter −6 |
| Surf 1 | NSC Object 177 | Parameter 7: | Pickup From 3 | Scale | 1.0000E+000 | Offset | 0.0000E+000 | Column Parameter −6 |
| Surf 1 | NSC Object 177 | Parameter 8: | Pickup From 3 | Scale | 1.0000E+000 | Offset | 0.0000E+000 | Column Parameter −6 |
| Surf 1 | NSC Object 178 | Position Y: | Pickup From 4 | Scale | 1.0000E+000 | Offset | 0.0000E+000 | Column Parameter −6 |
| Surf 1 | NSC Object 178 | Parameter 1: | Pickup From 3 | Scale | 1.0000E+000 | Offset | 0.0000E+000 | Column Parameter −6 |
| Surf 1 | NSC Object 178 | Parameter 2: | Pickup From 3 | Scale | 1.0000E+000 | Offset | 0.0000E+000 | Column Parameter −6 |
| Surf 1 | NSC Object 178 | Parameter 3: | Pickup From 3 | Scale | 1.0000E+000 | Offset | 0.0000E+000 | Column Parameter −6 |
| Surf 1 | NSC Object 178 | Parameter 5: | Pickup From 83 | Scale | 1.0000E+000 | Offset | 0.0000E+000 | Column Parameter −6 |
| Surf 1 | NSC Object 178 | Parameter 6: | Pickup From 3 | Scale | 1.0000E+000 | Offset | 0.0000E+000 | Column Parameter −6 |
| Surf 1 | NSC Object 178 | Parameter 7: | Pickup From 3 | Scale | 1.0000E+000 | Offset | 0.0000E+000 | Column Parameter −6 |
| Surf 1 | NSC Object 178 | Parameter 8: | Pickup From 3 | Scale | 1.0000E+000 | Offset | 0.0000E+000 | Column Parameter −6 |
| Surf 1 | NSC Object 179 | Position Y: | Pickup From 4 | Scale | 1.0000E+000 | Offset | 0.0000E+000 | Column Parameter −6 |
| Surf 1 | NSC Object 179 | Parameter 1: | Pickup From 3 | Scale | 1.0000E+000 | Offset | 0.0000E+000 | Column Parameter −6 |
| Surf 1 | NSC Object 179 | Parameter 2: | Pickup From 3 | Scale | 1.0000E+000 | Offset | 0.0000E+000 | Column Parameter −6 |
| Surf 1 | NSC Object 179 | Parameter 3: | Pickup From 3 | Scale | 1.0000E+000 | Offset | 0.0000E+000 | Column Parameter −6 |
| Surf 1 | NSC Object 179 | Parameter 5: | Pickup From 83 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | |
|---|---|---|---|---|---|---|---|---|
| Surf 1 | NSC Object 179 | Parameter 6: | Pickup From 3 | Scale | 1.0000E+000 | Offset | 0.0000E+000 | Column Parameter −6 |
| Surf 1 | NSC Object 179 | Parameter 7: | Pickup From 3 | Scale | 1.0000E+000 | Offset | 0.0000E+000 | Column Parameter −6 |
| Surf 1 | NSC Object 179 | Parameter 8: | Pickup From 3 | Scale | 1.0000E+000 | Offset | 0.0000E+000 | Column Parameter −6 |
| Surf 1 | NSC Object 180 | Position Y: | Pickup From 4 | Scale | 1.0000E+000 | Offset | 0.0000E+000 | Column Parameter −6 |
| Surf 1 | NSC Object 181 | Position Y: | Pickup From 4 | Scale | 1.0000E+000 | Offset | 0.0000E+000 | Column Parameter −6 |
| Surf 1 | NSC Object 182 | Position Y: | Pickup From 4 | Scale | −1.0000E+000 | Offset | 0.0000E+000 | Column Parameter −6 |
| Surf 1 | NSC Object 182 | Parameter 1: | Pickup From 3 | Scale | 1.0000E+000 | Offset | 0.0000E+000 | Column Parameter −6 |
| Surf 1 | NSC Object 182 | Parameter 2: | Pickup From 3 | Scale | 1.0000E+000 | Offset | 0.0000E+000 | Column Parameter −6 |
| Surf 1 | NSC Object 182 | Parameter 3: | Pickup From 3 | Scale | 1.0000E+000 | Offset | 0.0000E+000 | Column Parameter −6 |
| Surf 1 | NSC Object 182 | Parameter 5: | Pickup From 83 | Scale | 1.0000E+000 | Offset | 0.0000E+000 | Column Parameter −6 |
| Surf 1 | NSC Object 182 | Parameter 6: | Pickup From 3 | Scale | 1.0000E+000 | Offset | 0.0000E+000 | Column Parameter −6 |
| Surf 1 | NSC Object 182 | Parameter 7: | Pickup From 3 | Scale | 1.0000E+000 | Offset | 0.0000E+000 | Column Parameter −6 |
| Surf 1 | NSC Object 182 | Parameter 8: | Pickup From 3 | Scale | 1.0000E+000 | Offset | 0.0000E+000 | Column Parameter −6 |
| Surf 1 | NSC Object 183 | Position Y: | Pickup From 4 | Scale | −1.0000E+000 | Offset | 0.0000E+000 | Column Parameter −6 |
| Surf 1 | NSC Object 183 | Parameter 1: | Pickup From 3 | Scale | 1.0000E+000 | Offset | 0.0000E+000 | Column Parameter −6 |
| Surf 1 | NSC Object 183 | Parameter 2: | Pickup From 3 | Scale | 1.0000E+000 | Offset | 0.0000E+000 | Column Parameter −6 |
| Surf 1 | NSC Object 183 | Parameter 3: | Pickup From 3 | Scale | 1.0000E+000 | Offset | 0.0000E+000 | Column Parameter −6 |
| Surf 1 | NSC Object 183 | Parameter 5: | Pickup From 83 | Scale | 1.0000E+000 | Offset | 0.0000E+000 | Column Parameter −6 |
| Surf 1 | NSC Object 183 | Parameter 6: | Pickup From 3 | Scale | 1.0000E+000 | Offset | 0.0000E+000 | Column Parameter −6 |
| Surf 1 | NSC Object 183 | Parameter 7: | Pickup From 3 | Scale | 1.0000E+000 | Offset | 0.0000E+000 | Column Parameter −6 |
| Surf 1 | NSC Object 183 | Parameter 8: | Pickup From 3 | Scale | 1.0000E+000 | Offset | 0.0000E+000 | Column Parameter −6 |
| Surf 1 | NSC Object 184 | Position Y: | Pickup From 4 | Scale | −1.0000E+000 | Offset | 0.0000E+000 | Column Parameter −6 |
| Surf 1 | NSC Object 185 | Position Y: | Pickup From 4 | Scale | −1.0000E+000 | Offset | 0.0000E+000 | Column Parameter −6 |
| Surf 1 | NSC Object 187 | Parameter 1: | Pickup From 93 | Scale | 1.0000E+000 | Offset | 0.0000E+000 | Column Parameter −6 |
| Surf 1 | NSC Object 187 | Parameter 2: | Pickup From 93 | Scale | 1.0000E+000 | Offset | 0.0000E+000 | Column Parameter −6 |
| Surf 1 | NSC Object 187 | Parameter 3: | Pickup From 93 | Scale | 1.0000E+000 | Offset | 0.0000E+000 | Column Parameter −6 |
| Surf 1 | NSC Object 187 | Parameter 4: | Pickup From 93 | Scale | 1.0000E+000 | Offset | 0.0000E+000 | Column Parameter −6 |
| Surf 1 | NSC Object 187 | Parameter 5: | Pickup From 93 | Scale | 1.0000E+000 | Offset | 0.0000E+000 | Column Parameter −6 |
| Surf 1 | NSC Object 187 | Parameter 6: | Pickup From 93 | Scale | 1.0000E+000 | Offset | 0.0000E+000 | Column Parameter −6 |
| Surf 1 | NSC Object 187 | Parameter 7: | Pickup From 93 | Scale | 1.0000E+000 | Offset | 0.0000E+000 | Column Parameter −6 |
| Surf 1 | NSC Object 187 | Parameter 8: | Pickup From 93 | Scale | 1.0000E+000 | Offset | 0.0000E+000 | Column Parameter −6 |
| Surf 1 | NSC Object 187 | Parameter 9: | Pickup From 93 | Scale | 1.0000E+000 | Offset | 0.0000E+000 | Column Parameter −6 |
| Surf 1 | NSC Object 189 | Position Y: | Pickup From 95 | Scale | −1.0000E+000 | Offset | 0.0000E+000 | Column Parameter −6 |
| Surf 1 | NSC Object 189 | Position Z: | Pickup From 95 | Scale | 1.0000E+000 | Offset | 0.0000E+000 | Column Parameter −6 |
| Surf 1 | NSC Object 191 | Parameter 1: | Pickup From 3 | Scale | 1.0000E+000 | Offset | 0.0000E+000 | Column Parameter −6 |
| Surf 1 | NSC Object 191 | Parameter 2: | Pickup From 3 | Scale | 1.0000E+000 | Offset | 0.0000E+000 | Column Parameter −6 |
| Surf 1 | NSC Object 192 | Parameter 1: | Pickup From 3 | Scale | 1.0000E+000 | Offset | 0.0000E+000 | Column Parameter −6 |
| Surf 1 | NSC Object 192 | Parameter 2: | Pickup From 3 | Scale | 1.0000E+000 | Offset | 0.0000E+000 | Column Parameter −6 |
| Surf 1 | NSC Object 192 | Parameter 3: | Pickup From 3 | Scale | 1.0000E+000 | Offset | 0.0000E+000 | Column Parameter −6 |
| Surf 1 | NSC Object 192 | Parameter 5: | Pickup From 3 | Scale | 1.0000E+000 | Offset | 0.0000E+000 | Column Parameter −6 |
| Surf 1 | NSC Object 192 | Parameter 6: | Pickup From 3 | Scale | 1.0000E+000 | Offset | 0.0000E+000 | Column Parameter −6 |
| Surf 1 | NSC Object 192 | Parameter 7: | Pickup From 3 | Scale | 1.0000E+000 | Offset | 0.0000E+000 | Column Parameter −6 |
| Surf 1 | NSC Object 192 | Parameter 8: | Pickup From 3 | Scale | 1.0000E+000 | Offset | 0.0000E+000 | Column Parameter −6 |
| Surf 1 | NSC Object 193 | Position Y: | Pickup From 4 | Scale | 1.0000E+000 | Offset | 0.0000E+000 | Column Parameter −6 |
| Surf 1 | NSC Object 193 | Parameter 1: | Pickup From 3 | Scale | 1.0000E+000 | Offset | 0.0000E+000 | Column Parameter −6 |
| Surf 1 | NSC Object 193 | Parameter 2: | Pickup From 3 | Scale | 1.0000E+000 | Offset | 0.0000E+000 | Column Parameter −6 |
| Surf 1 | NSC Object 193 | Parameter 3: | Pickup From 3 | Scale | 1.0000E+000 | Offset | 0.0000E+000 | Column Parameter −6 |
| Surf 1 | NSC Object 193 | Parameter 5: | Pickup From 3 | Scale | 1.0000E+000 | Offset | 0.0000E+000 | Column Parameter −6 |
| Surf 1 | NSC Object 193 | Parameter 6: | Pickup From 3 | Scale | 1.0000E+000 | Offset | 0.0000E+000 | Column Parameter −6 |
| Surf 1 | NSC Object 193 | Parameter 7: | Pickup From 3 | Scale | 1.0000E+000 | Offset | 0.0000E+000 | Column Parameter −6 |
| Surf 1 | NSC Object 193 | Parameter 8: | Pickup From 3 | Scale | 1.0000E+000 | Offset | 0.0000E+000 | Column Parameter −6 |
| Surf 1 | NSC Object 194 | Position Y: | Pickup From 4 | Scale | 1.0000E+000 | Offset | 0.0000E+000 | Column Parameter −6 |
| Surf 1 | NSC Object 194 | Parameter 2: | Pickup From 3 | Scale | 1.0000E+000 | Offset | 0.0000E+000 | Column Parameter −6 |
| Surf 1 | NSC Object 194 | Parameter 3: | Pickup From 3 | Scale | 1.0000E+000 | Offset | 0.0000E+000 | Column Parameter −6 |
| Surf 1 | NSC Object 194 | Parameter 5: | Pickup From 3 | Scale | 1.0000E+000 | Offset | 0.0000E+000 | Column Parameter −6 |
| Surf 1 | NSC Object 194 | Parameter 6: | Pickup From 3 | Scale | 1.0000E+000 | Offset | 0.0000E+000 | Column Parameter −6 |
| Surf 1 | NSC Object 194 | Parameter 7: | Pickup From 3 | Scale | 1.0000E+000 | Offset | 0.0000E+000 | Column Parameter −6 |
| Surf 1 | NSC Object 194 | Parameter 8: | Pickup From 3 | Scale | 1.0000E+000 | Offset | 0.0000E+000 | Column Parameter −6 |
| Surf 1 | NSC Object 195 | Position Y: | Pickup From 4 | Scale | 1.0000E+000 | Offset | 0.0000E+000 | Column Parameter −6 |
| Surf 1 | NSC Object 195 | Parameter 1: | Pickup From 3 | Scale | 1.0000E+000 | Offset | 0.0000E+000 | Column Parameter −6 |
| Surf 1 | NSC Object 195 | Parameter 2: | Pickup From 3 | Scale | 1.0000E+000 | Offset | 0.0000E+000 | Column Parameter −6 |
| Surf 1 | NSC Object 195 | Parameter 3: | Pickup From 3 | Scale | 1.0000E+000 | Offset | 0.0000E+000 | Column Parameter −6 |
| Surf 1 | NSC Object 195 | Parameter 5: | Pickup From 3 | Scale | 1.0000E+000 | Offset | 0.0000E+000 | Column Parameter −6 |
| Surf 1 | NSC Object 195 | Parameter 6: | Pickup From 3 | Scale | 1.0000E+000 | Offset | 0.0000E+000 | Column Parameter −6 |
| Surf 1 | NSC Object 195 | Parameter 7: | Pickup From 3 | Scale | 1.0000E+000 | Offset | 0.0000E+000 | Column Parameter −6 |
| Surf 1 | NSC Object 195 | Parameter 8: | Pickup From 3 | Scale | 1.0000E+000 | Offset | 0.0000E+000 | Column Parameter −6 |
| Surf 1 | NSC Object 196 | Position Y: | Pickup From 4 | Scale | −1.0000E+000 | Offset | 0.0000E+000 | Column Parameter −6 |
| Surf 1 | NSC Object 196 | Parameter 1: | Pickup From 3 | Scale | 1.0000E+000 | Offset | 0.0000E+000 | Column Parameter −6 |
| Surf 1 | NSC Object 196 | Parameter 2: | Pickup From 3 | Scale | 1.0000E+000 | Offset | 0.0000E+000 | Column Parameter −6 |
| Surf 1 | NSC Object 196 | Parameter 3: | Pickup From 3 | Scale | 1.0000E+000 | Offset | 0.0000E+000 | Column Parameter −6 |
| Surf 1 | NSC Object 196 | Parameter 5: | Pickup From 3 | Scale | 1.0000E+000 | Offset | 0.0000E+000 | Column Parameter −6 |
| Surf 1 | NSC Object 196 | Parameter 6: | Pickup From 3 | Scale | 1.0000E+000 | Offset | 0.0000E+000 | Column Parameter −6 |
| Surf 1 | NSC Object 196 | Parameter 7: | Pickup From 3 | Scale | 1.0000E+000 | Offset | 0.0000E+000 | Column Parameter −6 |
| Surf 1 | NSC Object 196 | Parameter 8: | Pickup From 3 | Scale | 1.0000E+000 | Offset | 0.0000E+000 | Column Parameter −6 |
| Surf 1 | NSC Object 197 | Position Y: | Pickup From 4 | Scale | −1.0000E+000 | Offset | 0.0000E+000 | Column Parameter −6 |
| Surf 1 | NSC Object 197 | Parameter 1: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 197 | Parameter 2: | Pickup From 3 | Scale | 1.0000E+000 | Offset | 0.0000E+000 | Column Parameter | −6 |
| Surf 1 | NSC Object 197 | Parameter 3: | Pickup From 3 | Scale | 1.0000E+000 | Offset | 0.0000E+000 | Column Parameter | −6 |
| Surf 1 | NSC Object 197 | Parameter 5: | Pickup From 3 | Scale | 1.0000E+000 | Offset | 0.0000E+000 | Column Parameter | −6 |
| Surf 1 | NSC Object 197 | Parameter 6: | Pickup From 3 | Scale | 1.0000E+000 | Offset | 0.0000E+000 | Column Parameter | −6 |
| Surf 1 | NSC Object 197 | Parameter 7: | Pickup From 3 | Scale | 1.0000E+000 | Offset | 0.0000E+000 | Column Parameter | −6 |
| Surf 1 | NSC Object 197 | Parameter 8: | Pickup From 3 | Scale | 1.0000E+000 | Offset | 0.0000E+000 | Column Parameter | −6 |
| Surf 1 | NSC Object 198 | Position Y: | Pickup From 4 | Scale | −1.0000E+000 | Offset | 0.0000E+000 | Column Parameter | −6 |
| Surf 1 | NSC Object 198 | Parameter 1: | Pickup From 3 | Scale | 1.0000E+000 | Offset | 0.0000E+000 | Column Parameter | −6 |
| Surf 1 | NSC Object 198 | Parameter 2: | Pickup From 3 | Scale | 1.0000E+000 | Offset | 0.0000E+000 | Column Parameter | −6 |
| Surf 1 | NSC Object 198 | Parameter 3: | Pickup From 3 | Scale | 1.0000E+000 | Offset | 0.0000E+000 | Column Parameter | −6 |
| Surf 1 | NSC Object 198 | Parameter 5: | Pickup From 3 | Scale | 1.0000E+000 | Offset | 0.0000E+000 | Column Parameter | −6 |
| Surf 1 | NSC Object 198 | Parameter 6: | Pickup From 3 | Scale | 1.0000E+000 | Offset | 0.0000E+000 | Column Parameter | −6 |
| Surf 1 | NSC Object 198 | Parameter 7: | Pickup From 3 | Scale | 1.0000E+000 | Offset | 0.0000E+000 | Column Parameter | −6 |
| Surf 1 | NSC Object 198 | Parameter 8: | Pickup From 3 | Scale | 1.0000E+000 | Offset | 0.0000E+000 | Column Parameter | −6 |
| Surf 1 | NSC Object 199 | Position Y: | Pickup From 4 | Scale | −1.0000E+000 | Offset | 0.0000E+000 | Column Parameter | −6 |
| Surf 1 | NSC Object 199 | Parameter 1: | Pickup From 3 | Scale | 1.0000E+000 | Offset | 0.0000E+000 | Column Parameter | −6 |
| Surf 1 | NSC Object 199 | Parameter 2: | Pickup From 3 | Scale | 1.0000E+000 | Offset | 0.0000E+000 | Column Parameter | −6 |
| Surf 1 | NSC Object 199 | Parameter 3: | Pickup From 3 | Scale | 1.0000E+000 | Offset | 0.0000E+000 | Column Parameter | −6 |
| Surf 1 | NSC Object 199 | Parameter 5: | Pickup From 3 | Scale | 1.0000E+000 | Offset | 0.0000E+000 | Column Parameter | −6 |
| Surf 1 | NSC Object 199 | Parameter 6: | Pickup From 3 | Scale | 1.0000E+000 | Offset | 0.0000E+000 | Column Parameter | −6 |
| Surf 1 | NSC Object 199 | Parameter 7: | Pickup From 3 | Scale | 1.0000E+000 | Offset | 0.0000E+000 | Column Parameter | −6 |
| Surf 1 | NSC Object 199 | Parameter 8: | Pickup From 3 | Scale | 1.0000E+000 | Offset | 0.0000E+000 | Column Parameter | −6 |
| Surf 1 | NSC Object 201 | Position X: | Pickup From 2 | Scale | 2.0000E+000 | Offset | 0.0000E+000 | Column Parameter | −6 |
| Surf 1 | NSC Object 201 | Parameter 1: | Pickup From 3 | Scale | 1.0000E+000 | Offset | 0.0000E+000 | Column Parameter | −6 |
| Surf 1 | NSC Object 201 | Parameter 2: | Pickup From 3 | Scale | 1.0000E+000 | Offset | 0.0000E+000 | Column Parameter | −6 |
| Surf 1 | NSC Object 201 | Parameter 3: | Pickup From 3 | Scale | 1.0000E+000 | Offset | 0.0000E+000 | Column Parameter | −6 |
| Surf 1 | NSC Object 201 | Parameter 6: | Pickup From 3 | Scale | 1.0000E+000 | Offset | 0.0000E+000 | Column Parameter | −6 |
| Surf 1 | NSC Object 201 | Parameter 7: | Pickup From 3 | Scale | 1.0000E+000 | Offset | 0.0000E+000 | Column Parameter | −6 |
| Surf 1 | NSC Object 201 | Parameter 8: | Pickup From 3 | Scale | 1.0000E+000 | Offset | 0.0000E+000 | Column Parameter | −6 |
| Surf 1 | NSC Object 202 | Position Y: | Pickup From 4 | Scale | 1.0000E+000 | Offset | 0.0000E+000 | Column Parameter | −6 |
| Surf 1 | NSC Object 202 | Parameter 1: | Pickup From 3 | Scale | 1.0000E+000 | Offset | 0.0000E+000 | Column Parameter | −6 |
| Surf 1 | NSC Object 202 | Parameter 2: | Pickup From 3 | Scale | 1.0000E+000 | Offset | 0.0000E+000 | Column Parameter | −6 |
| Surf 1 | NSC Object 202 | Parameter 3: | Pickup From 3 | Scale | 1.0000E+000 | Offset | 0.0000E+000 | Column Parameter | −6 |
| Surf 1 | NSC Object 202 | Parameter 5: | Pickup From 13 | Scale | 1.0000E+000 | Offset | 0.0000E+000 | Column Parameter | −6 |
| Surf 1 | NSC Object 202 | Parameter 6: | Pickup From 3 | Scale | 1.0000E+000 | Offset | 0.0000E+000 | Column Parameter | −6 |
| Surf 1 | NSC Object 202 | Parameter 7: | Pickup From 3 | Scale | 1.0000E+000 | Offset | 0.0000E+000 | Column Parameter | −6 |
| Surf 1 | NSC Object 202 | Parameter 8: | Pickup From 3 | Scale | 1.0000E+000 | Offset | 0.0000E+000 | Column Parameter | −6 |
| Surf 1 | NSC Object 203 | Position Y: | Pickup From 4 | Scale | 1.0000E+000 | Offset | 0.0000E+000 | Column Parameter | −6 |
| Surf 1 | NSC Object 203 | Parameter 1: | Pickup From 3 | Scale | 1.0000E+000 | Offset | 0.0000E+000 | Column Parameter | −6 |
| Surf 1 | NSC Object 203 | Parameter 2: | Pickup From 3 | Scale | 1.0000E+000 | Offset | 0.0000E+000 | Column Parameter | −6 |
| Surf 1 | NSC Object 203 | Parameter 3: | Pickup From 3 | Scale | 1.0000E+000 | Offset | 0.0000E+000 | Column Parameter | −6 |
| Surf 1 | NSC Object 203 | Parameter 5: | Pickup From 13 | Scale | 1.0000E+000 | Offset | 0.0000E+000 | Column Parameter | −6 |
| Surf 1 | NSC Object 203 | Parameter 6: | Pickup From 3 | Scale | 1.0000E+000 | Offset | 0.0000E+000 | Column Parameter | −6 |
| Surf 1 | NSC Object 203 | Parameter 7: | Pickup From 3 | Scale | 1.0000E+000 | Offset | 0.0000E+000 | Column Parameter | −6 |
| Surf 1 | NSC Object 203 | Parameter 8: | Pickup From 3 | Scale | 1.0000E+000 | Offset | 0.0000E+000 | Column Parameter | −6 |
| Surf 1 | NSC Object 204 | Position Y: | Pickup From 4 | Scale | 1.0000E+000 | Offset | 0.0000E+000 | Column Parameter | −6 |
| Surf 1 | NSC Object 204 | Parameter 1: | Pickup From 3 | Scale | 1.0000E+000 | Offset | 0.0000E+000 | Column Parameter | −6 |
| Surf 1 | NSC Object 204 | Parameter 2: | Pickup From 3 | Scale | 1.0000E+000 | Offset | 0.0000E+000 | Column Parameter | −6 |
| Surf 1 | NSC Object 204 | Parameter 3: | Pickup From 3 | Scale | 1.0000E+000 | Offset | 0.0000E+000 | Column Parameter | −6 |
| Surf 1 | NSC Object 204 | Parameter 5: | Pickup From 13 | Scale | 1.0000E+000 | Offset | 0.0000E+000 | Column Parameter | −6 |
| Surf 1 | NSC Object 204 | Parameter 6: | Pickup From 3 | Scale | 1.0000E+000 | Offset | 0.0000E+000 | Column Parameter | −6 |
| Surf 1 | NSC Object 204 | Parameter 7: | Pickup From 3 | Scale | 1.0000E+000 | Offset | 0.0000E+000 | Column Parameter | −6 |
| Surf 1 | NSC Object 204 | Parameter 8: | Pickup From 3 | Scale | 1.0000E+000 | Offset | 0.0000E+000 | Column Parameter | −6 |
| Surf 1 | NSC Object 205 | Position Y: | Pickup From 4 | Scale | 1.0000E+000 | Offset | 0.0000E+000 | Column Parameter | −6 |
| Surf 1 | NSC Object 205 | Parameter 1: | Pickup From 3 | Scale | 1.0000E+000 | Offset | 0.0000E+000 | Column Parameter | −6 |
| Surf 1 | NSC Object 205 | Parameter 2: | Pickup From 3 | Scale | 1.0000E+000 | Offset | 0.0000E+000 | Column Parameter | −6 |
| Surf 1 | NSC Object 205 | Parameter 3: | Pickup From 3 | Scale | 1.0000E+000 | Offset | 0.0000E+000 | Column Parameter | −6 |
| Surf 1 | NSC Object 205 | Parameter 5: | Pickup From 13 | Scale | 1.0000E+000 | Offset | 0.0000E+000 | Column Parameter | −6 |
| Surf 1 | NSC Object 205 | Parameter 6: | Pickup From 3 | Scale | 1.0000E+000 | Offset | 0.0000E+000 | Column Parameter | −6 |
| Surf 1 | NSC Object 205 | Parameter 7: | Pickup From 3 | Scale | 1.0000E+000 | Offset | 0.0000E+000 | Column Parameter | −6 |
| Surf 1 | NSC Object 205 | Parameter 8: | Pickup From 3 | Scale | 1.0000E+000 | Offset | 0.0000E+000 | Column Parameter | −6 |
| Surf 1 | NSC Object 206 | Position Y: | Pickup From 4 | Scale | −1.0000E+000 | Offset | 0.0000E+000 | Column Parameter | −6 |
| Surf 1 | NSC Object 206 | Parameter 1: | Pickup From 3 | Scale | 1.0000E+000 | Offset | 0.0000E+000 | Column Parameter | −6 |
| Surf 1 | NSC Object 206 | Parameter 2: | Pickup From 3 | Scale | 1.0000E+000 | Offset | 0.0000E+000 | Column Parameter | −6 |
| Surf 1 | NSC Object 206 | Parameter 3: | Pickup From 3 | Scale | 1.0000E+000 | Offset | 0.0000E+000 | Column Parameter | −6 |
| Surf 1 | NSC Object 206 | Parameter 5: | Pickup From 13 | Scale | 1.0000E+000 | Offset | 0.0000E+000 | Column Parameter | −6 |
| Surf 1 | NSC Object 206 | Parameter 6: | Pickup From 3 | Scale | 1.0000E+000 | Offset | 0.0000E+000 | Column Parameter | −6 |
| Surf 1 | NSC Object 206 | Parameter 7: | Pickup From 3 | Scale | 1.0000E+000 | Offset | 0.0000E+000 | Column Parameter | −6 |
| Surf 1 | NSC Object 206 | Parameter 8: | Pickup From 3 | Scale | 1.0000E+000 | Offset | 0.0000E+000 | Column Parameter | −6 |
| Surf 1 | NSC Object 207 | Position Y: | Pickup From 4 | Scale | −1.0000E+000 | Offset | 0.0000E+000 | Column Parameter | −6 |
| Surf 1 | NSC Object 207 | Parameter 1: | Pickup From 3 | Scale | 1.0000E+000 | Offset | 0.0000E+000 | Column Parameter | −6 |
| Surf 1 | NSC Object 207 | Parameter 2: | Pickup From 3 | Scale | 1.0000E+000 | Offset | 0.0000E+000 | Column Parameter | −6 |
| Surf 1 | NSC Object 207 | Parameter 3: | Pickup From 3 | Scale | 1.0000E+000 | Offset | 0.0000E+000 | Column Parameter | −6 |
| Surf 1 | NSC Object 207 | Parameter 5: | Pickup From 13 | Scale | 1.0000E+000 | Offset | 0.0000E+000 | Column Parameter | −6 |
| Surf 1 | NSC Object 207 | Parameter 6: | Pickup From 3 | Scale | 1.0000E+000 | Offset | 0.0000E+000 | Column Parameter | −6 |
| Surf 1 | NSC Object 207 | Parameter 7: | Pickup From 3 | Scale | 1.0000E+000 | Offset | 0.0000E+000 | Column Parameter | −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 207 | Parameter 8: | Pickup From 3 | Scale | 1.0000E+000 | Offset | 0.0000E+000 | Column Parameter −6 |
| Surf 1 | NSC Object 208 | Position Y: | Pickup From 4 | Scale | −1.0000E+000 | Offset | 0.0000E+000 | Column Parameter −6 |
| Surf 1 | NSC Object 208 | Parameter 1: | Pickup From 3 | Scale | 1.0000E+000 | Offset | 0.0000E+000 | Column Parameter −6 |
| Surf 1 | NSC Object 208 | Parameter 2: | Pickup From 3 | Scale | 1.0000E+000 | Offset | 0.0000E+000 | Column Parameter −6 |
| Surf 1 | NSC Object 208 | Parameter 3: | Pickup From 3 | Scale | 1.0000E+000 | Offset | 0.0000E+000 | Column Parameter −6 |
| Surf 1 | NSC Object 208 | Parameter 5: | Pickup From 13 | Scale | 1.0000E+000 | Offset | 0.0000E+000 | Column Parameter −6 |
| Surf 1 | NSC Object 208 | Parameter 6: | Pickup From 3 | Scale | 1.0000E+000 | Offset | 0.0000E+000 | Column Parameter −6 |
| Surf 1 | NSC Object 208 | Parameter 7: | Pickup From 3 | Scale | 1.0000E+000 | Offset | 0.0000E+000 | Column Parameter −6 |
| Surf 1 | NSC Object 208 | Parameter 8: | Pickup From 3 | Scale | 1.0000E+000 | Offset | 0.0000E+000 | Column Parameter −6 |
| Surf 1 | NSC Object 209 | Position Y: | Pickup From 4 | Scale | −1.0000E+000 | Offset | 0.0000E+000 | Column Parameter −6 |
| Surf 1 | NSC Object 209 | Parameter 1: | Pickup From 3 | Scale | 1.0000E+000 | Offset | 0.0000E+000 | Column Parameter −6 |
| Surf 1 | NSC Object 209 | Parameter 2: | Pickup From 3 | Scale | 1.0000E+000 | Offset | 0.0000E+000 | Column Parameter −6 |
| Surf 1 | NSC Object 209 | Parameter 3: | Pickup From 3 | Scale | 1.0000E+000 | Offset | 0.0000E+000 | Column Parameter −6 |
| Surf 1 | NSC Object 209 | Parameter 5: | Pickup From 13 | Scale | 1.0000E+000 | Offset | 0.0000E+000 | Column Parameter −6 |
| Surf 1 | NSC Object 209 | Parameter 6: | Pickup From 3 | Scale | 1.0000E+000 | Offset | 0.0000E+000 | Column Parameter −6 |
| Surf 1 | NSC Object 209 | Parameter 7: | Pickup From 3 | Scale | 1.0000E+000 | Offset | 0.0000E+000 | Column Parameter −6 |
| Surf 1 | NSC Object 209 | Parameter 8: | Pickup From 3 | Scale | 1.0000E+000 | Offset | 0.0000E+000 | Column Parameter −6 |
| Surf 1 | NSC Object 211 | Position X: | Pickup From 2 | Scale | 4.0000E+000 | Offset | 0.0000E+000 | Column Parameter −6 |
| Surf 1 | NSC Object 211 | Parameter 1: | Pickup From 3 | Scale | 1.0000E+000 | Offset | 0.0000E+000 | Column Parameter −6 |
| Surf 1 | NSC Object 211 | Parameter 2: | Pickup From 3 | Scale | 1.0000E+000 | Offset | 0.0000E+000 | Column Parameter −6 |
| Surf 1 | NSC Object 211 | Parameter 3: | Pickup From 3 | Scale | 1.0000E+000 | Offset | 0.0000E+000 | Column Parameter −6 |
| Surf 1 | NSC Object 211 | Parameter 6: | Pickup From 3 | Scale | 1.0000E+000 | Offset | 0.0000E+000 | Column Parameter −6 |
| Surf 1 | NSC Object 211 | Parameter 7: | Pickup From 3 | Scale | 1.0000E+000 | Offset | 0.0000E+000 | Column Parameter −6 |
| Surf 1 | NSC Object 211 | Parameter 8: | Pickup From 3 | Scale | 1.0000E+000 | Offset | 0.0000E+000 | Column Parameter −6 |
| Surf 1 | NSC Object 212 | Position Y: | Pickup From 4 | Scale | 1.0000E+000 | Offset | 0.0000E+000 | Column Parameter −6 |
| Surf 1 | NSC Object 212 | Parameter 1: | Pickup From 3 | Scale | 1.0000E+000 | Offset | 0.0000E+000 | Column Parameter −6 |
| Surf 1 | NSC Object 212 | Parameter 2: | Pickup From 3 | Scale | 1.0000E+000 | Offset | 0.0000E+000 | Column Parameter −6 |
| Surf 1 | NSC Object 212 | Parameter 3: | Pickup From 3 | Scale | 1.0000E+000 | Offset | 0.0000E+000 | Column Parameter −6 |
| Surf 1 | NSC Object 212 | Parameter 5: | Pickup From 23 | Scale | 1.0000E+000 | Offset | 0.0000E+000 | Column Parameter −6 |
| Surf 1 | NSC Object 212 | Parameter 6: | Pickup From 3 | Scale | 1.0000E+000 | Offset | 0.0000E+000 | Column Parameter −6 |
| Surf 1 | NSC Object 212 | Parameter 7: | Pickup From 3 | Scale | 1.0000E+000 | Offset | 0.0000E+000 | Column Parameter −6 |
| Surf 1 | NSC Object 212 | Parameter 8: | Pickup From 3 | Scale | 1.0000E+000 | Offset | 0.0000E+000 | Column Parameter −6 |
| Surf 1 | NSC Object 213 | Position Y: | Pickup From 4 | Scale | 1.0000E+000 | Offset | 0.0000E+000 | Column Parameter −6 |
| Surf 1 | NSC Object 213 | Parameter 1: | Pickup From 3 | Scale | 1.0000E+000 | Offset | 0.0000E+000 | Column Parameter −6 |
| Surf 1 | NSC Object 213 | Parameter 2: | Pickup From 3 | Scale | 1.0000E+000 | Offset | 0.0000E+000 | Column Parameter −6 |
| Surf 1 | NSC Object 213 | Parameter 3: | Pickup From 3 | Scale | 1.0000E+000 | Offset | 0.0000E+000 | Column Parameter −6 |
| Surf 1 | NSC Object 213 | Parameter 5: | Pickup From 23 | Scale | 1.0000E+000 | Offset | 0.0000E+000 | Column Parameter −6 |
| Surf 1 | NSC Object 213 | Parameter 6: | Pickup From 3 | Scale | 1.0000E+000 | Offset | 0.0000E+000 | Column Parameter −6 |
| Surf 1 | NSC Object 213 | Parameter 7: | Pickup From 3 | Scale | 1.0000E+000 | Offset | 0.0000E+000 | Column Parameter −6 |
| Surf 1 | NSC Object 213 | Parameter 8: | Pickup From 3 | Scale | 1.0000E+000 | Offset | 0.0000E+000 | Column Parameter −6 |
| Surf 1 | NSC Object 214 | Position Y: | Pickup From 4 | Scale | 1.0000E+000 | Offset | 0.0000E+000 | Column Parameter −6 |
| Surf 1 | NSC Object 214 | Parameter 1: | Pickup From 3 | Scale | 1.0000E+000 | Offset | 0.0000E+000 | Column Parameter −6 |
| Surf 1 | NSC Object 214 | Parameter 2: | Pickup From 3 | Scale | 1.0000E+000 | Offset | 0.0000E+000 | Column Parameter −6 |
| Surf 1 | NSC Object 214 | Parameter 3: | Pickup From 3 | Scale | 1.0000E+000 | Offset | 0.0000E+000 | Column Parameter −6 |
| Surf 1 | NSC Object 214 | Parameter 5: | Pickup From 23 | Scale | 1.0000E+000 | Offset | 0.0000E+000 | Column Parameter −6 |
| Surf 1 | NSC Object 214 | Parameter 6: | Pickup From 3 | Scale | 1.0000E+000 | Offset | 0.0000E+000 | Column Parameter −6 |
| Surf 1 | NSC Object 214 | Parameter 7: | Pickup From 3 | Scale | 1.0000E+000 | Offset | 0.0000E+000 | Column Parameter −6 |
| Surf 1 | NSC Object 214 | Parameter 8: | Pickup From 3 | Scale | 1.0000E+000 | Offset | 0.0000E+000 | Column Parameter −6 |
| Surf 1 | NSC Object 215 | Position Y: | Pickup From 4 | Scale | 1.0000E+000 | Offset | 0.0000E+000 | Column Parameter −6 |
| Surf 1 | NSC Object 215 | Parameter 1: | Pickup From 3 | Scale | 1.0000E+000 | Offset | 0.0000E+000 | Column Parameter −6 |
| Surf 1 | NSC Object 215 | Parameter 2: | Pickup From 3 | Scale | 1.0000E+000 | Offset | 0.0000E+000 | Column Parameter −6 |
| Surf 1 | NSC Object 215 | Parameter 3: | Pickup From 3 | Scale | 1.0000E+000 | Offset | 0.0000E+000 | Column Parameter −6 |
| Surf 1 | NSC Object 215 | Parameter 5: | Pickup From 23 | Scale | 1.0000E+000 | Offset | 0.0000E+000 | Column Parameter −6 |
| Surf 1 | NSC Object 215 | Parameter 6: | Pickup From 3 | Scale | 1.0000E+000 | Offset | 0.0000E+000 | Column Parameter −6 |
| Surf 1 | NSC Object 215 | Parameter 7: | Pickup From 3 | Scale | 1.0000E+000 | Offset | 0.0000E+000 | Column Parameter −6 |
| Surf 1 | NSC Object 215 | Parameter 8: | Pickup From 3 | Scale | 1.0000E+000 | Offset | 0.0000E+000 | Column Parameter −6 |
| Surf 1 | NSC Object 216 | Position Y: | Pickup From 4 | Scale | −1.0000E+000 | Offset | 0.0000E+000 | Column Parameter −6 |
| Surf 1 | NSC Object 216 | Parameter 1: | Pickup From 3 | Scale | 1.0000E+000 | Offset | 0.0000E+000 | Column Parameter −6 |
| Surf 1 | NSC Object 216 | Parameter 2: | Pickup From 3 | Scale | 1.0000E+000 | Offset | 0.0000E+000 | Column Parameter −6 |
| Surf 1 | NSC Object 216 | Parameter 3: | Pickup From 3 | Scale | 1.0000E+000 | Offset | 0.0000E+000 | Column Parameter −6 |
| Surf 1 | NSC Object 216 | Parameter 5: | Pickup From 23 | Scale | 1.0000E+000 | Offset | 0.0000E+000 | Column Parameter −6 |
| Surf 1 | NSC Object 216 | Parameter 6: | Pickup From 3 | Scale | 1.0000E+000 | Offset | 0.0000E+000 | Column Parameter −6 |
| Surf 1 | NSC Object 216 | Parameter 7: | Pickup From 3 | Scale | 1.0000E+000 | Offset | 0.0000E+000 | Column Parameter −6 |
| Surf 1 | NSC Object 216 | Parameter 8: | Pickup From 3 | Scale | 1.0000E+000 | Offset | 0.0000E+000 | Column Parameter −6 |
| Surf 1 | NSC Object 217 | Position Y: | Pickup From 4 | Scale | −1.0000E+000 | Offset | 0.0000E+000 | Column Parameter −6 |
| Surf 1 | NSC Object 217 | Parameter 1: | Pickup From 3 | Scale | 1.0000E+000 | Offset | 0.0000E+000 | Column Parameter −6 |
| Surf 1 | NSC Object 217 | Parameter 2: | Pickup From 3 | Scale | 1.0000E+000 | Offset | 0.0000E+000 | Column Parameter −6 |
| Surf 1 | NSC Object 217 | Parameter 3: | Pickup From 3 | Scale | 1.0000E+000 | Offset | 0.0000E+000 | Column Parameter −6 |
| Surf 1 | NSC Object 217 | Parameter 5: | Pickup From 23 | Scale | 1.0000E+000 | Offset | 0.0000E+000 | Column Parameter −6 |
| Surf 1 | NSC Object 217 | Parameter 6: | Pickup From 3 | Scale | 1.0000E+000 | Offset | 0.0000E+000 | Column Parameter −6 |
| Surf 1 | NSC Object 217 | Parameter 7: | Pickup From 3 | Scale | 1.0000E+000 | Offset | 0.0000E+000 | Column Parameter −6 |
| Surf 1 | NSC Object 217 | Parameter 8: | Pickup From 3 | Scale | 1.0000E+000 | Offset | 0.0000E+000 | Column Parameter −6 |
| Surf 1 | NSC Object 218 | Position Y: | Pickup From 4 | Scale | −1.0000E+000 | Offset | 0.0000E+000 | Column Parameter −6 |
| Surf 1 | NSC Object 218 | Parameter 1: | Pickup From 3 | Scale | 1.0000E+000 | Offset | 0.0000E+000 | Column Parameter −6 |
| Surf 1 | NSC Object 218 | Parameter 2: | Pickup From 3 | Scale | 1.0000E+000 | Offset | 0.0000E+000 | Column Parameter −6 |
| Surf 1 | NSC Object 218 | Parameter 3: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| Surf 1 | NSC Object 218 | Parameter 5: | Pickup From 23 | Scale | 1.0000E+000 | Offset | 0.0000E+000 | Column Parameter −6 |
|---|---|---|---|---|---|---|---|---|
| Surf 1 | NSC Object 218 | Parameter 6: | Pickup From 3 | Scale | 1.0000E+000 | Offset | 0.0000E+000 | Column Parameter −6 |
| Surf 1 | NSC Object 218 | Parameter 7: | Pickup From 3 | Scale | 1.0000E+000 | Offset | 0.0000E+000 | Column Parameter −6 |
| Surf 1 | NSC Object 218 | Parameter 8: | Pickup From 3 | Scale | 1.0000E+000 | Offset | 0.0000E+000 | Column Parameter −6 |
| Surf 1 | NSC Object 219 | Position Y: | Pickup From 4 | Scale | −1.0000E+000 | Offset | 0.0000E+000 | Column Parameter −6 |
| Surf 1 | NSC Object 219 | Parameter 1: | Pickup From 3 | Scale | 1.0000E+000 | Offset | 0.0000E+000 | Column Parameter −6 |
| Surf 1 | NSC Object 219 | Parameter 2: | Pickup From 3 | Scale | 1.0000E+000 | Offset | 0.0000E+000 | Column Parameter −6 |
| Surf 1 | NSC Object 219 | Parameter 3: | Pickup From 3 | Scale | 1.0000E+000 | Offset | 0.0000E+000 | Column Parameter −6 |
| Surf 1 | NSC Object 219 | Parameter 5: | Pickup From 23 | Scale | 1.0000E+000 | Offset | 0.0000E+000 | Column Parameter −6 |
| Surf 1 | NSC Object 219 | Parameter 6: | Pickup From 3 | Scale | 1.0000E+000 | Offset | 0.0000E+000 | Column Parameter −6 |
| Surf 1 | NSC Object 219 | Parameter 7: | Pickup From 3 | Scale | 1.0000E+000 | Offset | 0.0000E+000 | Column Parameter −6 |
| Surf 1 | NSC Object 219 | Parameter 8: | Pickup From 3 | Scale | 1.0000E+000 | Offset | 0.0000E+000 | Column Parameter −6 |
| Surf 1 | NSC Object 221 | Position X: | Pickup From 2 | Scale | 6.0000E+000 | Offset | 0.0000E+000 | Column Parameter −6 |
| Surf 1 | NSC Object 221 | Parameter 1: | Pickup From 3 | Scale | 1.0000E+000 | Offset | 0.0000E+000 | Column Parameter −6 |
| Surf 1 | NSC Object 221 | Parameter 2: | Pickup From 3 | Scale | 1.0000E+000 | Offset | 0.0000E+000 | Column Parameter −6 |
| Surf 1 | NSC Object 221 | Parameter 3: | Pickup From 3 | Scale | 1.0000E+000 | Offset | 0.0000E+000 | Column Parameter −6 |
| Surf 1 | NSC Object 221 | Parameter 6: | Pickup From 3 | Scale | 1.0000E+000 | Offset | 0.0000E+000 | Column Parameter −6 |
| Surf 1 | NSC Object 221 | Parameter 7: | Pickup From 3 | Scale | 1.0000E+000 | Offset | 0.0000E+000 | Column Parameter −6 |
| Surf 1 | NSC Object 221 | Parameter 8: | Pickup From 3 | Scale | 1.0000E+000 | Offset | 0.0000E+000 | Column Parameter −6 |
| Surf 1 | NSC Object 222 | Position Y: | Pickup From 4 | Scale | 1.0000E+000 | Offset | 0.0000E+000 | Column Parameter −6 |
| Surf 1 | NSC Object 222 | Parameter 1: | Pickup From 3 | Scale | 1.0000E+000 | Offset | 0.0000E+000 | Column Parameter −6 |
| Surf 1 | NSC Object 222 | Parameter 2: | Pickup From 3 | Scale | 1.0000E+000 | Offset | 0.0000E+000 | Column Parameter −6 |
| Surf 1 | NSC Object 222 | Parameter 3: | Pickup From 3 | Scale | 1.0000E+000 | Offset | 0.0000E+000 | Column Parameter −6 |
| Surf 1 | NSC Object 222 | Parameter 5: | Pickup From 33 | Scale | 1.0000E+000 | Offset | 0.0000E+000 | Column Parameter −6 |
| Surf 1 | NSC Object 222 | Parameter 6: | Pickup From 3 | Scale | 1.0000E+000 | Offset | 0.0000E+000 | Column Parameter −6 |
| Surf 1 | NSC Object 222 | Parameter 7: | Pickup From 3 | Scale | 1.0000E+000 | Offset | 0.0000E+000 | Column Parameter −6 |
| Surf 1 | NSC Object 222 | Parameter 8: | Pickup From 3 | Scale | 1.0000E+000 | Offset | 0.0000E+000 | Column Parameter −6 |
| Surf 1 | NSC Object 223 | Position Y: | Pickup From 4 | Scale | 1.0000E+000 | Offset | 0.0000E+000 | Column Parameter −6 |
| Surf 1 | NSC Object 223 | Parameter 1: | Pickup From 3 | Scale | 1.0000E+000 | Offset | 0.0000E+000 | Column Parameter −6 |
| Surf 1 | NSC Object 223 | Parameter 2: | Pickup From 3 | Scale | 1.0000E+000 | Offset | 0.0000E+000 | Column Parameter −6 |
| Surf 1 | NSC Object 223 | Parameter 3: | Pickup From 3 | Scale | 1.0000E+000 | Offset | 0.0000E+000 | Column Parameter −6 |
| Surf 1 | NSC Object 223 | Parameter 5: | Pickup From 33 | Scale | 1.0000E+000 | Offset | 0.0000E+000 | Column Parameter −6 |
| Surf 1 | NSC Object 223 | Parameter 6: | Pickup From 3 | Scale | 1.0000E+000 | Offset | 0.0000E+000 | Column Parameter −6 |
| Surf 1 | NSC Object 223 | Parameter 7: | Pickup From 3 | Scale | 1.0000E+000 | Offset | 0.0000E+000 | Column Parameter −6 |
| Surf 1 | NSC Object 223 | Parameter 8: | Pickup From 3 | Scale | 1.0000E+000 | Offset | 0.0000E+000 | Column Parameter −6 |
| Surf 1 | NSC Object 224 | Position Y: | Pickup From 4 | Scale | 1.0000E+000 | Offset | 0.0000E+000 | Column Parameter −6 |
| Surf 1 | NSC Object 224 | Parameter 1: | Pickup From 3 | Scale | 1.0000E+000 | Offset | 0.0000E+000 | Column Parameter −6 |
| Surf 1 | NSC Object 224 | Parameter 2: | Pickup From 3 | Scale | 1.0000E+000 | Offset | 0.0000E+000 | Column Parameter −6 |
| Surf 1 | NSC Object 224 | Parameter 3: | Pickup From 3 | Scale | 1.0000E+000 | Offset | 0.0000E+000 | Column Parameter −6 |
| Surf 1 | NSC Object 224 | Parameter 5: | Pickup From 33 | Scale | 1.0000E+000 | Offset | 0.0000E+000 | Column Parameter −6 |
| Surf 1 | NSC Object 224 | Parameter 6: | Pickup From 3 | Scale | 1.0000E+000 | Offset | 0.0000E+000 | Column Parameter −6 |
| Surf 1 | NSC Object 224 | Parameter 7: | Pickup From 3 | Scale | 1.0000E+000 | Offset | 0.0000E+000 | Column Parameter −6 |
| Surf 1 | NSC Object 224 | Parameter 8: | Pickup From 3 | Scale | 1.0000E+000 | Offset | 0.0000E+000 | Column Parameter −6 |
| Surf 1 | NSC Object 225 | Position Y: | Pickup From 4 | Scale | 1.0000E+000 | Offset | 0.0000E+000 | Column Parameter −6 |
| Surf 1 | NSC Object 226 | Position Y: | Pickup From 4 | Scale | −1.0000E+000 | Offset | 0.0000E+000 | Column Parameter −6 |
| Surf 1 | NSC Object 226 | Parameter 1: | Pickup From 3 | Scale | 1.0000E+000 | Offset | 0.0000E+000 | Column Parameter −6 |
| Surf 1 | NSC Object 226 | Parameter 2: | Pickup From 3 | Scale | 1.0000E+000 | Offset | 0.0000E+000 | Column Parameter −6 |
| Surf 1 | NSC Object 226 | Parameter 3: | Pickup From 3 | Scale | 1.0000E+000 | Offset | 0.0000E+000 | Column Parameter −6 |
| Surf 1 | NSC Object 226 | Parameter 5: | Pickup From 33 | Scale | 1.0000E+000 | Offset | 0.0000E+000 | Column Parameter −6 |
| Surf 1 | NSC Object 226 | Parameter 6: | Pickup From 3 | Scale | 1.0000E+000 | Offset | 0.0000E+000 | Column Parameter −6 |
| Surf 1 | NSC Object 226 | Parameter 7: | Pickup From 3 | Scale | 1.0000E+000 | Offset | 0.0000E+000 | Column Parameter −6 |
| Surf 1 | NSC Object 226 | Parameter 8: | Pickup From 3 | Scale | 1.0000E+000 | Offset | 0.0000E+000 | Column Parameter −6 |
| Surf 1 | NSC Object 227 | Position Y: | Pickup From 4 | Scale | −1.0000E+000 | Offset | 0.0000E+000 | Column Parameter −6 |
| Surf 1 | NSC Object 227 | Parameter 1: | Pickup From 3 | Scale | 1.0000E+000 | Offset | 0.0000E+000 | Column Parameter −6 |
| Surf 1 | NSC Object 227 | Parameter 2: | Pickup From 3 | Scale | 1.0000E+000 | Offset | 0.0000E+000 | Column Parameter −6 |
| Surf 1 | NSC Object 227 | Parameter 3: | Pickup From 3 | Scale | 1.0000E+000 | Offset | 0.0000E+000 | Column Parameter −6 |
| Surf 1 | NSC Object 227 | Parameter 5: | Pickup From 33 | Scale | 1.0000E+000 | Offset | 0.0000E+000 | Column Parameter −6 |
| Surf 1 | NSC Object 227 | Parameter 6: | Pickup From 3 | Scale | 1.0000E+000 | Offset | 0.0000E+000 | Column Parameter −6 |
| Surf 1 | NSC Object 227 | Parameter 7: | Pickup From 3 | Scale | 1.0000E+000 | Offset | 0.0000E+000 | Column Parameter −6 |
| Surf 1 | NSC Object 227 | Parameter 8: | Pickup From 3 | Scale | 1.0000E+000 | Offset | 0.0000E+000 | Column Parameter −6 |
| Surf 1 | NSC Object 228 | Position Y: | Pickup From 4 | Scale | −1.0000E+000 | Offset | 0.0000E+000 | Column Parameter −6 |
| Surf 1 | NSC Object 228 | Parameter 1: | Pickup From 3 | Scale | 1.0000E+000 | Offset | 0.0000E+000 | Column Parameter −6 |
| Surf 1 | NSC Object 228 | Parameter 2: | Pickup From 3 | Scale | 1.0000E+000 | Offset | 0.0000E+000 | Column Parameter −6 |
| Surf 1 | NSC Object 228 | Parameter 3: | Pickup From 3 | Scale | 1.0000E+000 | Offset | 0.0000E+000 | Column Parameter −6 |
| Surf 1 | NSC Object 228 | Parameter 5: | Pickup From 33 | Scale | 1.0000E+000 | Offset | 0.0000E+000 | Column Parameter −6 |
| Surf 1 | NSC Object 228 | Parameter 6: | Pickup From 3 | Scale | 1.0000E+000 | Offset | 0.0000E+000 | Column Parameter −6 |
| Surf 1 | NSC Object 228 | Parameter 7: | Pickup From 3 | Scale | 1.0000E+000 | Offset | 0.0000E+000 | Column Parameter −6 |
| Surf 1 | NSC Object 228 | Parameter 8: | Pickup From 3 | Scale | 1.0000E+000 | Offset | 0.0000E+000 | Column Parameter −6 |
| Surf 1 | NSC Object 229 | Position Y: | Pickup From 4 | Scale | −1.0000E+000 | Offset | 0.0000E+000 | Column Parameter −6 |
| Surf 1 | NSC Object 231 | Position X: | Pickup From 2 | Scale | 8.0000E+000 | Offset | 0.0000E+000 | Column Parameter −6 |
| Surf 1 | NSC Object 231 | Parameter 1: | Pickup From 3 | Scale | 1.0000E+000 | Offset | 0.0000E+000 | Column Parameter −6 |
| Surf 1 | NSC Object 231 | Parameter 2: | Pickup From 3 | Scale | 1.0000E+000 | Offset | 0.0000E+000 | Column Parameter −6 |
| Surf 1 | NSC Object 231 | Parameter 3: | Pickup From 3 | Scale | 1.0000E+000 | Offset | 0.0000E+000 | Column Parameter −6 |
| Surf 1 | NSC Object 231 | Parameter 6: | Pickup From 3 | Scale | 1.0000E+000 | Offset | 0.0000E+000 | Column Parameter −6 |
| Surf 1 | NSC Object 231 | Parameter 7: | Pickup From 3 | Scale | 1.0000E+000 | Offset | 0.0000E+000 | Column Parameter −6 |
| Surf 1 | NSC Object 231 | Parameter 8: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | |
|---|---|---|---|---|---|---|---|---|
| Surf 1 | NSC Object 232 | Position Y: | Pickup From 4 | Scale | 1.0000E+000 | Offset | 0.0000E+000 | Column Parameter −6 |
| Surf 1 | NSC Object 232 | Parameter 1: | Pickup From 3 | Scale | 1.0000E+000 | Offset | 0.0000E+000 | Column Parameter −6 |
| Surf 1 | NSC Object 232 | Parameter 2: | Pickup From 3 | Scale | 1.0000E+000 | Offset | 0.0000E+000 | Column Parameter −6 |
| Surf 1 | NSC Object 232 | Parameter 3: | Pickup From 3 | Scale | 1.0000E+000 | Offset | 0.0000E+000 | Column Parameter −6 |
| Surf 1 | NSC Object 232 | Parameter 5: | Pickup From 43 | Scale | 1.0000E+000 | Offset | 0.0000E+000 | Column Parameter −6 |
| Surf 1 | NSC Object 232 | Parameter 6: | Pickup From 3 | Scale | 1.0000E+000 | Offset | 0.0000E+000 | Column Parameter −6 |
| Surf 1 | NSC Object 232 | Parameter 7: | Pickup From 3 | Scale | 1.0000E+000 | Offset | 0.0000E+000 | Column Parameter −6 |
| Surf 1 | NSC Object 232 | Parameter 8: | Pickup From 3 | Scale | 1.0000E+000 | Offset | 0.0000E+000 | Column Parameter −6 |
| Surf 1 | NSC Object 233 | Position Y: | Pickup From 4 | Scale | 1.0000E+000 | Offset | 0.0000E+000 | Column Parameter −6 |
| Surf 1 | NSC Object 233 | Parameter 1: | Pickup From 3 | Scale | 1.0000E+000 | Offset | 0.0000E+000 | Column Parameter −6 |
| Surf 1 | NSC Object 233 | Parameter 2: | Pickup From 3 | Scale | 1.0000E+000 | Offset | 0.0000E+000 | Column Parameter −6 |
| Surf 1 | NSC Object 233 | Parameter 3: | Pickup From 3 | Scale | 1.0000E+000 | Offset | 0.0000E+000 | Column Parameter −6 |
| Surf 1 | NSC Object 233 | Parameter 5: | Pickup From 43 | Scale | 1.0000E+000 | Offset | 0.0000E+000 | Column Parameter −6 |
| Surf 1 | NSC Object 233 | Parameter 6: | Pickup From 3 | Scale | 1.0000E+000 | Offset | 0.0000E+000 | Column Parameter −6 |
| Surf 1 | NSC Object 233 | Parameter 7: | Pickup From 3 | Scale | 1.0000E+000 | Offset | 0.0000E+000 | Column Parameter −6 |
| Surf 1 | NSC Object 233 | Parameter 8: | Pickup From 3 | Scale | 1.0000E+000 | Offset | 0.0000E+000 | Column Parameter −6 |
| Surf 1 | NSC Object 234 | Position Y: | Pickup From 4 | Scale | 1.0000E+000 | Offset | 0.0000E+000 | Column Parameter −6 |
| Surf 1 | NSC Object 235 | Position Y: | Pickup From 4 | Scale | 1.0000E+000 | Offset | 0.0000E+000 | Column Parameter −6 |
| Surf 1 | NSC Object 236 | Position Y: | Pickup From 4 | Scale | −1.0000E+000 | Offset | 0.0000E+000 | Column Parameter −6 |
| Surf 1 | NSC Object 236 | Parameter 1: | Pickup From 3 | Scale | 1.0000E+000 | Offset | 0.0000E+000 | Column Parameter −6 |
| Surf 1 | NSC Object 236 | Parameter 2: | Pickup From 3 | Scale | 1.0000E+000 | Offset | 0.0000E+000 | Column Parameter −6 |
| Surf 1 | NSC Object 236 | Parameter 3: | Pickup From 3 | Scale | 1.0000E+000 | Offset | 0.0000E+000 | Column Parameter −6 |
| Surf 1 | NSC Object 236 | Parameter 5: | Pickup From 43 | Scale | 1.0000E+000 | Offset | 0.0000E+000 | Column Parameter −6 |
| Surf 1 | NSC Object 236 | Parameter 6: | Pickup From 3 | Scale | 1.0000E+000 | Offset | 0.0000E+000 | Column Parameter −6 |
| Surf 1 | NSC Object 236 | Parameter 7: | Pickup From 3 | Scale | 1.0000E+000 | Offset | 0.0000E+000 | Column Parameter −6 |
| Surf 1 | NSC Object 236 | Parameter 8: | Pickup From 3 | Scale | 1.0000E+000 | Offset | 0.0000E+000 | Column Parameter −6 |
| Surf 1 | NSC Object 237 | Position Y: | Pickup From 4 | Scale | −1.0000E+000 | Offset | 0.0000E+000 | Column Parameter −6 |
| Surf 1 | NSC Object 237 | Parameter 1: | Pickup From 3 | Scale | 1.0000E+000 | Offset | 0.0000E+000 | Column Parameter −6 |
| Surf 1 | NSC Object 237 | Parameter 2: | Pickup From 3 | Scale | 1.0000E+000 | Offset | 0.0000E+000 | Column Parameter −6 |
| Surf 1 | NSC Object 237 | Parameter 3: | Pickup From 3 | Scale | 1.0000E+000 | Offset | 0.0000E+000 | Column Parameter −6 |
| Surf 1 | NSC Object 237 | Parameter 5: | Pickup From 43 | Scale | 1.0000E+000 | Offset | 0.0000E+000 | Column Parameter −6 |
| Surf 1 | NSC Object 237 | Parameter 6: | Pickup From 3 | Scale | 1.0000E+000 | Offset | 0.0000E+000 | Column Parameter −6 |
| Surf 1 | NSC Object 237 | Parameter 7: | Pickup From 3 | Scale | 1.0000E+000 | Offset | 0.0000E+000 | Column Parameter −6 |
| Surf 1 | NSC Object 237 | Parameter 8: | Pickup From 3 | Scale | 1.0000E+000 | Offset | 0.0000E+000 | Column Parameter −6 |
| Surf 1 | NSC Object 238 | Position Y: | Pickup From 4 | Scale | −1.0000E+000 | Offset | 0.0000E+000 | Column Parameter −6 |
| Surf 1 | NSC Object 239 | Position Y: | Pickup From 4 | Scale | −1.0000E+000 | Offset | 0.0000E+000 | Column Parameter −6 |
| Surf 1 | NSC Object 241 | Position X: | Pickup From 2 | Scale | −2.0000E+000 | Offset | 0.0000E+000 | Column Parameter −6 |
| Surf 1 | NSC Object 241 | Parameter 1: | Pickup From 3 | Scale | 1.0000E+000 | Offset | 0.0000E+000 | Column Parameter −6 |
| Surf 1 | NSC Object 241 | Parameter 2: | Pickup From 3 | Scale | 1.0000E+000 | Offset | 0.0000E+000 | Column Parameter −6 |
| Surf 1 | NSC Object 241 | Parameter 3: | Pickup From 3 | Scale | 1.0000E+000 | Offset | 0.0000E+000 | Column Parameter −6 |
| Surf 1 | NSC Object 241 | Parameter 6: | Pickup From 3 | Scale | 1.0000E+000 | Offset | 0.0000E+000 | Column Parameter −6 |
| Surf 1 | NSC Object 241 | Parameter 7: | Pickup From 3 | Scale | 1.0000E+000 | Offset | 0.0000E+000 | Column Parameter −6 |
| Surf 1 | NSC Object 241 | Parameter 8: | Pickup From 3 | Scale | 1.0000E+000 | Offset | 0.0000E+000 | Column Parameter −6 |
| Surf 1 | NSC Object 242 | Position Y: | Pickup From 4 | Scale | 1.0000E+000 | Offset | 0.0000E+000 | Column Parameter −6 |
| Surf 1 | NSC Object 242 | Parameter 1: | Pickup From 3 | Scale | 1.0000E+000 | Offset | 0.0000E+000 | Column Parameter −6 |
| Surf 1 | NSC Object 242 | Parameter 2: | Pickup From 3 | Scale | 1.0000E+000 | Offset | 0.0000E+000 | Column Parameter −6 |
| Surf 1 | NSC Object 242 | Parameter 3: | Pickup From 3 | Scale | 1.0000E+000 | Offset | 0.0000E+000 | Column Parameter −6 |
| Surf 1 | NSC Object 242 | Parameter 5: | Pickup From 53 | Scale | 1.0000E+000 | Offset | 0.0000E+000 | Column Parameter −6 |
| Surf 1 | NSC Object 242 | Parameter 6: | Pickup From 3 | Scale | 1.0000E+000 | Offset | 0.0000E+000 | Column Parameter −6 |
| Surf 1 | NSC Object 242 | Parameter 7: | Pickup From 3 | Scale | 1.0000E+000 | Offset | 0.0000E+000 | Column Parameter −6 |
| Surf 1 | NSC Object 242 | Parameter 8: | Pickup From 3 | Scale | 1.0000E+000 | Offset | 0.0000E+000 | Column Parameter −6 |
| Surf 1 | NSC Object 243 | Position Y: | Pickup From 4 | Scale | 1.0000E+000 | Offset | 0.0000E+000 | Column Parameter −6 |
| Surf 1 | NSC Object 243 | Parameter 1: | Pickup From 3 | Scale | 1.0000E+000 | Offset | 0.0000E+000 | Column Parameter −6 |
| Surf 1 | NSC Object 243 | Parameter 2: | Pickup From 3 | Scale | 1.0000E+000 | Offset | 0.0000E+000 | Column Parameter −6 |
| Surf 1 | NSC Object 243 | Parameter 3: | Pickup From 3 | Scale | 1.0000E+000 | Offset | 0.0000E+000 | Column Parameter −6 |
| Surf 1 | NSC Object 243 | Parameter 5: | Pickup From 53 | Scale | 1.0000E+000 | Offset | 0.0000E+000 | Column Parameter −6 |
| Surf 1 | NSC Object 243 | Parameter 6: | Pickup From 3 | Scale | 1.0000E+000 | Offset | 0.0000E+000 | Column Parameter −6 |
| Surf 1 | NSC Object 243 | Parameter 7: | Pickup From 3 | Scale | 1.0000E+000 | Offset | 0.0000E+000 | Column Parameter −6 |
| Surf 1 | NSC Object 243 | Parameter 8: | Pickup From 3 | Scale | 1.0000E+000 | Offset | 0.0000E+000 | Column Parameter −6 |
| Surf 1 | NSC Object 244 | Position Y: | Pickup From 4 | Scale | 1.0000E+000 | Offset | 0.0000E+000 | Column Parameter −6 |
| Surf 1 | NSC Object 244 | Parameter 1: | Pickup From 3 | Scale | 1.0000E+000 | Offset | 0.0000E+000 | Column Parameter −6 |
| Surf 1 | NSC Object 244 | Parameter 2: | Pickup From 3 | Scale | 1.0000E+000 | Offset | 0.0000E+000 | Column Parameter −6 |
| Surf 1 | NSC Object 244 | Parameter 3: | Pickup From 3 | Scale | 1.0000E+000 | Offset | 0.0000E+000 | Column Parameter −6 |
| Surf 1 | NSC Object 244 | Parameter 5: | Pickup From 53 | Scale | 1.0000E+000 | Offset | 0.0000E+000 | Column Parameter −6 |
| Surf 1 | NSC Object 244 | Parameter 6: | Pickup From 3 | Scale | 1.0000E+000 | Offset | 0.0000E+000 | Column Parameter −6 |
| Surf 1 | NSC Object 244 | Parameter 7: | Pickup From 3 | Scale | 1.0000E+000 | Offset | 0.0000E+000 | Column Parameter −6 |
| Surf 1 | NSC Object 244 | Parameter 8: | Pickup From 3 | Scale | 1.0000E+000 | Offset | 0.0000E+000 | Column Parameter −6 |
| Surf 1 | NSC Object 245 | Position Y: | Pickup From 4 | Scale | 1.0000E+000 | Offset | 0.0000E+000 | Column Parameter −6 |
| Surf 1 | NSC Object 245 | Parameter 1: | Pickup From 3 | Scale | 1.0000E+000 | Offset | 0.0000E+000 | Column Parameter −6 |
| Surf 1 | NSC Object 245 | Parameter 2: | Pickup From 3 | Scale | 1.0000E+000 | Offset | 0.0000E+000 | Column Parameter −6 |
| Surf 1 | NSC Object 245 | Parameter 3: | Pickup From 3 | Scale | 1.0000E+000 | Offset | 0.0000E+000 | Column Parameter −6 |
| Surf 1 | NSC Object 245 | Parameter 5: | Pickup From 53 | Scale | 1.0000E+000 | Offset | 0.0000E+000 | Column Parameter −6 |
| Surf 1 | NSC Object 245 | Parameter 6: | Pickup From 3 | Scale | 1.0000E+000 | Offset | 0.0000E+000 | Column Parameter −6 |
| Surf 1 | NSC Object 245 | Parameter 7: | Pickup From 3 | Scale | 1.0000E+000 | Offset | 0.0000E+000 | Column Parameter −6 |
| Surf 1 | NSC Object 245 | Parameter 8: | Pickup From 3 | Scale | 1.0000E+000 | Offset | 0.0000E+000 | Column Parameter −6 |
| Surf 1 | NSC Object 246 | Position Y: | Pickup From 4 | Scale | −1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 246 | Parameter 1: | Pickup From 3 | Scale | 1.0000E+000 | Offset | 0.0000E+000 | Column Parameter −6 |
| Surf 1 | NSC Object 246 | Parameter 2: | Pickup From 3 | Scale | 1.0000E+000 | Offset | 0.0000E+000 | Column Parameter −6 |
| Surf 1 | NSC Object 246 | Parameter 3: | Pickup From 3 | Scale | 1.0000E+000 | Offset | 0.0000E+000 | Column Parameter −6 |
| Surf 1 | NSC Object 246 | Parameter 5: | Pickup From 53 | Scale | 1.0000E+000 | Offset | 0.0000E+000 | Column Parameter −6 |
| Surf 1 | NSC Object 246 | Parameter 6: | Pickup From 3 | Scale | 1.0000E+000 | Offset | 0.0000E+000 | Column Parameter −6 |
| Surf 1 | NSC Object 246 | Parameter 7: | Pickup From 3 | Scale | 1.0000E+000 | Offset | 0.0000E+000 | Column Parameter −6 |
| Surf 1 | NSC Object 246 | Parameter 8: | Pickup From 3 | Scale | 1.0000E+000 | Offset | 0.0000E+000 | Column Parameter −6 |
| Surf 1 | NSC Object 247 | Position Y: | Pickup From 4 | Scale | −1.0000E+000 | Offset | 0.0000E+000 | Column Parameter −6 |
| Surf 1 | NSC Object 247 | Parameter 1: | Pickup From 3 | Scale | 1.0000E+000 | Offset | 0.0000E+000 | Column Parameter −6 |
| Surf 1 | NSC Object 247 | Parameter 2: | Pickup From 3 | Scale | 1.0000E+000 | Offset | 0.0000E+000 | Column Parameter −6 |
| Surf 1 | NSC Object 247 | Parameter 3: | Pickup From 3 | Scale | 1.0000E+000 | Offset | 0.0000E+000 | Column Parameter −6 |
| Surf 1 | NSC Object 247 | Parameter 5: | Pickup From 53 | Scale | 1.0000E+000 | Offset | 0.0000E+000 | Column Parameter −6 |
| Surf 1 | NSC Object 247 | Parameter 6: | Pickup From 3 | Scale | 1.0000E+000 | Offset | 0.0000E+000 | Column Parameter −6 |
| Surf 1 | NSC Object 247 | Parameter 7: | Pickup From 3 | Scale | 1.0000E+000 | Offset | 0.0000E+000 | Column Parameter −6 |
| Surf 1 | NSC Object 247 | Parameter 8: | Pickup From 3 | Scale | 1.0000E+000 | Offset | 0.0000E+000 | Column Parameter −6 |
| Surf 1 | NSC Object 248 | Position Y: | Pickup From 4 | Scale | −1.0000E+000 | Offset | 0.0000E+000 | Column Parameter −6 |
| Surf 1 | NSC Object 248 | Parameter 1: | Pickup From 3 | Scale | 1.0000E+000 | Offset | 0.0000E+000 | Column Parameter −6 |
| Surf 1 | NSC Object 248 | Parameter 2: | Pickup From 3 | Scale | 1.0000E+000 | Offset | 0.0000E+000 | Column Parameter −6 |
| Surf 1 | NSC Object 248 | Parameter 3: | Pickup From 3 | Scale | 1.0000E+000 | Offset | 0.0000E+000 | Column Parameter −6 |
| Surf 1 | NSC Object 248 | Parameter 5: | Pickup From 53 | Scale | 1.0000E+000 | Offset | 0.0000E+000 | Column Parameter −6 |
| Surf 1 | NSC Object 248 | Parameter 6: | Pickup From 3 | Scale | 1.0000E+000 | Offset | 0.0000E+000 | Column Parameter −6 |
| Surf 1 | NSC Object 248 | Parameter 7: | Pickup From 3 | Scale | 1.0000E+000 | Offset | 0.0000E+000 | Column Parameter −6 |
| Surf 1 | NSC Object 248 | Parameter 8: | Pickup From 3 | Scale | 1.0000E+000 | Offset | 0.0000E+000 | Column Parameter −6 |
| Surf 1 | NSC Object 249 | Position Y: | Pickup From 4 | Scale | −1.0000E+000 | Offset | 0.0000E+000 | Column Parameter −6 |
| Surf 1 | NSC Object 249 | Parameter 2: | Pickup From 3 | Scale | 1.0000E+000 | Offset | 0.0000E+000 | Column Parameter −6 |
| Surf 1 | NSC Object 249 | Parameter 3: | Pickup From 3 | Scale | 1.0000E+000 | Offset | 0.0000E+000 | Column Parameter −6 |
| Surf 1 | NSC Object 249 | Parameter 5: | Pickup From 53 | Scale | 1.0000E+000 | Offset | 0.0000E+000 | Column Parameter −6 |
| Surf 1 | NSC Object 249 | Parameter 6: | Pickup From 3 | Scale | 1.0000E+000 | Offset | 0.0000E+000 | Column Parameter −6 |
| Surf 1 | NSC Object 249 | Parameter 7: | Pickup From 3 | Scale | 1.0000E+000 | Offset | 0.0000E+000 | Column Parameter −6 |
| Surf 1 | NSC Object 249 | Parameter 8: | Pickup From 3 | Scale | 1.0000E+000 | Offset | 0.0000E+000 | Column Parameter −6 |
| Surf 1 | NSC Object 251 | Position X: | Pickup From 2 | Scale | −4.0000E+000 | Offset | 0.0000E+000 | Column Parameter −6 |
| Surf 1 | NSC Object 251 | Parameter 1: | Pickup From 3 | Scale | 1.0000E+000 | Offset | 0.0000E+000 | Column Parameter −6 |
| Surf 1 | NSC Object 251 | Parameter 2: | Pickup From 3 | Scale | 1.0000E+000 | Offset | 0.0000E+000 | Column Parameter −6 |
| Surf 1 | NSC Object 251 | Parameter 3: | Pickup From 3 | Scale | 1.0000E+000 | Offset | 0.0000E+000 | Column Parameter −6 |
| Surf 1 | NSC Object 251 | Parameter 6: | Pickup From 3 | Scale | 1.0000E+000 | Offset | 0.0000E+000 | Column Parameter −6 |
| Surf 1 | NSC Object 251 | Parameter 7: | Pickup From 3 | Scale | 1.0000E+000 | Offset | 0.0000E+000 | Column Parameter −6 |
| Surf 1 | NSC Object 251 | Parameter 8: | Pickup From 3 | Scale | 1.0000E+000 | Offset | 0.0000E+000 | Column Parameter −6 |
| Surf 1 | NSC Object 252 | Position Y: | Pickup From 4 | Scale | 1.0000E+000 | Offset | 0.0000E+000 | Column Parameter −6 |
| Surf 1 | NSC Object 252 | Parameter 1: | Pickup From 3 | Scale | 1.0000E+000 | Offset | 0.0000E+000 | Column Parameter −6 |
| Surf 1 | NSC Object 252 | Parameter 2: | Pickup From 3 | Scale | 1.0000E+000 | Offset | 0.0000E+000 | Column Parameter −6 |
| Surf 1 | NSC Object 252 | Parameter 3: | Pickup From 3 | Scale | 1.0000E+000 | Offset | 0.0000E+000 | Column Parameter −6 |
| Surf 1 | NSC Object 252 | Parameter 5: | Pickup From 63 | Scale | 1.0000E+000 | Offset | 0.0000E+000 | Column Parameter −6 |
| Surf 1 | NSC Object 252 | Parameter 6: | Pickup From 3 | Scale | 1.0000E+000 | Offset | 0.0000E+000 | Column Parameter −6 |
| Surf 1 | NSC Object 252 | Parameter 7: | Pickup From 3 | Scale | 1.0000E+000 | Offset | 0.0000E+000 | Column Parameter −6 |
| Surf 1 | NSC Object 252 | Parameter 8: | Pickup From 3 | Scale | 1.0000E+000 | Offset | 0.0000E+000 | Column Parameter −6 |
| Surf 1 | NSC Object 253 | Position Y: | Pickup From 4 | Scale | 1.0000E+000 | Offset | 0.0000E+000 | Column Parameter −6 |
| Surf 1 | NSC Object 253 | Parameter 1: | Pickup From 3 | Scale | 1.0000E+000 | Offset | 0.0000E+000 | Column Parameter −6 |
| Surf 1 | NSC Object 253 | Parameter 2: | Pickup From 3 | Scale | 1.0000E+000 | Offset | 0.0000E+000 | Column Parameter −6 |
| Surf 1 | NSC Object 253 | Parameter 3: | Pickup From 3 | Scale | 1.0000E+000 | Offset | 0.0000E+000 | Column Parameter −6 |
| Surf 1 | NSC Object 253 | Parameter 5: | Pickup From 63 | Scale | 1.0000E+000 | Offset | 0.0000E+000 | Column Parameter −6 |
| Surf 1 | NSC Object 253 | Parameter 6: | Pickup From 3 | Scale | 1.0000E+000 | Offset | 0.0000E+000 | Column Parameter −6 |
| Surf 1 | NSC Object 253 | Parameter 7: | Pickup From 3 | Scale | 1.0000E+000 | Offset | 0.0000E+000 | Column Parameter −6 |
| Surf 1 | NSC Object 253 | Parameter 8: | Pickup From 3 | Scale | 1.0000E+000 | Offset | 0.0000E+000 | Column Parameter −6 |
| Surf 1 | NSC Object 254 | Position Y: | Pickup From 4 | Scale | 1.0000E+000 | Offset | 0.0000E+000 | Column Parameter −6 |
| Surf 1 | NSC Object 254 | Parameter 1: | Pickup From 3 | Scale | 1.0000E+000 | Offset | 0.0000E+000 | Column Parameter −6 |
| Surf 1 | NSC Object 254 | Parameter 2: | Pickup From 3 | Scale | 1.0000E+000 | Offset | 0.0000E+000 | Column Parameter −6 |
| Surf 1 | NSC Object 254 | Parameter 3: | Pickup From 3 | Scale | 1.0000E+000 | Offset | 0.0000E+000 | Column Parameter −6 |
| Surf 1 | NSC Object 254 | Parameter 5: | Pickup From 63 | Scale | 1.0000E+000 | Offset | 0.0000E+000 | Column Parameter −6 |
| Surf 1 | NSC Object 254 | Parameter 6: | Pickup From 3 | Scale | 1.0000E+000 | Offset | 0.0000E+000 | Column Parameter −6 |
| Surf 1 | NSC Object 254 | Parameter 7: | Pickup From 3 | Scale | 1.0000E+000 | Offset | 0.0000E+000 | Column Parameter −6 |
| Surf 1 | NSC Object 254 | Parameter 8: | Pickup From 3 | Scale | 1.0000E+000 | Offset | 0.0000E+000 | Column Parameter −6 |
| Surf 1 | NSC Object 255 | Position Y: | Pickup From 4 | Scale | 1.0000E+000 | Offset | 0.0000E+000 | Column Parameter −6 |
| Surf 1 | NSC Object 255 | Parameter 1: | Pickup From 3 | Scale | 1.0000E+000 | Offset | 0.0000E+000 | Column Parameter −6 |
| Surf 1 | NSC Object 255 | Parameter 2: | Pickup From 3 | Scale | 1.0000E+000 | Offset | 0.0000E+000 | Column Parameter −6 |
| Surf 1 | NSC Object 255 | Parameter 3: | Pickup From 3 | Scale | 1.0000E+000 | Offset | 0.0000E+000 | Column Parameter −6 |
| Surf 1 | NSC Object 255 | Parameter 5: | Pickup From 63 | Scale | 1.0000E+000 | Offset | 0.0000E+000 | Column Parameter −6 |
| Surf 1 | NSC Object 255 | Parameter 6: | Pickup From 3 | Scale | 1.0000E+000 | Offset | 0.0000E+000 | Column Parameter −6 |
| Surf 1 | NSC Object 255 | Parameter 7: | Pickup From 3 | Scale | 1.0000E+000 | Offset | 0.0000E+000 | Column Parameter −6 |
| Surf 1 | NSC Object 255 | Parameter 8: | Pickup From 3 | Scale | 1.0000E+000 | Offset | 0.0000E+000 | Column Parameter −6 |
| Surf 1 | NSC Object 256 | Position Y: | Pickup From 4 | Scale | −1.0000E+000 | Offset | 0.0000E+000 | Column Parameter −6 |
| Surf 1 | NSC Object 256 | Parameter 1: | Pickup From 3 | Scale | 1.0000E+000 | Offset | 0.0000E+000 | Column Parameter −6 |
| Surf 1 | NSC Object 256 | Parameter 2: | Pickup From 3 | Scale | 1.0000E+000 | Offset | 0.0000E+000 | Column Parameter −6 |
| Surf 1 | NSC Object 256 | Parameter 3: | Pickup From 3 | Scale | 1.0000E+000 | Offset | 0.0000E+000 | Column Parameter −6 |
| Surf 1 | NSC Object 256 | Parameter 5: | Pickup From 63 | Scale | 1.0000E+000 | Offset | 0.0000E+000 | Column Parameter −6 |
| Surf 1 | NSC Object 256 | Parameter 6: | Pickup From 3 | Scale | 1.0000E+000 | Offset | 0.0000E+000 | Column Parameter −6 |
| Surf 1 | NSC Object 256 | Parameter 7: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | |
|---|---|---|---|---|---|---|---|---|
| Surf 1 | NSC Object 256 | Parameter 8: | Pickup From 3 | Scale | 1.0000E+000 | Offset | 0.0000E+000 | Column Parameter −6 |
| Surf 1 | NSC Object 257 | Position Y: | Pickup From 4 | Scale | −1.0000E+000 | Offset | 0.0000E+000 | Column Parameter −6 |
| Surf 1 | NSC Object 257 | Parameter 1: | Pickup From 3 | Scale | 1.0000E+000 | Offset | 0.0000E+000 | Column Parameter −6 |
| Surf 1 | NSC Object 257 | Parameter 2: | Pickup From 3 | Scale | 1.0000E+000 | Offset | 0.0000E+000 | Column Parameter −6 |
| Surf 1 | NSC Object 257 | Parameter 3: | Pickup From 3 | Scale | 1.0000E+000 | Offset | 0.0000E+000 | Column Parameter −6 |
| Surf 1 | NSC Object 257 | Parameter 5: | Pickup From 63 | Scale | 1.0000E+000 | Offset | 0.0000E+000 | Column Parameter −6 |
| Surf 1 | NSC Object 257 | Parameter 6: | Pickup From 3 | Scale | 1.0000E+000 | Offset | 0.0000E+000 | Column Parameter −6 |
| Surf 1 | NSC Object 257 | Parameter 7: | Pickup From 3 | Scale | 1.0000E+000 | Offset | 0.0000E+000 | Column Parameter −6 |
| Surf 1 | NSC Object 257 | Parameter 8: | Pickup From 3 | Scale | 1.0000E+000 | Offset | 0.0000E+000 | Column Parameter −6 |
| Surf 1 | NSC Object 258 | Position Y: | Pickup From 4 | Scale | −1.0000E+000 | Offset | 0.0000E+000 | Column Parameter −6 |
| Surf 1 | NSC Object 258 | Parameter 1: | Pickup From 3 | Scale | 1.0000E+000 | Offset | 0.0000E+000 | Column Parameter −6 |
| Surf 1 | NSC Object 258 | Parameter 2: | Pickup From 3 | Scale | 1.0000E+000 | Offset | 0.0000E+000 | Column Parameter −6 |
| Surf 1 | NSC Object 258 | Parameter 3: | Pickup From 3 | Scale | 1.0000E+000 | Offset | 0.0000E+000 | Column Parameter −6 |
| Surf 1 | NSC Object 258 | Parameter 5: | Pickup From 63 | Scale | 1.0000E+000 | Offset | 0.0000E+000 | Column Parameter −6 |
| Surf 1 | NSC Object 258 | Parameter 6: | Pickup From 3 | Scale | 1.0000E+000 | Offset | 0.0000E+000 | Column Parameter −6 |
| Surf 1 | NSC Object 258 | Parameter 7: | Pickup From 3 | Scale | 1.0000E+000 | Offset | 0.0000E+000 | Column Parameter −6 |
| Surf 1 | NSC Object 258 | Parameter 8: | Pickup From 3 | Scale | 1.0000E+000 | Offset | 0.0000E+000 | Column Parameter −6 |
| Surf 1 | NSC Object 259 | Position Y: | Pickup From 4 | Scale | −1.0000E+000 | Offset | 0.0000E+000 | Column Parameter −6 |
| Surf 1 | NSC Object 259 | Parameter 1: | Pickup From 3 | Scale | 1.0000E+000 | Offset | 0.0000E+000 | Column Parameter −6 |
| Surf 1 | NSC Object 259 | Parameter 2: | Pickup From 3 | Scale | 1.0000E+000 | Offset | 0.0000E+000 | Column Parameter −6 |
| Surf 1 | NSC Object 259 | Parameter 3: | Pickup From 3 | Scale | 1.0000E+000 | Offset | 0.0000E+000 | Column Parameter −6 |
| Surf 1 | NSC Object 259 | Parameter 5: | Pickup From 63 | Scale | 1.0000E+000 | Offset | 0.0000E+000 | Column Parameter −6 |
| Surf 1 | NSC Object 259 | Parameter 6: | Pickup From 3 | Scale | 1.0000E+000 | Offset | 0.0000E+000 | Column Parameter −6 |
| Surf 1 | NSC Object 259 | Parameter 7: | Pickup From 3 | Scale | 1.0000E+000 | Offset | 0.0000E+000 | Column Parameter −6 |
| Surf 1 | NSC Object 259 | Parameter 8: | Pickup From 3 | Scale | 1.0000E+000 | Offset | 0.0000E+000 | Column Parameter −6 |
| Surf 1 | NSC Object 261 | Position X: | Pickup From 2 | Scale | −6.0000E+000 | Offset | 0.0000E+000 | Column Parameter −6 |
| Surf 1 | NSC Object 261 | Parameter 1: | Pickup From 3 | Scale | 1.0000E+000 | Offset | 0.0000E+000 | Column Parameter −6 |
| Surf 1 | NSC Object 261 | Parameter 2: | Pickup From 3 | Scale | 1.0000E+000 | Offset | 0.0000E+000 | Column Parameter −6 |
| Surf 1 | NSC Object 261 | Parameter 3: | Pickup From 3 | Scale | 1.0000E+000 | Offset | 0.0000E+000 | Column Parameter −6 |
| Surf 1 | NSC Object 261 | Parameter 6: | Pickup From 3 | Scale | 1.0000E+000 | Offset | 0.0000E+000 | Column Parameter −6 |
| Surf 1 | NSC Object 261 | Parameter 7: | Pickup From 3 | Scale | 1.0000E+000 | Offset | 0.0000E+000 | Column Parameter −6 |
| Surf 1 | NSC Object 261 | Parameter 8: | Pickup From 3 | Scale | 1.0000E+000 | Offset | 0.0000E+000 | Column Parameter −6 |
| Surf 1 | NSC Object 262 | Position Y: | Pickup From 4 | Scale | 1.0000E+000 | Offset | 0.0000E+000 | Column Parameter −6 |
| Surf 1 | NSC Object 262 | Parameter 1: | Pickup From 3 | Scale | 1.0000E+000 | Offset | 0.0000E+000 | Column Parameter −6 |
| Surf 1 | NSC Object 262 | Parameter 2: | Pickup From 3 | Scale | 1.0000E+000 | Offset | 0.0000E+000 | Column Parameter −6 |
| Surf 1 | NSC Object 262 | Parameter 3: | Pickup From 3 | Scale | 1.0000E+000 | Offset | 0.0000E+000 | Column Parameter −6 |
| Surf 1 | NSC Object 262 | Parameter 5: | Pickup From 73 | Scale | 1.0000E+000 | Offset | 0.0000E+000 | Column Parameter −6 |
| Surf 1 | NSC Object 262 | Parameter 6: | Pickup From 3 | Scale | 1.0000E+000 | Offset | 0.0000E+000 | Column Parameter −6 |
| Surf 1 | NSC Object 262 | Parameter 7: | Pickup From 3 | Scale | 1.0000E+000 | Offset | 0.0000E+000 | Column Parameter −6 |
| Surf 1 | NSC Object 262 | Parameter 8: | Pickup From 3 | Scale | 1.0000E+000 | Offset | 0.0000E+000 | Column Parameter −6 |
| Surf 1 | NSC Object 263 | Position Y: | Pickup From 4 | Scale | 1.0000E+000 | Offset | 0.0000E+000 | Column Parameter −6 |
| Surf 1 | NSC Object 263 | Parameter 1: | Pickup From 3 | Scale | 1.0000E+000 | Offset | 0.0000E+000 | Column Parameter −6 |
| Surf 1 | NSC Object 263 | Parameter 2: | Pickup From 3 | Scale | 1.0000E+000 | Offset | 0.0000E+000 | Column Parameter −6 |
| Surf 1 | NSC Object 263 | Parameter 3: | Pickup From 3 | Scale | 1.0000E+000 | Offset | 0.0000E+000 | Column Parameter −6 |
| Surf 1 | NSC Object 263 | Parameter 5: | Pickup From 73 | Scale | 1.0000E+000 | Offset | 0.0000E+000 | Column Parameter −6 |
| Surf 1 | NSC Object 263 | Parameter 6: | Pickup From 3 | Scale | 1.0000E+000 | Offset | 0.0000E+000 | Column Parameter −6 |
| Surf 1 | NSC Object 263 | Parameter 7: | Pickup From 3 | Scale | 1.0000E+000 | Offset | 0.0000E+000 | Column Parameter −6 |
| Surf 1 | NSC Object 263 | Parameter 8: | Pickup From 3 | Scale | 1.0000E+000 | Offset | 0.0000E+000 | Column Parameter −6 |
| Surf 1 | NSC Object 264 | Position Y: | Pickup From 4 | Scale | 1.0000E+000 | Offset | 0.0000E+000 | Column Parameter −6 |
| Surf 1 | NSC Object 264 | Parameter 1: | Pickup From 3 | Scale | 1.0000E+000 | Offset | 0.0000E+000 | Column Parameter −6 |
| Surf 1 | NSC Object 264 | Parameter 2: | Pickup From 3 | Scale | 1.0000E+000 | Offset | 0.0000E+000 | Column Parameter −6 |
| Surf 1 | NSC Object 264 | Parameter 3: | Pickup From 3 | Scale | 1.0000E+000 | Offset | 0.0000E+000 | Column Parameter −6 |
| Surf 1 | NSC Object 264 | Parameter 5: | Pickup From 73 | Scale | 1.0000E+000 | Offset | 0.0000E+000 | Column Parameter −6 |
| Surf 1 | NSC Object 264 | Parameter 6: | Pickup From 3 | Scale | 1.0000E+000 | Offset | 0.0000E+000 | Column Parameter −6 |
| Surf 1 | NSC Object 264 | Parameter 7: | Pickup From 3 | Scale | 1.0000E+000 | Offset | 0.0000E+000 | Column Parameter −6 |
| Surf 1 | NSC Object 264 | Parameter 8: | Pickup From 3 | Scale | 1.0000E+000 | Offset | 0.0000E+000 | Column Parameter −6 |
| Surf 1 | NSC Object 265 | Position Y: | Pickup From 4 | Scale | 1.0000E+000 | Offset | 0.0000E+000 | Column Parameter −6 |
| Surf 1 | NSC Object 266 | Position Y: | Pickup From 4 | Scale | −1.0000E+000 | Offset | 0.0000E+000 | Column Parameter −6 |
| Surf 1 | NSC Object 266 | Parameter 1: | Pickup From 3 | Scale | 1.0000E+000 | Offset | 0.0000E+000 | Column Parameter −6 |
| Surf 1 | NSC Object 266 | Parameter 2: | Pickup From 3 | Scale | 1.0000E+000 | Offset | 0.0000E+000 | Column Parameter −6 |
| Surf 1 | NSC Object 266 | Parameter 3: | Pickup From 3 | Scale | 1.0000E+000 | Offset | 0.0000E+000 | Column Parameter −6 |
| Surf 1 | NSC Object 266 | Parameter 5: | Pickup From 73 | Scale | 1.0000E+000 | Offset | 0.0000E+000 | Column Parameter −6 |
| Surf 1 | NSC Object 266 | Parameter 6: | Pickup From 3 | Scale | 1.0000E+000 | Offset | 0.0000E+000 | Column Parameter −6 |
| Surf 1 | NSC Object 266 | Parameter 7: | Pickup From 3 | Scale | 1.0000E+000 | Offset | 0.0000E+000 | Column Parameter −6 |
| Surf 1 | NSC Object 266 | Parameter 8: | Pickup From 3 | Scale | 1.0000E+000 | Offset | 0.0000E+000 | Column Parameter −6 |
| Surf 1 | NSC Object 267 | Position Y: | Pickup From 4 | Scale | −1.0000E+000 | Offset | 0.0000E+000 | Column Parameter −6 |
| Surf 1 | NSC Object 267 | Parameter 1: | Pickup From 3 | Scale | 1.0000E+000 | Offset | 0.0000E+000 | Column Parameter −6 |
| Surf 1 | NSC Object 267 | Parameter 2: | Pickup From 3 | Scale | 1.0000E+000 | Offset | 0.0000E+000 | Column Parameter −6 |
| Surf 1 | NSC Object 267 | Parameter 3: | Pickup From 3 | Scale | 1.0000E+000 | Offset | 0.0000E+000 | Column Parameter −6 |
| Surf 1 | NSC Object 267 | Parameter 5: | Pickup From 73 | Scale | 1.0000E+000 | Offset | 0.0000E+000 | Column Parameter −6 |
| Surf 1 | NSC Object 267 | Parameter 6: | Pickup From 3 | Scale | 1.0000E+000 | Offset | 0.0000E+000 | Column Parameter −6 |
| Surf 1 | NSC Object 267 | Parameter 7: | Pickup From 3 | Scale | 1.0000E+000 | Offset | 0.0000E+000 | Column Parameter −6 |
| Surf 1 | NSC Object 267 | Parameter 8: | Pickup From 3 | Scale | 1.0000E+000 | Offset | 0.0000E+000 | Column Parameter −6 |
| Surf 1 | NSC Object 268 | Position Y: | Pickup From 4 | Scale | −1.0000E+000 | Offset | 0.0000E+000 | Column Parameter −6 |
| Surf 1 | NSC Object 268 | Parameter 1: | Pickup From 3 | Scale | 1.0000E+000 | Offset | 0.0000E+000 | Column Parameter −6 |
| Surf 1 | NSC Object 268 | Parameter 2: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| Surf 1 | NSC Object 268 | Parameter 3: | Pickup From 3  | Scale | 1.0000E+000  | Offset | 0.0000E+000 | Column Parameter −6 |
|---|---|---|---|---|---|---|---|---|
| Surf 1 | NSC Object 268 | Parameter 5: | Pickup From 73 | Scale | 1.0000E+000  | Offset | 0.0000E+000 | Column Parameter −6 |
| Surf 1 | NSC Object 268 | Parameter 6: | Pickup From 3  | Scale | 1.0000E+000  | Offset | 0.0000E+000 | Column Parameter −6 |
| Surf 1 | NSC Object 268 | Parameter 7: | Pickup From 3  | Scale | 1.0000E+000  | Offset | 0.0000E+000 | Column Parameter −6 |
| Surf 1 | NSC Object 268 | Parameter 8: | Pickup From 3  | Scale | 1.0000E+000  | Offset | 0.0000E+000 | Column Parameter −6 |
| Surf 1 | NSC Object 269 | Position Y:  | Pickup From 4  | Scale | −1.0000E+000 | Offset | 0.0000E+000 | Column Parameter −6 |
| Surf 1 | NSC Object 271 | Position X:  | Pickup From 2  | Scale | −8.0000E+000 | Offset | 0.0000E+000 | Column Parameter −6 |
| Surf 1 | NSC Object 271 | Parameter 1: | Pickup From 3  | Scale | 1.0000E+000  | Offset | 0.0000E+000 | Column Parameter −6 |
| Surf 1 | NSC Object 271 | Parameter 2: | Pickup From 3  | Scale | 1.0000E+000  | Offset | 0.0000E+000 | Column Parameter −6 |
| Surf 1 | NSC Object 271 | Parameter 3: | Pickup From 3  | Scale | 1.0000E+000  | Offset | 0.0000E+000 | Column Parameter −6 |
| Surf 1 | NSC Object 271 | Parameter 6: | Pickup From 3  | Scale | 1.0000E+000  | Offset | 0.0000E+000 | Column Parameter −6 |
| Surf 1 | NSC Object 271 | Parameter 7: | Pickup From 3  | Scale | 1.0000E+000  | Offset | 0.0000E+000 | Column Parameter −6 |
| Surf 1 | NSC Object 271 | Parameter 8: | Pickup From 3  | Scale | 1.0000E+000  | Offset | 0.0000E+000 | Column Parameter −6 |
| Surf 1 | NSC Object 272 | Position Y:  | Pickup From 4  | Scale | 1.0000E+000  | Offset | 0.0000E+000 | Column Parameter −6 |
| Surf 1 | NSC Object 272 | Parameter 1: | Pickup From 3  | Scale | 1.0000E+000  | Offset | 0.0000E+000 | Column Parameter −6 |
| Surf 1 | NSC Object 272 | Parameter 2: | Pickup From 3  | Scale | 1.0000E+000  | Offset | 0.0000E+000 | Column Parameter −6 |
| Surf 1 | NSC Object 272 | Parameter 3: | Pickup From 3  | Scale | 1.0000E+000  | Offset | 0.0000E+000 | Column Parameter −6 |
| Surf 1 | NSC Object 272 | Parameter 5: | Pickup From 83 | Scale | 1.0000E+000  | Offset | 0.0000E+000 | Column Parameter −6 |
| Surf 1 | NSC Object 272 | Parameter 6: | Pickup From 3  | Scale | 1.0000E+000  | Offset | 0.0000E+000 | Column Parameter −6 |
| Surf 1 | NSC Object 272 | Parameter 7: | Pickup From 3  | Scale | 1.0000E+000  | Offset | 0.0000E+000 | Column Parameter −6 |
| Surf 1 | NSC Object 272 | Parameter 8: | Pickup From 3  | Scale | 1.0000E+000  | Offset | 0.0000E+000 | Column Parameter −6 |
| Surf 1 | NSC Object 273 | Position Y:  | Pickup From 4  | Scale | 1.0000E+000  | Offset | 0.0000E+000 | Column Parameter −6 |
| Surf 1 | NSC Object 273 | Parameter 1: | Pickup From 3  | Scale | 1.0000E+000  | Offset | 0.0000E+000 | Column Parameter −6 |
| Surf 1 | NSC Object 273 | Parameter 2: | Pickup From 3  | Scale | 1.0000E+000  | Offset | 0.0000E+000 | Column Parameter −6 |
| Surf 1 | NSC Object 273 | Parameter 3: | Pickup From 3  | Scale | 1.0000E+000  | Offset | 0.0000E+000 | Column Parameter −6 |
| Surf 1 | NSC Object 273 | Parameter 5: | Pickup From 83 | Scale | 1.0000E+000  | Offset | 0.0000E+000 | Column Parameter −6 |
| Surf 1 | NSC Object 273 | Parameter 6: | Pickup From 3  | Scale | 1.0000E+000  | Offset | 0.0000E+000 | Column Parameter −6 |
| Surf 1 | NSC Object 273 | Parameter 7: | Pickup From 3  | Scale | 1.0000E+000  | Offset | 0.0000E+000 | Column Parameter −6 |
| Surf 1 | NSC Object 273 | Parameter 8: | Pickup From 3  | Scale | 1.0000E+000  | Offset | 0.0000E+000 | Column Parameter −6 |
| Surf 1 | NSC Object 274 | Position Y:  | Pickup From 4  | Scale | 1.0000E+000  | Offset | 0.0000E+000 | Column Parameter −6 |
| Surf 1 | NSC Object 275 | Position Y:  | Pickup From 4  | Scale | 1.0000E+000  | Offset | 0.0000E+000 | Column Parameter −6 |
| Surf 1 | NSC Object 276 | Position Y:  | Pickup From 4  | Scale | −1.0000E+000 | Offset | 0.0000E+000 | Column Parameter −6 |
| Surf 1 | NSC Object 276 | Parameter 1: | Pickup From 3  | Scale | 1.0000E+000  | Offset | 0.0000E+000 | Column Parameter −6 |
| Surf 1 | NSC Object 276 | Parameter 2: | Pickup From 3  | Scale | 1.0000E+000  | Offset | 0.0000E+000 | Column Parameter −6 |
| Surf 1 | NSC Object 276 | Parameter 3: | Pickup From 3  | Scale | 1.0000E+000  | Offset | 0.0000E+000 | Column Parameter −6 |
| Surf 1 | NSC Object 276 | Parameter 5: | Pickup From 83 | Scale | 1.0000E+000  | Offset | 0.0000E+000 | Column Parameter −6 |
| Surf 1 | NSC Object 276 | Parameter 6: | Pickup From 3  | Scale | 1.0000E+000  | Offset | 0.0000E+000 | Column Parameter −6 |
| Surf 1 | NSC Object 276 | Parameter 7: | Pickup From 3  | Scale | 1.0000E+000  | Offset | 0.0000E+000 | Column Parameter −6 |
| Surf 1 | NSC Object 276 | Parameter 8: | Pickup From 3  | Scale | 1.0000E+000  | Offset | 0.0000E+000 | Column Parameter −6 |
| Surf 1 | NSC Object 277 | Position Y:  | Pickup From 4  | Scale | −1.0000E+000 | Offset | 0.0000E+000 | Column Parameter −6 |
| Surf 1 | NSC Object 277 | Parameter 1: | Pickup From 3  | Scale | 1.0000E+000  | Offset | 0.0000E+000 | Column Parameter −6 |
| Surf 1 | NSC Object 277 | Parameter 2: | Pickup From 3  | Scale | 1.0000E+000  | Offset | 0.0000E+000 | Column Parameter −6 |
| Surf 1 | NSC Object 277 | Parameter 3: | Pickup From 3  | Scale | 1.0000E+000  | Offset | 0.0000E+000 | Column Parameter −6 |
| Surf 1 | NSC Object 277 | Parameter 5: | Pickup From 83 | Scale | 1.0000E+000  | Offset | 0.0000E+000 | Column Parameter −6 |
| Surf 1 | NSC Object 277 | Parameter 6: | Pickup From 3  | Scale | 1.0000E+000  | Offset | 0.0000E+000 | Column Parameter −6 |
| Surf 1 | NSC Object 277 | Parameter 7: | Pickup From 3  | Scale | 1.0000E+000  | Offset | 0.0000E+000 | Column Parameter −6 |
| Surf 1 | NSC Object 277 | Parameter 8: | Pickup From 3  | Scale | 1.0000E+000  | Offset | 0.0000E+000 | Column Parameter −6 |
| Surf 1 | NSC Object 278 | Position Y:  | Pickup From 4  | Scale | −1.0000E+000 | Offset | 0.0000E+000 | Column Parameter −6 |
| Surf 1 | NSC Object 279 | Position Y:  | Pickup From 4  | Scale | −1.0000E+000 | Offset | 0.0000E+000 | Column Parameter −6 |
| Surf 1 | NSC Object 281 | Parameter 1: | Pickup From 93 | Scale | 1.0000E+000  | Offset | 0.0000E+000 | Column Parameter −6 |
| Surf 1 | NSC Object 281 | Parameter 2: | Pickup From 93 | Scale | 1.0000E+000  | Offset | 0.0000E+000 | Column Parameter −6 |
| Surf 1 | NSC Object 281 | Parameter 3: | Pickup From 93 | Scale | 1.0000E+000  | Offset | 0.0000E+000 | Column Parameter −6 |
| Surf 1 | NSC Object 281 | Parameter 4: | Pickup From 93 | Scale | 1.0000E+000  | Offset | 0.0000E+000 | Column Parameter −6 |
| Surf 1 | NSC Object 281 | Parameter 5: | Pickup From 93 | Scale | 1.0000E+000  | Offset | 0.0000E+000 | Column Parameter −6 |
| Surf 1 | NSC Object 281 | Parameter 6: | Pickup From 93 | Scale | 1.0000E+000  | Offset | 0.0000E+000 | Column Parameter −6 |
| Surf 1 | NSC Object 281 | Parameter 7: | Pickup From 93 | Scale | 1.0000E+000  | Offset | 0.0000E+000 | Column Parameter −6 |
| Surf 1 | NSC Object 281 | Parameter 8: | Pickup From 93 | Scale | 1.0000E+000  | Offset | 0.0000E+000 | Column Parameter −6 |
| Surf 1 | NSC Object 281 | Parameter 9: | Pickup From 93 | Scale | 1.0000E+000  | Offset | 0.0000E+000 | Column Parameter −6 |
| Surf 1 | NSC Object 283 | Position Y:  | Pickup From 1  | Scale | −1.0000E+000 | Offset | 0.0000E+000 | Column Parameter −6 |
| Surf 1 | NSC Object 283 | Position Z:  | Pickup From 1  | Scale | 1.0000E+000  | Offset | 0.0000E+000 | Column Parameter −6 |
| Surf 1 | NSC Object 285 | Parameter 1: | Pickup From 3  | Scale | 1.0000E+000  | Offset | 0.0000E+000 | Column Parameter −6 |
| Surf 1 | NSC Object 285 | Parameter 2: | Pickup From 3  | Scale | 1.0000E+000  | Offset | 0.0000E+000 | Column Parameter −6 |
| Surf 1 | NSC Object 286 | Parameter 1: | Pickup From 3  | Scale | 1.0000E+000  | Offset | 0.0000E+000 | Column Parameter −6 |
| Surf 1 | NSC Object 286 | Parameter 2: | Pickup From 3  | Scale | 1.0000E+000  | Offset | 0.0000E+000 | Column Parameter −6 |
| Surf 1 | NSC Object 286 | Parameter 3: | Pickup From 3  | Scale | 1.0000E+000  | Offset | 0.0000E+000 | Column Parameter −6 |
| Surf 1 | NSC Object 286 | Parameter 5: | Pickup From 3  | Scale | 1.0000E+000  | Offset | 0.0000E+000 | Column Parameter −6 |
| Surf 1 | NSC Object 286 | Parameter 6: | Pickup From 3  | Scale | 1.0000E+000  | Offset | 0.0000E+000 | Column Parameter −6 |
| Surf 1 | NSC Object 286 | Parameter 7: | Pickup From 3  | Scale | 1.0000E+000  | Offset | 0.0000E+000 | Column Parameter −6 |
| Surf 1 | NSC Object 286 | Parameter 8: | Pickup From 3  | Scale | 1.0000E+000  | Offset | 0.0000E+000 | Column Parameter −6 |
| Surf 1 | NSC Object 287 | Position Y:  | Pickup From 4  | Scale | 1.0000E+000  | Offset | 0.0000E+000 | Column Parameter −6 |
| Surf 1 | NSC Object 287 | Parameter 1: | Pickup From 3  | Scale | 1.0000E+000  | Offset | 0.0000E+000 | Column Parameter −6 |
| Surf 1 | NSC Object 287 | Parameter 2: | Pickup From 3  | Scale | 1.0000E+000  | Offset | 0.0000E+000 | Column Parameter −6 |
| Surf 1 | NSC Object 287 | Parameter 3: | Pickup From 3  | Scale | 1.0000E+000  | Offset | 0.0000E+000 | Column Parameter −6 |
| Surf 1 | NSC Object 287 | Parameter 5: | Pickup From 3  | Scale | 1.0000E+000  | Offset | 0.0000E+000 | Column Parameter −6 |
| Surf 1 | NSC Object 287 | Parameter 6: | Pickup From 3  | Scale | 1.0000E+000  | Offset | 0.0000E+000 | Column Parameter −6 |
| Surf 1 | NSC Object 287 | Parameter 7: | Pickup From 3  | Scale | 1.0000E+000  | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| Surf 1 | NSC Object 287 | Parameter 8: | Pickup From 3 | Scale | 1.0000E+000 | Offset | 0.0000E+000 | Column Parameter −6 |
|---|---|---|---|---|---|---|---|---|
| Surf 1 | NSC Object 288 | Position Y: | Pickup From 4 | Scale | 1.0000E+000 | Offset | 0.0000E+000 | Column Parameter −6 |
| Surf 1 | NSC Object 288 | Parameter 1: | Pickup From 3 | Scale | 1.0000E+000 | Offset | 0.0000E+000 | Column Parameter −6 |
| Surf 1 | NSC Object 288 | Parameter 2: | Pickup From 3 | Scale | 1.0000E+000 | Offset | 0.0000E+000 | Column Parameter −6 |
| Surf 1 | NSC Object 288 | Parameter 3: | Pickup From 3 | Scale | 1.0000E+000 | Offset | 0.0000E+000 | Column Parameter −6 |
| Surf 1 | NSC Object 288 | Parameter 5: | Pickup From 3 | Scale | 1.0000E+000 | Offset | 0.0000E+000 | Column Parameter −6 |
| Surf 1 | NSC Object 288 | Parameter 6: | Pickup From 3 | Scale | 1.0000E+000 | Offset | 0.0000E+000 | Column Parameter −6 |
| Surf 1 | NSC Object 288 | Parameter 7: | Pickup From 3 | Scale | 1.0000E+000 | Offset | 0.0000E+000 | Column Parameter −6 |
| Surf 1 | NSC Object 288 | Parameter 8: | Pickup From 3 | Scale | 1.0000E+000 | Offset | 0.0000E+000 | Column Parameter −6 |
| Surf 1 | NSC Object 289 | Position Y: | Pickup From 4 | Scale | 1.0000E+000 | Offset | 0.0000E+000 | Column Parameter −6 |
| Surf 1 | NSC Object 289 | Parameter 2: | Pickup From 3 | Scale | 1.0000E+000 | Offset | 0.0000E+000 | Column Parameter −6 |
| Surf 1 | NSC Object 289 | Parameter 3: | Pickup From 3 | Scale | 1.0000E+000 | Offset | 0.0000E+000 | Column Parameter −6 |
| Surf 1 | NSC Object 289 | Parameter 5: | Pickup From 3 | Scale | 1.0000E+000 | Offset | 0.0000E+000 | Column Parameter −6 |
| Surf 1 | NSC Object 289 | Parameter 6: | Pickup From 3 | Scale | 1.0000E+000 | Offset | 0.0000E+000 | Column Parameter −6 |
| Surf 1 | NSC Object 289 | Parameter 7: | Pickup From 3 | Scale | 1.0000E+000 | Offset | 0.0000E+000 | Column Parameter −6 |
| Surf 1 | NSC Object 289 | Parameter 8: | Pickup From 3 | Scale | 1.0000E+000 | Offset | 0.0000E+000 | Column Parameter −6 |
| Surf 1 | NSC Object 290 | Position Y: | Pickup From 4 | Scale | −1.0000E+000 | Offset | 0.0000E+000 | Column Parameter −6 |
| Surf 1 | NSC Object 290 | Parameter 1: | Pickup From 3 | Scale | 1.0000E+000 | Offset | 0.0000E+000 | Column Parameter −6 |
| Surf 1 | NSC Object 290 | Parameter 2: | Pickup From 3 | Scale | 1.0000E+000 | Offset | 0.0000E+000 | Column Parameter −6 |
| Surf 1 | NSC Object 290 | Parameter 3: | Pickup From 3 | Scale | 1.0000E+000 | Offset | 0.0000E+000 | Column Parameter −6 |
| Surf 1 | NSC Object 290 | Parameter 5: | Pickup From 3 | Scale | 1.0000E+000 | Offset | 0.0000E+000 | Column Parameter −6 |
| Surf 1 | NSC Object 290 | Parameter 6: | Pickup From 3 | Scale | 1.0000E+000 | Offset | 0.0000E+000 | Column Parameter −6 |
| Surf 1 | NSC Object 290 | Parameter 7: | Pickup From 3 | Scale | 1.0000E+000 | Offset | 0.0000E+000 | Column Parameter −6 |
| Surf 1 | NSC Object 290 | Parameter 8: | Pickup From 3 | Scale | 1.0000E+000 | Offset | 0.0000E+000 | Column Parameter −6 |
| Surf 1 | NSC Object 291 | Position Y: | Pickup From 4 | Scale | −1.0000E+000 | Offset | 0.0000E+000 | Column Parameter −6 |
| Surf 1 | NSC Object 291 | Parameter 1: | Pickup From 3 | Scale | 1.0000E+000 | Offset | 0.0000E+000 | Column Parameter −6 |
| Surf 1 | NSC Object 291 | Parameter 2: | Pickup From 3 | Scale | 1.0000E+000 | Offset | 0.0000E+000 | Column Parameter −6 |
| Surf 1 | NSC Object 291 | Parameter 3: | Pickup From 3 | Scale | 1.0000E+000 | Offset | 0.0000E+000 | Column Parameter −6 |
| Surf 1 | NSC Object 291 | Parameter 5: | Pickup From 3 | Scale | 1.0000E+000 | Offset | 0.0000E+000 | Column Parameter −6 |
| Surf 1 | NSC Object 291 | Parameter 6: | Pickup From 3 | Scale | 1.0000E+000 | Offset | 0.0000E+000 | Column Parameter −6 |
| Surf 1 | NSC Object 291 | Parameter 7: | Pickup From 3 | Scale | 1.0000E+000 | Offset | 0.0000E+000 | Column Parameter −6 |
| Surf 1 | NSC Object 291 | Parameter 8: | Pickup From 3 | Scale | 1.0000E+000 | Offset | 0.0000E+000 | Column Parameter −6 |
| Surf 1 | NSC Object 292 | Position Y: | Pickup From 4 | Scale | −1.0000E+000 | Offset | 0.0000E+000 | Column Parameter −6 |
| Surf 1 | NSC Object 292 | Parameter 1: | Pickup From 3 | Scale | 1.0000E+000 | Offset | 0.0000E+000 | Column Parameter −6 |
| Surf 1 | NSC Object 292 | Parameter 2: | Pickup From 3 | Scale | 1.0000E+000 | Offset | 0.0000E+000 | Column Parameter −6 |
| Surf 1 | NSC Object 292 | Parameter 3: | Pickup From 3 | Scale | 1.0000E+000 | Offset | 0.0000E+000 | Column Parameter −6 |
| Surf 1 | NSC Object 292 | Parameter 5: | Pickup From 3 | Scale | 1.0000E+000 | Offset | 0.0000E+000 | Column Parameter −6 |
| Surf 1 | NSC Object 292 | Parameter 6: | Pickup From 3 | Scale | 1.0000E+000 | Offset | 0.0000E+000 | Column Parameter −6 |
| Surf 1 | NSC Object 292 | Parameter 7: | Pickup From 3 | Scale | 1.0000E+000 | Offset | 0.0000E+000 | Column Parameter −6 |
| Surf 1 | NSC Object 292 | Parameter 8: | Pickup From 3 | Scale | 1.0000E+000 | Offset | 0.0000E+000 | Column Parameter −6 |
| Surf 1 | NSC Object 293 | Position Y: | Pickup From 4 | Scale | −1.0000E+000 | Offset | 0.0000E+000 | Column Parameter −6 |
| Surf 1 | NSC Object 293 | Parameter 1: | Pickup From 3 | Scale | 1.0000E+000 | Offset | 0.0000E+000 | Column Parameter −6 |
| Surf 1 | NSC Object 293 | Parameter 2: | Pickup From 3 | Scale | 1.0000E+000 | Offset | 0.0000E+000 | Column Parameter −6 |
| Surf 1 | NSC Object 293 | Parameter 3: | Pickup From 3 | Scale | 1.0000E+000 | Offset | 0.0000E+000 | Column Parameter −6 |
| Surf 1 | NSC Object 293 | Parameter 5: | Pickup From 3 | Scale | 1.0000E+000 | Offset | 0.0000E+000 | Column Parameter −6 |
| Surf 1 | NSC Object 293 | Parameter 6: | Pickup From 3 | Scale | 1.0000E+000 | Offset | 0.0000E+000 | Column Parameter −6 |
| Surf 1 | NSC Object 293 | Parameter 7: | Pickup From 3 | Scale | 1.0000E+000 | Offset | 0.0000E+000 | Column Parameter −6 |
| Surf 1 | NSC Object 293 | Parameter 8: | Pickup From 3 | Scale | 1.0000E+000 | Offset | 0.0000E+000 | Column Parameter −6 |
| Surf 1 | NSC Object 295 | Position X: | Pickup From 2 | Scale | 2.0000E+000 | Offset | 0.0000E+000 | Column Parameter −6 |
| Surf 1 | NSC Object 295 | Parameter 1: | Pickup From 3 | Scale | 1.0000E+000 | Offset | 0.0000E+000 | Column Parameter −6 |
| Surf 1 | NSC Object 295 | Parameter 2: | Pickup From 3 | Scale | 1.0000E+000 | Offset | 0.0000E+000 | Column Parameter −6 |
| Surf 1 | NSC Object 295 | Parameter 3: | Pickup From 3 | Scale | 1.0000E+000 | Offset | 0.0000E+000 | Column Parameter −6 |
| Surf 1 | NSC Object 295 | Parameter 6: | Pickup From 3 | Scale | 1.0000E+000 | Offset | 0.0000E+000 | Column Parameter −6 |
| Surf 1 | NSC Object 295 | Parameter 7: | Pickup From 3 | Scale | 1.0000E+000 | Offset | 0.0000E+000 | Column Parameter −6 |
| Surf 1 | NSC Object 295 | Parameter 8: | Pickup From 3 | Scale | 1.0000E+000 | Offset | 0.0000E+000 | Column Parameter −6 |
| Surf 1 | NSC Object 296 | Position Y: | Pickup From 4 | Scale | 1.0000E+000 | Offset | 0.0000E+000 | Column Parameter −6 |
| Surf 1 | NSC Object 296 | Parameter 1: | Pickup From 3 | Scale | 1.0000E+000 | Offset | 0.0000E+000 | Column Parameter −6 |
| Surf 1 | NSC Object 296 | Parameter 2: | Pickup From 3 | Scale | 1.0000E+000 | Offset | 0.0000E+000 | Column Parameter −6 |
| Surf 1 | NSC Object 296 | Parameter 3: | Pickup From 3 | Scale | 1.0000E+000 | Offset | 0.0000E+000 | Column Parameter −6 |
| Surf 1 | NSC Object 296 | Parameter 5: | Pickup From 13 | Scale | 1.0000E+000 | Offset | 0.0000E+000 | Column Parameter −6 |
| Surf 1 | NSC Object 296 | Parameter 6: | Pickup From 3 | Scale | 1.0000E+000 | Offset | 0.0000E+000 | Column Parameter −6 |
| Surf 1 | NSC Object 296 | Parameter 7: | Pickup From 3 | Scale | 1.0000E+000 | Offset | 0.0000E+000 | Column Parameter −6 |
| Surf 1 | NSC Object 296 | Parameter 8: | Pickup From 3 | Scale | 1.0000E+000 | Offset | 0.0000E+000 | Column Parameter −6 |
| Surf 1 | NSC Object 297 | Position Y: | Pickup From 4 | Scale | 1.0000E+000 | Offset | 0.0000E+000 | Column Parameter −6 |
| Surf 1 | NSC Object 297 | Parameter 1: | Pickup From 3 | Scale | 1.0000E+000 | Offset | 0.0000E+000 | Column Parameter −6 |
| Surf 1 | NSC Object 297 | Parameter 2: | Pickup From 3 | Scale | 1.0000E+000 | Offset | 0.0000E+000 | Column Parameter −6 |
| Surf 1 | NSC Object 297 | Parameter 3: | Pickup From 3 | Scale | 1.0000E+000 | Offset | 0.0000E+000 | Column Parameter −6 |
| Surf 1 | NSC Object 297 | Parameter 5: | Pickup From 13 | Scale | 1.0000E+000 | Offset | 0.0000E+000 | Column Parameter −6 |
| Surf 1 | NSC Object 297 | Parameter 6: | Pickup From 3 | Scale | 1.0000E+000 | Offset | 0.0000E+000 | Column Parameter −6 |
| Surf 1 | NSC Object 297 | Parameter 7: | Pickup From 3 | Scale | 1.0000E+000 | Offset | 0.0000E+000 | Column Parameter −6 |
| Surf 1 | NSC Object 297 | Parameter 8: | Pickup From 3 | Scale | 1.0000E+000 | Offset | 0.0000E+000 | Column Parameter −6 |
| Surf 1 | NSC Object 298 | Position Y: | Pickup From 4 | Scale | 1.0000E+000 | Offset | 0.0000E+000 | Column Parameter −6 |
| Surf 1 | NSC Object 298 | Parameter 1: | Pickup From 3 | Scale | 1.0000E+000 | Offset | 0.0000E+000 | Column Parameter −6 |
| Surf 1 | NSC Object 298 | Parameter 2: | Pickup From 3 | Scale | 1.0000E+000 | Offset | 0.0000E+000 | Column Parameter −6 |
| Surf 1 | NSC Object 298 | Parameter 3: | Pickup From 3 | Scale | 1.0000E+000 | Offset | 0.0000E+000 | Column Parameter −6 |
| Surf 1 | NSC Object 298 | Parameter 5: | Pickup From 13 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 298 | Parameter 6: | Pickup From 3 | Scale | 1.0000E+000 | Offset | 0.0000E+000 | Column Parameter | −6 |
| Surf 1 | NSC Object 298 | Parameter 7: | Pickup From 3 | Scale | 1.0000E+000 | Offset | 0.0000E+000 | Column Parameter | −6 |
| Surf 1 | NSC Object 298 | Parameter 8: | Pickup From 3 | Scale | 1.0000E+000 | Offset | 0.0000E+000 | Column Parameter | −6 |
| Surf 1 | NSC Object 299 | Position Y: | Pickup From 4 | Scale | 1.0000E+000 | Offset | 0.0000E+000 | Column Parameter | −6 |
| Surf 1 | NSC Object 299 | Parameter 1: | Pickup From 3 | Scale | 1.0000E+000 | Offset | 0.0000E+000 | Column Parameter | −6 |
| Surf 1 | NSC Object 299 | Parameter 2: | Pickup From 3 | Scale | 1.0000E+000 | Offset | 0.0000E+000 | Column Parameter | −6 |
| Surf 1 | NSC Object 299 | Parameter 3: | Pickup From 3 | Scale | 1.0000E+000 | Offset | 0.0000E+000 | Column Parameter | −6 |
| Surf 1 | NSC Object 299 | Parameter 5: | Pickup From 13 | Scale | 1.0000E+000 | Offset | 0.0000E+000 | Column Parameter | −6 |
| Surf 1 | NSC Object 299 | Parameter 6: | Pickup From 3 | Scale | 1.0000E+000 | Offset | 0.0000E+000 | Column Parameter | −6 |
| Surf 1 | NSC Object 299 | Parameter 7: | Pickup From 3 | Scale | 1.0000E+000 | Offset | 0.0000E+000 | Column Parameter | −6 |
| Surf 1 | NSC Object 299 | Parameter 8: | Pickup From 3 | Scale | 1.0000E+000 | Offset | 0.0000E+000 | Column Parameter | −6 |
| Surf 1 | NSC Object 300 | Position Y: | Pickup From 4 | Scale | −1.0000E+000 | Offset | 0.0000E+000 | Column Parameter | −6 |
| Surf 1 | NSC Object 300 | Parameter 1: | Pickup From 3 | Scale | 1.0000E+000 | Offset | 0.0000E+000 | Column Parameter | −6 |
| Surf 1 | NSC Object 300 | Parameter 2: | Pickup From 3 | Scale | 1.0000E+000 | Offset | 0.0000E+000 | Column Parameter | −6 |
| Surf 1 | NSC Object 300 | Parameter 3: | Pickup From 3 | Scale | 1.0000E+000 | Offset | 0.0000E+000 | Column Parameter | −6 |
| Surf 1 | NSC Object 300 | Parameter 5: | Pickup From 13 | Scale | 1.0000E+000 | Offset | 0.0000E+000 | Column Parameter | −6 |
| Surf 1 | NSC Object 300 | Parameter 6: | Pickup From 3 | Scale | 1.0000E+000 | Offset | 0.0000E+000 | Column Parameter | −6 |
| Surf 1 | NSC Object 300 | Parameter 7: | Pickup From 3 | Scale | 1.0000E+000 | Offset | 0.0000E+000 | Column Parameter | −6 |
| Surf 1 | NSC Object 300 | Parameter 8: | Pickup From 3 | Scale | 1.0000E+000 | Offset | 0.0000E+000 | Column Parameter | −6 |
| Surf 1 | NSC Object 301 | Position Y: | Pickup From 4 | Scale | −1.0000E+000 | Offset | 0.0000E+000 | Column Parameter | −6 |
| Surf 1 | NSC Object 301 | Parameter 1: | Pickup From 3 | Scale | 1.0000E+000 | Offset | 0.0000E+000 | Column Parameter | −6 |
| Surf 1 | NSC Object 301 | Parameter 2: | Pickup From 3 | Scale | 1.0000E+000 | Offset | 0.0000E+000 | Column Parameter | −6 |
| Surf 1 | NSC Object 301 | Parameter 3: | Pickup From 3 | Scale | 1.0000E+000 | Offset | 0.0000E+000 | Column Parameter | −6 |
| Surf 1 | NSC Object 301 | Parameter 5: | Pickup From 13 | Scale | 1.0000E+000 | Offset | 0.0000E+000 | Column Parameter | −6 |
| Surf 1 | NSC Object 301 | Parameter 6: | Pickup From 3 | Scale | 1.0000E+000 | Offset | 0.0000E+000 | Column Parameter | −6 |
| Surf 1 | NSC Object 301 | Parameter 7: | Pickup From 3 | Scale | 1.0000E+000 | Offset | 0.0000E+000 | Column Parameter | −6 |
| Surf 1 | NSC Object 301 | Parameter 8: | Pickup From 3 | Scale | 1.0000E+000 | Offset | 0.0000E+000 | Column Parameter | −6 |
| Surf 1 | NSC Object 302 | Position Y: | Pickup From 4 | Scale | −1.0000E+000 | Offset | 0.0000E+000 | Column Parameter | −6 |
| Surf 1 | NSC Object 302 | Parameter 1: | Pickup From 3 | Scale | 1.0000E+000 | Offset | 0.0000E+000 | Column Parameter | −6 |
| Surf 1 | NSC Object 302 | Parameter 2: | Pickup From 3 | Scale | 1.0000E+000 | Offset | 0.0000E+000 | Column Parameter | −6 |
| Surf 1 | NSC Object 302 | Parameter 3: | Pickup From 3 | Scale | 1.0000E+000 | Offset | 0.0000E+000 | Column Parameter | −6 |
| Surf 1 | NSC Object 302 | Parameter 5: | Pickup From 13 | Scale | 1.0000E+000 | Offset | 0.0000E+000 | Column Parameter | −6 |
| Surf 1 | NSC Object 302 | Parameter 6: | Pickup From 3 | Scale | 1.0000E+000 | Offset | 0.0000E+000 | Column Parameter | −6 |
| Surf 1 | NSC Object 302 | Parameter 7: | Pickup From 3 | Scale | 1.0000E+000 | Offset | 0.0000E+000 | Column Parameter | −6 |
| Surf 1 | NSC Object 302 | Parameter 8: | Pickup From 3 | Scale | 1.0000E+000 | Offset | 0.0000E+000 | Column Parameter | −6 |
| Surf 1 | NSC Object 303 | Position Y: | Pickup From 4 | Scale | −1.0000E+000 | Offset | 0.0000E+000 | Column Parameter | −6 |
| Surf 1 | NSC Object 303 | Parameter 1: | Pickup From 3 | Scale | 1.0000E+000 | Offset | 0.0000E+000 | Column Parameter | −6 |
| Surf 1 | NSC Object 303 | Parameter 2: | Pickup From 3 | Scale | 1.0000E+000 | Offset | 0.0000E+000 | Column Parameter | −6 |
| Surf 1 | NSC Object 303 | Parameter 3: | Pickup From 3 | Scale | 1.0000E+000 | Offset | 0.0000E+000 | Column Parameter | −6 |
| Surf 1 | NSC Object 303 | Parameter 5: | Pickup From 13 | Scale | 1.0000E+000 | Offset | 0.0000E+000 | Column Parameter | −6 |
| Surf 1 | NSC Object 303 | Parameter 6: | Pickup From 3 | Scale | 1.0000E+000 | Offset | 0.0000E+000 | Column Parameter | −6 |
| Surf 1 | NSC Object 303 | Parameter 7: | Pickup From 3 | Scale | 1.0000E+000 | Offset | 0.0000E+000 | Column Parameter | −6 |
| Surf 1 | NSC Object 303 | Parameter 8: | Pickup From 3 | Scale | 1.0000E+000 | Offset | 0.0000E+000 | Column Parameter | −6 |
| Surf 1 | NSC Object 305 | Position X: | Pickup From 2 | Scale | 4.0000E+000 | Offset | 0.0000E+000 | Column Parameter | −6 |
| Surf 1 | NSC Object 305 | Parameter 1: | Pickup From 3 | Scale | 1.0000E+000 | Offset | 0.0000E+000 | Column Parameter | −6 |
| Surf 1 | NSC Object 305 | Parameter 2: | Pickup From 3 | Scale | 1.0000E+000 | Offset | 0.0000E+000 | Column Parameter | −6 |
| Surf 1 | NSC Object 305 | Parameter 3: | Pickup From 3 | Scale | 1.0000E+000 | Offset | 0.0000E+000 | Column Parameter | −6 |
| Surf 1 | NSC Object 305 | Parameter 6: | Pickup From 3 | Scale | 1.0000E+000 | Offset | 0.0000E+000 | Column Parameter | −6 |
| Surf 1 | NSC Object 305 | Parameter 7: | Pickup From 3 | Scale | 1.0000E+000 | Offset | 0.0000E+000 | Column Parameter | −6 |
| Surf 1 | NSC Object 305 | Parameter 8: | Pickup From 3 | Scale | 1.0000E+000 | Offset | 0.0000E+000 | Column Parameter | −6 |
| Surf 1 | NSC Object 306 | Position Y: | Pickup From 4 | Scale | 1.0000E+000 | Offset | 0.0000E+000 | Column Parameter | −6 |
| Surf 1 | NSC Object 306 | Parameter 1: | Pickup From 3 | Scale | 1.0000E+000 | Offset | 0.0000E+000 | Column Parameter | −6 |
| Surf 1 | NSC Object 306 | Parameter 2: | Pickup From 3 | Scale | 1.0000E+000 | Offset | 0.0000E+000 | Column Parameter | −6 |
| Surf 1 | NSC Object 306 | Parameter 3: | Pickup From 3 | Scale | 1.0000E+000 | Offset | 0.0000E+000 | Column Parameter | −6 |
| Surf 1 | NSC Object 306 | Parameter 5: | Pickup From 23 | Scale | 1.0000E+000 | Offset | 0.0000E+000 | Column Parameter | −6 |
| Surf 1 | NSC Object 306 | Parameter 6: | Pickup From 3 | Scale | 1.0000E+000 | Offset | 0.0000E+000 | Column Parameter | −6 |
| Surf 1 | NSC Object 306 | Parameter 7: | Pickup From 3 | Scale | 1.0000E+000 | Offset | 0.0000E+000 | Column Parameter | −6 |
| Surf 1 | NSC Object 306 | Parameter 8: | Pickup From 3 | Scale | 1.0000E+000 | Offset | 0.0000E+000 | Column Parameter | −6 |
| Surf 1 | NSC Object 307 | Position Y: | Pickup From 4 | Scale | 1.0000E+000 | Offset | 0.0000E+000 | Column Parameter | −6 |
| Surf 1 | NSC Object 307 | Parameter 1: | Pickup From 3 | Scale | 1.0000E+000 | Offset | 0.0000E+000 | Column Parameter | −6 |
| Surf 1 | NSC Object 307 | Parameter 2: | Pickup From 3 | Scale | 1.0000E+000 | Offset | 0.0000E+000 | Column Parameter | −6 |
| Surf 1 | NSC Object 307 | Parameter 3: | Pickup From 3 | Scale | 1.0000E+000 | Offset | 0.0000E+000 | Column Parameter | −6 |
| Surf 1 | NSC Object 307 | Parameter 5: | Pickup From 23 | Scale | 1.0000E+000 | Offset | 0.0000E+000 | Column Parameter | −6 |
| Surf 1 | NSC Object 307 | Parameter 6: | Pickup From 3 | Scale | 1.0000E+000 | Offset | 0.0000E+000 | Column Parameter | −6 |
| Surf 1 | NSC Object 307 | Parameter 7: | Pickup From 3 | Scale | 1.0000E+000 | Offset | 0.0000E+000 | Column Parameter | −6 |
| Surf 1 | NSC Object 307 | Parameter 8: | Pickup From 3 | Scale | 1.0000E+000 | Offset | 0.0000E+000 | Column Parameter | −6 |
| Surf 1 | NSC Object 308 | Position Y: | Pickup From 4 | Scale | 1.0000E+000 | Offset | 0.0000E+000 | Column Parameter | −6 |
| Surf 1 | NSC Object 308 | Parameter 1: | Pickup From 3 | Scale | 1.0000E+000 | Offset | 0.0000E+000 | Column Parameter | −6 |
| Surf 1 | NSC Object 308 | Parameter 2: | Pickup From 3 | Scale | 1.0000E+000 | Offset | 0.0000E+000 | Column Parameter | −6 |
| Surf 1 | NSC Object 308 | Parameter 3: | Pickup From 3 | Scale | 1.0000E+000 | Offset | 0.0000E+000 | Column Parameter | −6 |
| Surf 1 | NSC Object 308 | Parameter 5: | Pickup From 23 | Scale | 1.0000E+000 | Offset | 0.0000E+000 | Column Parameter | −6 |
| Surf 1 | NSC Object 308 | Parameter 6: | Pickup From 3 | Scale | 1.0000E+000 | Offset | 0.0000E+000 | Column Parameter | −6 |
| Surf 1 | NSC Object 308 | Parameter 7: | Pickup From 3 | Scale | 1.0000E+000 | Offset | 0.0000E+000 | Column Parameter | −6 |
| Surf 1 | NSC Object 308 | Parameter 8: | Pickup From 3 | Scale | 1.0000E+000 | Offset | 0.0000E+000 | Column Parameter | −6 |
| Surf 1 | NSC Object 309 | Position Y: | Pickup From 4 | Scale | 1.0000E+000 | Offset | 0.0000E+000 | Column Parameter | −6 |
| Surf 1 | NSC Object 309 | Parameter 1: | Pickup From 3 | Scale | 1.0000E+000 | Offset | 0.0000E+000 | Column Parameter | −6 |

TABLE 3-continued

ZEMAX Software Output Describing Surface Data Summary and Detail for Each
Individual Element within the Illumination Optical System illustrated in FIGS. 13-15

| | | | | | | | | |
|---|---|---|---|---|---|---|---|---|
| Surf 1 | NSC Object 309 | Parameter 2: | Pickup From 3 | Scale | 1.0000E+000 | Offset | 0.0000E+000 | Column Parameter −6 |
| Surf 1 | NSC Object 309 | Parameter 3: | Pickup From 3 | Scale | 1.0000E+000 | Offset | 0.0000E+000 | Column Parameter −6 |
| Surf 1 | NSC Object 309 | Parameter 5: | Pickup From 23 | Scale | 1.0000E+000 | Offset | 0.0000E+000 | Column Parameter −6 |
| Surf 1 | NSC Object 309 | Parameter 6: | Pickup From 3 | Scale | 1.0000E+000 | Offset | 0.0000E+000 | Column Parameter −6 |
| Surf 1 | NSC Object 309 | Parameter 7: | Pickup From 3 | Scale | 1.0000E+000 | Offset | 0.0000E+000 | Column Parameter −6 |
| Surf 1 | NSC Object 309 | Parameter 8: | Pickup From 3 | Scale | 1.0000E+000 | Offset | 0.0000E+000 | Column Parameter −6 |
| Surf 1 | NSC Object 310 | Position Y: | Pickup From 4 | Scale | −1.0000E+000 | Offset | 0.0000E+000 | Column Parameter −6 |
| Surf 1 | NSC Object 310 | Parameter 1: | Pickup From 3 | Scale | 1.0000E+000 | Offset | 0.0000E+000 | Column Parameter −6 |
| Surf 1 | NSC Object 310 | Parameter 2: | Pickup From 3 | Scale | 1.0000E+000 | Offset | 0.0000E+000 | Column Parameter −6 |
| Surf 1 | NSC Object 310 | Parameter 3: | Pickup From 3 | Scale | 1.0000E+000 | Offset | 0.0000E+000 | Column Parameter −6 |
| Surf 1 | NSC Object 310 | Parameter 5: | Pickup From 23 | Scale | 1.0000E+000 | Offset | 0.0000E+000 | Column Parameter −6 |
| Surf 1 | NSC Object 310 | Parameter 6: | Pickup From 3 | Scale | 1.0000E+000 | Offset | 0.0000E+000 | Column Parameter −6 |
| Surf 1 | NSC Object 310 | Parameter 7: | Pickup From 3 | Scale | 1.0000E+000 | Offset | 0.0000E+000 | Column Parameter −6 |
| Surf 1 | NSC Object 310 | Parameter 8: | Pickup From 3 | Scale | 1.0000E+000 | Offset | 0.0000E+000 | Column Parameter −6 |
| Surf 1 | NSC Object 311 | Position Y: | Pickup From 4 | Scale | −1.0000E+000 | Offset | 0.0000E+000 | Column Parameter −6 |
| Surf 1 | NSC Object 311 | Parameter 1: | Pickup From 3 | Scale | 1.0000E+000 | Offset | 0.0000E+000 | Column Parameter −6 |
| Surf 1 | NSC Object 311 | Parameter 2: | Pickup From 3 | Scale | 1.0000E+000 | Offset | 0.0000E+000 | Column Parameter −6 |
| Surf 1 | NSC Object 311 | Parameter 3: | Pickup From 3 | Scale | 1.0000E+000 | Offset | 0.0000E+000 | Column Parameter −6 |
| Surf 1 | NSC Object 311 | Parameter 5: | Pickup From 23 | Scale | 1.0000E+000 | Offset | 0.0000E+000 | Column Parameter −6 |
| Surf 1 | NSC Object 311 | Parameter 6: | Pickup From 3 | Scale | 1.0000E+000 | Offset | 0.0000E+000 | Column Parameter −6 |
| Surf 1 | NSC Object 311 | Parameter 7: | Pickup From 3 | Scale | 1.0000E+000 | Offset | 0.0000E+000 | Column Parameter −6 |
| Surf 1 | NSC Object 311 | Parameter 8: | Pickup From 3 | Scale | 1.0000E+000 | Offset | 0.0000E+000 | Column Parameter −6 |
| Surf 1 | NSC Object 312 | Position Y: | Pickup From 4 | Scale | −1.0000E+000 | Offset | 0.0000E+000 | Column Parameter −6 |
| Surf 1 | NSC Object 312 | Parameter 1: | Pickup From 3 | Scale | 1.0000E+000 | Offset | 0.0000E+000 | Column Parameter −6 |
| Surf 1 | NSC Object 312 | Parameter 2: | Pickup From 3 | Scale | 1.0000E+000 | Offset | 0.0000E+000 | Column Parameter −6 |
| Surf 1 | NSC Object 312 | Parameter 3: | Pickup From 3 | Scale | 1.0000E+000 | Offset | 0.0000E+000 | Column Parameter −6 |
| Surf 1 | NSC Object 312 | Parameter 5: | Pickup From 23 | Scale | 1.0000E+000 | Offset | 0.0000E+000 | Column Parameter −6 |
| Surf 1 | NSC Object 312 | Parameter 6: | Pickup From 3 | Scale | 1.0000E+000 | Offset | 0.0000E+000 | Column Parameter −6 |
| Surf 1 | NSC Object 312 | Parameter 7: | Pickup From 3 | Scale | 1.0000E+000 | Offset | 0.0000E+000 | Column Parameter −6 |
| Surf 1 | NSC Object 312 | Parameter 8: | Pickup From 3 | Scale | 1.0000E+000 | Offset | 0.0000E+000 | Column Parameter −6 |
| Surf 1 | NSC Object 313 | Position Y: | Pickup From 4 | Scale | −1.0000E+000 | Offset | 0.0000E+000 | Column Parameter −6 |
| Surf 1 | NSC Object 313 | Parameter 1: | Pickup From 3 | Scale | 1.0000E+000 | Offset | 0.0000E+000 | Column Parameter −6 |
| Surf 1 | NSC Object 313 | Parameter 2: | Pickup From 3 | Scale | 1.0000E+000 | Offset | 0.0000E+000 | Column Parameter −6 |
| Surf 1 | NSC Object 313 | Parameter 3: | Pickup From 3 | Scale | 1.0000E+000 | Offset | 0.0000E+000 | Column Parameter −6 |
| Surf 1 | NSC Object 313 | Parameter 5: | Pickup From 23 | Scale | 1.0000E+000 | Offset | 0.0000E+000 | Column Parameter −6 |
| Surf 1 | NSC Object 313 | Parameter 6: | Pickup From 3 | Scale | 1.0000E+000 | Offset | 0.0000E+000 | Column Parameter −6 |
| Surf 1 | NSC Object 313 | Parameter 7: | Pickup From 3 | Scale | 1.0000E+000 | Offset | 0.0000E+000 | Column Parameter −6 |
| Surf 1 | NSC Object 313 | Parameter 8: | Pickup From 3 | Scale | 1.0000E+000 | Offset | 0.0000E+000 | Column Parameter −6 |
| Surf 1 | NSC Object 315 | Position X: | Pickup From 2 | Scale | 6.0000E+000 | Offset | 0.0000E+000 | Column Parameter −6 |
| Surf 1 | NSC Object 315 | Parameter 1: | Pickup From 3 | Scale | 1.0000E+000 | Offset | 0.0000E+000 | Column Parameter −6 |
| Surf 1 | NSC Object 315 | Parameter 2: | Pickup From 3 | Scale | 1.0000E+000 | Offset | 0.0000E+000 | Column Parameter −6 |
| Surf 1 | NSC Object 315 | Parameter 3: | Pickup From 3 | Scale | 1.0000E+000 | Offset | 0.0000E+000 | Column Parameter −6 |
| Surf 1 | NSC Object 315 | Parameter 6: | Pickup From 3 | Scale | 1.0000E+000 | Offset | 0.0000E+000 | Column Parameter −6 |
| Surf 1 | NSC Object 315 | Parameter 7: | Pickup From 3 | Scale | 1.0000E+000 | Offset | 0.0000E+000 | Column Parameter −6 |
| Surf 1 | NSC Object 315 | Parameter 8: | Pickup From 3 | Scale | 1.0000E+000 | Offset | 0.0000E+000 | Column Parameter −6 |
| Surf 1 | NSC Object 316 | Position Y: | Pickup From 4 | Scale | 1.0000E+000 | Offset | 0.0000E+000 | Column Parameter −6 |
| Surf 1 | NSC Object 316 | Parameter 1: | Pickup From 3 | Scale | 1.0000E+000 | Offset | 0.0000E+000 | Column Parameter −6 |
| Surf 1 | NSC Object 316 | Parameter 2: | Pickup From 3 | Scale | 1.0000E+000 | Offset | 0.0000E+000 | Column Parameter −6 |
| Surf 1 | NSC Object 316 | Parameter 3: | Pickup From 3 | Scale | 1.0000E+000 | Offset | 0.0000E+000 | Column Parameter −6 |
| Surf 1 | NSC Object 316 | Parameter 5: | Pickup From 33 | Scale | 1.0000E+000 | Offset | 0.0000E+000 | Column Parameter −6 |
| Surf 1 | NSC Object 316 | Parameter 6: | Pickup From 3 | Scale | 1.0000E+000 | Offset | 0.0000E+000 | Column Parameter −6 |
| Surf 1 | NSC Object 316 | Parameter 7: | Pickup From 3 | Scale | 1.0000E+000 | Offset | 0.0000E+000 | Column Parameter −6 |
| Surf 1 | NSC Object 316 | Parameter 8: | Pickup From 3 | Scale | 1.0000E+000 | Offset | 0.0000E+000 | Column Parameter −6 |
| Surf 1 | NSC Object 317 | Position Y: | Pickup From 4 | Scale | 1.0000E+000 | Offset | 0.0000E+000 | Column Parameter −6 |
| Surf 1 | NSC Object 317 | Parameter 1: | Pickup From 3 | Scale | 1.0000E+000 | Offset | 0.0000E+000 | Column Parameter −6 |
| Surf 1 | NSC Object 317 | Parameter 2: | Pickup From 3 | Scale | 1.0000E+000 | Offset | 0.0000E+000 | Column Parameter −6 |
| Surf 1 | NSC Object 317 | Parameter 3: | Pickup From 3 | Scale | 1.0000E+000 | Offset | 0.0000E+000 | Column Parameter −6 |
| Surf 1 | NSC Object 317 | Parameter 5: | Pickup From 33 | Scale | 1.0000E+000 | Offset | 0.0000E+000 | Column Parameter −6 |
| Surf 1 | NSC Object 317 | Parameter 6: | Pickup From 3 | Scale | 1.0000E+000 | Offset | 0.0000E+000 | Column Parameter −6 |
| Surf 1 | NSC Object 317 | Parameter 7: | Pickup From 3 | Scale | 1.0000E+000 | Offset | 0.0000E+000 | Column Parameter −6 |
| Surf 1 | NSC Object 317 | Parameter 8: | Pickup From 3 | Scale | 1.0000E+000 | Offset | 0.0000E+000 | Column Parameter −6 |
| Surf 1 | NSC Object 318 | Position Y: | Pickup From 4 | Scale | 1.0000E+000 | Offset | 0.0000E+000 | Column Parameter −6 |
| Surf 1 | NSC Object 318 | Parameter 1: | Pickup From 3 | Scale | 1.0000E+000 | Offset | 0.0000E+000 | Column Parameter −6 |
| Surf 1 | NSC Object 318 | Parameter 2: | Pickup From 3 | Scale | 1.0000E+000 | Offset | 0.0000E+000 | Column Parameter −6 |
| Surf 1 | NSC Object 318 | Parameter 3: | Pickup From 3 | Scale | 1.0000E+000 | Offset | 0.0000E+000 | Column Parameter −6 |
| Surf 1 | NSC Object 318 | Parameter 5: | Pickup From 33 | Scale | 1.0000E+000 | Offset | 0.0000E+000 | Column Parameter −6 |
| Surf 1 | NSC Object 318 | Parameter 6: | Pickup From 3 | Scale | 1.0000E+000 | Offset | 0.0000E+000 | Column Parameter −6 |
| Surf 1 | NSC Object 318 | Parameter 7: | Pickup From 3 | Scale | 1.0000E+000 | Offset | 0.0000E+000 | Column Parameter −6 |
| Surf 1 | NSC Object 318 | Parameter 8: | Pickup From 3 | Scale | 1.0000E+000 | Offset | 0.0000E+000 | Column Parameter −6 |
| Surf 1 | NSC Object 319 | Position Y: | Pickup From 4 | Scale | 1.0000E+000 | Offset | 0.0000E+000 | Column Parameter −6 |
| Surf 1 | NSC Object 320 | Position Y: | Pickup From 4 | Scale | −1.0000E+000 | Offset | 0.0000E+000 | Column Parameter −6 |
| Surf 1 | NSC Object 320 | Parameter 1: | Pickup From 3 | Scale | 1.0000E+000 | Offset | 0.0000E+000 | Column Parameter −6 |
| Surf 1 | NSC Object 320 | Parameter 2: | Pickup From 3 | Scale | 1.0000E+000 | Offset | 0.0000E+000 | Column Parameter −6 |
| Surf 1 | NSC Object 320 | Parameter 3: | Pickup From 3 | Scale | 1.0000E+000 | Offset | 0.0000E+000 | Column Parameter −6 |
| Surf 1 | NSC Object 320 | Parameter 5: | Pickup From 33 | Scale | 1.0000E+000 | Offset | 0.0000E+000 | Column Parameter −6 |
| Surf 1 | NSC Object 320 | Parameter 6: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | |
|---|---|---|---|---|---|---|---|---|
| Surf 1 | NSC Object 320 | Parameter 7: | Pickup From 3 | Scale | 1.0000E+000 | Offset | 0.0000E+000 | Column Parameter −6 |
| Surf 1 | NSC Object 320 | Parameter 8: | Pickup From 3 | Scale | 1.0000E+000 | Offset | 0.0000E+000 | Column Parameter −6 |
| Surf 1 | NSC Object 321 | Position Y: | Pickup From 4 | Scale | −1.0000E+000 | Offset | 0.0000E+000 | Column Parameter −6 |
| Surf 1 | NSC Object 321 | Parameter 1: | Pickup From 3 | Scale | 1.0000E+000 | Offset | 0.0000E+000 | Column Parameter −6 |
| Surf 1 | NSC Object 321 | Parameter 2: | Pickup From 3 | Scale | 1.0000E+000 | Offset | 0.0000E+000 | Column Parameter −6 |
| Surf 1 | NSC Object 321 | Parameter 3: | Pickup From 3 | Scale | 1.0000E+000 | Offset | 0.0000E+000 | Column Parameter −6 |
| Surf 1 | NSC Object 321 | Parameter 5: | Pickup From 33 | Scale | 1.0000E+000 | Offset | 0.0000E+000 | Column Parameter −6 |
| Surf 1 | NSC Object 321 | Parameter 6: | Pickup From 3 | Scale | 1.0000E+000 | Offset | 0.0000E+000 | Column Parameter −6 |
| Surf 1 | NSC Object 321 | Parameter 7: | Pickup From 3 | Scale | 1.0000E+000 | Offset | 0.0000E+000 | Column Parameter −6 |
| Surf 1 | NSC Object 321 | Parameter 8: | Pickup From 3 | Scale | 1.0000E+000 | Offset | 0.0000E+000 | Column Parameter −6 |
| Surf 1 | NSC Object 322 | Position Y: | Pickup From 4 | Scale | −1.0000E+000 | Offset | 0.0000E+000 | Column Parameter −6 |
| Surf 1 | NSC Object 322 | Parameter 1: | Pickup From 3 | Scale | 1.0000E+000 | Offset | 0.0000E+000 | Column Parameter −6 |
| Surf 1 | NSC Object 322 | Parameter 2: | Pickup From 3 | Scale | 1.0000E+000 | Offset | 0.0000E+000 | Column Parameter −6 |
| Surf 1 | NSC Object 322 | Parameter 3: | Pickup From 3 | Scale | 1.0000E+000 | Offset | 0.0000E+000 | Column Parameter −6 |
| Surf 1 | NSC Object 322 | Parameter 5: | Pickup From 33 | Scale | 1.0000E+000 | Offset | 0.0000E+000 | Column Parameter −6 |
| Surf 1 | NSC Object 322 | Parameter 6: | Pickup From 3 | Scale | 1.0000E+000 | Offset | 0.0000E+000 | Column Parameter −6 |
| Surf 1 | NSC Object 322 | Parameter 7: | Pickup From 3 | Scale | 1.0000E+000 | Offset | 0.0000E+000 | Column Parameter −6 |
| Surf 1 | NSC Object 322 | Parameter 8: | Pickup From 3 | Scale | 1.0000E+000 | Offset | 0.0000E+000 | Column Parameter −6 |
| Surf 1 | NSC Object 323 | Position Y: | Pickup From 4 | Scale | −1.0000E+000 | Offset | 0.0000E+000 | Column Parameter −6 |
| Surf 1 | NSC Object 325 | Position X: | Pickup From 2 | Scale | 8.0000E+000 | Offset | 0.0000E+000 | Column Parameter −6 |
| Surf 1 | NSC Object 325 | Parameter 1: | Pickup From 3 | Scale | 1.0000E+000 | Offset | 0.0000E+000 | Column Parameter −6 |
| Surf 1 | NSC Object 325 | Parameter 2: | Pickup From 3 | Scale | 1.0000E+000 | Offset | 0.0000E+000 | Column Parameter −6 |
| Surf 1 | NSC Object 325 | Parameter 3: | Pickup From 3 | Scale | 1.0000E+000 | Offset | 0.0000E+000 | Column Parameter −6 |
| Surf 1 | NSC Object 325 | Parameter 6: | Pickup From 3 | Scale | 1.0000E+000 | Offset | 0.0000E+000 | Column Parameter −6 |
| Surf 1 | NSC Object 325 | Parameter 7: | Pickup From 3 | Scale | 1.0000E+000 | Offset | 0.0000E+000 | Column Parameter −6 |
| Surf 1 | NSC Object 325 | Parameter 8: | Pickup From 3 | Scale | 1.0000E+000 | Offset | 0.0000E+000 | Column Parameter −6 |
| Surf 1 | NSC Object 326 | Position Y: | Pickup From 4 | Scale | 1.0000E+000 | Offset | 0.0000E+000 | Column Parameter −6 |
| Surf 1 | NSC Object 326 | Parameter 1: | Pickup From 3 | Scale | 1.0000E+000 | Offset | 0.0000E+000 | Column Parameter −6 |
| Surf 1 | NSC Object 326 | Parameter 2: | Pickup From 3 | Scale | 1.0000E+000 | Offset | 0.0000E+000 | Column Parameter −6 |
| Surf 1 | NSC Object 326 | Parameter 3: | Pickup From 3 | Scale | 1.0000E+000 | Offset | 0.0000E+000 | Column Parameter −6 |
| Surf 1 | NSC Object 326 | Parameter 5: | Pickup From 43 | Scale | 1.0000E+000 | Offset | 0.0000E+000 | Column Parameter −6 |
| Surf 1 | NSC Object 326 | Parameter 6: | Pickup From 3 | Scale | 1.0000E+000 | Offset | 0.0000E+000 | Column Parameter −6 |
| Surf 1 | NSC Object 326 | Parameter 7: | Pickup From 3 | Scale | 1.0000E+000 | Offset | 0.0000E+000 | Column Parameter −6 |
| Surf 1 | NSC Object 326 | Parameter 8: | Pickup From 3 | Scale | 1.0000E+000 | Offset | 0.0000E+000 | Column Parameter −6 |
| Surf 1 | NSC Object 327 | Position Y: | Pickup From 4 | Scale | 1.0000E+000 | Offset | 0.0000E+000 | Column Parameter −6 |
| Surf 1 | NSC Object 327 | Parameter 1: | Pickup From 3 | Scale | 1.0000E+000 | Offset | 0.0000E+000 | Column Parameter −6 |
| Surf 1 | NSC Object 327 | Parameter 2: | Pickup From 3 | Scale | 1.0000E+000 | Offset | 0.0000E+000 | Column Parameter −6 |
| Surf 1 | NSC Object 327 | Parameter 3: | Pickup From 3 | Scale | 1.0000E+000 | Offset | 0.0000E+000 | Column Parameter −6 |
| Surf 1 | NSC Object 327 | Parameter 5: | Pickup From 43 | Scale | 1.0000E+000 | Offset | 0.0000E+000 | Column Parameter −6 |
| Surf 1 | NSC Object 327 | Parameter 6: | Pickup From 3 | Scale | 1.0000E+000 | Offset | 0.0000E+000 | Column Parameter −6 |
| Surf 1 | NSC Object 327 | Parameter 7: | Pickup From 3 | Scale | 1.0000E+000 | Offset | 0.0000E+000 | Column Parameter −6 |
| Surf 1 | NSC Object 327 | Parameter 8: | Pickup From 3 | Scale | 1.0000E+000 | Offset | 0.0000E+000 | Column Parameter −6 |
| Surf 1 | NSC Object 328 | Position Y: | Pickup From 4 | Scale | 1.0000E+000 | Offset | 0.0000E+000 | Column Parameter −6 |
| Surf 1 | NSC Object 329 | Position Y: | Pickup From 4 | Scale | 1.0000E+000 | Offset | 0.0000E+000 | Column Parameter −6 |
| Surf 1 | NSC Object 330 | Position Y: | Pickup From 4 | Scale | −1.0000E+000 | Offset | 0.0000E+000 | Column Parameter −6 |
| Surf 1 | NSC Object 330 | Parameter 1: | Pickup From 3 | Scale | 1.0000E+000 | Offset | 0.0000E+000 | Column Parameter −6 |
| Surf 1 | NSC Object 330 | Parameter 2: | Pickup From 3 | Scale | 1.0000E+000 | Offset | 0.0000E+000 | Column Parameter −6 |
| Surf 1 | NSC Object 330 | Parameter 3: | Pickup From 3 | Scale | 1.0000E+000 | Offset | 0.0000E+000 | Column Parameter −6 |
| Surf 1 | NSC Object 330 | Parameter 5: | Pickup From 43 | Scale | 1.0000E+000 | Offset | 0.0000E+000 | Column Parameter −6 |
| Surf 1 | NSC Object 330 | Parameter 6: | Pickup From 3 | Scale | 1.0000E+000 | Offset | 0.0000E+000 | Column Parameter −6 |
| Surf 1 | NSC Object 330 | Parameter 7: | Pickup From 3 | Scale | 1.0000E+000 | Offset | 0.0000E+000 | Column Parameter −6 |
| Surf 1 | NSC Object 330 | Parameter 8: | Pickup From 3 | Scale | 1.0000E+000 | Offset | 0.0000E+000 | Column Parameter −6 |
| Surf 1 | NSC Object 331 | Position Y: | Pickup From 4 | Scale | −1.0000E+000 | Offset | 0.0000E+000 | Column Parameter −6 |
| Surf 1 | NSC Object 331 | Parameter 1: | Pickup From 3 | Scale | 1.0000E+000 | Offset | 0.0000E+000 | Column Parameter −6 |
| Surf 1 | NSC Object 331 | Parameter 2: | Pickup From 3 | Scale | 1.0000E+000 | Offset | 0.0000E+000 | Column Parameter −6 |
| Surf 1 | NSC Object 331 | Parameter 3: | Pickup From 3 | Scale | 1.0000E+000 | Offset | 0.0000E+000 | Column Parameter −6 |
| Surf 1 | NSC Object 331 | Parameter 5: | Pickup From 43 | Scale | 1.0000E+000 | Offset | 0.0000E+000 | Column Parameter −6 |
| Surf 1 | NSC Object 331 | Parameter 6: | Pickup From 3 | Scale | 1.0000E+000 | Offset | 0.0000E+000 | Column Parameter −6 |
| Surf 1 | NSC Object 331 | Parameter 7: | Pickup From 3 | Scale | 1.0000E+000 | Offset | 0.0000E+000 | Column Parameter −6 |
| Surf 1 | NSC Object 331 | Parameter 8: | Pickup From 3 | Scale | 1.0000E+000 | Offset | 0.0000E+000 | Column Parameter −6 |
| Surf 1 | NSC Object 332 | Position Y: | Pickup From 4 | Scale | −1.0000E+000 | Offset | 0.0000E+000 | Column Parameter −6 |
| Surf 1 | NSC Object 333 | Position Y: | Pickup From 4 | Scale | −1.0000E+000 | Offset | 0.0000E+000 | Column Parameter −6 |
| Surf 1 | NSC Object 335 | Position X: | Pickup From 2 | Scale | −2.0000E+000 | Offset | 0.0000E+000 | Column Parameter −6 |
| Surf 1 | NSC Object 335 | Parameter 1: | Pickup From 3 | Scale | 1.0000E+000 | Offset | 0.0000E+000 | Column Parameter −6 |
| Surf 1 | NSC Object 335 | Parameter 2: | Pickup From 3 | Scale | 1.0000E+000 | Offset | 0.0000E+000 | Column Parameter −6 |
| Surf 1 | NSC Object 335 | Parameter 3: | Pickup From 3 | Scale | 1.0000E+000 | Offset | 0.0000E+000 | Column Parameter −6 |
| Surf 1 | NSC Object 335 | Parameter 6: | Pickup From 3 | Scale | 1.0000E+000 | Offset | 0.0000E+000 | Column Parameter −6 |
| Surf 1 | NSC Object 335 | Parameter 7: | Pickup From 3 | Scale | 1.0000E+000 | Offset | 0.0000E+000 | Column Parameter −6 |
| Surf 1 | NSC Object 335 | Parameter 8: | Pickup From 3 | Scale | 1.0000E+000 | Offset | 0.0000E+000 | Column Parameter −6 |
| Surf 1 | NSC Object 336 | Position Y: | Pickup From 4 | Scale | 1.0000E+000 | Offset | 0.0000E+000 | Column Parameter −6 |
| Surf 1 | NSC Object 336 | Parameter 1: | Pickup From 3 | Scale | 1.0000E+000 | Offset | 0.0000E+000 | Column Parameter −6 |
| Surf 1 | NSC Object 336 | Parameter 2: | Pickup From 3 | Scale | 1.0000E+000 | Offset | 0.0000E+000 | Column Parameter −6 |
| Surf 1 | NSC Object 336 | Parameter 3: | Pickup From 3 | Scale | 1.0000E+000 | Offset | 0.0000E+000 | Column Parameter −6 |
| Surf 1 | NSC Object 336 | Parameter 5: | Pickup From 53 | Scale | 1.0000E+000 | Offset | 0.0000E+000 | Column Parameter −6 |
| Surf 1 | NSC Object 336 | Parameter 6: | Pickup From 3 | Scale | 1.0000E+000 | Offset | 0.0000E+000 | Column Parameter −6 |
| Surf 1 | NSC Object 336 | Parameter 7: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 336 | Parameter 8: | Pickup From 3 | Scale | 1.0000E+000 | Offset | 0.0000E+000 | Column Parameter −6 |
| Surf 1 | NSC Object 337 | Position Y: | Pickup From 4 | Scale | 1.0000E+000 | Offset | 0.0000E+000 | Column Parameter −6 |
| Surf 1 | NSC Object 337 | Parameter 1: | Pickup From 3 | Scale | 1.0000E+000 | Offset | 0.0000E+000 | Column Parameter −6 |
| Surf 1 | NSC Object 337 | Parameter 2: | Pickup From 3 | Scale | 1.0000E+000 | Offset | 0.0000E+000 | Column Parameter −6 |
| Surf 1 | NSC Object 337 | Parameter 3: | Pickup From 3 | Scale | 1.0000E+000 | Offset | 0.0000E+000 | Column Parameter −6 |
| Surf 1 | NSC Object 337 | Parameter 5: | Pickup From 53 | Scale | 1.0000E+000 | Offset | 0.0000E+000 | Column Parameter −6 |
| Surf 1 | NSC Object 337 | Parameter 6: | Pickup From 3 | Scale | 1.0000E+000 | Offset | 0.0000E+000 | Column Parameter −6 |
| Surf 1 | NSC Object 337 | Parameter 7: | Pickup From 3 | Scale | 1.0000E+000 | Offset | 0.0000E+000 | Column Parameter −6 |
| Surf 1 | NSC Object 337 | Parameter 8: | Pickup From 3 | Scale | 1.0000E+000 | Offset | 0.0000E+000 | Column Parameter −6 |
| Surf 1 | NSC Object 338 | Position Y: | Pickup From 4 | Scale | 1.0000E+000 | Offset | 0.0000E+000 | Column Parameter −6 |
| Surf 1 | NSC Object 338 | Parameter 1: | Pickup From 3 | Scale | 1.0000E+000 | Offset | 0.0000E+000 | Column Parameter −6 |
| Surf 1 | NSC Object 338 | Parameter 2: | Pickup From 3 | Scale | 1.0000E+000 | Offset | 0.0000E+000 | Column Parameter −6 |
| Surf 1 | NSC Object 338 | Parameter 3: | Pickup From 3 | Scale | 1.0000E+000 | Offset | 0.0000E+000 | Column Parameter −6 |
| Surf 1 | NSC Object 338 | Parameter 5: | Pickup From 53 | Scale | 1.0000E+000 | Offset | 0.0000E+000 | Column Parameter −6 |
| Surf 1 | NSC Object 338 | Parameter 6: | Pickup From 3 | Scale | 1.0000E+000 | Offset | 0.0000E+000 | Column Parameter −6 |
| Surf 1 | NSC Object 338 | Parameter 7: | Pickup From 3 | Scale | 1.0000E+000 | Offset | 0.0000E+000 | Column Parameter −6 |
| Surf 1 | NSC Object 338 | Parameter 8: | Pickup From 3 | Scale | 1.0000E+000 | Offset | 0.0000E+000 | Column Parameter −6 |
| Surf 1 | NSC Object 339 | Position Y: | Pickup From 4 | Scale | 1.0000E+000 | Offset | 0.0000E+000 | Column Parameter −6 |
| Surf 1 | NSC Object 339 | Parameter 1: | Pickup From 3 | Scale | 1.0000E+000 | Offset | 0.0000E+000 | Column Parameter −6 |
| Surf 1 | NSC Object 339 | Parameter 2: | Pickup From 3 | Scale | 1.0000E+000 | Offset | 0.0000E+000 | Column Parameter −6 |
| Surf 1 | NSC Object 339 | Parameter 3: | Pickup From 3 | Scale | 1.0000E+000 | Offset | 0.0000E+000 | Column Parameter −6 |
| Surf 1 | NSC Object 339 | Parameter 5: | Pickup From 53 | Scale | 1.0000E+000 | Offset | 0.0000E+000 | Column Parameter −6 |
| Surf 1 | NSC Object 339 | Parameter 6: | Pickup From 3 | Scale | 1.0000E+000 | Offset | 0.0000E+000 | Column Parameter −6 |
| Surf 1 | NSC Object 339 | Parameter 7: | Pickup From 3 | Scale | 1.0000E+000 | Offset | 0.0000E+000 | Column Parameter −6 |
| Surf 1 | NSC Object 339 | Parameter 8: | Pickup From 3 | Scale | 1.0000E+000 | Offset | 0.0000E+000 | Column Parameter −6 |
| Surf 1 | NSC Object 340 | Position Y: | Pickup From 4 | Scale | −1.0000E+000 | Offset | 0.0000E+000 | Column Parameter −6 |
| Surf 1 | NSC Object 340 | Parameter 1: | Pickup From 3 | Scale | 1.0000E+000 | Offset | 0.0000E+000 | Column Parameter −6 |
| Surf 1 | NSC Object 340 | Parameter 2: | Pickup From 3 | Scale | 1.0000E+000 | Offset | 0.0000E+000 | Column Parameter −6 |
| Surf 1 | NSC Object 340 | Parameter 3: | Pickup From 3 | Scale | 1.0000E+000 | Offset | 0.0000E+000 | Column Parameter −6 |
| Surf 1 | NSC Object 340 | Parameter 5: | Pickup From 53 | Scale | 1.0000E+000 | Offset | 0.0000E+000 | Column Parameter −6 |
| Surf 1 | NSC Object 340 | Parameter 6: | Pickup From 3 | Scale | 1.0000E+000 | Offset | 0.0000E+000 | Column Parameter −6 |
| Surf 1 | NSC Object 340 | Parameter 7: | Pickup From 3 | Scale | 1.0000E+000 | Offset | 0.0000E+000 | Column Parameter −6 |
| Surf 1 | NSC Object 340 | Parameter 8: | Pickup From 3 | Scale | 1.0000E+000 | Offset | 0.0000E+000 | Column Parameter −6 |
| Surf 1 | NSC Object 341 | Position Y: | Pickup From 4 | Scale | −1.0000E+000 | Offset | 0.0000E+000 | Column Parameter −6 |
| Surf 1 | NSC Object 341 | Parameter 1: | Pickup From 3 | Scale | 1.0000E+000 | Offset | 0.0000E+000 | Column Parameter −6 |
| Surf 1 | NSC Object 341 | Parameter 2: | Pickup From 3 | Scale | 1.0000E+000 | Offset | 0.0000E+000 | Column Parameter −6 |
| Surf 1 | NSC Object 341 | Parameter 3: | Pickup From 3 | Scale | 1.0000E+000 | Offset | 0.0000E+000 | Column Parameter −6 |
| Surf 1 | NSC Object 341 | Parameter 5: | Pickup From 53 | Scale | 1.0000E+000 | Offset | 0.0000E+000 | Column Parameter −6 |
| Surf 1 | NSC Object 341 | Parameter 6: | Pickup From 3 | Scale | 1.0000E+000 | Offset | 0.0000E+000 | Column Parameter −6 |
| Surf 1 | NSC Object 341 | Parameter 7: | Pickup From 3 | Scale | 1.0000E+000 | Offset | 0.0000E+000 | Column Parameter −6 |
| Surf 1 | NSC Object 341 | Parameter 8: | Pickup From 3 | Scale | 1.0000E+000 | Offset | 0.0000E+000 | Column Parameter −6 |
| Surf 1 | NSC Object 342 | Position Y: | Pickup From 4 | Scale | −1.0000E+000 | Offset | 0.0000E+000 | Column Parameter −6 |
| Surf 1 | NSC Object 342 | Parameter 1: | Pickup From 3 | Scale | 1.0000E+000 | Offset | 0.0000E+000 | Column Parameter −6 |
| Surf 1 | NSC Object 342 | Parameter 2: | Pickup From 3 | Scale | 1.0000E+000 | Offset | 0.0000E+000 | Column Parameter −6 |
| Surf 1 | NSC Object 342 | Parameter 3: | Pickup From 3 | Scale | 1.0000E+000 | Offset | 0.0000E+000 | Column Parameter −6 |
| Surf 1 | NSC Object 342 | Parameter 5: | Pickup From 53 | Scale | 1.0000E+000 | Offset | 0.0000E+000 | Column Parameter −6 |
| Surf 1 | NSC Object 342 | Parameter 6: | Pickup From 3 | Scale | 1.0000E+000 | Offset | 0.0000E+000 | Column Parameter −6 |
| Surf 1 | NSC Object 342 | Parameter 7: | Pickup From 3 | Scale | 1.0000E+000 | Offset | 0.0000E+000 | Column Parameter −6 |
| Surf 1 | NSC Object 342 | Parameter 8: | Pickup From 3 | Scale | 1.0000E+000 | Offset | 0.0000E+000 | Column Parameter −6 |
| Surf 1 | NSC Object 343 | Position Y: | Pickup From 4 | Scale | −1.0000E+000 | Offset | 0.0000E+000 | Column Parameter −6 |
| Surf 1 | NSC Object 343 | Parameter 1: | Pickup From 3 | Scale | 1.0000E+000 | Offset | 0.0000E+000 | Column Parameter −6 |
| Surf 1 | NSC Object 343 | Parameter 2: | Pickup From 3 | Scale | 1.0000E+000 | Offset | 0.0000E+000 | Column Parameter −6 |
| Surf 1 | NSC Object 343 | Parameter 3: | Pickup From 3 | Scale | 1.0000E+000 | Offset | 0.0000E+000 | Column Parameter −6 |
| Surf 1 | NSC Object 343 | Parameter 5: | Pickup From 53 | Scale | 1.0000E+000 | Offset | 0.0000E+000 | Column Parameter −6 |
| Surf 1 | NSC Object 343 | Parameter 6: | Pickup From 3 | Scale | 1.0000E+000 | Offset | 0.0000E+000 | Column Parameter −6 |
| Surf 1 | NSC Object 343 | Parameter 7: | Pickup From 3 | Scale | 1.0000E+000 | Offset | 0.0000E+000 | Column Parameter −6 |
| Surf 1 | NSC Object 343 | Parameter 8: | Pickup From 3 | Scale | 1.0000E+000 | Offset | 0.0000E+000 | Column Parameter −6 |
| Surf 1 | NSC Object 345 | Position X: | Pickup From 2 | Scale | −4.0000E+000 | Offset | 0.0000E+000 | Column Parameter −6 |
| Surf 1 | NSC Object 345 | Parameter 1: | Pickup From 3 | Scale | 1.0000E+000 | Offset | 0.0000E+000 | Column Parameter −6 |
| Surf 1 | NSC Object 345 | Parameter 2: | Pickup From 3 | Scale | 1.0000E+000 | Offset | 0.0000E+000 | Column Parameter −6 |
| Surf 1 | NSC Object 345 | Parameter 3: | Pickup From 3 | Scale | 1.0000E+000 | Offset | 0.0000E+000 | Column Parameter −6 |
| Surf 1 | NSC Object 345 | Parameter 6: | Pickup From 3 | Scale | 1.0000E+000 | Offset | 0.0000E+000 | Column Parameter −6 |
| Surf 1 | NSC Object 345 | Parameter 7: | Pickup From 3 | Scale | 1.0000E+000 | Offset | 0.0000E+000 | Column Parameter −6 |
| Surf 1 | NSC Object 345 | Parameter 8: | Pickup From 3 | Scale | 1.0000E+000 | Offset | 0.0000E+000 | Column Parameter −6 |
| Surf 1 | NSC Object 346 | Position Y: | Pickup From 4 | Scale | 1.0000E+000 | Offset | 0.0000E+000 | Column Parameter −6 |
| Surf 1 | NSC Object 346 | Parameter 1: | Pickup From 3 | Scale | 1.0000E+000 | Offset | 0.0000E+000 | Column Parameter −6 |
| Surf 1 | NSC Object 346 | Parameter 2: | Pickup From 3 | Scale | 1.0000E+000 | Offset | 0.0000E+000 | Column Parameter −6 |
| Surf 1 | NSC Object 346 | Parameter 3: | Pickup From 3 | Scale | 1.0000E+000 | Offset | 0.0000E+000 | Column Parameter −6 |
| Surf 1 | NSC Object 346 | Parameter 5: | Pickup From 63 | Scale | 1.0000E+000 | Offset | 0.0000E+000 | Column Parameter −6 |
| Surf 1 | NSC Object 346 | Parameter 6: | Pickup From 3 | Scale | 1.0000E+000 | Offset | 0.0000E+000 | Column Parameter −6 |
| Surf 1 | NSC Object 346 | Parameter 7: | Pickup From 3 | Scale | 1.0000E+000 | Offset | 0.0000E+000 | Column Parameter −6 |
| Surf 1 | NSC Object 346 | Parameter 8: | Pickup From 3 | Scale | 1.0000E+000 | Offset | 0.0000E+000 | Column Parameter −6 |
| Surf 1 | NSC Object 347 | Position Y: | Pickup From 4 | Scale | 1.0000E+000 | Offset | 0.0000E+000 | Column Parameter −6 |
| Surf 1 | NSC Object 347 | Parameter 1: | Pickup From 3 | Scale | 1.0000E+000 | Offset | 0.0000E+000 | Column Parameter −6 |
| Surf 1 | NSC Object 347 | Parameter 2: | Pickup From 3 | Scale | 1.0000E+000 | Offset | 0.0000E+000 | Column Parameter −6 |
| Surf 1 | NSC Object 347 | Parameter 3: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 347 | Parameter 5: | Pickup From 63 | Scale | 1.0000E+000 | Offset | 0.0000E+000 | Column Parameter −6 |
| Surf 1 | NSC Object 347 | Parameter 6: | Pickup From 3 | Scale | 1.0000E+000 | Offset | 0.0000E+000 | Column Parameter −6 |
| Surf 1 | NSC Object 347 | Parameter 7: | Pickup From 3 | Scale | 1.0000E+000 | Offset | 0.0000E+000 | Column Parameter −6 |
| Surf 1 | NSC Object 347 | Parameter 8: | Pickup From 3 | Scale | 1.0000E+000 | Offset | 0.0000E+000 | Column Parameter −6 |
| Surf 1 | NSC Object 348 | Position Y: | Pickup From 4 | Scale | 1.0000E+000 | Offset | 0.0000E+000 | Column Parameter −6 |
| Surf 1 | NSC Object 348 | Parameter 1: | Pickup From 3 | Scale | 1.0000E+000 | Offset | 0.0000E+000 | Column Parameter −6 |
| Surf 1 | NSC Object 348 | Parameter 2: | Pickup From 3 | Scale | 1.0000E+000 | Offset | 0.0000E+000 | Column Parameter −6 |
| Surf 1 | NSC Object 348 | Parameter 3: | Pickup From 3 | Scale | 1.0000E+000 | Offset | 0.0000E+000 | Column Parameter −6 |
| Surf 1 | NSC Object 348 | Parameter 5: | Pickup From 63 | Scale | 1.0000E+000 | Offset | 0.0000E+000 | Column Parameter −6 |
| Surf 1 | NSC Object 348 | Parameter 6: | Pickup From 3 | Scale | 1.0000E+000 | Offset | 0.0000E+000 | Column Parameter −6 |
| Surf 1 | NSC Object 348 | Parameter 7: | Pickup From 3 | Scale | 1.0000E+000 | Offset | 0.0000E+000 | Column Parameter −6 |
| Surf 1 | NSC Object 348 | Parameter 8: | Pickup From 3 | Scale | 1.0000E+000 | Offset | 0.0000E+000 | Column Parameter −6 |
| Surf 1 | NSC Object 349 | Position Y: | Pickup From 4 | Scale | 1.0000E+000 | Offset | 0.0000E+000 | Column Parameter −6 |
| Surf 1 | NSC Object 349 | Parameter 1: | Pickup From 3 | Scale | 1.0000E+000 | Offset | 0.0000E+000 | Column Parameter −6 |
| Surf 1 | NSC Object 349 | Parameter 2: | Pickup From 3 | Scale | 1.0000E+000 | Offset | 0.0000E+000 | Column Parameter −6 |
| Surf 1 | NSC Object 349 | Parameter 3: | Pickup From 3 | Scale | 1.0000E+000 | Offset | 0.0000E+000 | Column Parameter −6 |
| Surf 1 | NSC Object 349 | Parameter 5: | Pickup From 63 | Scale | 1.0000E+000 | Offset | 0.0000E+000 | Column Parameter −6 |
| Surf 1 | NSC Object 349 | Parameter 6: | Pickup From 3 | Scale | 1.0000E+000 | Offset | 0.0000E+000 | Column Parameter −6 |
| Surf 1 | NSC Object 349 | Parameter 7: | Pickup From 3 | Scale | 1.0000E+000 | Offset | 0.0000E+000 | Column Parameter −6 |
| Surf 1 | NSC Object 349 | Parameter 8: | Pickup From 3 | Scale | 1.0000E+000 | Offset | 0.0000E+000 | Column Parameter −6 |
| Surf 1 | NSC Object 350 | Position Y: | Pickup From 4 | Scale | −1.0000E+000 | Offset | 0.0000E+000 | Column Parameter −6 |
| Surf 1 | NSC Object 350 | Parameter 2: | Pickup From 3 | Scale | 1.0000E+000 | Offset | 0.0000E+000 | Column Parameter −6 |
| Surf 1 | NSC Object 350 | Parameter 3: | Pickup From 3 | Scale | 1.0000E+000 | Offset | 0.0000E+000 | Column Parameter −6 |
| Surf 1 | NSC Object 350 | Parameter 5: | Pickup From 63 | Scale | 1.0000E+000 | Offset | 0.0000E+000 | Column Parameter −6 |
| Surf 1 | NSC Object 350 | Parameter 6: | Pickup From 3 | Scale | 1.0000E+000 | Offset | 0.0000E+000 | Column Parameter −6 |
| Surf 1 | NSC Object 350 | Parameter 7: | Pickup From 3 | Scale | 1.0000E+000 | Offset | 0.0000E+000 | Column Parameter −6 |
| Surf 1 | NSC Object 350 | Parameter 8: | Pickup From 3 | Scale | 1.0000E+000 | Offset | 0.0000E+000 | Column Parameter −6 |
| Surf 1 | NSC Object 351 | Position Y: | Pickup From 4 | Scale | −1.0000E+000 | Offset | 0.0000E+000 | Column Parameter −6 |
| Surf 1 | NSC Object 351 | Parameter 1: | Pickup From 3 | Scale | 1.0000E+000 | Offset | 0.0000E+000 | Column Parameter −6 |
| Surf 1 | NSC Object 351 | Parameter 2: | Pickup From 3 | Scale | 1.0000E+000 | Offset | 0.0000E+000 | Column Parameter −6 |
| Surf 1 | NSC Object 351 | Parameter 3: | Pickup From 3 | Scale | 1.0000E+000 | Offset | 0.0000E+000 | Column Parameter −6 |
| Surf 1 | NSC Object 351 | Parameter 5: | Pickup From 63 | Scale | 1.0000E+000 | Offset | 0.0000E+000 | Column Parameter −6 |
| Surf 1 | NSC Object 351 | Parameter 6: | Pickup From 3 | Scale | 1.0000E+000 | Offset | 0.0000E+000 | Column Parameter −6 |
| Surf 1 | NSC Object 351 | Parameter 7: | Pickup From 3 | Scale | 1.0000E+000 | Offset | 0.0000E+000 | Column Parameter −6 |
| Surf 1 | NSC Object 351 | Parameter 8: | Pickup From 3 | Scale | 1.0000E+000 | Offset | 0.0000E+000 | Column Parameter −6 |
| Surf 1 | NSC Object 352 | Position Y: | Pickup From 4 | Scale | −1.0000E+000 | Offset | 0.0000E+000 | Column Parameter −6 |
| Surf 1 | NSC Object 352 | Parameter 1: | Pickup From 3 | Scale | 1.0000E+000 | Offset | 0.0000E+000 | Column Parameter −6 |
| Surf 1 | NSC Object 352 | Parameter 2: | Pickup From 3 | Scale | 1.0000E+000 | Offset | 0.0000E+000 | Column Parameter −6 |
| Surf 1 | NSC Object 352 | Parameter 3: | Pickup From 3 | Scale | 1.0000E+000 | Offset | 0.0000E+000 | Column Parameter −6 |
| Surf 1 | NSC Object 352 | Parameter 5: | Pickup From 63 | Scale | 1.0000E+000 | Offset | 0.0000E+000 | Column Parameter −6 |
| Surf 1 | NSC Object 352 | Parameter 6: | Pickup From 3 | Scale | 1.0000E+000 | Offset | 0.0000E+000 | Column Parameter −6 |
| Surf 1 | NSC Object 352 | Parameter 7: | Pickup From 3 | Scale | 1.0000E+000 | Offset | 0.0000E+000 | Column Parameter −6 |
| Surf 1 | NSC Object 352 | Parameter 8: | Pickup From 3 | Scale | 1.0000E+000 | Offset | 0.0000E+000 | Column Parameter −6 |
| Surf 1 | NSC Object 353 | Position Y: | Pickup From 4 | Scale | −1.0000E+000 | Offset | 0.0000E+000 | Column Parameter −6 |
| Surf 1 | NSC Object 353 | Parameter 1: | Pickup From 3 | Scale | 1.0000E+000 | Offset | 0.0000E+000 | Column Parameter −6 |
| Surf 1 | NSC Object 353 | Parameter 2: | Pickup From 3 | Scale | 1.0000E+000 | Offset | 0.0000E+000 | Column Parameter −6 |
| Surf 1 | NSC Object 353 | Parameter 3: | Pickup From 3 | Scale | 1.0000E+000 | Offset | 0.0000E+000 | Column Parameter −6 |
| Surf 1 | NSC Object 353 | Parameter 5: | Pickup From 63 | Scale | 1.0000E+000 | Offset | 0.0000E+000 | Column Parameter −6 |
| Surf 1 | NSC Object 353 | Parameter 6: | Pickup From 3 | Scale | 1.0000E+000 | Offset | 0.0000E+000 | Column Parameter −6 |
| Surf 1 | NSC Object 353 | Parameter 7: | Pickup From 3 | Scale | 1.0000E+000 | Offset | 0.0000E+000 | Column Parameter −6 |
| Surf 1 | NSC Object 353 | Parameter 8: | Pickup From 3 | Scale | 1.0000E+000 | Offset | 0.0000E+000 | Column Parameter −6 |
| Surf 1 | NSC Object 355 | Position X: | Pickup From 2 | Scale | −6.0000E+000 | Offset | 0.0000E+000 | Column Parameter −6 |
| Surf 1 | NSC Object 355 | Parameter 1: | Pickup From 3 | Scale | 1.0000E+000 | Offset | 0.0000E+000 | Column Parameter −6 |
| Surf 1 | NSC Object 355 | Parameter 2: | Pickup From 3 | Scale | 1.0000E+000 | Offset | 0.0000E+000 | Column Parameter −6 |
| Surf 1 | NSC Object 355 | Parameter 3: | Pickup From 3 | Scale | 1.0000E+000 | Offset | 0.0000E+000 | Column Parameter −6 |
| Surf 1 | NSC Object 355 | Parameter 6: | Pickup From 3 | Scale | 1.0000E+000 | Offset | 0.0000E+000 | Column Parameter −6 |
| Surf 1 | NSC Object 355 | Parameter 7: | Pickup From 3 | Scale | 1.0000E+000 | Offset | 0.0000E+000 | Column Parameter −6 |
| Surf 1 | NSC Object 355 | Parameter 8: | Pickup From 3 | Scale | 1.0000E+000 | Offset | 0.0000E+000 | Column Parameter −6 |
| Surf 1 | NSC Object 356 | Position Y: | Pickup From 4 | Scale | 1.0000E+000 | Offset | 0.0000E+000 | Column Parameter −6 |
| Surf 1 | NSC Object 356 | Parameter 1: | Pickup From 3 | Scale | 1.0000E+000 | Offset | 0.0000E+000 | Column Parameter −6 |
| Surf 1 | NSC Object 356 | Parameter 2: | Pickup From 3 | Scale | 1.0000E+000 | Offset | 0.0000E+000 | Column Parameter −6 |
| Surf 1 | NSC Object 356 | Parameter 3: | Pickup From 3 | Scale | 1.0000E+000 | Offset | 0.0000E+000 | Column Parameter −6 |
| Surf 1 | NSC Object 356 | Parameter 5: | Pickup From 73 | Scale | 1.0000E+000 | Offset | 0.0000E+000 | Column Parameter −6 |
| Surf 1 | NSC Object 356 | Parameter 6: | Pickup From 3 | Scale | 1.0000E+000 | Offset | 0.0000E+000 | Column Parameter −6 |
| Surf 1 | NSC Object 356 | Parameter 7: | Pickup From 3 | Scale | 1.0000E+000 | Offset | 0.0000E+000 | Column Parameter −6 |
| Surf 1 | NSC Object 356 | Parameter 8: | Pickup From 3 | Scale | 1.0000E+000 | Offset | 0.0000E+000 | Column Parameter −6 |
| Surf 1 | NSC Object 357 | Position Y: | Pickup From 4 | Scale | 1.0000E+000 | Offset | 0.0000E+000 | Column Parameter −6 |
| Surf 1 | NSC Object 357 | Parameter 1: | Pickup From 3 | Scale | 1.0000E+000 | Offset | 0.0000E+000 | Column Parameter −6 |
| Surf 1 | NSC Object 357 | Parameter 2: | Pickup From 3 | Scale | 1.0000E+000 | Offset | 0.0000E+000 | Column Parameter −6 |
| Surf 1 | NSC Object 357 | Parameter 3: | Pickup From 3 | Scale | 1.0000E+000 | Offset | 0.0000E+000 | Column Parameter −6 |
| Surf 1 | NSC Object 357 | Parameter 5: | Pickup From 73 | Scale | 1.0000E+000 | Offset | 0.0000E+000 | Column Parameter −6 |
| Surf 1 | NSC Object 357 | Parameter 6: | Pickup From 3 | Scale | 1.0000E+000 | Offset | 0.0000E+000 | Column Parameter −6 |
| Surf 1 | NSC Object 357 | Parameter 7: | Pickup From 3 | Scale | 1.0000E+000 | Offset | 0.0000E+000 | Column Parameter −6 |
| Surf 1 | NSC Object 357 | Parameter 8: | Pickup From 3 | Scale | 1.0000E+000 | Offset | 0.0000E+000 | Column Parameter −6 |
| Surf 1 | NSC Object 358 | Position Y: | Pickup From 4 | Scale | 1.0000E+000 | Offset | 0.0000E+000 | Column Parameter −6 |
| Surf 1 | NSC Object 358 | Parameter 1: | Pickup From 3 | Scale | 1.0000E+000 | Offset | 0.0000E+000 | Column Parameter −6 |

TABLE 3-continued

ZEMAX Software Output Describing Surface Data Summary and Detail for Each
Individual Element within the Illumination Optical System illustrated in FIGS. 13-15

| | | | | | | | | | |
|---|---|---|---|---|---|---|---|---|---|
| Surf 1 | NSC Object 358 | Parameter 2: | Pickup From 3 | Scale | 1.0000E+000 | Offset | 0.0000E+000 | Column Parameter | −6 |
| Surf 1 | NSC Object 358 | Parameter 3: | Pickup From 3 | Scale | 1.0000E+000 | Offset | 0.0000E+000 | Column Parameter | −6 |
| Surf 1 | NSC Object 358 | Parameter 5: | Pickup From 73 | Scale | 1.0000E+000 | Offset | 0.0000E+000 | Column Parameter | −6 |
| Surf 1 | NSC Object 358 | Parameter 6: | Pickup From 3 | Scale | 1.0000E+000 | Offset | 0.0000E+000 | Column Parameter | −6 |
| Surf 1 | NSC Object 358 | Parameter 7: | Pickup From 3 | Scale | 1.0000E+000 | Offset | 0.0000E+000 | Column Parameter | −6 |
| Surf 1 | NSC Object 358 | Parameter 8: | Pickup From 3 | Scale | 1.0000E+000 | Offset | 0.0000E+000 | Column Parameter | −6 |
| Surf 1 | NSC Object 359 | Position Y: | Pickup From 4 | Scale | 1.0000E+000 | Offset | 0.0000E+000 | Column Parameter | −6 |
| Surf 1 | NSC Object 360 | Position Y: | Pickup From 4 | Scale | −1.0000E+000 | Offset | 0.0000E+000 | Column Parameter | −6 |
| Surf 1 | NSC Object 360 | Parameter 1: | Pickup From 3 | Scale | 1.0000E+000 | Offset | 0.0000E+000 | Column Parameter | −6 |
| Surf 1 | NSC Object 360 | Parameter 2: | Pickup From 3 | Scale | 1.0000E+000 | Offset | 0.0000E+000 | Column Parameter | −6 |
| Surf 1 | NSC Object 360 | Parameter 3: | Pickup From 3 | Scale | 1.0000E+000 | Offset | 0.0000E+000 | Column Parameter | −6 |
| Surf 1 | NSC Object 360 | Parameter 5: | Pickup From 73 | Scale | 1.0000E+000 | Offset | 0.0000E+000 | Column Parameter | −6 |
| Surf 1 | NSC Object 360 | Parameter 6: | Pickup From 3 | Scale | 1.0000E+000 | Offset | 0.0000E+000 | Column Parameter | −6 |
| Surf 1 | NSC Object 360 | Parameter 7: | Pickup From 3 | Scale | 1.0000E+000 | Offset | 0.0000E+000 | Column Parameter | −6 |
| Surf 1 | NSC Object 360 | Parameter 8: | Pickup From 3 | Scale | 1.0000E+000 | Offset | 0.0000E+000 | Column Parameter | −6 |
| Surf 1 | NSC Object 361 | Position Y: | Pickup From 4 | Scale | −1.0000E+000 | Offset | 0.0000E+000 | Column Parameter | −6 |
| Surf 1 | NSC Object 361 | Parameter 1: | Pickup From 3 | Scale | 1.0000E+000 | Offset | 0.0000E+000 | Column Parameter | −6 |
| Surf 1 | NSC Object 361 | Parameter 2: | Pickup From 3 | Scale | 1.0000E+000 | Offset | 0.0000E+000 | Column Parameter | −6 |
| Surf 1 | NSC Object 361 | Parameter 3: | Pickup From 3 | Scale | 1.0000E+000 | Offset | 0.0000E+000 | Column Parameter | −6 |
| Surf 1 | NSC Object 361 | Parameter 5: | Pickup From 73 | Scale | 1.0000E+000 | Offset | 0.0000E+000 | Column Parameter | −6 |
| Surf 1 | NSC Object 361 | Parameter 6: | Pickup From 3 | Scale | 1.0000E+000 | Offset | 0.0000E+000 | Column Parameter | −6 |
| Surf 1 | NSC Object 361 | Parameter 7: | Pickup From 3 | Scale | 1.0000E+000 | Offset | 0.0000E+000 | Column Parameter | −6 |
| Surf 1 | NSC Object 361 | Parameter 8: | Pickup From 3 | Scale | 1.0000E+000 | Offset | 0.0000E+000 | Column Parameter | −6 |
| Surf 1 | NSC Object 362 | Position Y: | Pickup From 4 | Scale | −1.0000E+000 | Offset | 0.0000E+000 | Column Parameter | −6 |
| Surf 1 | NSC Object 362 | Parameter 1: | Pickup From 3 | Scale | 1.0000E+000 | Offset | 0.0000E+000 | Column Parameter | −6 |
| Surf 1 | NSC Object 362 | Parameter 2: | Pickup From 3 | Scale | 1.0000E+000 | Offset | 0.0000E+000 | Column Parameter | −6 |
| Surf 1 | NSC Object 362 | Parameter 3: | Pickup From 3 | Scale | 1.0000E+000 | Offset | 0.0000E+000 | Column Parameter | −6 |
| Surf 1 | NSC Object 362 | Parameter 5: | Pickup From 73 | Scale | 1.0000E+000 | Offset | 0.0000E+000 | Column Parameter | −6 |
| Surf 1 | NSC Object 362 | Parameter 6: | Pickup From 3 | Scale | 1.0000E+000 | Offset | 0.0000E+000 | Column Parameter | −6 |
| Surf 1 | NSC Object 362 | Parameter 7: | Pickup From 3 | Scale | 1.0000E+000 | Offset | 0.0000E+000 | Column Parameter | −6 |
| Surf 1 | NSC Object 362 | Parameter 8: | Pickup From 3 | Scale | 1.0000E+000 | Offset | 0.0000E+000 | Column Parameter | −6 |
| Surf 1 | NSC Object 363 | Position Y: | Pickup From 4 | Scale | −1.0000E+000 | Offset | 0.0000E+000 | Column Parameter | −6 |
| Surf 1 | NSC Object 365 | Position X: | Pickup From 2 | Scale | −8.0000E+000 | Offset | 0.0000E+000 | Column Parameter | −6 |
| Surf 1 | NSC Object 365 | Parameter 1: | Pickup From 3 | Scale | 1.0000E+000 | Offset | 0.0000E+000 | Column Parameter | −6 |
| Surf 1 | NSC Object 365 | Parameter 2: | Pickup From 3 | Scale | 1.0000E+000 | Offset | 0.0000E+000 | Column Parameter | −6 |
| Surf 1 | NSC Object 365 | Parameter 3: | Pickup From 3 | Scale | 1.0000E+000 | Offset | 0.0000E+000 | Column Parameter | −6 |
| Surf 1 | NSC Object 365 | Parameter 6: | Pickup From 3 | Scale | 1.0000E+000 | Offset | 0.0000E+000 | Column Parameter | −6 |
| Surf 1 | NSC Object 365 | Parameter 7: | Pickup From 3 | Scale | 1.0000E+000 | Offset | 0.0000E+000 | Column Parameter | −6 |
| Surf 1 | NSC Object 365 | Parameter 8: | Pickup From 3 | Scale | 1.0000E+000 | Offset | 0.0000E+000 | Column Parameter | −6 |
| Surf 1 | NSC Object 366 | Position Y: | Pickup From 4 | Scale | 1.0000E+000 | Offset | 0.0000E+000 | Column Parameter | −6 |
| Surf 1 | NSC Object 366 | Parameter 1: | Pickup From 3 | Scale | 1.0000E+000 | Offset | 0.0000E+000 | Column Parameter | −6 |
| Surf 1 | NSC Object 366 | Parameter 2: | Pickup From 3 | Scale | 1.0000E+000 | Offset | 0.0000E+000 | Column Parameter | −6 |
| Surf 1 | NSC Object 366 | Parameter 3: | Pickup From 3 | Scale | 1.0000E+000 | Offset | 0.0000E+000 | Column Parameter | −6 |
| Surf 1 | NSC Object 366 | Parameter 5: | Pickup From 83 | Scale | 1.0000E+000 | Offset | 0.0000E+000 | Column Parameter | −6 |
| Surf 1 | NSC Object 366 | Parameter 6: | Pickup From 3 | Scale | 1.0000E+000 | Offset | 0.0000E+000 | Column Parameter | −6 |
| Surf 1 | NSC Object 366 | Parameter 7: | Pickup From 3 | Scale | 1.0000E+000 | Offset | 0.0000E+000 | Column Parameter | −6 |
| Surf 1 | NSC Object 366 | Parameter 8: | Pickup From 3 | Scale | 1.0000E+000 | Offset | 0.0000E+000 | Column Parameter | −6 |
| Surf 1 | NSC Object 367 | Position Y: | Pickup From 4 | Scale | 1.0000E+000 | Offset | 0.0000E+000 | Column Parameter | −6 |
| Surf 1 | NSC Object 367 | Parameter 1: | Pickup From 3 | Scale | 1.0000E+000 | Offset | 0.0000E+000 | Column Parameter | −6 |
| Surf 1 | NSC Object 367 | Parameter 2: | Pickup From 3 | Scale | 1.0000E+000 | Offset | 0.0000E+000 | Column Parameter | −6 |
| Surf 1 | NSC Object 367 | Parameter 3: | Pickup From 3 | Scale | 1.0000E+000 | Offset | 0.0000E+000 | Column Parameter | −6 |
| Surf 1 | NSC Object 367 | Parameter 5: | Pickup From 83 | Scale | 1.0000E+000 | Offset | 0.0000E+000 | Column Parameter | −6 |
| Surf 1 | NSC Object 367 | Parameter 6: | Pickup From 3 | Scale | 1.0000E+000 | Offset | 0.0000E+000 | Column Parameter | −6 |
| Surf 1 | NSC Object 367 | Parameter 7: | Pickup From 3 | Scale | 1.0000E+000 | Offset | 0.0000E+000 | Column Parameter | −6 |
| Surf 1 | NSC Object 367 | Parameter 8: | Pickup From 3 | Scale | 1.0000E+000 | Offset | 0.0000E+000 | Column Parameter | −6 |
| Surf 1 | NSC Object 368 | Position Y: | Pickup From 4 | Scale | 1.0000E+000 | Offset | 0.0000E+000 | Column Parameter | −6 |
| Surf 1 | NSC Object 369 | Position Y: | Pickup From 4 | Scale | 1.0000E+000 | Offset | 0.0000E+000 | Column Parameter | −6 |
| Surf 1 | NSC Object 370 | Position Y: | Pickup From 4 | Scale | −1.0000E+000 | Offset | 0.0000E+000 | Column Parameter | −6 |
| Surf 1 | NSC Object 370 | Parameter 1: | Pickup From 3 | Scale | 1.0000E+000 | Offset | 0.0000E+000 | Column Parameter | −6 |
| Surf 1 | NSC Object 370 | Parameter 2: | Pickup From 3 | Scale | 1.0000E+000 | Offset | 0.0000E+000 | Column Parameter | −6 |
| Surf 1 | NSC Object 370 | Parameter 3: | Pickup From 3 | Scale | 1.0000E+000 | Offset | 0.0000E+000 | Column Parameter | −6 |
| Surf 1 | NSC Object 370 | Parameter 5: | Pickup From 83 | Scale | 1.0000E+000 | Offset | 0.0000E+000 | Column Parameter | −6 |
| Surf 1 | NSC Object 370 | Parameter 6: | Pickup From 3 | Scale | 1.0000E+000 | Offset | 0.0000E+000 | Column Parameter | −6 |
| Surf 1 | NSC Object 370 | Parameter 7: | Pickup From 3 | Scale | 1.0000E+000 | Offset | 0.0000E+000 | Column Parameter | −6 |
| Surf 1 | NSC Object 370 | Parameter 8: | Pickup From 3 | Scale | 1.0000E+000 | Offset | 0.0000E+000 | Column Parameter | −6 |
| Surf 1 | NSC Object 371 | Position Y: | Pickup From 4 | Scale | −1.0000E+000 | Offset | 0.0000E+000 | Column Parameter | −6 |
| Surf 1 | NSC Object 371 | Parameter 1: | Pickup From 3 | Scale | 1.0000E+000 | Offset | 0.0000E+000 | Column Parameter | −6 |
| Surf 1 | NSC Object 371 | Parameter 2: | Pickup From 3 | Scale | 1.0000E+000 | Offset | 0.0000E+000 | Column Parameter | −6 |
| Surf 1 | NSC Object 371 | Parameter 3: | Pickup From 3 | Scale | 1.0000E+000 | Offset | 0.0000E+000 | Column Parameter | −6 |
| Surf 1 | NSC Object 371 | Parameter 5: | Pickup From 83 | Scale | 1.0000E+000 | Offset | 0.0000E+000 | Column Parameter | −6 |
| Surf 1 | NSC Object 371 | Parameter 6: | Pickup From 3 | Scale | 1.0000E+000 | Offset | 0.0000E+000 | Column Parameter | −6 |
| Surf 1 | NSC Object 371 | Parameter 7: | Pickup From 3 | Scale | 1.0000E+000 | Offset | 0.0000E+000 | Column Parameter | −6 |
| Surf 1 | NSC Object 371 | Parameter 8: | Pickup From 3 | Scale | 1.0000E+000 | Offset | 0.0000E+000 | Column Parameter | −6 |
| Surf 1 | NSC Object 372 | Position Y: | Pickup From 4 | Scale | −1.0000E+000 | Offset | 0.0000E+000 | Column Parameter | −6 |
| Surf 1 | NSC Object 373 | Position Y: | Pickup From 4 | Scale | −1.0000E+000 | Offset | 0.0000E+000 | Column Parameter | −6 |
| Surf 1 | NSC Object 375 | Parameter 1: | Pickup From 93 | Scale | 1.0000E+000 | Offset | 0.0000E+000 | Column Parameter | −6 |

TABLE 3-continued

ZEMAX Software Output Describing Surface Data Summary and Detail for Each
Individual Element within the Illumination Optical System illustrated in FIGS. 13-15

| Surf 1 | NSC Object 375 | Parameter 2: | Pickup From 93 | Scale | 1.0000E+000 | Offset | 0.0000E+000 | Column Parameter −6 |
|---|---|---|---|---|---|---|---|---|
| Surf 1 | NSC Object 375 | Parameter 3: | Pickup From 93 | Scale | 1.0000E+000 | Offset | 0.0000E+000 | Column Parameter −6 |
| Surf 1 | NSC Object 375 | Parameter 4: | Pickup From 93 | Scale | 1.0000E+000 | Offset | 0.0000E+000 | Column Parameter −6 |
| Surf 1 | NSC Object 375 | Parameter 5: | Pickup From 93 | Scale | 1.0000E+000 | Offset | 0.0000E+000 | Column Parameter −6 |
| Surf 1 | NSC Object 375 | Parameter 6: | Pickup From 93 | Scale | 1.0000E+000 | Offset | 0.0000E+000 | Column Parameter −6 |
| Surf 1 | NSC Object 375 | Parameter 7: | Pickup From 93 | Scale | 1.0000E+000 | Offset | 0.0000E+000 | Column Parameter −6 |
| Surf 1 | NSC Object 375 | Parameter 8: | Pickup From 93 | Scale | 1.0000E+000 | Offset | 0.0000E+000 | Column Parameter −6 |
| Surf 1 | NSC Object 375 | Parameter 9: | Pickup From 93 | Scale | 1.0000E+000 | Offset | 0.0000E+000 | Column Parameter −6 |
| Surf 1 | NSC Object 377 | Parameter 2: | Pickup From 377 | Scale | 1.0000E+000 | Offset | 0.0000E+000 | Column Parameter 1 |
| Surf 1 | NSC Object 377 | Parameter 4: | Pickup From 377 | Scale | 1.0000E+000 | Offset | 0.0000E+000 | Column Parameter 1 |
| Surf 1 | NSC Object 377 | Parameter 5: | Pickup From 377 | Scale | 1.0000E+000 | Offset | 0.0000E+000 | Column Parameter 1 |
| Surf 1 | NSC Object 378 | Position Y: | Pickup From 377 | Scale | −1.0000E+000 | Offset | 0.0000E+000 | Column Parameter −6 |
| Surf 1 | NSC Object 378 | Position Z: | Pickup From 377 | Scale | 1.0000E+000 | Offset | 0.0000E+000 | Column Parameter −6 |
| Surf 1 | NSC Object 378 | Tilt About X: | Pickup From 377 | Scale | −1.0000E+000 | Offset | 0.0000E+000 | Column Parameter −6 |
| Surf 1 | NSC Object 378 | Parameter 1: | Pickup From 377 | Scale | 1.0000E+000 | Offset | 0.0000E+000 | Column Parameter −6 |
| Surf 1 | NSC Object 378 | Parameter 2: | Pickup From 377 | Scale | 1.0000E+000 | Offset | 0.0000E+000 | Column Parameter −6 |
| Surf 1 | NSC Object 378 | Parameter 3: | Pickup From 377 | Scale | 1.0000E+000 | Offset | 0.0000E+000 | Column Parameter −6 |
| Surf 1 | NSC Object 378 | Parameter 4: | Pickup From 377 | Scale | 1.0000E+000 | Offset | 0.0000E+000 | Column Parameter −6 |
| Surf 1 | NSC Object 378 | Parameter 5: | Pickup From 377 | Scale | 1.0000E+000 | Offset | 0.0000E+000 | Column Parameter −6 |

Semi Diameter 2: Fixed

Figure 17:
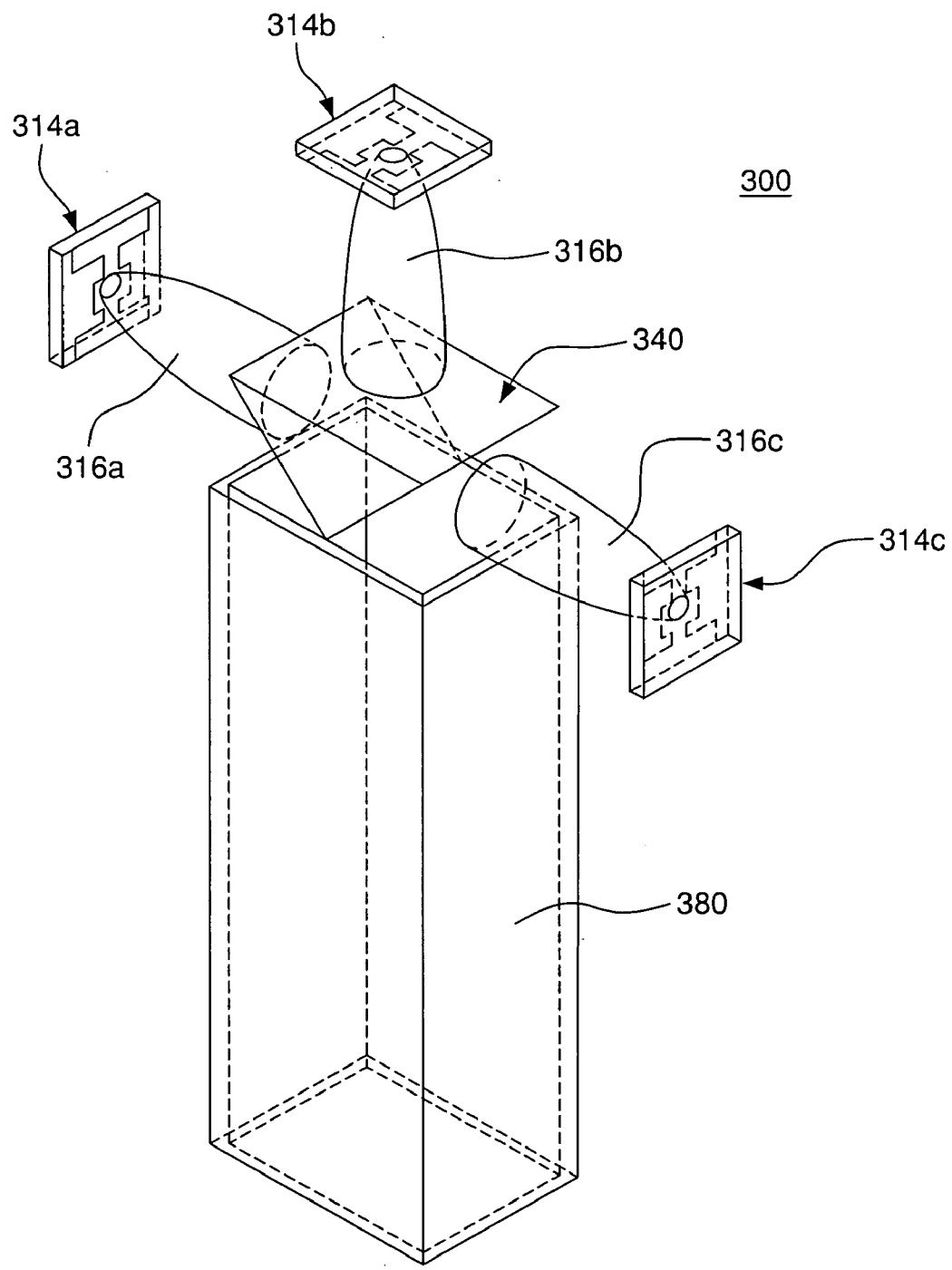
FIG. 17 is an isometric view illustrating a portion of another digital light projection system including a prismatic 3-channel LED array configuration, in accordance with a preferred embodiment of the present invention.
Figure 18:
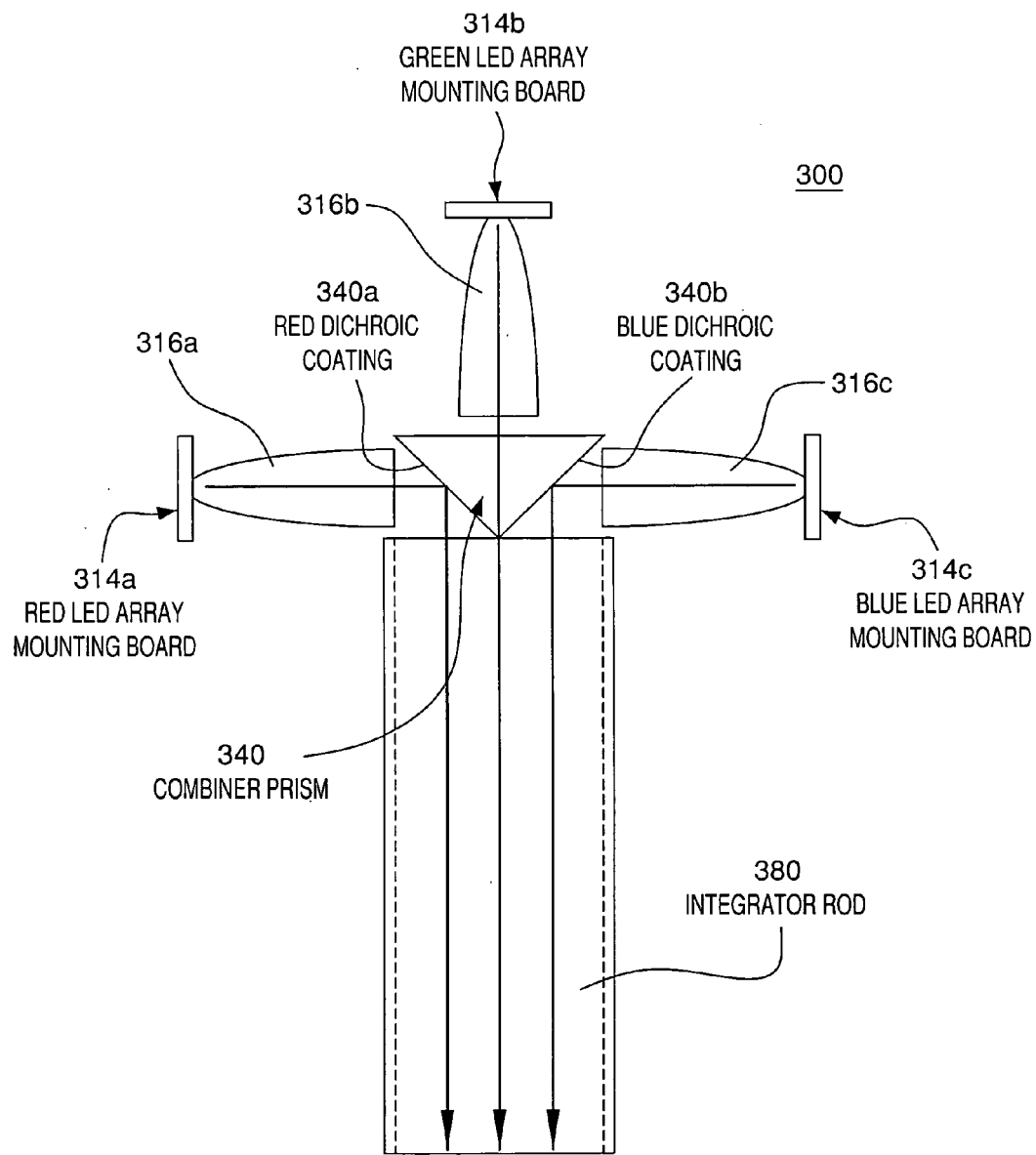
FIG. 18 is a side view of the portion of the digital light projection system shown in FIG. 17.

FIG. 17 is an isometric view illustrating a portion 300 of another digital light projection system including a prismatic 3-channel LED array configuration, in accordance with a preferred embodiment of the present invention. FIG. 18 is a side view of the portion 300 of the digital light projection system shown in FIG. 17. Combiner element 340 is a prism having dichroic coatings 340a,340b thereon. LED array mounting board 314a-c correspond with concentrator elements 316a-c, respectively. Functioning of the dichroic plates in this embodiment are similar to that of the dichroic plates in the FIG. 13 embodiment above.

As shown in FIGS. 17 and 18, the combiner element is in the form of a prism wherein the first dichroic element/coating 340a spatially combines the substantially uniform light provided at the output surface of each of a first and a second of the concentrator elements (i.e. 316a,316b), and wherein the second dichroic element/coating 340b spatially combines the substantially uniform light provided at the output surface of each of the second and a third of the concentrator elements (i.e. 316b,316c). The first dichroic element 340a reflects the substantially uniform light provided at the output surface of the first concentrator element 316a, and wherein the first dichroic element 340a transmits the substantially uniform light provided at the output surface of the second concentrator element 316b. The second dichroic element 340b reflects the substantially uniform light provided at the output surface of the third concentrator element 316c, and wherein the second dichroic element 340b transmits the substantially uniform light provided at the output surface of the second concentrator element 316b.

The first concentrator element 316a and the third concentrator element 316c are oriented in substantially opposite directions from each other such that the output surfaces of the first concentrator element and the third concentrator element are optically aligned with opposite sides of the combiner element, wherein the output surface of the second concentrator element 316b is optically aligned with an intermediary side of the combiner element 340, and wherein the intermediary side of the combiner element joins the opposite sides of the combiner element.

The plurality of LED arrays preferably consists of 3 LED arrays, wherein the 3 LED arrays consist of 3 single-color LED arrays, and wherein each of the 3 single-color LED arrays is of a different color from one another. The 3 single-color LED arrays more preferably consist of an LED array consisting of only red LEDs, an LED array consisting of only green LEDs, and an LED array consisting of only blue LEDs.

Figure 19:
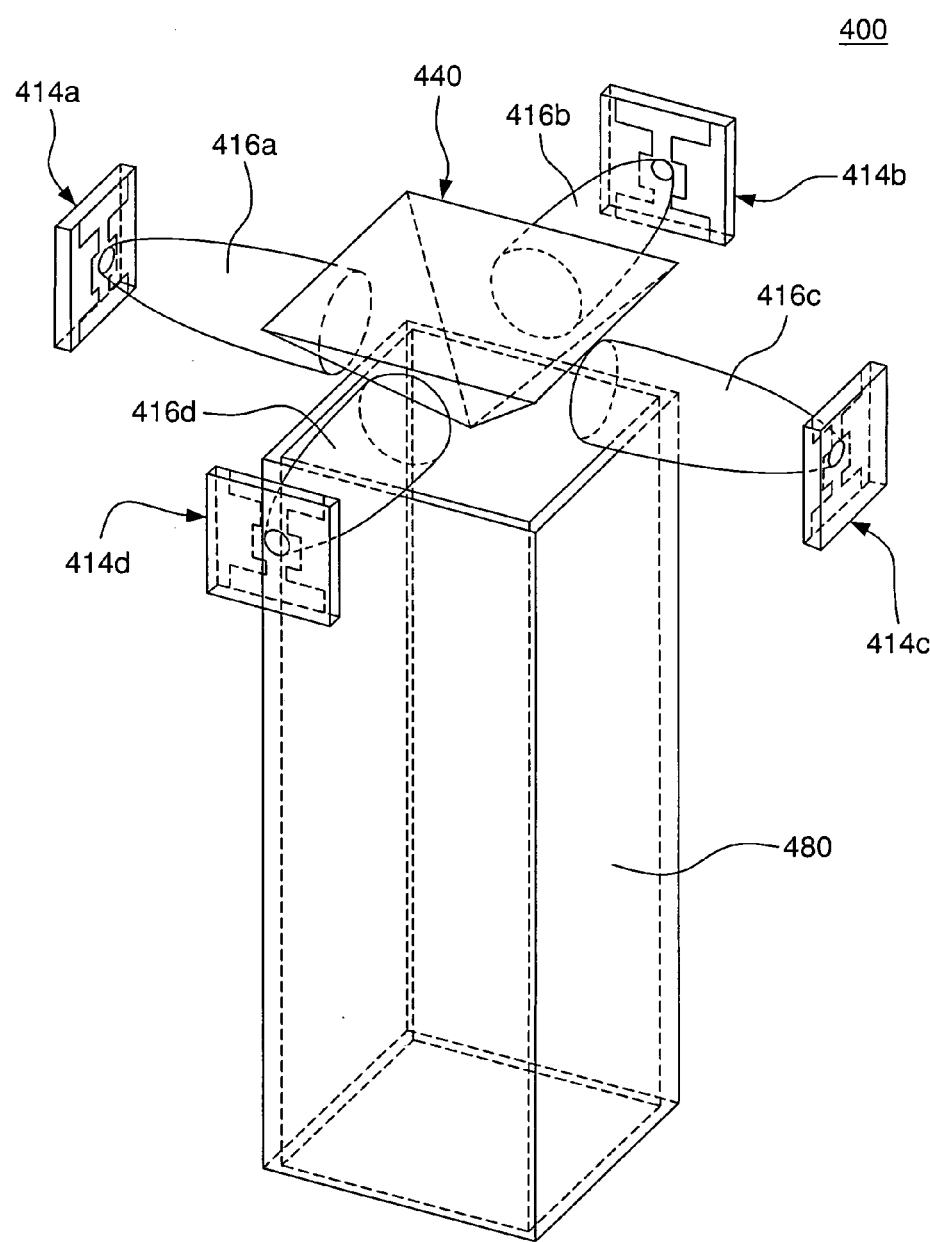
FIG. 19 is an isometric view illustrating a portion of another digital light projection system including a pyramidal 4-channel LED array configuration, in accordance with a preferred embodiment of the present invention.
Figure 20:
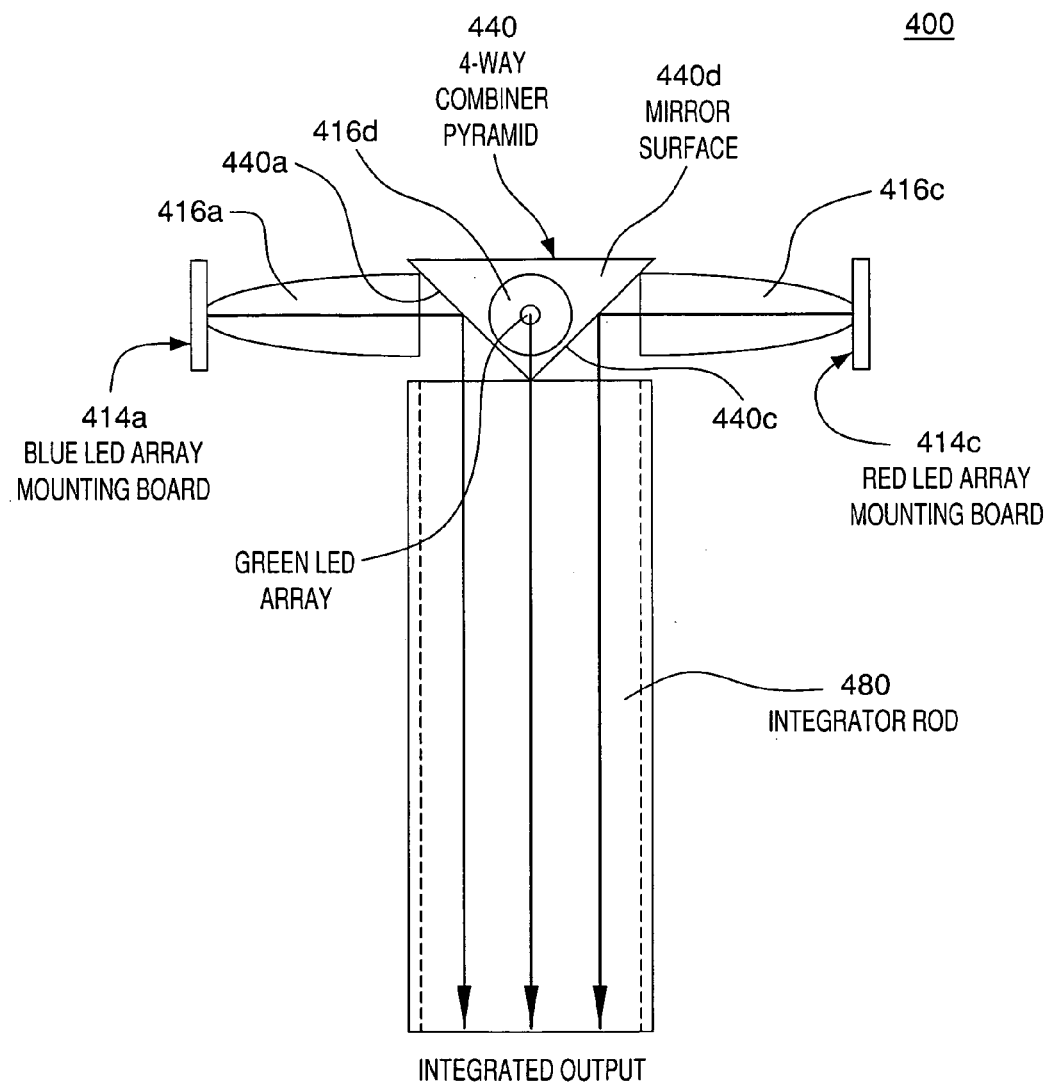
FIG. 20 is a side view of the portion of the digital light projection system shown in FIG. 19.

FIG. 19 is an isometric view illustrating a portion 400 of another digital light projection system including a pyramidal 4-channel LED array configuration, in accordance with a preferred embodiment of the present invention. FIG. 20 is a side view of the portion 400 of the digital light projection system shown in FIG. 19. In this embodiment, light output from the concentrator elements 416a-d is specularly reflected by four sides of the combiner element 440 via mirror surfaces (three of which are labeled in FIG. 20 as 440a,c,d). Although this embodiment is described using four combiner element sides/channels, any number of combiner element sides/channels may be contemplated.

Figure 21:
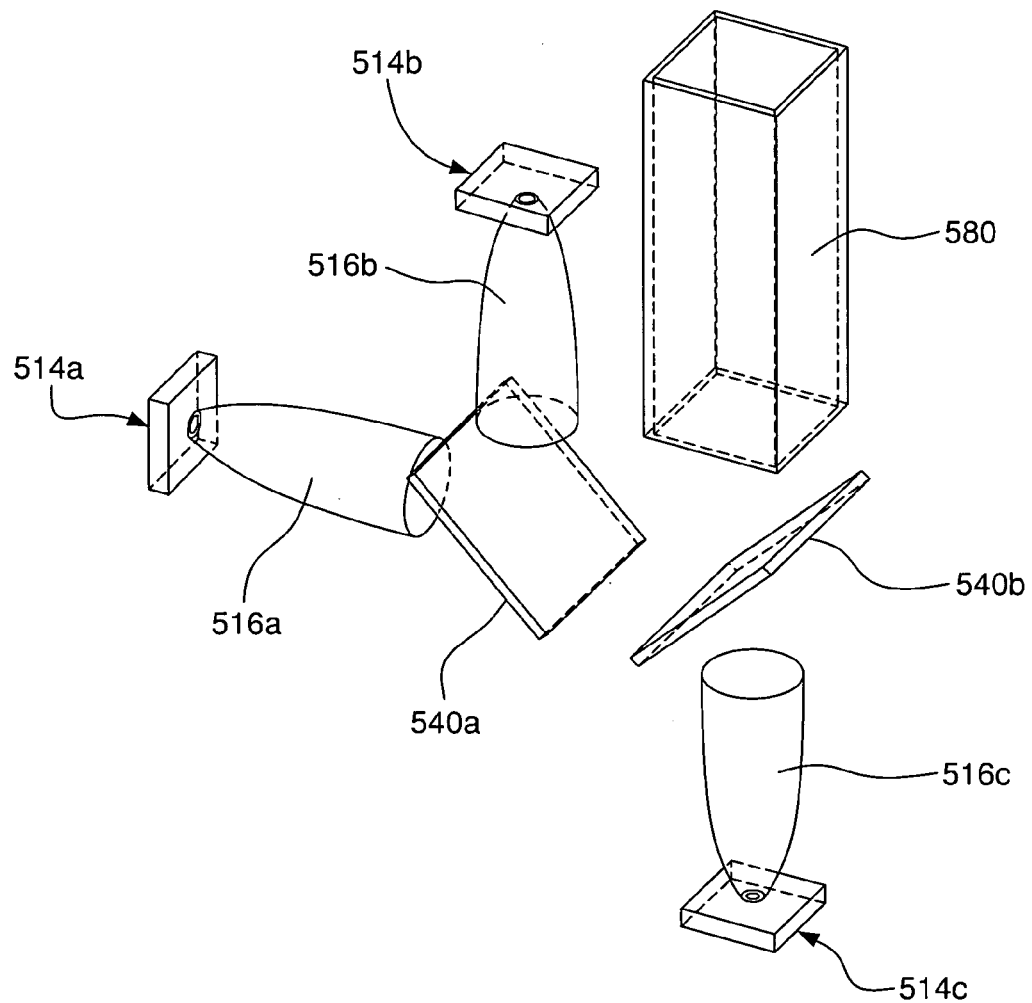
FIG. 21 is an isometric view illustrating a portion of another digital light projection system including a 3-channel LED array configuration, in accordance with a preferred embodiment of the present invention.
Figure 22:
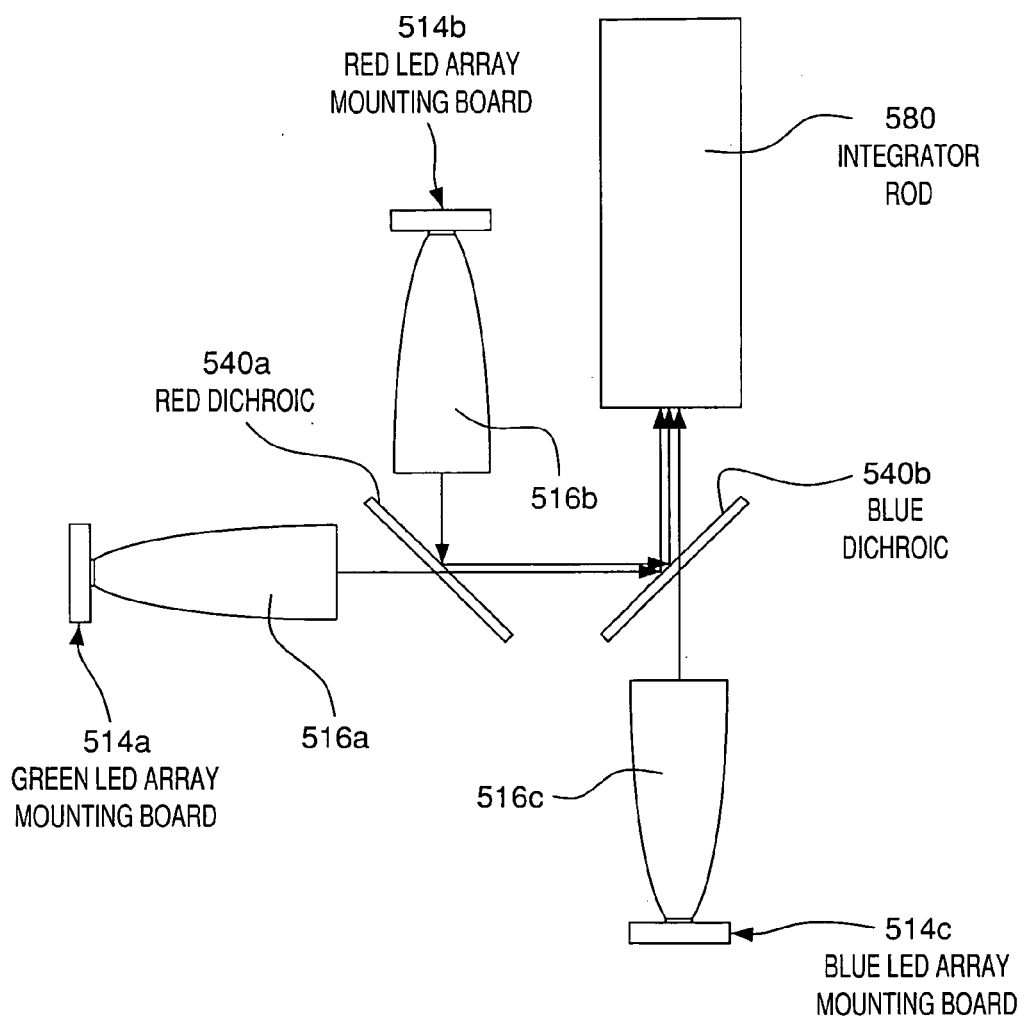
FIG. 22 is a side view of the portion of the digital light projection system shown in FIG. 21.

FIG. 21 is an isometric view illustrating a portion 500 of another digital light projection system including a 3-channel LED array configuration, in accordance with a preferred embodiment of the present invention. FIG. 22 is a side view of the portion 500 of the digital light projection system shown in FIG. 21. A first dichroic element 540a combines light from concentrator elements 516a,516b, while a second dichroic element 540b combines light output from the first dichroic element 540a and concentrator element 516c.

Figure 23:
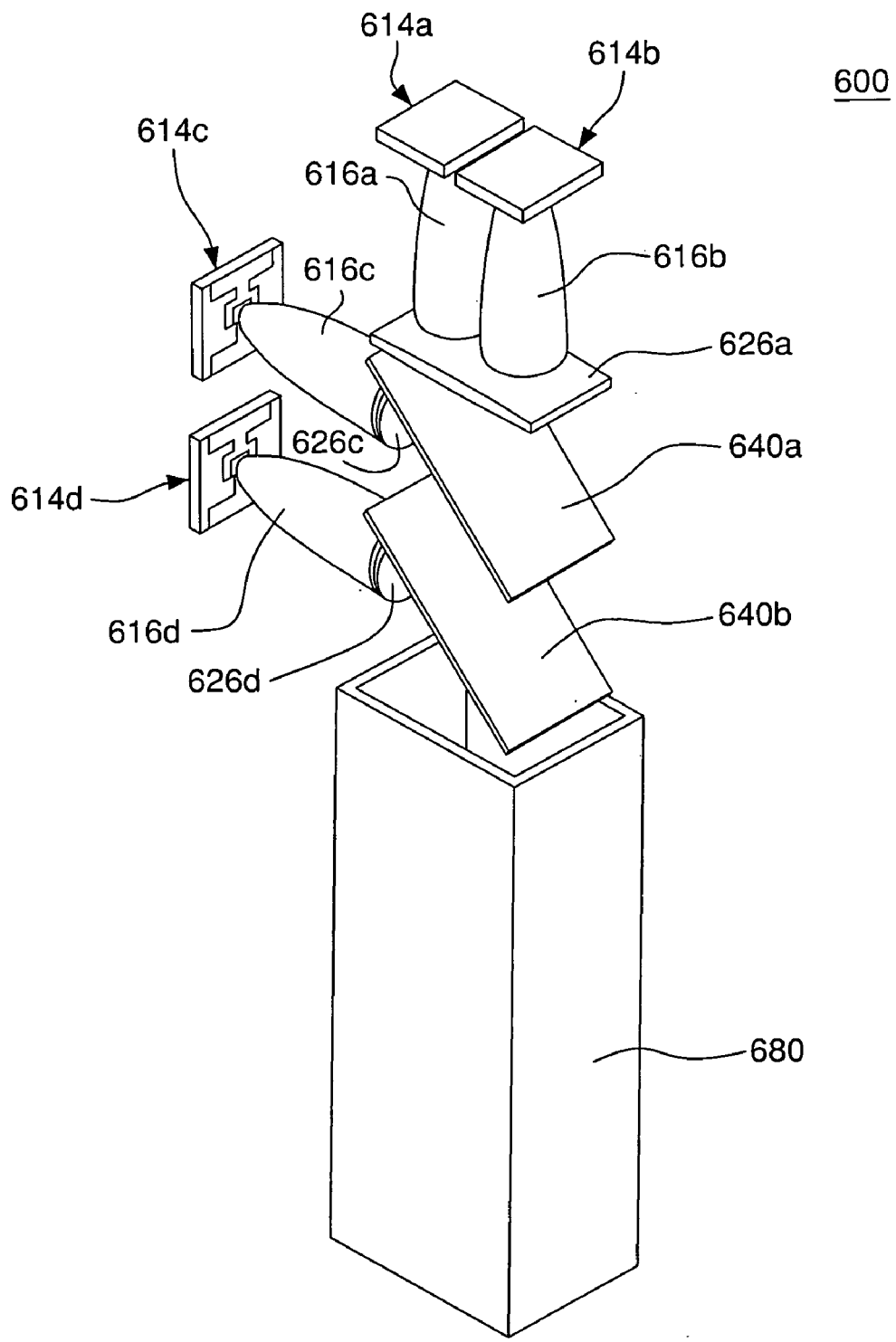
FIG. 23 is an isometric view illustrating a portion of another digital light projection system including a 4-channel LED array configuration, in accordance with a preferred embodiment of the present invention.
Figure 24:
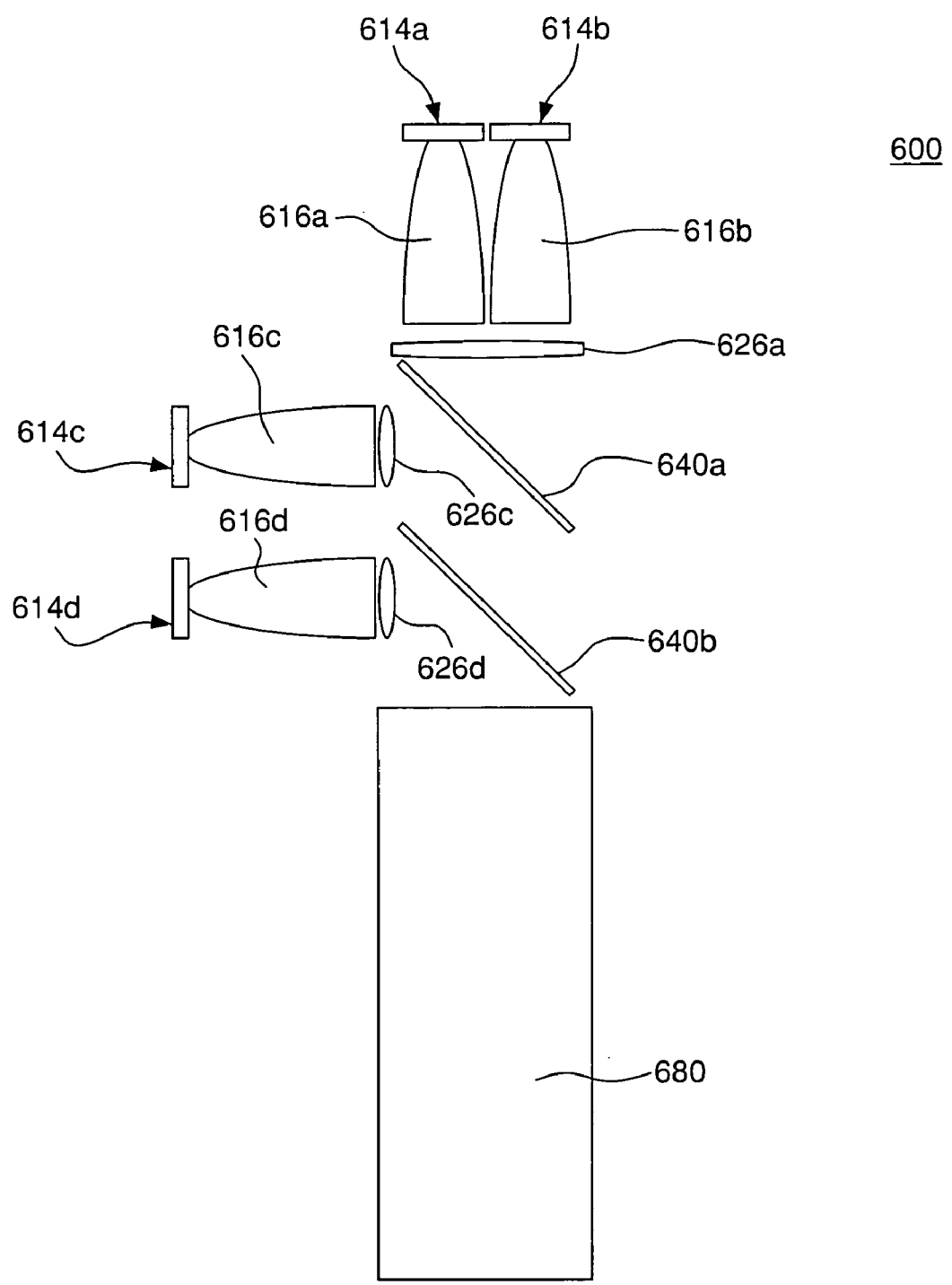
FIG. 24 is a side view of the portion of the digital light projection system shown in FIG. 23.

FIG. 23 is an isometric view illustrating a portion 600 of another digital light projection system including a 4-channel LED array configuration, in accordance with a preferred embodiment of the present invention. FIG. 24 is a side view of the portion 600 of the digital light projection system shown in FIG. 23. A first dichroic element 640a combines light from adjacent concentrator elements 616a,616b and concentrator element 616c, while a second dichroic element 640b combines light output from the first dichroic element 640a and concentrator element 616d.

Figure 25:
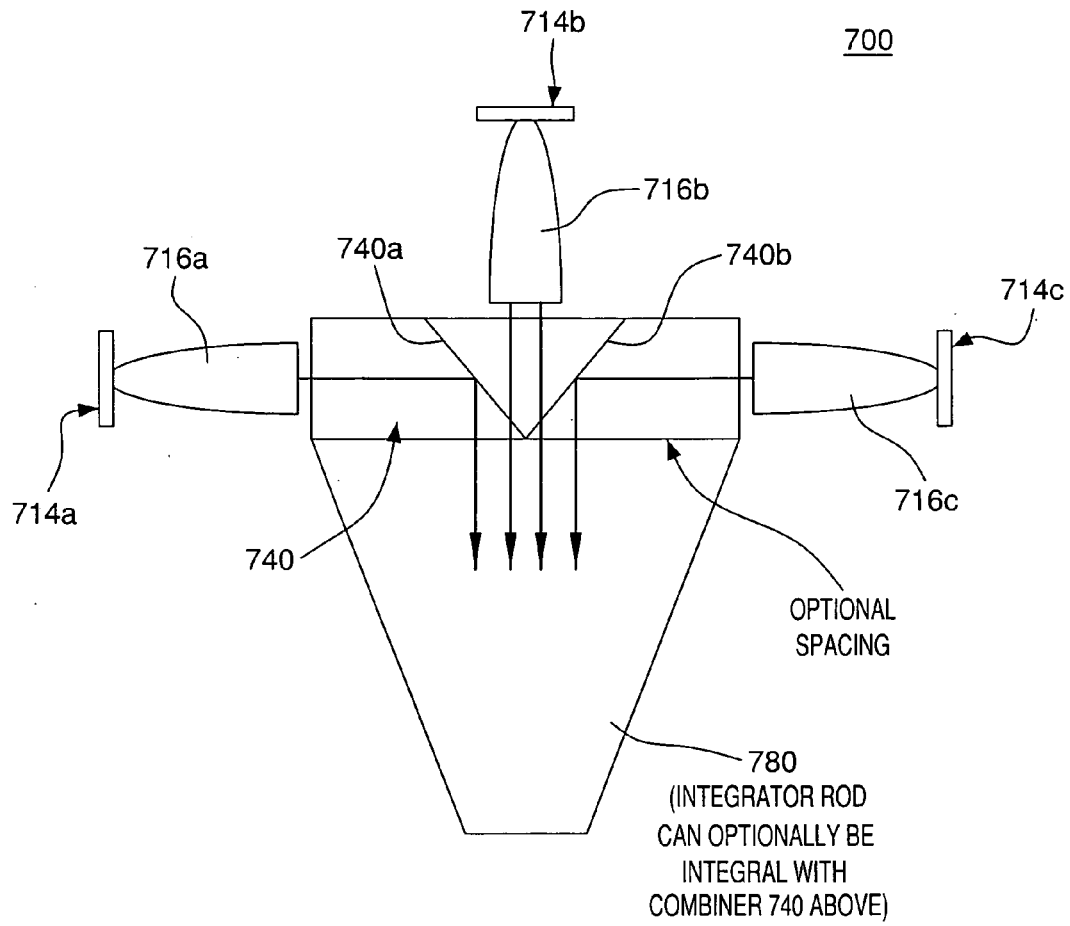
FIG. 25 is a side view illustrating a portion of another digital light projection system including a 3-channel LED array configuration, in accordance with a preferred embodiment of the present invention.

FIG. 25 is a side view illustrating a portion 700 of another digital light projection system including a 3-channel LED array configuration, in accordance with a preferred embodiment of the present invention. The combiner element 740 is in solid form and includes dichroic coatings 740a,740b. Integrator element 780 may be formed integrally with the combiner element 740, or formed separately. If formed separately, the integrator element 780 may be spaced from the combiner element 740, with at least one optional imaging lens therebetween.

Figure 26:
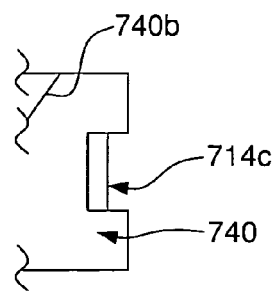
FIG. 26 is a partial side view of the portion of the digital light projection system shown in FIG. 25 with the LED array mounting board 714c embedded directly within the optical combiner element 740, i.e. without utilizing optical concentrator element 716c.

FIG. 26 is a partial side view of the portion 700 of the digital light projection system shown in FIG. 25 with the LED array mounting board 714c embedded directly within the combiner element 740, i.e. without utilizing optical concentrator element 716c.

Figure 27:
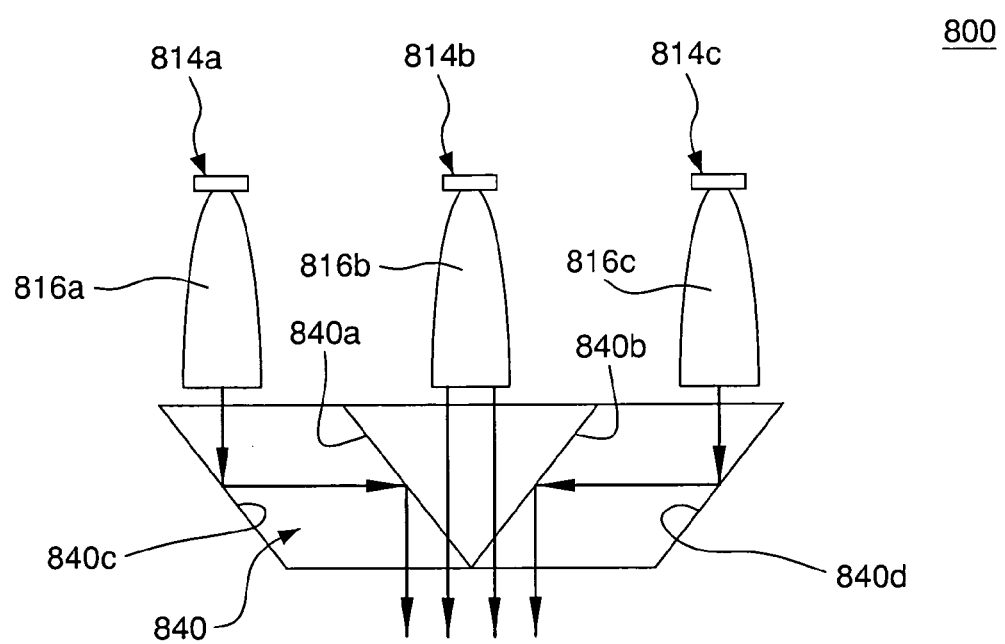
FIG. 27 is a side view illustrating a portion of another digital light projection system including a linear 3-channel LED array configuration, in accordance with a preferred embodiment of the present invention.

In another embodiment, the output surfaces of the first, second, third, and fourth concentrator elements may be optically aligned with a common side of the combiner element, wherein the combiner element further comprises a first reflector and a second reflector, wherein the first reflector is provided in the optical path between the output surface of the first concentrator element and the first dichroic element, and wherein the second reflector is provided in the optical path between the output surface of the fourth concentrator element and the second dichroic element. FIG. 27 illustrates a similar configuration wherein a single concentrator element 816b replaces the second and third concentrator elements.

FIG. 27 is a side view illustrating a portion 800 of another digital light projection system including a linear 3-channel LED array configuration, in accordance with a preferred embodiment of the present invention. The output surfaces of the first, second, and third concentrator elements 816a-c are optically aligned with a common side of the combiner element 840, wherein the combiner element comprises a first reflector 840c and a second reflector 840d, wherein the first reflector 840c is provided in the optical path between the output surface of the first concentrator element 816a and the first dichroic element 840a, and wherein the second reflector 840d is provided in the optical path between the output surface of the third concentrator element 816c and the second dichroic element 840b.

The field lens(es) at the output of the concentrator elements in the above embodiments may be provided to focus the output of the concentrators into the input of the integrator element. And, the imaging lens(es) at the input of the integrator element spreads and combines the light for entry into the integrator element. The integrator element preferably transforms a circular input light beam into a homogenized rectangular output beam which preferably slightly overfills the geometry of the imaging device.

An anti-reflective coating is preferably also utilized in conjunction with the dichroic coatings in any of the above embodiments.

Figure 28:
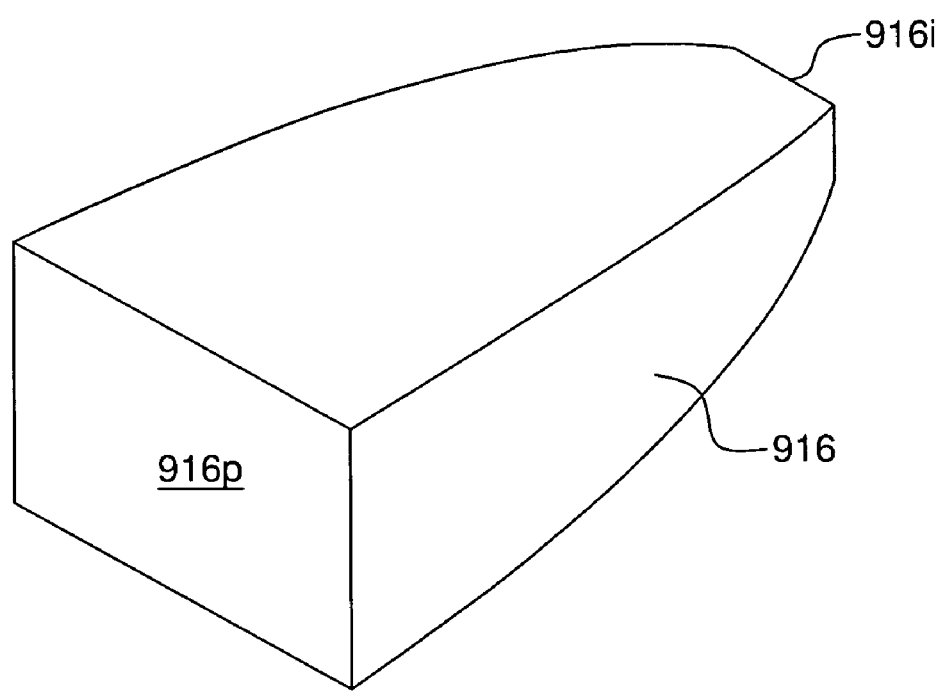
FIG. 28 is an enlarged, isometric view of a portion of another digital light projection system, including an optical concentrator element having a rectangular input surface and a rectangular output surface, in accordance with a preferred embodiment of the present invention.

In another alternative embodiment, the concentrator element 916 may alternatively have a rectangular input surface 916i and a rectangular output surface 916p as illustrated in FIG. 28. This parabolic concentrator element with rectangular input and output to thereby achieve better pupil matching. The rectangular input surface may preferably then be designed with an aspect ratio that matches that of the imager. This configuration provides better far-field uniformity as more uniform and evenly spread intermediate images are formed when viewing at a distance which ultimately helps reduce hot spots. Since the surface profile is governed by the same mathematical equation as round concentrator elements, no loss in efficiency is realized.

Figure 29:
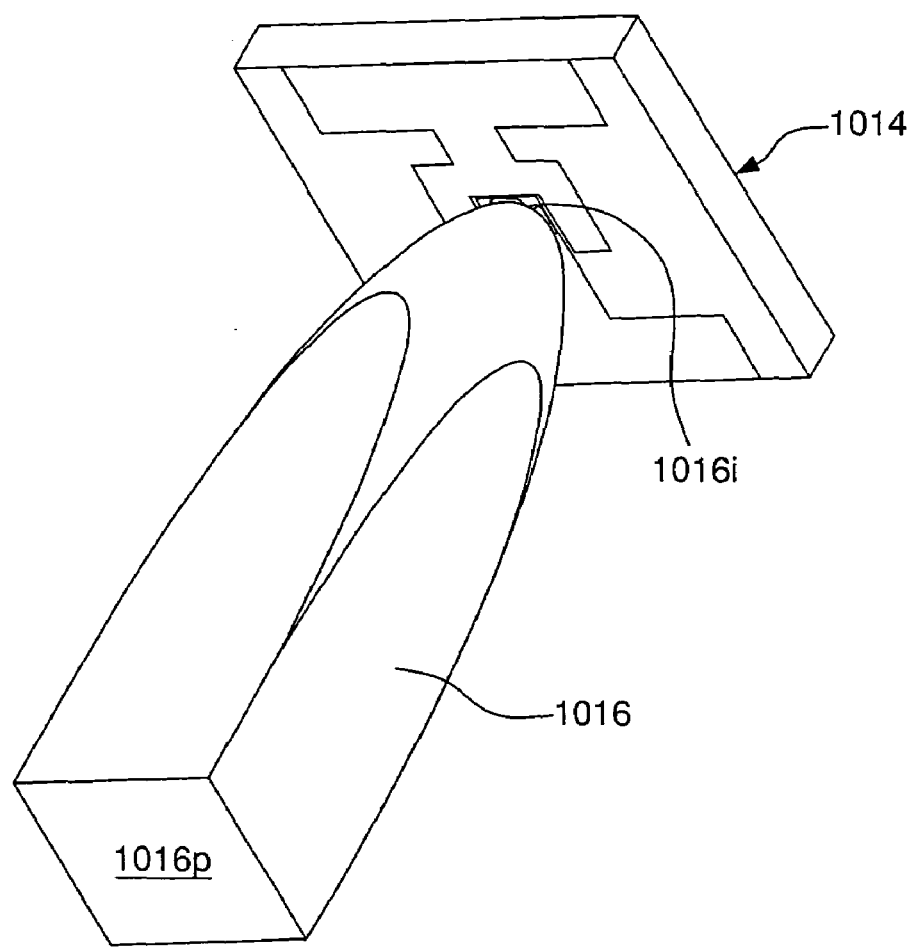
FIG. 29 is an enlarged, isometric view of a portion of another digital light projection system, including an LED array and corresponding LED array mounting board, and an optical concentrator element having a circular input surface and a rectangular output surface, in accordance with a preferred embodiment of the present invention.
Figure 30:
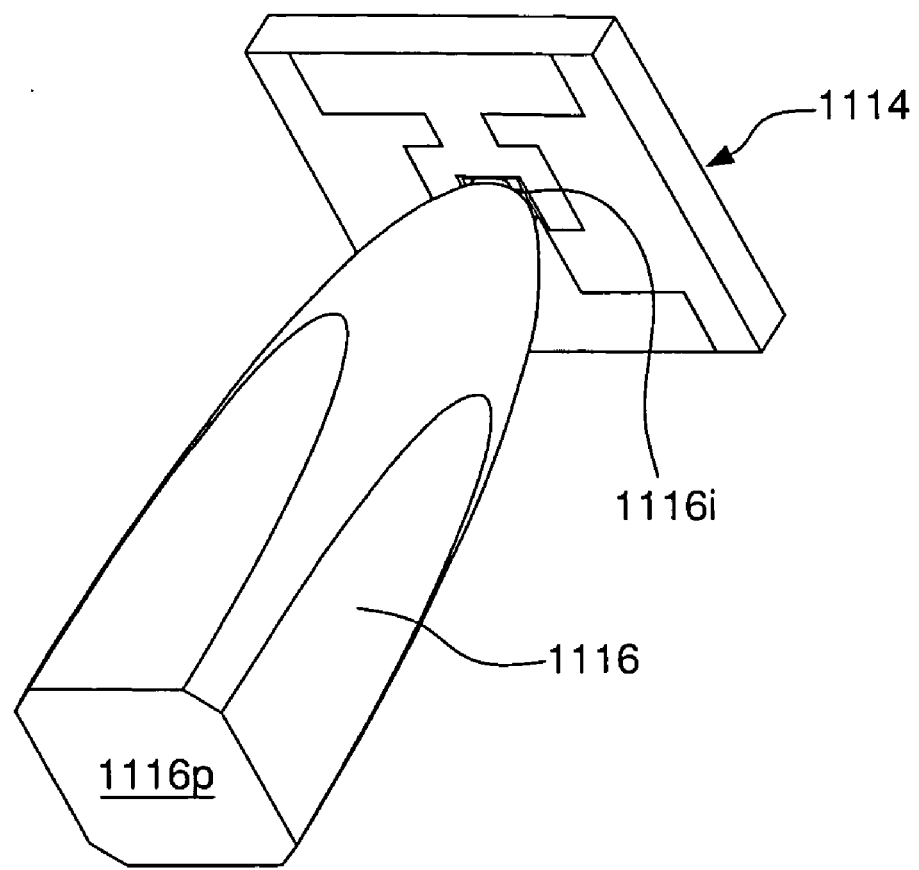
FIG. 30 is an enlarged, isometric view of a portion of another digital light projection system, including an LED array and corresponding LED array mounting board, and an optical concentrator element having a circular input surface and a rectangular output surface with beveled edges, in accordance with a preferred embodiment of the present invention.

Other configurations may also be envisioned within the spirit and scope of this invention. For example, FIG. 29 illustrates another alternative configuration including a concentrator element 1016 having a circular input surface 1016i and a rectangular output surface 1016p. FIG. 30 illustrates a further alternative configuration including a concentrator element 1116 having a circular input surface 1116i and a rectangular output surface 1116p with beveled edges. The beveled portion may of course vary in size and dimension. The LED array mounting boards 1014, 1114 are also illustrated in FIGS. 29 and 30, respectively. A concentrator element having other curved taper configurations, e.g. from a circular input surface to a rectangular output surface may also be contemplated. The output surface in any of these embodiments is preferably rectangular and more preferably a square. Mixing of light is optimal with a square as light achieves better uniformity. The aspect ratio may preferably match that of the imaging device, for example, 16:9.

Figure 31:
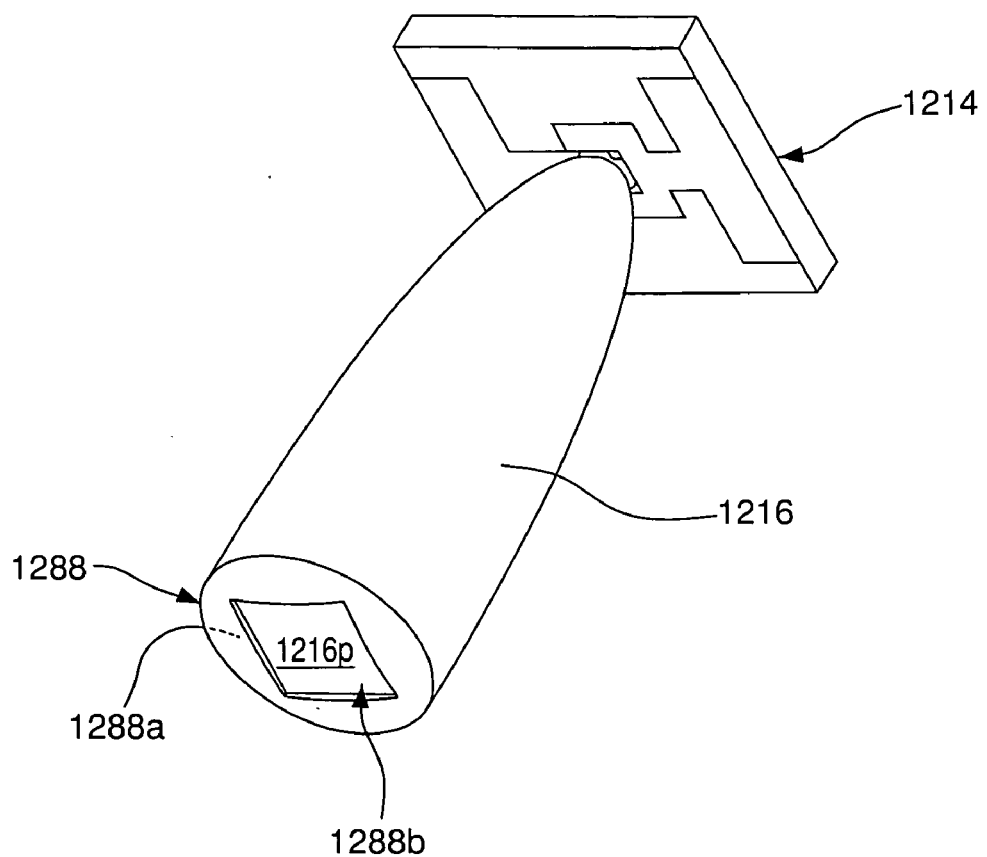
FIG. 31 is an enlarged, isometric view of a portion of another digital light projection system, including an LED array and corresponding LED array mounting board, and an optical concentrator element having a reflective aperture coating formed on the output surface of the optical concentrator element, in accordance with a preferred embodiment of the present invention.
Figure 32:
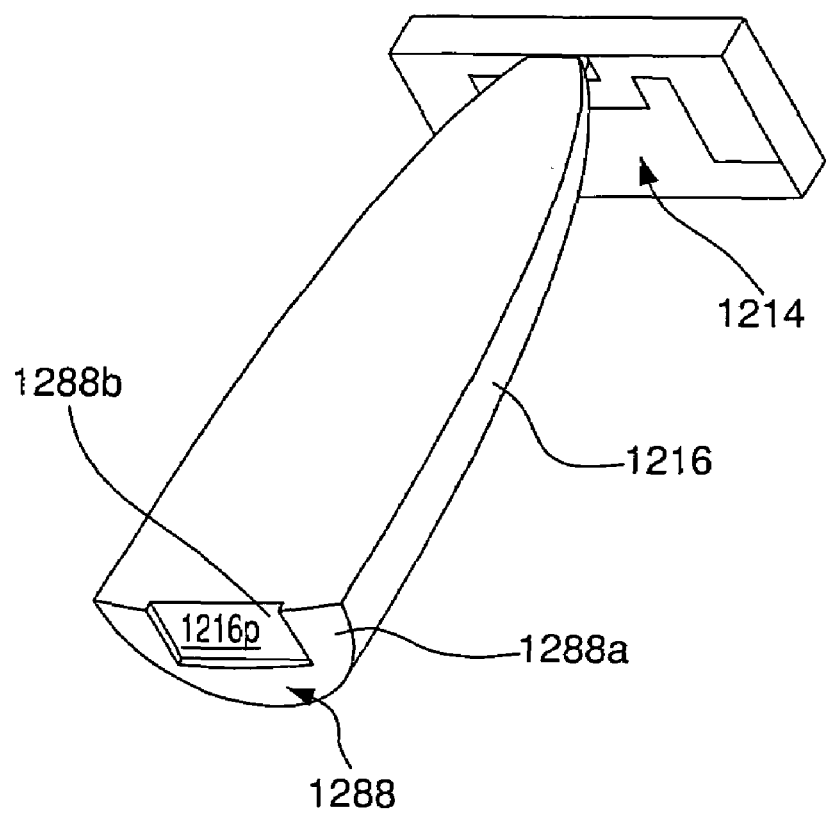
FIG. 32 is a cross-sectional view of the configuration shown in FIG. 31.
Figure 33:
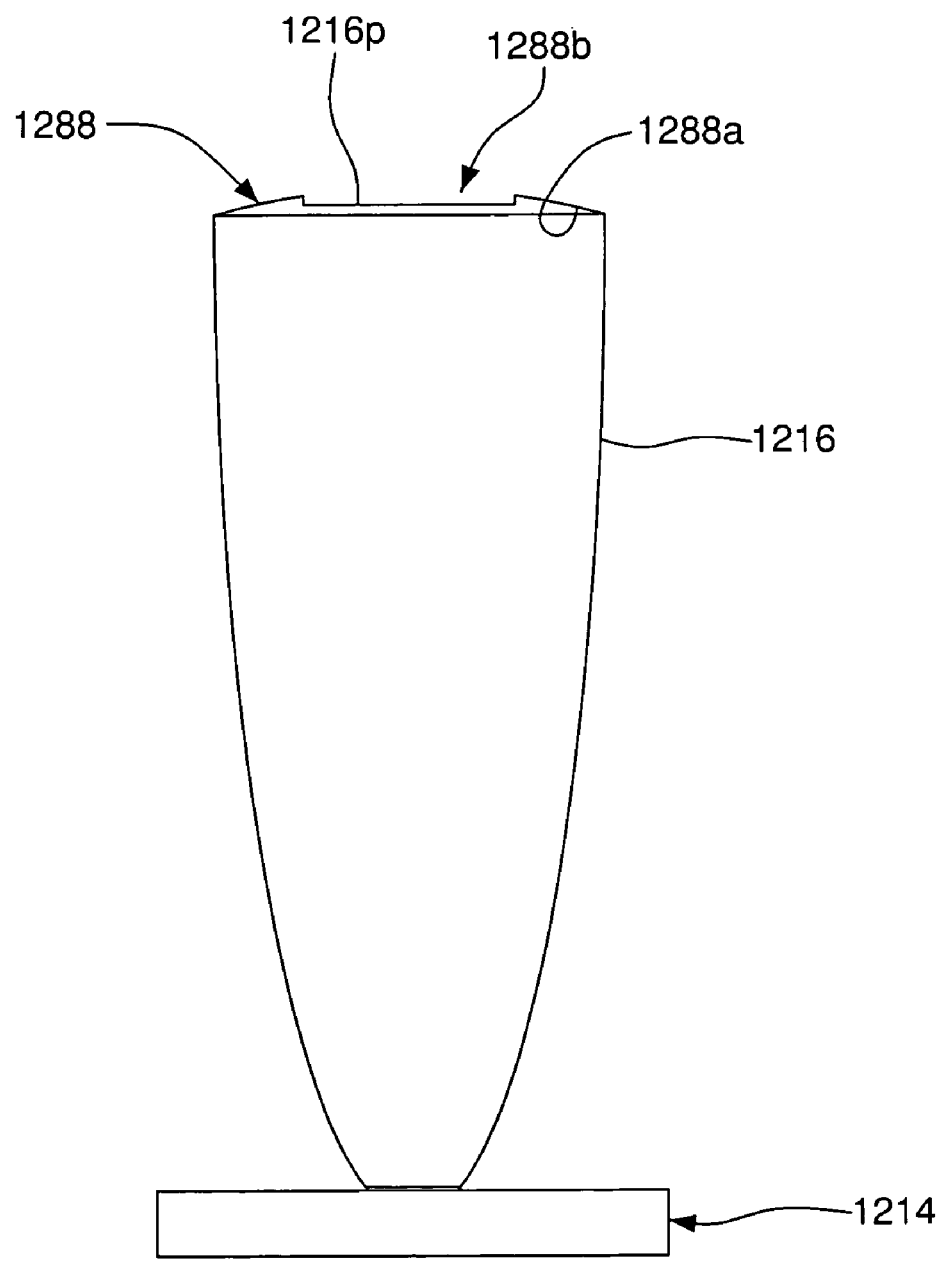
FIG. 33 is a side view of the configuration shown in FIG. 31.

FIG. 31 is an enlarged, isometric view of a portion of another digital light projection system, including an LED array and corresponding LED array mounting board 1214, and an optical concentrator element 1216 having a reflective aperture coating 1288 formed on the output surface 1216p of the optical concentrator element 1216. FIG. 32 is a cross-sectional view of the configuration shown in FIG. 31. FIG. 33 is a side view of the configuration shown in FIG. 31.

Figure 34:
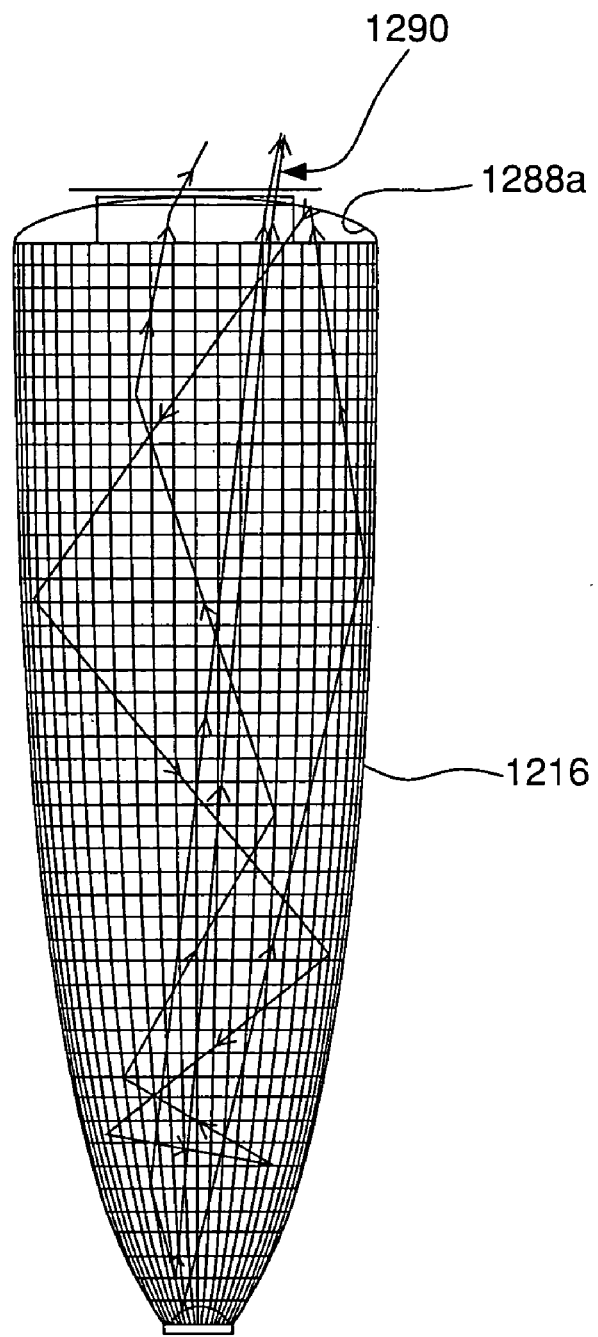
FIG. 34 is a side view substantially similar of the configuration shown in FIG. 31 without the LED array mounting board and with the addition of sample light-ray traces.

The aperture element 1288 is positioned substantially adjacent to the output surface 1216p of each concentrator element 1216, wherein the aperture element 1288 includes an aperture 1288b and a reflective surface 1288a facing the output surface 1216p of each concentrator element 1216, wherein a first portion of the reflected light is intended for projection through the aperture 1288b without reflection by the reflective surface 1288a, while a second portion of the reflected light is reflected by the reflective surface 1288a back into the concentrator element 1216 to thereby provide light which is additionally reflected within the concentrator element. The first portion of the reflected light and the additionally reflected light is spatially combined at the output surface of each concentrator element at the aperture to thereby provide substantially uniform light which is projected through the aperture. FIG. 34 is a side view substantially similar of the configuration shown in FIG. 31, i.e. without the LED array mounting board and with the addition of sample light-ray traces 1290 for illustrative purposes. As illustrated, this approach increases the light-ray bounces by causing the light to re-enter the concentrator element at different positions and angles thus homogenizing the light more uniformly. Use of the reflective surface 1288a therefore recovers otherwise lost light and improves near-field uniformity, and ultimately, optimal collection efficiency is achieved.

The aperture element 1288 is preferably formed as a specularly reflective coating directly on the output surface 1216p of each concentrator element 1216. The aperture 1288b is formed preferably by a masking technique and will be defined by reflective surface 1288a. In this manufacturing method, the output surface 1216p aligned with the aperture 1288b would be either planar or curved (i.e. spherical or aspherical) depending on whether the output surface 1216p is planar or curved (i.e. spherical or aspherical). The coating technique used may be any suitable technique such as, for example, vacuum deposition.

Alternatively, the aperture may be formed by initially forming the specularly reflective coating on the entire output surface 1216p. Then, the aperture 1288b may be subsequently formed by, for example, etching or cutting a portion of the coated output surface 1216p thereby leaving a "window" or aperture in its place. In this manufacturing method, the output surface 1216p aligned with the aperture would be planar, regardless of whether the reflective surface 1288a and correspondingly underlying output surface 1216p are curved or planar.

Regardless of the manufacturing method or type of aperture element, the aperture may be rectangular. The aperture may have an aspect ratio other than 1:1, such as 16:9.

The output surface 1216p of each concentrator element 1216 may be planar and preferable forms an angle of substantially 90° with respect to a longitudinal direction of the concentrator element, although the output surface 1216p may form an angle other than 90° with respect to a longitudinal direction of the concentrator element.

The output surface of each concentrator element may be curved, or may be curved only in locations adjacent the reflective surface. Alternatively, the output surface of each concentrator element may be curved only in locations adjacent the aperture.

The output surface of each concentrator element may be diffusive, or may be diffusive only in locations adjacent the reflective surface. Alternatively, the output surface of each concentrator element may be diffractive, or may be diffractive only in locations adjacent the reflective surface. As a further alternative, the output surface of each concentrator element may be faceted, or may be faceted only in locations adjacent the reflective surface. These diffusive, diffractive, or faceted functions may alternatively be employed by embossing directly within the output surface of the concentrator element. Another alternative or combination to any of these above functions is the realization that lenslets may be employed at the output surface. Lenslet arrays may have reflective coatings on the far (back) surface and when properly optimized, may better utilize the otherwise lost light to thereby improve the near-field uniformity without compromising the etendue of the system.

In situations where the output surface is neither diffusive, diffractive, nor faceted, the reflective surface may instead be diffusive, diffractive, or faceted.

The concentrator element may be positioned directly in contact with each corresponding LED array, or an optical coupling material may be positioned between the concentrator element and each corresponding LED array, wherein the optical coupling material may be in contact with the concentrator element and each corresponding LED array. The optical coupling material may preferably comprise a gel having an index of refraction which substantially matches that of the concentrator element.

The reflection of light performed by each concentrator element may be total internal reflection, specular reflection, or a combination of both. For example, a specularly reflective element (e.g. a coating) may be positioned only on a limited portion of an outer surface of each concentrator element which is in the vicinity of each corresponding LED array such that the reflection of light performed by each concentrator element comprises specular reflection and total internal reflection. This limited reflective portion is capable of reflecting light from the edges of the LEDs that hits the interface at too steep of an angle for total internal reflection and therefore increased efficiency is achieved.

Each concentrator element may be solid (i.e. preferably using total internal reflection or combination of total internal reflection and specular reflection) or hollow (i.e. using specular reflection).

Figure 35:
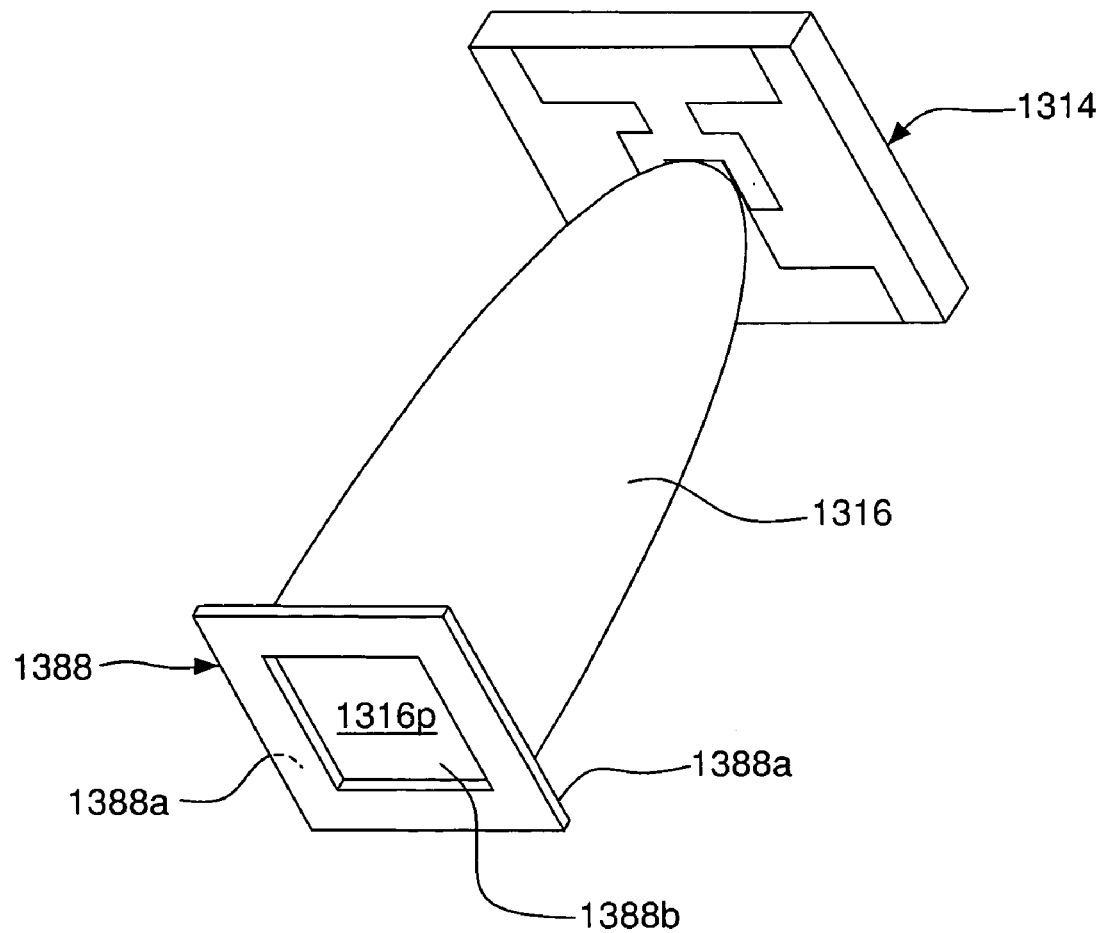
FIG. 35 is an enlarged, isometric view of a portion of another digital light projection system, including an LED array and corresponding LED array mounting board, and an optical concentrator element having a reflective aperture plate positioned on the output surface of the optical concentrator element, in accordance with a preferred embodiment of the present invention.
Figure 36:
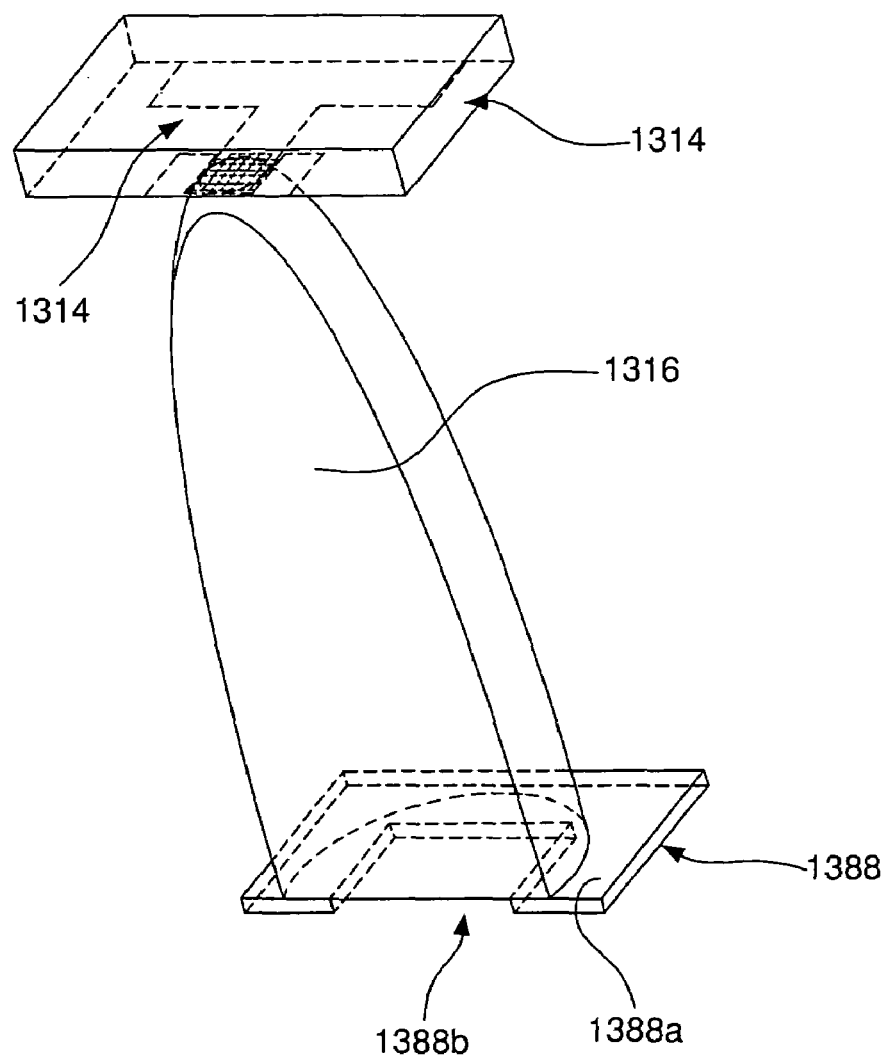
FIG. 36 is a cross-sectional view of the configuration shown in FIG. 35.

FIG. 35 is an enlarged, isometric view of a portion of another digital light projection system, including an LED array and corresponding LED array mounting board 1314, and an optical concentrator element 1316 having a reflective aperture plate 1388 positioned on the output surface 1316p of the optical concentrator element 1316. FIG. 36 is a cross-sectional view of the configuration shown in FIG. 35. The aperture plate 1388 is preferably solid and includes an aperture 1388b and a reflective surface 1388a facing output surface 1316p of each concentrator element 1316. The specularly reflective surface, if not initially formed as reflective, may be made reflective by forming a reflecting coating thereon or by any other technique. The aperture 1388b may be formed during the molding technique used to form the aperture element 1388 or may be formed thereafter by a process such as, for example, punching. The aperture plate may be attached directly to the output surface 1316p of the optical concentrator element 1316 or may be attached via a coupling element such as epoxy or adhesive.

In the preferred exemplary configuration shown in FIGS. 31-34, the ZEMAX software outputs surface data describing these surface characteristics as illustrated in Table 4. Although the ZEMAX data corresponds to a system including a red LED array, it may also be applicable to LED arrays of other single-color LED arrays or combination-color LED arrays.

TABLE 4

ZEMAX Software Output Describing Surface Data Summary and Detail for the Exemplary Configuration illustrated in FIGS. 31-34

GENERAL LENS DATA:

| | | |
|---|---|---|
| Glass Catalogs: | | SCHOTT MISC ZEON |
| Temperature (C.): | | 2.00000E+001 |
| Pressure (ATM): | | 1.00000E+000 |
| Adjust Index Data To Environment: | | Off |
| Primary Wavelength: | | 0.5 μm |
| Lens Units: | | Millimeters |
| Wavelengths: 5 | | |
| Units: μm | | |
| # | Value | Weight |
| 1 | 0.500000 | 1.000000 |
| 2 | 0.550000 | 1.000000 |
| 3 | 0.550000 | 1.000000 |
| 4 | 0.550000 | 1.000000 |
| 5 | 0.550000 | 1.000000 |

TABLE 4-continued

ZEMAX Software Output Describing Surface Data Summary and Detail for the
Exemplary Configuration illustrated in FIGS. 31-34

OBJECT DATA DETAIL:
There are 69 objects:

Object 1:
Object type: Null Object (NSC_NULL)
Reference object: 0
Inside of: 0
XYZ position: 0 0 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material:
Index at 0.500000 μm = 1.00000000
Index at 0.550000 μm = 1.00000000
Index at 0.550000 μm = 1.00000000
Index at 0.550000 μm = 1.00000000
Index at 0.550000 μm = 1.00000000
Object 2: SUBSTRATE
Object type: Rectangular Volume (NSC_RBLK)
Face 0: Side Faces
Coating: (none)
Scattering: None
Face 1: Front Face
Coating: (none)
Scattering: None
Face 2: Back Face
Coating: (none)
Scattering: None
Reference object: 0
Inside of: 0
XYZ position: 0 0 0
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 0.00000000E+000
Material: MIRROR
X1 Half Width: 2
Y1 Half Width: 2
Z Length: 0.5
X2 Half Width: 2
Y2 Half Width: 2
Front X Angle: 0
Front Y Angle: 0
Rear X Angle: 0
Rear Y Angle: 0
Object 3: CONCENTRATOR
Object type: CPC (NSC_CPCO)
Face 0: Side Faces
Coating: (none)
Scattering: None
Face 1: Front Face
Coating: (none)
Scattering: None
Face 2: Back Face
Coating: (none)
Scattering: None
Reference object: −1
Inside of: 0
XYZ position: 0 0 0.5
Tilt about XYZ: 0 0 0
Pos. Mtrx. R11 R12 R13 X: 1.00000000E+000 0.00000000E+000 0.00000000E+000 0.00000000E+000
Pos. Mtrx. R21 R22 R23 Y: 0.00000000E+000 1.00000000E+000 0.00000000E+000 0.00000000E+000
Pos. Mtrx. R31 R32 R33 Z: 0.00000000E+000 0.00000000E+000 1.00000000E+000 5.00000000E−001
Material: 480R
Index at 0.500000 μm = 1.53073072
Index at 0.550000 μm = 1.52728428
Index at 0.550000 μm = 1.52728428
Index at 0.550000 μm = 1.52728428
Index at 0.550000 μm = 1.52728428
Radial Aperture: 2
Angle (deg): 12.5
Length: 50.7
Object 4:
Object type: Standard Lens (NSC_SLEN)
Face 0: Side Faces TABLE 4-continued ZEMAX Software Output Describing Surface Data Summary and Detail for the Exemplary Configuration illustrated in FIGS. 31-34

| | |
|---|---|
| Coating: | (none) |
| Scattering: | None |
| Face 1: | Front Face |
| Coating: | (none) |
| Scattering: | None |
| Face 2: | Back Face |
| Coating: | (none) |
| Scattering: | None |
| Reference object: | 0 |
| Inside of: | 3 |
| XYZ position: | 0   0   0.5 |
| Tilt about XYZ: | 0   0   0 |
| Pos. Mtrx. R11 R12 R13 X: | 1.00000000E+000   0.00000000E+000   0.00000000E+000   0.00000000E+000 |
| Pos. Mtrx. R21 R22 R23 Y: | 0.00000000E+000   1.00000000E+000   0.00000000E+000   0.00000000E+000 |
| Pos. Mtrx. R31 R32 R33 Z: | 0.00000000E+000   0.00000000E+000   1.00000000E+000   5.00000000E−001 |
| Material: | 480R |
| Index at 0.500000 μm = 1.53073072 | |
| Index at 0.550000 μm = 1.52728428 | |
| Index at 0.550000 μm = 1.52728428 | |
| Index at 0.550000 μm = 1.52728428 | |
| Index at 0.550000 μm = 1.52728428 | |
| Radius 1: | 0 |
| Conic 1: | 0 |
| Clear 1: | 1.8 |
| Edge 1: | 1.8 |
| Thickness: | 1.292 |
| Radius 2: | −1.9 |
| Conic 2: | 0 |
| Clear 2: | 1.8 |
| Edge 2: | 1.8 |
| Object 5: | Row Center |
| Object type: | Null Object (NSC_NULL) |
| Reference object: | 0 |
| Inside of: | 0 |
| XYZ position: | −0.3856   0.3856   0 |
| Tilt about XYZ: | 0   0   0 |
| Pos. Mtrx. R11 R12 R13 X: | 1.00000000E+000   0.00000000E+000   0.00000000E+000   −3.85600000E−001 |
| Pos. Mtrx. R21 R22 R23 Y: | 0.00000000E+000   1.00000000E+000   0.00000000E+000   3.85600000E−001 |
| Pos. Mtrx. R31 R32 R33 Z: | 0.00000000E+000   0.00000000E+000   1.00000000E+000   0.00000000E+000 |
| Material: | |
| Index at 0.500000 μm = 1.00000000 | |
| Index at 0.550000 μm = 1.00000000 | |
| Index at 0.550000 μm = 1.00000000 | |
| Index at 0.550000 μm = 1.00000000 | |
| Index at 0.550000 μm = 1.00000000 | |
| Object 6: | LED EMITTER C5 |
| Object type: | Source Radial (NSC_SRAD) |
| Reference object: | −4 |
| Inside of: | 4 |
| XYZ position: | −0.1928   −0.1928   0.729 |
| Tilt about XYZ: | 0   0   0 |
| Pos. Mtrx. R11 R12 R13 X: | 1.00000000E+000   0.00000000E+000   0.00000000E+000   −1.92800000E−001 |
| Pos. Mtrx. R21 R22 R23 Y: | 0.00000000E+000   1.00000000E+000   0.00000000E+000   −1.92800000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |

TABLE 4-continued

ZEMAX Software Output Describing Surface Data Summary and Detail for the
Exemplary Configuration illustrated in FIGS. 31-34

| | |
|---|---|
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 7: | LED EMITTER C4 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    −1.92800000E−001 |
| Pos. Mtrx. R21 R22 R23 Y: | 0.00000000E+000    1.00000000E+000    0.00000000E+000    1.92800000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 8: | LED EMITTER C3 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    −1.92800000E−001 |
| Pos. Mtrx. R21 R22 R23 Y: | 0.00000000E+000    1.00000000E+000    0.00000000E+000    5.78400000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |

TABLE 4-continued

ZEMAX Software Output Describing Surface Data Summary and Detail for the
Exemplary Configuration illustrated in FIGS. 31-34

| | |  |  |  |
|---|---|---|---|---|
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 9: | LED EMITTER C2 | | | |
| Object type: | Source Radial (NSC_SRAD) | | | |
| Reference object: | −1 | | | |
| Inside of: | 4 | | | |
| XYZ position: | 0    0.3856    0 | | | |
| Tilt about XYZ: | 0    0    0 | | | |
| Pos. Mtrx. R11 R12 R13 X: | 1.00000000E+000 | 0.00000000E+000 | 0.00000000E+000 | −1.92800000E−001 |
| Pos. Mtrx. R21 R22 R23 Y: | 0.00000000E+000 | 1.00000000E+000 | 0.00000000E+000 | 9.64000000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 10: | LED EMITTER C1 | | | |
| Object type: | Source Radial (NSC_SRAD) | | | |
| Reference object: | −1 | | | |
| Inside of: | 4 | | | |
| XYZ position: | 0    0.3856    0 | | | |
| Tilt about XYZ: | 0    0    0 | | | |
| Pos. Mtrx. R11 R12 R13 X: | 1.00000000E+000 | 0.00000000E+000 | 0.00000000E+000 | −1.92800000E−001 |
| Pos. Mtrx. R21 R22 R23 Y: | 0.00000000E+000 | 1.00000000E+000 | 0.00000000E+000 | 1.34960000E+000 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |

TABLE 4-continued

ZEMAX Software Output Describing Surface Data Summary and Detail for the Exemplary Configuration illustrated in FIGS. 31-34

| | |
|---|---|
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 11: | LED EMITTER C6 |
| Object type: | Source Radial (NSC_SRAD) |
| Reference object: | −5 |
| Inside of: | 4 |
| XYZ position: | 0   −0.3856   0 |
| Tilt about XYZ: | 0   0   0 |
| Pos. Mtrx. R11 R12 R13 X: | 1.00000000E+000   0.00000000E+000   0.00000000E+000   −1.92800000E−001 |
| Pos. Mtrx. R21 R22 R23 Y: | 0.00000000E+000   1.00000000E+000   0.00000000E+000   −5.78400000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 12: | LED EMITTER C7 |
| Object type: | Source Radial (NSC_SRAD) |
| Reference object: | −1 |
| Inside of: | 4 |
| XYZ position: | 0   −0.3856   0 |
| Tilt about XYZ: | 0   0   0 |
| Pos. Mtrx. R11 R12 R13 X: | 1.00000000E+000   0.00000000E+000   0.00000000E+000   −1.92800000E−001 |
| Pos. Mtrx. R21 R22 R23 Y: | 0.00000000E+000   1.00000000E+000   0.00000000E+000   −9.64000000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |

TABLE 4-continued

ZEMAX Software Output Describing Surface Data Summary and Detail for the
Exemplary Configuration illustrated in FIGS. 31-34

| | |
|---|---|
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 13: | LED EMITTER C8 |
| Object type: | Source Radial (NSC_SRAD) |
| Reference object: | −1 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    −1.92800000E−001 |
| Pos. Mtrx. R21 R22 R23 Y: | 0.00000000E+000    1.00000000E+000    0.00000000E+000    −1.34960000E+000 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 14: | ROW −1 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.500000 μm = 1.00000000 | |
| Index at 0.550000 μm = 1.00000000 | |
| Index at 0.550000 μm = 1.00000000 | |
| Index at 0.550000 μm = 1.00000000 | |
| Index at 0.550000 μm = 1.00000000 | |
| Object 15: | LED EMITTER C5 |
| Object type: | Source Radial (NSC_SRAD) |
| Reference object: | −9 |
| Inside of: | 4 |
| XYZ position: | −0.3856    0    0 |
| Tilt about XYZ: | 0    0    0 |
| Pos. Mtrx. R11 R12 R13 X: | 1.00000000E+000    0.00000000E+000    0.00000000E+000    −5.78400000E−001 |
| Pos. Mtrx. R21 R22 R23 Y: | 0.00000000E+000    1.00000000E+000    0.00000000E+000    −1.92800000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |

TABLE 4-continued

ZEMAX Software Output Describing Surface Data Summary and Detail for the Exemplary Configuration illustrated in FIGS. 31-34

| | |
|---|---|
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 16: | LED EMITTER C4 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    −5.78400000E−001 |
| Pos. Mtrx. R21 R22 R23 Y: | 0.00000000E+000    1.00000000E+000    0.00000000E+000    1.92800000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 17: | LED EMITTER C3 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    −5.78400000E−001 |
| Pos. Mtrx. R21 R22 R23 Y: | 0.00000000E+000    1.00000000E+000    0.00000000E+000    5.78400000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |

TABLE 4-continued

ZEMAX Software Output Describing Surface Data Summary and Detail for the
Exemplary Configuration illustrated in FIGS. 31-34

| | |
|---|---|
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 18: | LED EMITTER C2 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    −5.78400000E−001 |
| Pos. Mtrx. R21 R22 R23 Y: | 0.00000000E+000    1.00000000E+000    0.00000000E+000    9.64000000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 19: | LED EMITTER C1 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    −5.78400000E−001 |
| Pos. Mtrx. R21 R22 R23 Y: | 0.00000000E+000    1.00000000E+000    0.00000000E+000    1.34960000E+000 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |

TABLE 4-continued

ZEMAX Software Output Describing Surface Data Summary and Detail for the
Exemplary Configuration illustrated in FIGS. 31-34

| | |
|---|---|
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 20: | LED EMITTER C6 |
| Object type: | Source Radial (NSC_SRAD) |
| Reference object: | −5 |
| Inside of: | 4 |
| XYZ position: | 0   −0.3856   0 |
| Tilt about XYZ: | 0   0   0 |
| Pos. Mtrx. R11 R12 R13 X: | 1.00000000E+000   0.00000000E+000   0.00000000E+000   −5.78400000E−001 |
| Pos. Mtrx. R21 R22 R23 Y: | 0.00000000E+000   1.00000000E+000   0.00000000E+000   −5.78400000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 21: | LED EMITTER C7 |
| Object type: | Source Radial (NSC_SRAD) |
| Reference object: | −1 |
| Inside of: | 4 |
| XYZ position: | 0   −0.3856   0 |
| Tilt about XYZ: | 0   0   0 |
| Pos. Mtrx. R11 R12 R13 X: | 1.00000000E+000   0.00000000E+000   0.00000000E+000   −5.78400000E−001 |
| Pos. Mtrx. R21 R22 R23 Y: | 0.00000000E+000   1.00000000E+000   0.00000000E+000   −9.64000000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |

TABLE 4-continued

ZEMAX Software Output Describing Surface Data Summary and Detail for the
Exemplary Configuration illustrated in FIGS. 31-34

| | |
|---|---|
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 22: | LED EMITTER C8 |
| Object type: | Source Radial (NSC_SRAD) |
| Reference object: | −1 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    −5.78400000E−001 |
| Pos. Mtrx. R21 R22 R23 Y: | 0.00000000E+000    1.00000000E+000    0.00000000E+000    −1.34960000E+000 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 23: | ROW −2 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.500000 μm = 1.00000000 | |
| Index at 0.550000 μm = 1.00000000 | |
| Index at 0.550000 μm = 1.00000000 | |
| Index at 0.550000 μm = 1.00000000 | |
| Index at 0.550000 μm = 1.00000000 | |
| Object 24: | LED EMITTER C5 |

TABLE 4-continued

ZEMAX Software Output Describing Surface Data Summary and Detail for the Exemplary Configuration illustrated in FIGS. 31-34

| | |
|---|---|
| Object type: | Source Radial (NSC_SRAD) |
| Reference object: | −9 |
| Inside of: | 4 |
| XYZ position: | −0.3856  0  0 |
| Tilt about XYZ: | 0  0  0 |
| Pos. Mtrx. R11 R12 R13 X: | 1.00000000E+000  0.00000000E+000  0.00000000E+000  −9.64000000E−001 |
| Pos. Mtrx. R21 R22 R23 Y: | 0.00000000E+000  1.00000000E+000  0.00000000E+000  −1.92800000E−001 |
| Pos. Mtrx. R31 R32 R33 Z: | 0.00000000E+000  0.00000000E+000  1.00000000E+000  7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 25: | LED EMITTER C4 |
| Object type: | Source Radial (NSC_SRAD) |
| Reference object: | −1 |
| Inside of: | 4 |
| XYZ position: | 0  0.3856  0 |
| Tilt about XYZ: | 0  0  0 |
| Pos. Mtrx. R11 R12 R13 X: | 1.00000000E+000  0.00000000E+000  0.00000000E+000  −9.64000000E−001 |
| Pos. Mtrx. R21 R22 R23 Y: | 0.00000000E+000  1.00000000E+000  0.00000000E+000  1.92800000E−001 |
| Pos. Mtrx. R31 R32 R33 Z: | 0.00000000E+000  0.00000000E+000  1.00000000E+000  7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 26: | LED EMITTER C3 |

TABLE 4-continued

ZEMAX Software Output Describing Surface Data Summary and Detail for the Exemplary Configuration illustrated in FIGS. 31-34

| | |
|---|---|
| Object type: | Source Radial (NSC_SRAD) |
| Reference object: | −1 |
| Inside of: | 4 |
| XYZ position: | 0   0.3856   0 |
| Tilt about XYZ: | 0   0   0 |
| Pos. Mtrx. R11 R12 R13 X: | 1.00000000E+000   0.00000000E+000   0.00000000E+000   −9.64000000E−001 |
| Pos. Mtrx. R21 R22 R23 Y: | 0.00000000E+000   1.00000000E+000   0.00000000E+000   5.78400000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 27: | LED EMITTER C2 |
| Object type: | Source Radial (NSC_SRAD) |
| Reference object: | −1 |
| Inside of: | 4 |
| XYZ position: | 0   0.3856   0 |
| Tilt about XYZ: | 0   0   0 |
| Pos. Mtrx. R11 R12 R13 X: | 1.00000000E+000   0.00000000E+000   0.00000000E+000   −9.64000000E−001 |
| Pos. Mtrx. R21 R22 R23 Y: | 0.00000000E+000   1.00000000E+000   0.00000000E+000   9.64000000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 28: | LED EMITTER C6 |

TABLE 4-continued

ZEMAX Software Output Describing Surface Data Summary and Detail for the
Exemplary Configuration illustrated in FIGS. 31-34

| | |
|---|---|
| Object type: | Source Radial (NSC_SRAD) |
| Reference object: | −4 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    −9.64000000E−001 |
| Pos. Mtrx. R21 R22 R23 Y: | 0.00000000E+000    1.00000000E+000    0.00000000E+000    −5.78400000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 29: | LED EMITTER C7 |
| Object type: | Source Radial (NSC_SRAD) |
| Reference object: | −1 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    −9.64000000E−001 |
| Pos. Mtrx. R21 R22 R23 Y: | 0.00000000E+000    1.00000000E+000    0.00000000E+000    −9.64000000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 30: | ROW −3 |

TABLE 4-continued

ZEMAX Software Output Describing Surface Data Summary and Detail for the Exemplary Configuration illustrated in FIGS. 31-34

| Object type: | Null Object (NSC_NULL) | | | |
|---|---|---|---|---|
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.500000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| Object 31: | LED EMITTER C5 | | | |
| Object type: | Source Radial (NSC_SRAD) | | | |
| Reference object: | −7 | | | |
| Inside of: | 4 | | | |
| XYZ position: | −0.3856 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.34960000E+000 |
| Pos. Mtrx. R21 R22 R23 Y: | 0.00000000E+000 | 1.00000000E+000 | 0.00000000E+000 | −1.92800000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 32: | LED EMITTER C4 | | | |
| Object type: | Source Radial (NSC_SRAD) | | | |
| Reference object: | −1 | | | |
| Inside of: | 4 | | | |
| XYZ position: | 0 | 0.3856 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | −1.34960000E+000 |
| Pos. Mtrx. R21 R22 R23 Y: | 0.00000000E+000 | 1.00000000E+000 | 0.00000000E+000 | 1.92800000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |

TABLE 4-continued

ZEMAX Software Output Describing Surface Data Summary and Detail for the Exemplary Configuration illustrated in FIGS. 31-34

| | |
|---|---|
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 33: | LED EMITTER C3 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    −1.34960000E+000 |
| Pos. Mtrx. R21 R22 R23 Y: | 0.00000000E+000    1.00000000E+000    0.00000000E+000    5.78400000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 34: | LED EMITTER C6 |
| Object type: | Source Radial (NSC_SRAD) |
| Reference object: | −3 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    −1.34960000E+000 |
| Pos. Mtrx. R21 R22 R23 Y: | 0.00000000E+000    1.00000000E+000    0.00000000E+000    −5.78400000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |

TABLE 4-continued

ZEMAX Software Output Describing Surface Data Summary and Detail for the Exemplary Configuration illustrated in FIGS. 31-34

| | |
|---|---|
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 35: | ROW +1 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.500000 μm = 1.00000000 | |
| Index at 0.550000 μm = 1.00000000 | |
| Index at 0.550000 μm = 1.00000000 | |
| Index at 0.550000 μm = 1.00000000 | |
| Index at 0.550000 μm = 1.00000000 | |
| Object 36: | LED EMITTER C5 |
| Object type: | Source Radial (NSC_SRAD) |
| Reference object: | 6 |
| Inside of: | 4 |
| XYZ position: | 0.3856    0    0 |
| Tilt about XYZ: | 0    0    0 |
| Pos. Mtrx. R11 R12 R13 X: | 1.00000000E+000    0.00000000E+000    0.00000000E+000    1.92800000E−001 |
| Pos. Mtrx. R21 R22 R23 Y: | 0.00000000E+000    1.00000000E+000    0.00000000E+000    −1.92800000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 37: | LED EMITTER C4 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    1.92800000E−001 |
| Pos. Mtrx. R21 R22 R23 Y: | 0.00000000E+000    1.00000000E+000    0.00000000E+000    1.92800000E−001 |
| Pos. Mtrx. R31 R32 R33 Z: | 0.00000000E+000    0.00000000E+000    1.00000000E+000    7.29000000E−001 |

TABLE 4-continued

ZEMAX Software Output Describing Surface Data Summary and Detail for the Exemplary Configuration illustrated in FIGS. 31-34

| | |  |  |  |
|---|---|---|---|---|
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 38: | LED EMITTER C3 | | | |
| Object type: | Source Radial (NSC_SRAD) | | | |
| Reference object: | −1 | | | |
| Inside of: | 4 | | | |
| XYZ position: | 0 | 0.3856 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.92800000E−001 |
| Pos. Mtrx. R21 R22 R23 Y: | 0.00000000E+000 | 1.00000000E+000 | 0.00000000E+000 | 5.78400000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 39: | LED EMITTER C2 | | | |
| Object type: | Source Radial (NSC_SRAD) | | | |
| Reference object: | −1 | | | |
| Inside of: | 4 | | | |
| XYZ position: | 0 | 0.3856 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.92800000E−001 |
| Pos. Mtrx. R21 R22 R23 Y: | 0.00000000E+000 | 1.00000000E+000 | 0.00000000E+000 | 9.64000000E−001 |
| Pos. Mtrx. R31 R32 R33 Z: | 0.00000000E+000 | 0.00000000E+000 | 1.00000000E+000 | 7.29000000E−001 |

TABLE 4-continued

ZEMAX Software Output Describing Surface Data Summary and Detail for the Exemplary Configuration illustrated in FIGS. 31-34

| | |
|---|---|
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 40: | LED EMITTER C1 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    1.92800000E−001 |
| Pos. Mtrx. R21 R22 R23 Y: | 0.00000000E+000    1.00000000E+000    0.00000000E+000    1.34960000E+000 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 41: | LED EMITTER C6 |
| Object type: | Source Radial (NSC_SRAD) |
| Reference object: | −5 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    1.92800000E−001 |
| Pos. Mtrx. R21 R22 R23 Y: | 0.00000000E+000    1.00000000E+000    0.00000000E+000    −5.78400000E−001 |
| Pos. Mtrx. R31 R32 R33 Z: | 0.00000000E+000    0.00000000E+000    1.00000000E+000    7.29000000E−001 |

TABLE 4-continued

ZEMAX Software Output Describing Surface Data Summary and Detail for the Exemplary Configuration illustrated in FIGS. 31-34

| | |
|---|---|
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 42: | LED EMITTER C7 |
| Object type: | Source Radial (NSC_SRAD) |
| Reference object: | −1 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    1.92800000E−001 |
| Pos. Mtrx. R21 R22 R23 Y: | 0.00000000E+000    1.00000000E+000    0.00000000E+000    −9.64000000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 43: | LED EMITTER C8 |
| Object type: | Source Radial (NSC_SRAD) |
| Reference object: | −1 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    1.92800000E−001 |
| Pos. Mtrx. R21 R22 R23 Y: | 0.00000000E+000    1.00000000E+000    0.00000000E+000    −1.34960000E−000 |
| Pos. Mtrx. R31 R32 R33 Z: | 0.00000000E+000    0.00000000E+000    1.00000000E+000    7.29000000E−001 |

TABLE 4-continued

ZEMAX Software Output Describing Surface Data Summary and Detail for the
Exemplary Configuration illustrated in FIGS. 31-34

| | |
|---|---|
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 44: | ROW +2 |
| Object type: | Null Object (NSC_NULL) |
| Reference object: | 0 |
| Inside of: | 0 |

| | | | | |
|---|---|---|---|---|
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |

| | |
|---|---|
| Material: | |
| Index at 0.500000 μm = 1.00000000 | |
| Index at 0.550000 μm = 1.00000000 | |
| Index at 0.550000 μm = 1.00000000 | |
| Index at 0.550000 μm = 1.00000000 | |
| Index at 0.550000 μm = 1.00000000 | |
| Object 45: | LED EMITTER C5 |
| Object type: | Source Radial (NSC_SRAD) |
| Reference object: | −9 |
| Inside of: | 4 |

| | | | | |
|---|---|---|---|---|
| XYZ position: | 0.3856 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 5.78400000E−001 |
| Pos. Mtrx. R21 R22 R23 Y: | 0.00000000E+000 | 1.00000000E+000 | 0.00000000E+000 | −1.92800000E−001 |
| Pos. Mtrx. R31 R32 R33 Z: | 0.00000000E+000 | 0.00000000E+000 | 1.00000000E+000 | 7.29000000E−001 |

| | |
|---|---|
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |

TABLE 4-continued

ZEMAX Software Output Describing Surface Data Summary and Detail for the Exemplary Configuration illustrated in FIGS. 31-34

| | |
|---|---|
| I(65.00): | 50 |
| I(70.00): | 42.5 |
| I(75.00): | 30 |
| I(80.00): | 22 |
| I(85.00): | 14 |
| I(90.00): | 0 |
| Object 46: | LED EMITTER C4 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    5.78400000E−001 |
| Pos. Mtrx. R21 R22 R23 Y: | 0.00000000E+000    1.00000000E+000    0.00000000E+000    1.92800000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 47: | LED EMITTER C3 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    5.78400000E−001 |
| Pos. Mtrx. R21 R22 R23 Y: | 0.00000000E+000    1.00000000E+000    0.00000000E+000    5.78400000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |

TABLE 4-continued

ZEMAX Software Output Describing Surface Data Summary and Detail for the Exemplary Configuration illustrated in FIGS. 31-34

| | |
|---|---|
| I(65.00): | 50 |
| I(70.00): | 42.5 |
| I(75.00): | 30 |
| I(80.00): | 22 |
| I(85.00): | 14 |
| I(90.00): | 0 |
| Object 48: | LED EMITTER C2 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    5.78400000E−001 |
| Pos. Mtrx. R21 R22 R23 Y: | 0.00000000E+000    1.00000000E+000    0.00000000E+000    9.64000000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 49: | LED EMITTER C1 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    5.78400000E−001 |
| Pos. Mtrx. R21 R22 R23 Y: | 0.00000000E+000    1.00000000E+000    0.00000000E+000    1.34960000E+000 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |

TABLE 4-continued

ZEMAX Software Output Describing Surface Data Summary and Detail for the Exemplary Configuration illustrated in FIGS. 31-34

| | |
|---|---|
| I(65.00): | 50 |
| I(70.00): | 42.5 |
| I(75.00): | 30 |
| I(80.00): | 22 |
| I(85.00): | 14 |
| I(90.00): | 0 |
| Object 50: | LED EMITTER C6 |
| Object type: | Source Radial (NSC_SRAD) |
| Reference object: | −5 |
| Inside of: | 4 |

| | | | | | |
|---|---|---|---|---|---|
| XYZ position: | 0 | −0.3856 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 5.78400000E−001 | |
| Pos. Mtrx. R21 R22 R23 Y: | 0.00000000E+000 | 1.00000000E+000 | 0.00000000E+000 | −5.78400000E−001 | |
| Pos. Mtrx. R31 R32 R33 Z: | 0.00000000E+000 | 0.00000000E+000 | 1.00000000E+000 | 7.29000000E−001 | |

| | |
|---|---|
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 51: | LED EMITTER C7 |
| Object type: | Source Radial (NSC_SRAD) |
| Reference object: | −1 |
| Inside of: | 4 |

| | | | | | |
|---|---|---|---|---|---|
| XYZ position: | 0 | −0.3856 | 0 | | |
| Tilt about XYZ: | 0 | 0 | 0 | | |
| Pos. Mtrx. R11 R12 R13 X: | 1.00000000E+000 | 0.00000000E+000 | 0.00000000E+000 | 5.78400000E−001 | |
| Pos. Mtrx. R21 R22 R23 Y: | 0.00000000E+000 | 1.00000000E+000 | 0.00000000E+000 | −9.64000000E−001 | |
| Pos. Mtrx. R31 R32 R33 Z: | 0.00000000E+000 | 0.00000000E+000 | 1.00000000E+000 | 7.29000000E−001 | |

| | |
|---|---|
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |

TABLE 4-continued

ZEMAX Software Output Describing Surface Data Summary and Detail for the Exemplary Configuration illustrated in FIGS. 31-34

| | |  |  |  |
|---|---|---|---|---|
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 52: | LED EMITTER C8 | | | |
| Object type: | Source Radial (NSC_SRAD) | | | |
| Reference object: | −1 | | | |
| Inside of: | 4 | | | |
| XYZ position: | 0 | −0.3856 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 5.78400000E−001 |
| Pos. Mtrx. R21 R22 R23 Y: | 0.00000000E+000 | 1.00000000E+000 | 0.00000000E+000 | −1.34960000E+000 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 53: | ROW +3 | | | |
| Object type: | Null Object (NSC_NULL) | | | |
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.500000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| Object 54: | LED EMITTER C5 | | | |
| Object type: | Source Radial (NSC_SRAD) | | | |
| Reference object: | −9 | | | |
| Inside of: | 4 | | | |
| XYZ position: | 0.3856 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 9.64000000E−001 |
| Pos. Mtrx. R21 R22 R23 Y: | 0.00000000E+000 | 1.00000000E+000 | 0.00000000E+000 | −1.92800000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |

TABLE 4-continued

ZEMAX Software Output Describing Surface Data Summary and Detail for the
Exemplary Configuration illustrated in FIGS. 31-34

| | |
|---|---|
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 55: | LED EMITTER C4 |
| Object type: | Source Radial (NSC_SRAD) |
| Reference object: | −1 |
| Inside of: | 4 |
| XYZ position: | 0   0.3856   0 |
| Tilt about XYZ: | 0   0   0 |
| Pos. Mtrx. R11 R12 R13 X: | 1.00000000E+000   0.00000000E+000   0.00000000E+000   9.64000000E−001 |
| Pos. Mtrx. R21 R22 R23 Y: | 0.00000000E+000   1.00000000E+000   0.00000000E+000   1.92800000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 56: | LED EMITTER C3 |
| Object type: | Source Radial (NSC_SRAD) |
| Reference object: | −1 |
| Inside of: | 4 |
| XYZ position: | 0   0.3856   0 |
| Tilt about XYZ: | 0   0   0 |
| Pos. Mtrx. R11 R12 R13 X: | 1.00000000E+000   0.00000000E+000   0.00000000E+000   9.64000000E−001 |
| Pos. Mtrx. R21 R22 R23 Y: | 0.00000000E+000   1.00000000E+000   0.00000000E+000   5.78400000E−001 |
| Pos. Mtrx. R31 R32 R33 Z: | 0.00000000E+000   0.00000000E+000   1.00000000E+000   7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |

TABLE 4-continued

ZEMAX Software Output Describing Surface Data Summary and Detail for the Exemplary Configuration illustrated in FIGS. 31-34

| | |
|---|---|
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 57: | LED EMITTER C2 |
| Object type: | Source Radial (NSC_SRAD) |
| Reference object: | −1 |
| Inside of: | 4 |
| XYZ position: | 0    0.3856    0 |
| Tilt about XYZ: | 0    0    0 |
| Pos. Mtrx. R11 R12 R13 X: | 1.00000000E+000    0.00000000E+000    0.00000000E+000    9.64000000E−001 |
| Pos. Mtrx. R21 R22 R23 Y: | 0.00000000E+000    1.00000000E+000    0.00000000E+000    9.64000000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 58: | LED EMITTER C6 |
| Object type: | Source Radial (NSC_SRAD) |
| Reference object: | −4 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    9.64000000E−001 |
| Pos. Mtrx. R21 R22 R23 Y: | 0.00000000E+000    1.00000000E+000    0.00000000E+000    −5.78400000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |

TABLE 4-continued

ZEMAX Software Output Describing Surface Data Summary and Detail for the Exemplary Configuration illustrated in FIGS. 31-34

| | |
|---|---|
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 59: | LED EMITTER C7 |
| Object type: | Source Radial (NSC_SRAD) |
| Reference object: | −1 |
| Inside of: | 4 |
| XYZ position: | 0    −0.3856    0 |
| Tilt about XYZ: | 0    0    0 |
| Pos. Mtrx. R11 R12 R13 X: | 1.00000000E+000    0.00000000E+000    0.00000000E+000    9.64000000E−001 |
| Pos. Mtrx. R21 R22 R23 Y: | 0.00000000E+000    1.00000000E+000    0.00000000E+000    −9.64000000E−001 |
| Pos. Mtrx. R31 R32 R33 Z: | 0.00000000E+000    0.00000000E+000    1.00000000E+000    7.29000000E−001 |
| # Layout Rays: | 0 |
| # Analysis Rays: | 5000 |
| Power(Watts): | 0.015 |
| Wavenumber: | 0 |
| Color #: | 3 |
| X Half Width: | 0.1778 |
| Y Half Width: | 0.1778 |
| Unused 1: | 0 |
| Unused 2: | 0 |
| # Of Points: | 19 |
| I(0.00): | 100 |
| I(5.00): | 99.5 |
| I(10.00): | 99.5 |
| I(15.00): | 98.5 |
| I(20.00): | 97.5 |
| I(25.00): | 96 |
| I(30.00): | 94 |
| I(35.00): | 91 |
| I(40.00): | 86 |
| I(45.00): | 82 |
| I(50.00): | 76 |
| I(55.00): | 70 |
| I(60.00): | 61 |
| I(65.00): | 50 |
| I(70.00): | 42.5 |
| I(75.00): | 30 |
| I(80.00): | 22 |
| I(85.00): | 14 |
| I(90.00): | 0 |
| Object 60: | ROW +4 |
| Object type: | Null Object (NSC_NULL) |
| Reference object: | 0 |
| Inside of: | 0 |
| XYZ position: | 0    0    0 |
| Tilt about XYZ: | 0    0    0 |
| Pos. Mtrx. R11 R12 R13 X: | 1.00000000E+000    0.00000000E+000    0.00000000E+000    0.00000000E+000 |
| Pos. Mtrx. R21 R22 R23 Y: | 0.00000000E+000    1.00000000E+000    0.00000000E+000    0.00000000E+000 |
| Pos. Mtrx. R31 R32 R33 Z: | 0.00000000E+000    0.00000000E+000    1.00000000E+000    0.00000000E+000 |
| Material: | |
| Index at 0.500000 μm = 1.00000000 | |
| Index at 0.550000 μm = 1.00000000 | |
| Index at 0.550000 μm = 1.00000000 | |
| Index at 0.550000 μm = 1.00000000 | |
| Index at 0.550000 μm = 1.00000000 | |
| Object 61: | LED EMITTER C5 |
| Object type: | Source Radial (NSC_SRAD) |

TABLE 4-continued

ZEMAX Software Output Describing Surface Data Summary and Detail for the Exemplary Configuration illustrated in FIGS. 31-34

| | | | | |
|---|---|---|---|---|
| Reference object: | −7 | | | |
| Inside of: | 4 | | | |
| XYZ position: | 0.3856 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.34960000E+000 |
| Pos. Mtrx. R21 R22 R23 Y: | 0.00000000E+000 | 1.00000000E+000 | 0.00000000E+000 | −1.92800000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 62: | LED EMITTER C4 | | | |
| Object type: | Source Radial (NSC_SRAD) | | | |
| Reference object: | −1 | | | |
| Inside of: | 4 | | | |
| XYZ position: | 0 | 0.3856 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.34960000E+000 |
| Pos. Mtrx. R21 R22 R23 Y: | 0.00000000E+000 | 1.00000000E+000 | 0.00000000E+000 | 1.92800000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 63: | LED EMITTER C3 | | | |
| Object type: | Source Radial (NSC_SRAD) | | | |

TABLE 4-continued

ZEMAX Software Output Describing Surface Data Summary and Detail for the Exemplary Configuration illustrated in FIGS. 31-34

| | | | | |
|---|---|---|---|---|
| Reference object: | −1 | | | |
| Inside of: | 4 | | | |
| XYZ position: | 0 | 0.3856 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.34960000E+000 |
| Pos. Mtrx. R21 R22 R23 Y: | 0.00000000E+000 | 1.00000000E+000 | 0.00000000E+000 | 5.78400000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 64: | LED EMITTER C6 | | | |
| Object type: | Source Radial (NSC_SRAD) | | | |
| Reference object: | −3 | | | |
| Inside of: | 4 | | | |
| XYZ position: | 0 | −0.3856 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 1.34960000E+000 |
| Pos. Mtrx. R21 R22 R23 Y: | 0.00000000E+000 | 1.00000000E+000 | 0.00000000E+000 | −5.78400000E−001 |
| Pos. Mtrx. R31 R32 R33 Z: | 0.00000000E+000 | 0.00000000E+000 | 1.00000000E+000 | 7.29000000E−001 |
| # Layout Rays: | 0 | | | |
| # Analysis Rays: | 5000 | | | |
| Power(Watts): | 0.015 | | | |
| Wavenumber: | 0 | | | |
| Color #: | 3 | | | |
| X Half Width: | 0.1778 | | | |
| Y Half Width: | 0.1778 | | | |
| Unused 1: | 0 | | | |
| Unused 2: | 0 | | | |
| # Of Points: | 19 | | | |
| I(0.00): | 100 | | | |
| I(5.00): | 99.5 | | | |
| I(10.00): | 99.5 | | | |
| I(15.00): | 98.5 | | | |
| I(20.00): | 97.5 | | | |
| I(25.00): | 96 | | | |
| I(30.00): | 94 | | | |
| I(35.00): | 91 | | | |
| I(40.00): | 86 | | | |
| I(45.00): | 82 | | | |
| I(50.00): | 76 | | | |
| I(55.00): | 70 | | | |
| I(60.00): | 61 | | | |
| I(65.00): | 50 | | | |
| I(70.00): | 42.5 | | | |
| I(75.00): | 30 | | | |
| I(80.00): | 22 | | | |
| I(85.00): | 14 | | | |
| I(90.00): | 0 | | | |
| Object 65: | | | | |
| Object type: | Null Object (NSC_NULL) | | | |

TABLE 4-continued

ZEMAX Software Output Describing Surface Data Summary and Detail for the Exemplary Configuration illustrated in FIGS. 31-34

| | | | | |
|---|---|---|---|---|
| Reference object: | 0 | | | |
| Inside of: | 0 | | | |
| XYZ position: | 0 | 0 | 0 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 0.00000000E+000 |
| Material: | | | | |
| Index at 0.500000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| Object 66: | | | | |
| Object type: | Standard Lens (NSC_SLEN) | | | |
| Face 0: | Side Faces | | | |
| Coating: | (none) | | | |
| Scattering: | None | | | |
| Face 1: | Front Face | | | |
| Coating: | (none) | | | |
| Scattering: | None | | | |
| Face 2: | Back Face | | | |
| Coating: | (none) | | | |
| Scattering: | None | | | |
| Reference object: | 0 | | | |
| Inside of: | 0 | | | |
| XYZ position: | 0 | 0 | 51.2 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 5.12000000E+001 |
| Material: | 480R | | | |
| Index at 0.500000 μm = 1.53073072 | | | | |
| Index at 0.550000 μm = 1.52728428 | | | | |
| Index at 0.550000 μm = 1.52728428 | | | | |
| Index at 0.550000 μm = 1.52728428 | | | | |
| Index at 0.550000 μm = 1.52728428 | | | | |
| Radius 1: | 0 | | | |
| Conic 1: | 0 | | | |
| Clear 1: | 9.3 | | | |
| Edge 1: | 9.3 | | | |
| Thickness: | 1 | | | |
| Radius 2: | −350 | | | |
| Conic 2: | 0 | | | |
| Clear 2: | 9.3 | | | |
| Edge 2: | 9.3 | | | |
| Object 67: | | | | |
| Object type: | Rectangular Volume (NSC_RBLK) | | | |
| Face 0: | Side Faces | | | |
| Coating: | (none) | | | |
| Scattering: | None | | | |
| Face 1: | Front Face | | | |
| Coating: | (none) | | | |
| Scattering: | None | | | |
| Face 2: | Back Face | | | |
| Coating: | (none) | | | |
| Scattering: | None | | | |
| Reference object: | 0 | | | |
| Inside of: | 0 | | | |
| XYZ position: | 0 | 0 | 51.2 | |
| Tilt about XYZ: | 0 | 0 | 0 | |
| Pos. Mtrx. R11 R12 R13 X: | 1.00000000E+000 | 0.00000000E+000 | 0.00000000E+000 | 0.00000000E+000 |
| Pos. Mtrx. R21 R22 R23 Y: | 0.00000000E+000 | 1.00000000E+000 | 0.00000000E+000 | 0.00000000E+000 |
| Pos. Mtrx. R31 R32 R33 Z: | 0.00000000E+000 | 0.00000000E+000 | 1.00000000E+000 | 5.12000000E+001 |
| Material: | | | | |
| Index at 0.500000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| Index at 0.550000 μm = 1.00000000 | | | | |
| X1 Half Width: | 7.1 | | | |
| Y1 Half Width: | 5.3 | | | |
| Z Length: | 1.2 | | | |
| X2 Half Width: | 7.1 | | | |
| Y2 Half Width: | 5.3 | | | |
| Front X Angle: | 0 | | | |

TABLE 4-continued

ZEMAX Software Output Describing Surface Data Summary and Detail for the Exemplary Configuration illustrated in FIGS. 31-34

| | |
|---|---|
| Front Y Angle: | 0 |
| Rear X Angle: | 0 |
| Rear Y Angle: | 0 |
| Object 68: | |
| Object type: | Rectangular Volume (NSC_RBLK) |
| Face 0: | Side Faces |
| Coating: | (none) |
| Scattering: | None |
| Face 1: | Front Face |
| Coating: | (none) |
| Scattering: | None |
| Face 2: | Back Face |
| Coating: | (none) |
| Scattering: | None |
| Reference object: | 0 |
| Inside of: | 0 |
| XYZ position: | 0     0     51.2 |
| Tilt about XYZ: | 0     0     0 |
| Pos. Mtrx. R11 R12 R13 X: | 1.00000000E+000     0.00000000E+000     0.00000000E+000     0.00000000E+000 |
| Pos. Mtrx. R21 R22 R23 Y: | 0.00000000E+000     1.00000000E+000     0.00000000E+000     0.00000000E+000 |
| Pos. Mtrx. R31 R32 R33 Z: | 0.00000000E+000     0.00000000E+000     1.00000000E+000     5.12000000E+001 |
| Material: | 480R |
| Index at 0.500000 μm = 1.53073072 | |
| Index at 0.550000 μm = 1.52728428 | |
| Index at 0.550000 μm = 1.52728428 | |
| Index at 0.550000 μm = 1.52728428 | |
| Index at 0.550000 μm = 1.52728428 | |
| X1 Half Width: | 7.1 |
| Y1 Half Width: | 5.3 |
| Z Length: | 0.95 |
| X2 Half Width: | 7.1 |
| Y2 Half Width: | 5.3 |
| Front X Angle: | 0 |
| Front Y Angle: | 0 |
| Rear X Angle: | 0 |
| Rear Y Angle: | 0 |
| Object 69: | |
| Object type: | Detector Rect (NSC_DETE) |
| Face 0: | All Faces |
| Coating: | (none) |
| Scattering: | None |
| Reference object: | 0 |
| Inside of: | 0 |
| XYZ position: | 0     0     52.8 |
| Tilt about XYZ: | 0     0     0 |
| Pos. Mtrx. R11 R12 R13 X: | 1.00000000E+000     0.00000000E+000     0.00000000E+000     0.00000000E+000 |
| Pos. Mtrx. R21 R22 R23 Y: | 0.00000000E+000     1.00000000E+000     0.00000000E+000     0.00000000E+000 |
| Pos. Mtrx. R31 R32 R33 Z: | 0.00000000E+000     0.00000000E+000     1.00000000E+000     5.28000000E+001 |
| Material: | |
| Index at 0.500000 μm = 1.00000000 | |
| Index at 0.550000 μm = 1.00000000 | |
| Index at 0.550000 μm = 1.00000000 | |
| Index at 0.550000 μm = 1.00000000 | |
| Index at 0.550000 μm = 1.00000000 | |
| X Half Width: | 9.6 |
| Y Half Width: | 7.2 |
| # X Pixels: | 48 |
| # Y Pixels: | 36 |
| Data Type: | 0 |
| Color: | 2 |
| Smoothing: | 2 |
| Scale: | 0 |
| Plot Scale: | 0 |
| Front Only: | 0 |
| PSF Wave#: | 0 |
| X Angle Min: | −90 |
| X Angle Max: | 90 |
| Y Angle Min: | −90 |
| Y Angle Max: | 90 |
| Polarization: | 0 |

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. For example, other colored LEDs may be employed for the LED arrays 150 instead of the red, green, or blue LEDs mentioned in the above embodiment. As another example, although FIGS. 1-7, 13-15, 17-25, and 27 utilize concentrator elements 16, 216a-d, 316a-c, 416a-d, 516a-c, 616a-d, 716a-c, 816a-c, it may be envisioned to position a select number or all the LED arrays and/or LED array mounting boards (i.e. within any one of the embodiments above) near, adjacent to, or within any one of the various combiner elements thereby eliminating utilization of the concentrator element(s). FIG. 26 illustrates such a scenario wherein LED array mounting board 714c is positioned directly within combiner element 740. Even with the absence of the concentrator elements, optional field lenses may still be utilized between the LED arrays/LED array mounting boards, and the combiner element. As a further example, although some embodiments described above include utilization of separate dichroic plates, solid combiner elements (e.g. solid prism, pyramidal, or trapezoidal elements having dichroic coatings thereon and/or therein) may alternatively be employed to provide a similar or same function. Of course, the reverse may also be contemplated. The solid combiner elements may be comprised of glass, plastic, or polymer. Furthermore, although the preferred embodiments are described having certain color channels in certain locations (i.e. following certain paths), these color channel locations/paths may of course be modified as necessary by design. Further, in any of the embodiments above the integrator may be solid or hollow and may provide internal specular reflection or total internal reflection. The integrator may also be tapered in any of the embodiments. The integrator may optionally be used in combination with any of the concentrator elements described above (i.e. with or without the aperture elements, and regardless of the shape or size of the output surface of the concentrator elements). Each concentrator element (e.g. with or without the reflective aperture element thereon) in any of the embodiments above may be used interchangeably with any of the remaining embodiments and would function as contemplated in conjunction with the remaining system elements. It is therefore to be understood that the present invention is not limited to the particular embodiments disclosed above, but it is intended to cover such modifications and variations as defined by the following claims.

What is claimed is:

1. An optical system for a digital light projection system, the optical system comprising:
   at least one LED array, wherein each LED array comprises a plurality of LEDs; and
   an optical concentrator element positioned substantially adjacent to each LED array, wherein each concentrator element reflects light emitted from the plurality of LEDs within the corresponding LED array so as to provide reflected light at an output surface of each concentrator element; and
   an aperture element positioned substantially adjacent to the output surface of each concentrator element, wherein the aperture element includes a reflective surface and an aperture defined by the reflective surface, wherein the reflective surface faces the output surface of each concentrator element such that a first portion of the reflected light is intended for projection through the aperture without reflection by the reflective surface, while a second portion of the reflected light is reflected by the reflective surface back into the concentrator element to thereby provide light which is additionally reflected within the concentrator element, and wherein the first portion of the reflected light and the additionally reflected light is spatially combined at the output surface of each concentrator element at the aperture to thereby provide substantially uniform light which is projected through the aperture.

2. The optical system of claim 1, wherein the aperture element comprises a reflective coating which has the reflective surface located on the output surface of each concentrator element.

3. The optical system of claim 1, wherein the aperture element comprises a reflective plate which has the reflective surface facing the output surface of each concentrator element.

4. The optical system of claim 1, wherein the aperture is rectangular.

5. The optical system of claim 1, wherein the aperture has an aspect ratio other than 1:1.

6. The optical system of claim 1, wherein the aperture has an aspect ratio of 16:9.

7. The optical system of claim 1, wherein the output surface of each concentrator element is planar.

8. The optical system of claim 1, wherein the output surface of each concentrator element is planar and forms an angle other than 90° with respect to a longitudinal direction of the concentrator element.

9. The optical system of claim 1, wherein the output surface of each concentrator element is curved.

10. The optical system of claim 1, wherein the output surface of each concentrator element is curved only in locations adjacent the reflective surface.

11. The optical system of claim 1, wherein the output surface of each concentrator element is curved only in locations adjacent the aperture.

12. The optical system of claim 1, wherein the output surface of each concentrator element is diffusive.

13. The optical system of claim 1, wherein the output surface of each concentrator element is diffusive only in locations adjacent the reflective surface.

14. The optical system of claim 1, wherein the output surface of each concentrator element is diffractive.

15. The optical system of claim 1, wherein the output surface of each concentrator element is diffractive only in locations adjacent the reflective surface.

16. The optical system of claim 1, wherein the output surface of each concentrator element is faceted.

17. The optical system of claim 1, wherein the output surface of each concentrator element is faceted only in locations adjacent the reflective surface.

18. The optical system of claim 1, wherein the output surface of each concentrator element comprises lenslets.

19. The optical system of claim 1, wherein the output surface of each concentrator element comprises lenslets only in locations adjacent the reflective surface.

20. The optical system of claim 1, wherein the reflective surface is diffusive.

21. The optical system of claim 1, wherein the reflective surface is diffractive.

22. The optical system of claim 1, wherein the reflective surface is faceted.

23. The optical system of claim 1, wherein the reflective surface comprises lenslets.

24. The optical system of claim 1, wherein the concentrator element is positioned directly in contact with each corresponding LED array.

25. The optical system of claim 1 further comprising an optical coupling material positioned between the concentrator element and each corresponding LED array, wherein the optical coupling material is in contact with the concentrator element and each corresponding LED array.

26. The optical system of claim 25, wherein the optical coupling material comprises a gel having an index of refraction which substantially matches that of the concentrator element.

27. The optical system of claim 1, wherein each LED array comprises LEDs which are less than 0.35 mm in width.

28. The optical system of claim 1, wherein each LED array comprises LEDs which are spaced from adjacent LEDs within the same array by an amount less than 0.025 mm.

29. The optical system of claim 1, wherein the concentrator element has a conic shape.

30. The optical system of claim 1, wherein the concentrator element has a complex conic shape.

31. The optical system of claim 1, wherein the concentrator element has a substantially parabolic cross section.

32. The optical system of claim 1, wherein the concentrator element comprises a material selected from the group consisting of a polymer, plastic, glass, metal, and combinations thereof.

33. The optical system of claim 1, wherein the concentrator element comprises Zeonex®.

34. The optical system of claim 1, wherein the reflection of light performed by each concentrator element is total internal reflection.

35. The optical system of claim 1, wherein the reflection of light performed by each concentrator element is specular reflection.

36. The optical system of claim 1, wherein a specularly reflective element is positioned only on a limited portion of an outer surface of each concentrator element which is in the vicinity of each corresponding LED array such that the reflection of light performed by each concentrator element comprises specular reflection and total internal reflection.

37. The optical system of claim 1, wherein each concentrator element is solid.

38. The optical system of claim 1, wherein each concentrator element is hollow.

39. The optical system of claim 1, wherein the optical system is an illumination optical system.

40. The optical system of claim 1 further comprising a digital imaging device.

41. The optical system of claim 40, wherein the output surface of each concentrator element is imaged directly on the digital imaging device.

42. The optical system of claim 40, wherein the imaging device has an aspect ratio other than 1:1.

43. The optical system of claim 40, wherein the imaging device has an aspect ratio of 16:9.

44. The optical system of claim 1, wherein the plurality of LEDs within each LED array is of substantially the same color.

45. The optical system of claim 1, wherein the plurality of LEDs within each LED array comprise a plurality of colors.

* * * * *